United States Patent [19]

Nelson et al.

[11] Patent Number: 4,679,191

[45] Date of Patent: Jul. 7, 1987

[54] VARIABLE BANDWIDTH SWITCHING SYSTEM

[75] Inventors: Gary A. Nelson, Irvine; Patrick N. Godding, Tustin; Richard E. Schumaker, Orange; Keith D. Walter, Huntington Beach; Edward S. Marrone, Los Angeles; Stillman E. Gates, Capistrano Beach; Everett O. Rigsbee, III, San Rafael; Michael D. Teener, Irvine, all of Calif.

[73] Assignee: CXC Corporation, Irvine, Calif.

[21] Appl. No.: 611,462

[22] Filed: May 17, 1984

Related U.S. Application Data

[63] Continuation-in-part of Ser. No. 491,551, May 4, 1983, Pat. No. 4,587,651, Ser. No. 582,182, Feb. 21, 1984, and Ser. No. 582,069, Feb. 21, 1984, Pat. No. 4,598,397.

[51] Int. Cl.[4] .......... H04J 3/22; H04J 3/16

[52] U.S. Cl. .......... 370/84; 370/88; 370/89; 370/118

[58] Field of Search .......... 370/85, 86, 88, 89, 370/94, 118, 79; 340/825.5

[56] References Cited

U.S. PATENT DOCUMENTS

| | | | |
|---|---|---|---|
| 3,961,139 | 6/1976 | Bowman et al. | 370/89 |
| 4,019,176 | 4/1977 | Cour et al. | 370/89 |
| 4,293,948 | 10/1981 | Soderblom | 370/90 |
| 4,358,845 | 11/1982 | de Passoz | 370/118 |
| 4,383,314 | 4/1983 | Tam | 370/88 |
| 4,494,232 | 1/1985 | Dambrackas et al. | 370/118 |

*Primary Examiner*—Douglas W. Olms

*Assistant Examiner*—Curns Kuntz

*Attorney, Agent, or Firm*—Knobbe, Martens, Olson & Bear

[57] ABSTRACT

The present invention provides a communications system that improves upon the availability of communications paths between devices and simplifies the connectivity requirements to communicate data and control information to and from a remote station. System nodes are provided which are disposed along a time multiplex network signal stream. The nodes serve to interface remote stations to the network signal stream and may also switch information to different stations connected to the same node. The nodes are operative to allocate a variable bandwidth of the network signal stream for data communications between devices connected to different nodes. The nodes include switching devices that may be configured to accommodate stations that operate at different speeds. Allocation of bandwidth may be dynamically varied such that system resources are not unnecessarily diverted. Control of bandwidth allocation and internal switching within the node is accomplished via control information communicated to and from the node. Such control information may be contained within the network signal stream and decoded by the node or communicated to the node via a dedicated control communications line. Control information may be encoded into the signal stream communicated between the system node and the remote station. Thus, communication of data and control signals between the stations and the system node does not require complex wiring. Accordingly, individual stations may be more conveniently located.

25 Claims, 9 Drawing Figures

CONTROL LOGIC TRUTH TABLE

| $B_1$ | $B_0$ | A | B | C | D | FUNCTION |
|---|---|---|---|---|---|---|
| 0 | 0 | ON | OFF | ON | OFF | INSERT |
| 0 | 1 | OFF | ON | OFF | ON | PASS |
| 1 | 0 | ON | ON | ON | OFF | MULTIDROP |
| 1 | 1 | X | X | X | X | |

RING TIMESLOT SERVER PROGRAM

DATA TRANSFER FORMATS - LOCAL

| SIGNAL NAME | DIE PAD | DIP PIN |
|---|---|---|
| HYWOØ | | 11 |
| 1 | | 12 |
| 2 | | 13 |
| 3 | | 14 |
| 4 | | 15 |
| 5 | | 16 |
| 6 | | 17 |
| 7 | | 18 |
| HYW1Ø | | 39 |
| 1 | | 40 |
| 2 | | 41 |
| 3 | | 42 |
| 4 | | 43 |
| 5 | | 44 |
| 6 | | 45 |
| 7 | | 46 |
| LOØ | | 06 |
| 1 | | 07 |
| 2 | | 08 |
| 3 | | 09 |
| L1Ø | | 02 |
| 1 | | 03 |
| 2 | | 04 |
| 3 | | 05 |

| SIGNAL NAME | DIE PAD | DIP PIN |
|---|---|---|
| FSO | | 25 |
| HOC | | 26 |
| FSI | | 38 |
| HIC | | 37 |
| R/W | | 28 |
| STB | | 27 |
| ADØ | | 23 |
| 1 | | 22 |
| 2 | | 21 |
| 3 | | 20 |
| 4 | | 19 |
| LC | | 10 |
| CI | | 47 |
| INT | | 48 |
| DATØ | | 36 |
| 1 | | 35 |
| 2 | | 34 |
| 3 | | 33 |
| 4 | | 32 |
| 5 | | 31 |
| 6 | | 30 |
| 7 | | 29 |
| VCC | | 01 |
| VSS | | 24 |

| SIGNAL NAME | DIE PAD |
|---|---|
| HØRC9 | |
| HIRC9 | |
| ISRTP | |
| OSRTP | |

396
PACKET CHANNEL OUT (4 EACH)
(1) SEE LOGIC ON FIG. 26

CCITT CRC CKT 353

FIG 26 PROVIDES LOGIC CIRCUIT REFERENCED ON FIGURES 24 AND 25

FIG 24 CRC CKT REQUIRES PART "A" ONLY (4 EACH)

FIG 25 CRC CKT REQUIRES PARTS "A" AND "B" (4 EACH)

OUTPUT LINE CONTROL

LINE IN CONTROL

387

PACKET CHANNEL OUT TIMING 24

① OUTPUT UNDERRUN (SET K BIT AND INHIBIT CRC GEN)
K AND X DATA IS ALL ONES

② CLOCK BY FSID

INPUT MESSAGE CTL TIMING (33)

* EDGES DELAYED BY ONE LIC CLOCK PERIOD (MOS. CKT DID NOT USE LIC.)

CRITICAL TIMING PATHS

Synchronization Pattern

CLEAR CHANNEL RATE CONVERSION

RESYNCHRONIZATION OF TERMINAL DATA

MICROPROCESSOR INTERFACE 623

PACKET CHANNEL RECEIVE LOGIC

CRC CHECKING LOGIC

CRC TIMING

CRC GENERATOR LOGIC

VARIABLE BANDWIDTH SWITCHING SYSTEM

RELATED APPLICATIONS

This is a continuation-in-part of parent patent applications: Ser. No. 491,551 filed May 4, 1983 now U.S. Pat. No. 4,587,651 issued 5/6/86, inventors GARY A. NELSON, PATRICK N. GODDING, RICHARD E. SCHUMAKER, KEITH D. WALTER, EDWARD S. MARRONE, STILLMAN F. GATES, EVERETT O. RIGSBE III, MICHAEL D. TEENER, and entitled "DISTRIBUTED VARIABLE BANDWIDTH SWITCH FOR VOICE, DATA, AND IMAGE COMMUNICATIONS; Ser. No. 582,182, filed Feb. 21, 1984 still pending, inventors GARY A. NELSON and STILLMAN F. GATES, entitled "QUAD PER LINE SWITCH"; and Ser. No. 582,069, filed Feb. 21, 1984 now U.S. Pat. No. 4,598,397 issued 7/1/86, inventors GARY A. NELSON and PATRICK N. GODDING, entitled "MICROTELEPHONE CONTROLLER".

BACKGROUND OF THE INVENTION

This invention relates to digital voice/data/control switching systems and more particularly to circuitry for dynamically enabling the transfer of a variable bandwidth of information between a network signal stream and a local communications station.

As the complexity of data communications networks increases, the need for simpler and more economical methods of interfacing the various devices on the networks becomes critical. Simple interconnection between two devices such as two telephones or such as a computer and a terminal can be accomplished quite easily. For example, communications can be established between devices with one wire, such as was done with an early telegraph system. Though each device had simultaneous access to the one wire, typically connecting a remote junction box to a central switching location, only one device at a time could use the wire to send messages to other devices. When the device relinguished the line, another device could then use the line to send messages. Since only one device could use the line to send at any one time, the number of messages which could be sent would be quite low. Thus, the data rate of the systems was low. Some protocol was established for determining which device had the use of the line at any time. Considering the relative simplicity of such a system and the low data rates, and the fact that the system was most likely under the jurisdiction of one entity, such as the telegraph company, the protocol could be as simple as listening to determine whether the line was in use. As the volume of signal traffic on the line became greater and the need for immediate availability of communication paths increased, alternative systems came into use.

Most present day switching systems employ star architectures or distributed star architectures. In the star architecture, a large central switch is employed and all stations are wired to a central location. At the central location, a communications line from one device could be connected to the communications line from another device to which communication was to be established. This could be done manually as with an operator at switchboard, electromechanically such as in a complex telephone crossbar system, or under computer control as is done in modern telephone networks.

Although the method of running communications lines from each user to a central location has many advantages, it has the distinct disadvantage of requiring a communications line from each device to a central location. Thus, although two devices might be relatively close to each other compared to the distance to the central location, communications between the two devices would be routed through the central location. In a large, widespread network this would require substantial expenditures for the communications lines that would remain idle much of the time. If another device has to be added to an existing system a new dedicated communications line would have to be added to connect the device to the central location. Moreover, since the entire system was dependent upon proper operation of a central switch, the survivability of the system was low. It is obvious that such a method of interconnecting communications devices has substantial economical and practical drawbacks.

A distributed star still employs a large central switch but reduces the wiring requirements to that switch by multiplexing many conversations, or circuit paths, onto the wiring between the central switch and peripheral switching units. The advantages of distributed switching include improved reliability, improved availability, improved survivability, and reduced installation in wiring costs. However, a fundamental obstacle has prevented the widespread adoption of distributed switching, that obstacle being connectivity or allocation of circuit paths among the various nodes of the network. The connectivity between peripheral switching units remains limited to the number of circuit paths or "party lines" carried on the multiplexed wiring between the central switch and the peripheral switching units (PSU). The users in a given area would have to wait until the party line to the central switching location was not in use before initiating a message. As was frequently the case, a large number of users could want to send more messages than such a system could handle in a given time frame. Connectivity is not a problem when the switch is non-blocked, i.e. there is a circuit path for every station in the system, such as in the earlier star architecture. However, the cost of a non-blocked system is excessive and some level of blocking is introduced in order to reduce the cost per station of the system. The challenge is therefore to provide a communications system that employs some degree of blocking to avoid costly redundancies, but does so in a widely distributed manner to avoid bottlenecks in the signal traffic.

In the distributed star, blocking may be introduced in the PSU. Consequently, all stations on the PSU may contend for the number of circuits that exist between the PSU and the central switch. Typically the number of calls initiated per unit time varies from one PSU to another. To obtain a desired grade of service, i.e. the likelihood that a circuit path will be available for a call, it is thus necessary to balance the load on the PSU's by physically changing the number of telephones wired thereto. Because of the dynamic nature of modern businesses, the offered load to each PSU changes with time necessitating an ongoing process of traffic analysis followed by physically disconnecting and reconnecting telephones from one PSU to another. That process is costly, time consuming and introduces reliability problems.

When the number of circuits is small a significantly larger ratio of circuits to telephone sets (telesets) is required to ensure a fixed grade of service. For example, a 30% grade of service is insured by providing three circuits to service ten telsets, but requires two circuits to service four telsets. Therefore, in order to minimize the number of dedicated circuits, a more desirable system would allow the number of circuits per PSU to vary dynamically in accordance with the number of associated telesets. Ideally, the system would allow for the offered load from a local station to contend for all the circuits of the central switch rather than to contend for the small and fixed number of circuits at an individual PCU.

One approach to the problem developed in the prior art is the use of time division multiplexing of digital data. In a system which uses time division multiplexing a communications line is not provided from each device to a central location. Instead, each device is connected to other devices relatively close to it. Thus, there are considerable savings in the number of communications lines needed to interconnect the devices in a network. All the devices in a communications network may be connected in a ring, chain or the like, with each device connected to two other devices, or to one other device in the case of a device at the end of a chain connection. Although it might appear that such a device would then only be able to communicate with a device to which it has a direct connection, each device can communicate with all other devices connected to the network. The network ring or chain is continuous, with each device either tapping the ring or chain, or forming a part of the ring or chain. Although the devices are physically connected to the same line at any one time, and do not transmit data at the same time, the devices may be time multiplexed and need not have to wait until other devices complete their messages before sending their own messages. Communication between devices can typically be accommodated using only a portion of the time available in each cyclical message frame, thereby allowing the ring to communicate numerous messages within a given period. Moreover, the message pool includes all the resources of the network signal stream. Thus, blocking is provided on the most distributed basis possible.

When time division multiplexing is employed the communications line is not assigned solely to one device until the completion of a message. Instead, the line is assigned to each device for a relatively short period of time, typically referred to as a time slot. Other devices in the communications network are likewise assigned to time slots. The time slots occur periodically on the communications line, and are repeated at a frequency such that the device can send or receive data continuously at its normal data rate. A message frame is comprised of all the time slots available for devices.

In an exemplary system utilizing time division multiplexing, the communications devices might operate at a data rate of 1000 bits per second (bps). A communication line operating at 100,000 bps would be able to transfer messages to or from this device and 99 similar devices in a message frame which has a 1000 hertz repetition rate. The data from each device would be assigned to each of the 100 one-bit time slots in the message frame. Other configurations could assign the time slots for devices in multiple-bit groups.

In either the contemporary centralized network or the contemporary ring network, however, devices can only be added to the system if there are time slots available in a message frame. Therefore, it would be difficult, if not impossible, to add the 101st device to the exemplary system if the available time slots are permanently assigned to other devices. In many communications applications the devices present in the system probably would not all be communicating at the same time. Thus, there could be a substantial number of the time slots idle at any given time. However, a typical prior art communications system would not have the flexibility to reassign the idle time slots to additional devices to take greater advantage of the available time slots. Although increasing the number of time slots would accommodate extra devices, if possible to do so, the incremental increase in the number of time slots might be large compared to the number of devices to be accommodated, and therefore could result in a large number of unused time slots.

Another problem with the typical prior art system utilizing time division multiplexing is that devices operating at different data rates cannot be accommodated. Although the time slot allocations in a message frame might be adequate for most devices in a system, there is often a need for other devices operating at higher or lower data rates. For example, a system might consist primarily of digitized telephones operating at 64,000 bps. If a typical network is configured to accommodate the telephones, it might not be able to accommodate the communications to and from a terminal device operating at other data rates, e.g. 19,200 bps. Furthermore, a device might be such that it operates at different rates when communicating with different devices. Thus, a time slot assignment sufficient to accommodate a 19,200 bps data rate would be partially unused if the device were to operate at 9600 bps or a lower data rate. Similarly, a time slot assigned to a terminal device operating at 9600 bps would not be able to accommodate the same device operating at 19,200 bps.

A voice signal can be transferred without any appreciable loss of quality as a stream of 64,000 data bits per second (64,000 bps). The voice signal is sampled at periodic intervals by the sending device; the samples are converted to a digital format; the digital data is transferred to the receiving device as a stream of data bits; and the digital data is converted to a voice signal by the receiving device.

In comparison to a voice signal, the transmission of character information between a computer and a high-speed video terminal can require data transmission rates in the range of 19,200 bps. On the other hand, a typical teletypewriter terminal might only require data at a rate of 110 to 300 bps to operate at full capacity.

Typically a data communications network, therefore, needs to be capable of handling data rates from 110 bps to 19,200 bps, and under some circumstances up to 1,000,000 bps or more.

As can be readily seen from the foregoing, the implementation of time division multiplexing in the prior art accomplished a significant savings in physical resources in a typical communications network. However, the prior art systems have serious limitations with regard to flexibility in light of the ever increasing demands on data communications systems, both with regard to the increases in the quantity of devices to be connected to a system and with regard to widespread variations in the communications rates used by those devices.

In practice, a user at a given location will have both voice and data communications equipment which may be alternately, or simultaneously used. Preferably, the communications equipment connecting the local station to the network should be able to accept either or both voice and data information, format information for communication to the network, and synchronize the data rates of that information with the network data rate. The equipment should also have the ability to dynamically modify the network bit space allocation assignable to the particular communications device in accordance with the operating requirements of that device. The equipment should preferably be able to effect those functions without the need for extensive control equipment at the local equipment, and without the need for connecting the local equipment to dedicated control lines. The system should have the ability to communicate control information to and from the network controller using the same lines used to communicate voice and data information, thus simplifying the connection requirements for individual communications devices.

In contemporary communications systems interconnection of devices that operate with different communications formats and information rates is accomplished through the use of interface devices that perform a specialized function and operate with only one or, at most, a small number of terminal devices. Generally, such interface devices are hardwired with regard to formats and rates, or are manually switchable. Such devices do not lend themselves to control by a central network controller and do not provide the requisite flexibility in the rapidly expanding communications field.

SUMMARY OF THE INVENTION

A digital communications system for transfer of a variable bandwidth of information from a network signal stream to a digital communication device. The deive comprises at least one network path (25) for carrying the network signal stream, the network path (25) having a first bandwidth; a plurality of digital communication devices 11 at least one of which has a lower bandwidth than the first bandwidth, a first device (11) being operative to generate a message signal for communication to another device (11); and controller (77, 110, 611, 612) operative to interpret the message signal and to make variable allocation of the first bandwidth between the first device (11) and a second device (11) to enable a communications path from a first device (11) to a second device (11).

The present invention provides a digital communication system for transfer of a variable bandwidth of information between a network signal stream and local information highways connectable to digital communications devices. The communications system includes a demultiplexer (53) operative to convert a serial network signal stream into a plurality of signal streams communicated to network receive highways (62). The system further includes a multiplexer (33) operative to receive a plurality of signal streams on network receive highways (64) and to convert the received signal streams to a serial network signal stream. The system also includes data steering logic (41) connected to the network transmit and receive highways (62,64) and in electrical communication with at least one node transmit information highway (68) and at least one node receive information highway (66). The data steering logic is operative to selectively transfer a variable bandwidth of information between the network highways (62,64) and the node information highways (66,68).

The data steering logic (41) may be operatively controlled by a data steering map (107) which maintains information representative of the proper configuration of the data steering logic (41) to correlate information transfer between at least one of the network highways (62,64) and at least one of the node information highways (66,68). The data steering map (107) may be dynamically updated to reformat the information transfer in response to control data configuration signals.

The network signal stream may be communicated to the system by a network loop (25), which may be configured as a ring. The network signal stream may incorporate a control data portion and a circuit switched data portion. The circuit switched data portion may include machine data, voice data, and/or image data. The control data portion may alternatively be communicated from a dedicated control line to the system, and vice versa, via a local area network controller (81,125) and an ethernet transceiver (31). The communicated control information may be useful to regulate highway selection and the bandwidth of the information transferred between the network highways (62,64) and the node information highways (66,68).

Control information communicated to the system may be used by data processor (77,110) to formulate the control data configuration signals communicated to the data steering map control logic (109).

The present invention provides a communication system that improves upon the availability of communication paths between devices and simplifies the connection requirements to transmit data and control information. A plurality of system nodes are provided which are disposed along a time multiplexed network signal stream. The nodes are interconnected to a plurality of individual communications devices. The nodes serve to interface with devices to the network signal stream for communication with other devices, interconnected with different nodes. The nodes may also switch information along different communications devices connected to a single node.

The nodes can allocate a variable bandwidth of the network signal stream for communication with devices connected to different nodes. The nodes contain switching devices that may be configured to accommodate communications devices that operate at different speeds. Allocation of bandwidth and configuration of the internal switching devices may be dynamically varied such that system resources are not unnecessarily diverted.

Control of the bandwidth allocation and the internal switching within the node is accomplished via control information communicated to the node. Network control information may be contained within the network signal stream and decoded by the node. Alternatively, network control information may be communicated via a dedicated communications line. Locally, control information is encoded into the signal stream communicated between the system node and the individual communications devices. Thus, communication and control signals between the local devices and the system node does not require custom wiring. Where control information is encoded with the data information from the system node, a microtelephone controller is provided. The microtelephone controller is typically located near the station device and serves to derive the integrated control information and implement that information in controlling communications between the system node and local data and/or voice stations. Accordingly, one or more voice and/or data devices may be conveniently interfaced with the system node without the need for extensive interconnecting wiring.

In accordance with the present invention, the network system is preferably configured as a synchronous time division multiplexed ring, or loop, wherein messages at a node may be passed along the loop, or selectively diverted to or between peripheral highways interconnecting one or more terminal devices to a node. Both the network loops and the peripheral highways are adapted to provide variable bandwidth message carrying capacity. The network loop may incorporate dual loops with each loop in either a single loop configuration, or a redundant double-loop configuration with counter rotating data flow. In redundant double-loop configuration one loop may be used to carry circuit switched voice and data while we the other loop may carry digitized video or other high-speed data channels. Thus voice, data and digitized video transmissions may be integrated into a single distributed communication system having the capability to recover from catastrophic equipment and cabling failures.

The terminal devices, also referred to as remote stations, connected to the peripheral highways of the node, may operate in synchronization with the network loop, or asynchronously, and may utilize the network bandwidth capacity, as necessary, on a dynamic basis. Inactive stations and/or stations engaged in intranodal communications need not utilize any of the network capacity. Control functions are preferably minimized by delegating some bandwidth to each terminal device for anticipated transmission requirements, according to ongoing analysis of the activity patterns of the device. Additional bandwidth requirements resulting from heavier activity are accommodated via requests for more bandwidth to the network time slot manager.

The invention allows each node to employ as much of the ring network bandwidth as is required to meet its communication need. The presently preferred embodiment of the invention employs a network capacity of over 4,000 individually allocatable bit stream segments, or channels, of 8,000 bps each. Eight channels are provided that may be allocated 1, 2, 4, or 8 at a time, providing incremental bandwidths of 8, 16, 32 and 64 kbps. Alternate embodiments may allocate channels 1, 2, 3, 4, 5, 6, 7 or 8 at a time to provide bandwidths of 8, 16, 24, 32, 40, 48, 56, or 64 kbps. In addition, eight 64 kbps channels can be concatenated to provide transmission paths of as much as 512 kbps. These high speed channels can be used to accommodate integrated voice, data, and digital compressed video workstations.

In the presently preferred embodiment, circuit switched data communications traffic may be encoded and carried to terminal devices within synchronous channels, whose capacity is an integer power of two times 8000 bps. Thus, all data traffic below 8000 bps (e.g., 50 bps, 1200 bps, or 4800 bps) may be carried at 8000 bps. 9600 bps traffic may be carried at 16 kbps. 19,200 bps traffic may be carried at 32 kbps. 38.4 kbps and 56 kbps traffic may be carried at 64 kbps.

Nodes constructed in accordance with the preferred embodiment of this invention can switch digital information between a plurality of internal high speed information input highways and a plurality of internal high speed information output highways, or between internal high speed information highways and externally connected lower speed peripheral highways connected to local communications devices. The invention allows the input data source, the input data rate, the channel selection, the channel bandwidth, the output data rate, the output destination, and the data format to be selected within the device under program control. The node may also write data provided from an external control means to a plurality of information highway outputs, and read data from a plurality of information highway inputs for access by an external control means. The node may also communicate with synchronous lower speed device channels utilizing error monitored data sequences without requiring external synchronization circuits. Thus, the invention provides the flexibility needed to dynamically configure a communications network to the constantly changing and increasing demand of a modern voice, data and image communications system.

The present invention also provides digital telephone stations including a microtelephone controller that can receive serial information from a system node and transmit that information to one or more local communication devices, operating at different rates, as a serial voice and/or serial data stream. In addition, the microtelephone controller can extract control and status information from the serial information stream from the system node and present that information in parallel form to a local microprocessor that can manage information transfer between the system node and one or more local communications devices.

The microtelephone controller described herein also incorporates apparatus that can receive serial voice and serial data from local communication devices and receive parallel data from the microprocessor, whereupon the digital telephone station can transmit the combined circuit switched data and control data in serial form to the system node. The apparatus further provides the capability of interfacing between variable bandwidth data communications devices, with the bandwidth and data formats being selectable under external program control.

The microtelephone controller thereby integrates voice, data, and control information into the signal stream communicated to and from the system node. Thus, the need for custom wiring and sophisticated communications buses between the system node and the individual work station may be avoided even where the work station incorporates a plurality of different types of devices, which can utilize the services of the network.

BRIEF DESCRIPTION OF THE DRAWINGS

The foregoing objects, features, and advantages as well as others of the invention will be more fully comprehended from the following description and accompanying drawings in which:

FIG. 1(*b*) is an illustration of a prior art distributed star PBX.

FIG. 2(*b*) is a high level illustration of a representative PBX ring network including a baseband bus local area network.

FIG. 2(*c*) is a high level illustration of a representative PBX ring network including a dual ring transmission scheme.

FIG. 3(*b*) is an illustration of an exemplary signal frame.

FIG. 6(*b*) is an illustration of the switching within a ring interface and control unit (RICU).

FIG. 8(*b*) is a flow chart of the functions of the Network Timeslot Manager (NTM);

FIG. 8(*c*) is a flow chart of the functions of the Network Timeslot Servers (NTS);

FIG. 13(*b*) shows data flow from the station port to the information highways.

FIG. 13(*c*) shows a detailed block diagram of an input shift register in FIG. 13(*a*).

DETAILED DESCRIPTION OF THE PREFERRED EMBODIMENT

Prior Art PBX Systems

Figure 1A:
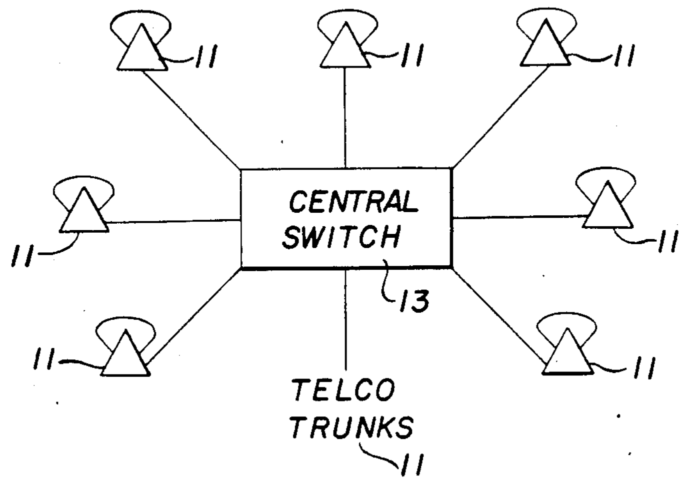
FIG. 1(*a*) is an illustration of a prior art star architecture PBX.
Figure 1B:
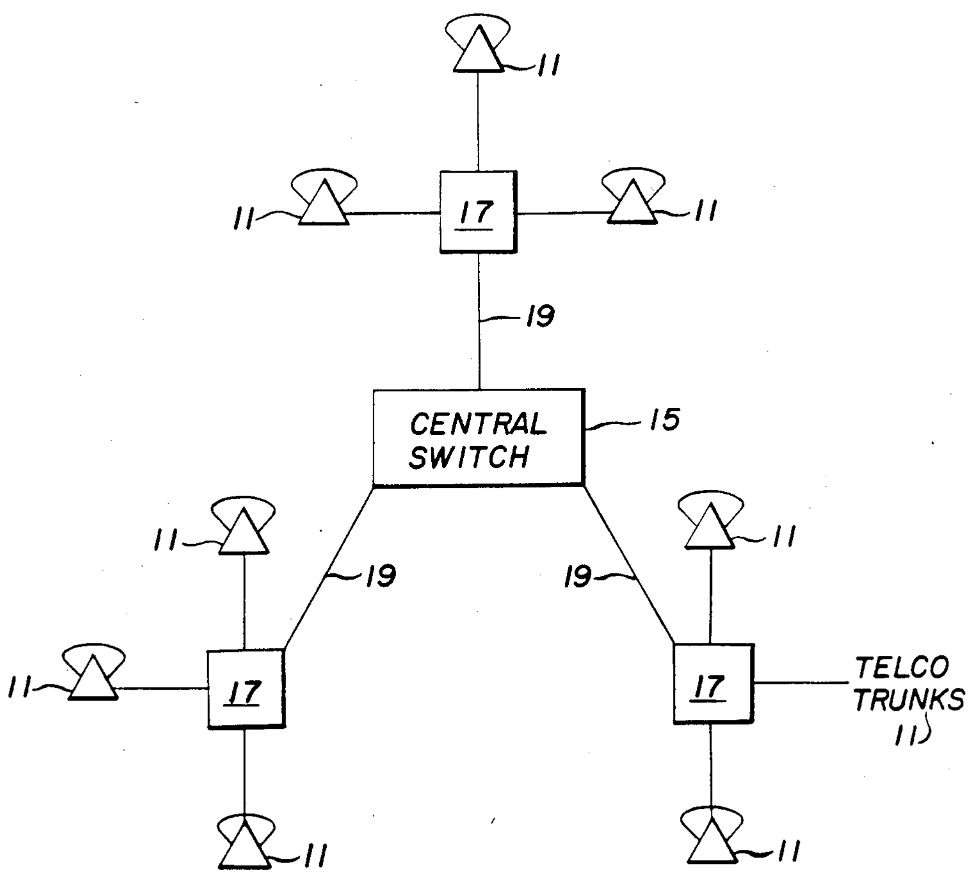

FIG. 1(*a*) illustrates a representative star architecture PBX such as one currently produced by Lexar Corporation. In operation, communications between individual stations 11 are effected via dedicated communications lines interconnected on a point-to-point basis at central switch 13. When a user at one station desires to communicate with another, he takes the receiver off hook and dials a number on the local station. That action causes the signal to be sent to the central switch 13 which connects a communication path with the station being called. The control switch 13 typically incorporates a time multiplexed switching network that includes time slots dedicated to the switching requirements of individual stations. The central switch 13 is a time slot interchange that typically provides two time slots for each station connected to the central switch. In this manner, the system operates in a nonblocking mode, i.e. a communications path is always available, providing total connectivity for all peripheral voice and data devices 11. In some applications the nonblocking nature of such products can be advantageous because no traffic engineering is required to obtain an adequate level of performance. However, such products suffer from a significant lack of flexibility because the total system size is limited, absolutely, to the traffic capacity of the central switch.

Other contemporary systems, such as the Model SX-2000 system produced by Mitel Corporation, have addressed the expansion requirement by adding an expansion switching module that effectively doubles the capacity of the time slot interchange. Such systems, however, still require dedicated communications lines between the local stations 11 and a central switch. Moreover, a number of connecting lines between the central switch and the expansion modules are limited. Thus, the capacity of the switch remains limited despite the addition of expansion switching modules.

The distributed star PBX illustrated in FIG. 1(*b*) is representative of commercial systems currently available, such as the SL-1 system produced by Northern Telecom, Inc. The primary switching element is time slot interchange (TSI) 15, which serves as the central switch and is connected to each of the peripheral switching units (PSU) 17 by means of communication paths 19, which typically operate at 2.048 Mbps and carry 30 channels of PCM voice traffic. Individual stations 11 are separately connected to PSU's. In practice, a user at local station 11, desiring to communicate with another station, will take the receiver off hook and dials a number. That action causes a signal to be sent to a PSU 17 and then to central switch 15 which connects the user to another station 11 via communication some path 19 and some PSU 17.

All communications between a station connected to one PSU and a station connected to another PSU must proceed via the communication paths through the TSI 15 which performs all switching functions. Moreover, in many cases, even signals between stations connected to a common PSU must also be conducted via the communication paths to the TSI, where the signal is then channeled back to the originating PSU. Such a system is inherently inefficient because it uses system capacity for intra-PSU traffic. Also, data transmission in such systems typically uses a full 64 kbps time slot even if the data speed is, for example, only 4800 bps. Moreover, those time slots remain dedicated to a particular connection, whether in use or not, and are unavailable for other connections.

In some other contemporary systems the PSU serves as an intercom switch to channel local traffic without the need for communicating the local signal to the TSI. However, such systems retain the inherent fixed level of connectivity associated with the branch connecting to the control switch and also remain statistically inefficient due to the poorer utilization of the total pool of time slots.

Overview of Dynamic Network Switching

As detailed below the system provided in the present invention allows dynamic allocation of the network signal stream, thereby providing dynamic connectivity as well as variable bandwidth circuits.

Figure 2A:
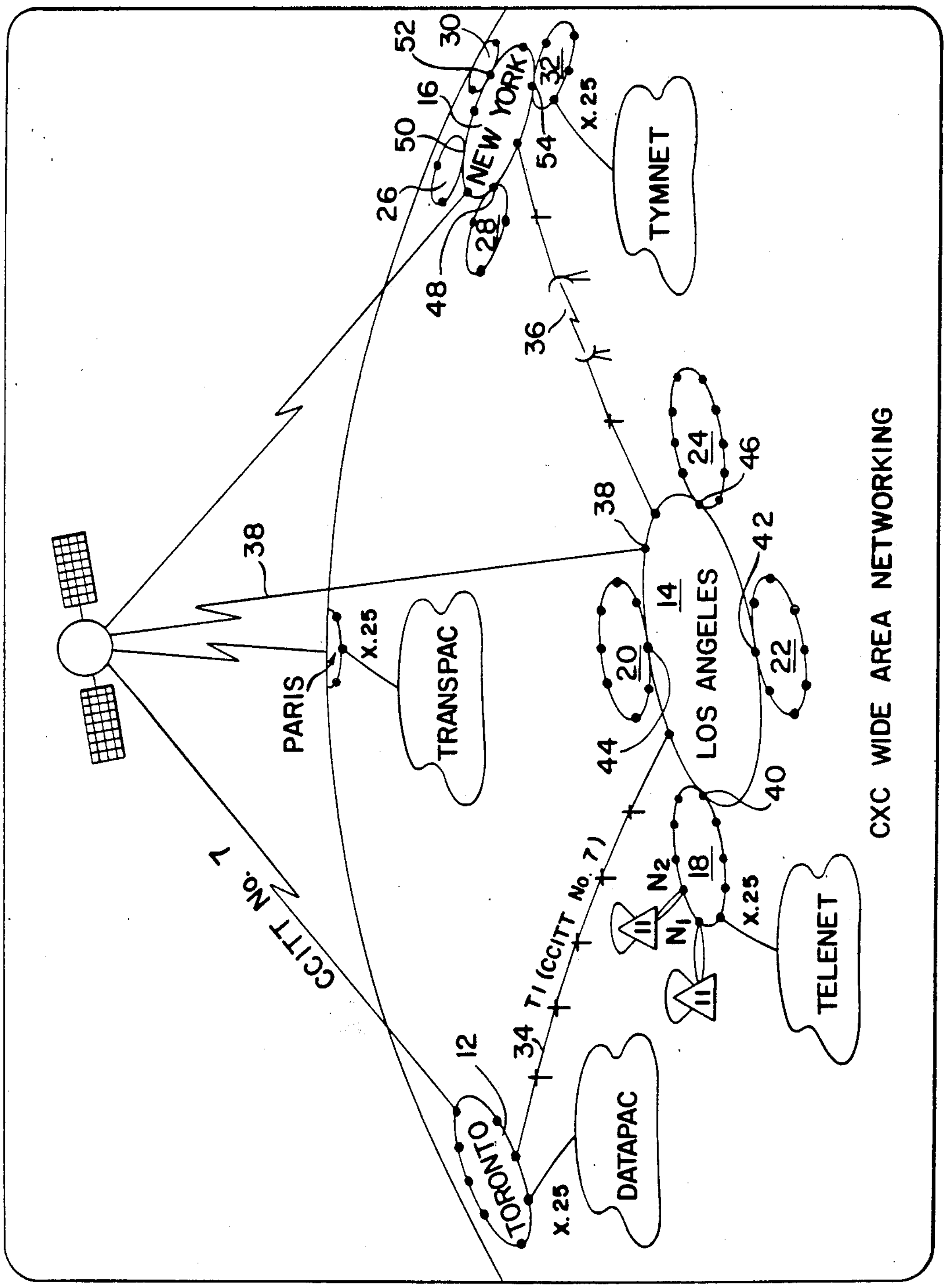
FIG. 2(*a*) is a high level illustration of wide area networking in accordance with the present invention.
Figure 2B:
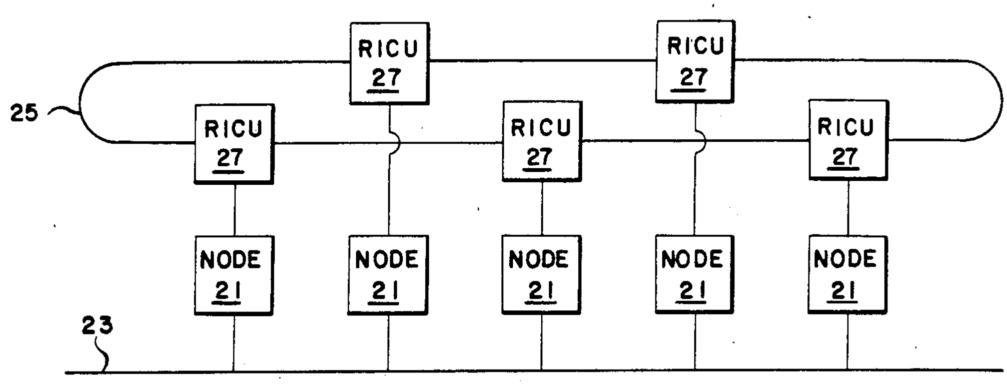
Figure 2C:
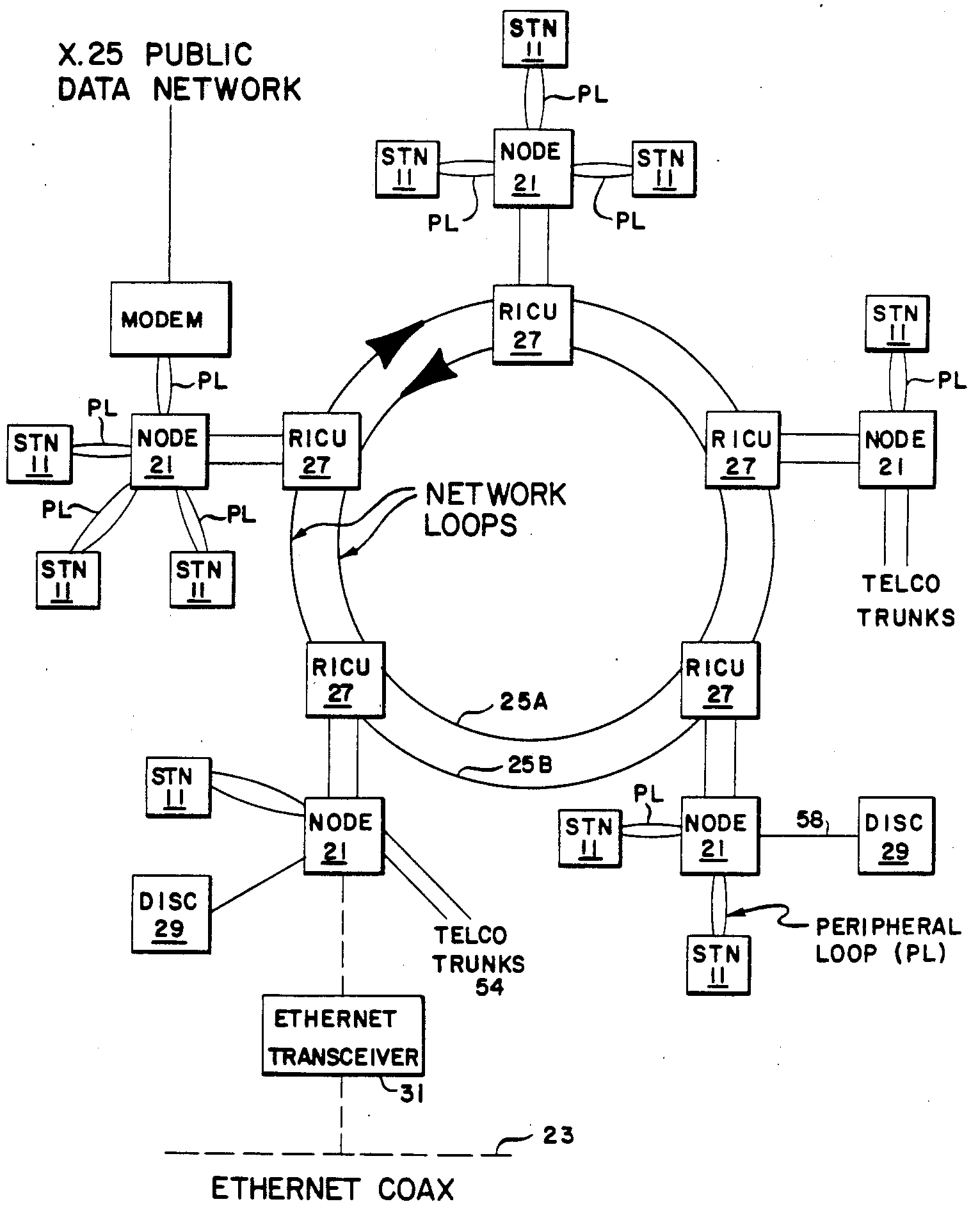

FIG. 2(*a*) is an illustration of wide area networking in accordance with the present invention. This figure is intended to illustrate potential application of the present invention for interconnecting various traffic subsystems called pools, located substantial distances apart. Network connections between pools may be accomplished by means of dedicated or switched land line connections 34, by light or microwave links 36, by satellite links 38, or by other such connections. Large ring based systems can be constructed using two or more levels of pools as illustrated in the Figure and described below.

The general topology of the presently preferred embodiment of the invention is a hierarchy of broadband rings. It should however, be understood that in its broader aspects the present invention may function in conjunction with network signal streams that are not communicated via a ring configuration. The lowest level of the hierarchy (Level 0) consists of a single switching node $N_1$, connected to ring 18, and to its local station devices 11, which may be terminals, teleterminals, file sub-systems, etc. A switching node is a fundamental portion of the present invention which permits communication between the network signal stream and one or more local devices. As described in more detail below, the node selectively extracts information from and inserts information to the network signal stream for communication to devices connected to other nodes. The node is dynamically configurable in order to make use of available bandwidth in the network signal stream. Network control information to effect the dynamic bandwidth allocation may be transmitted along with the network signal stream or independently communicated between the nodes.

Independent of whether the nodes receive network control information with the network packet switched data or on a separate line, they are constructed to integrate control information (packet data) with the voice and clear channel data (circuit switched data) for communications with the local devices. Thus, the need for elaborate control interfaces between the local devices and the node are eliminated. Moreover, a plurality of data communications equipment, integrated at the local station, may collectively communicate the node via the same simple wiring arrangement. As also described below, multiple local devices may be connected to a single node.

The next level of the hierarchy above the switching node (Level 1), e.g. ring 18, consists of a broadband ring connecting two or more level 0 rings, e.g. $N_1$, $N_2$ and associated devices 11, in a circular arrangement termed an "orbit". Level 2 of the hierarchy consists of another broadband ring, e.g. ring 14 or 16, connecting two or more orbits in a circular arrangement termed a "system". The method of connecting orbits is by means of special nodes, e.g. 42,44,46 which interface to both the orbit ring and the system ring and provide cross-over switching between the two. These special nodes are called "Bridge Nodes" and are constructed from the same basic modules as the switching nodes. Level 3 of the hierarchy is a ring connecting two or more systems, e.g. via the illustrated satellite, termed a "galaxy". Because a system is capable of serving in excess of 30–60,000 installed devices, discussion of the properties of Level 3 and 4 ("cosmos", not shown) networks will be limited to the obvious generalizations of the lower order formations.

Each level of the hierarchy is capable of functioning as an autonomous, stand-alone switching system because management of resources for a given level is always handled within that level. Thus, for example, should ring 14 become inoperative, ring 18 may continue to operate for communications between any of the nodes on that ring. This property contributes significantly to the survivability aspects of the invention especially with respect to multiple failure modes. Furthermore, this model for the management strategy is repeated at each level of the hierarchy in a symmetric fashion, which contributes to the ease of modeling and ultimately of implementation. Connectivity between the rings is established by assemblies called highway-to-highway interface modules (HIM's), described below.

FIG. 2(*b*) shows an exemplary level 1 ring system of switching nodes 21 employing the services of a baseband bus Local Area Network (LAN) for the purpose of network control and internodal communications. Interface between the nodes 21 and the circuit switched ring path 25 is effected by Ring Interface and Control Units (RICU) 27. The embodiment illustrated incorporates an ethernet LAN 23. The use of a LAN to establish a communication path between nodes employs protocol that permits both transmitting and receiving nodes to coordinate access to the network signal stream. Though the control functions, e.g. channel allocation, performed by the ethernet are in some ways peculiar to the particular ring construction employed, there are basic similarities to the channel allocation functions performed in contemporary control devices such as the D-3 Channel Bank, produced by American Telephone and Telegraph. However, the present invention expands upon existing capacity for time multiplexing mutual access to the network signal stream by permitting dynamic allocation of the size and location of the access channels.

Because the software is typically layered, e.g. to allow the nodes to autonomously perform certain intranode and internode functions without involving the network controller, the physical and link level protocols effecting lower level functions can be changed without affecting higher level software or system functioning. Therefore, the means of effecting high level management and supervision of the control functions delegated to the node may be modified without substantially altering the nodes' autonomous functions. In such a manner the LAN 23, which communicates control signals between nodes, may be readily replaced by a token ring configuration. In the token ring configuration control information may be integrated into the network signal stream and decoded at the individual node. The token ring cofiguration may employ a standard protocal such as the proposed IEEE 802 standard to facilitate communication of control signals between the nodes. The management of the network control functions in the presently preferred embodiment is described in more detail below.

FIG. 2(*c*) illustrates another level ring system using dual ring transmission scheme. Two identical ring paths 25(*a*) and 25(*b*) are illustrated which may each carry both a token ring component that conveys control information (i.e. packet data), and a time division multiplexed (TDM) ring that conveys the network circuit switched signal stream (i.e. voice and data signals). Alternatively, one ring may be dedicated to control information and the other to circuit switched data. In one embodiment one ring (called the forward ring) may carry circuit switched data traffic in the TDM ring portion, and network management and other control signals in the token ring portion. The other ring (called the backward ring) may carry digitized video channels in the TDM ring portion and control information in the token ring portion.

Consistent with FIG. 2(*b*), the token ring component of FIG. 2(*c*) may be replaced with an ethernet controller including Ethernet transceiver 31 connecting the LAN bus 23 to the node (shown in the dashed lines).

Typically, redundant dual-ring systems will include at least two nodes equipped with disc memory subsystems 29, as indicated in the figure. The disc memories typically serve to store the programing information transferred to the various processor modules within the node upon start-up. Disc systems may be used for storage of textual data for electronic messaging applications as well as to provide two identical redundant copies of the system data base and operational software. A small computer standard interface (SCSI) bus 58 provides an interface to a disc storage and tape storage module such as disc 29 illustrated in FIG. 2(*c*). While the presently preferred embodiment of the invention employs conventional cable TV coaxial cable for the network loop paths, other point-to-point transmission media of sufficient capacity could equally well be used, e.g. fiber optics or a parallel bus.

Figure 3A:
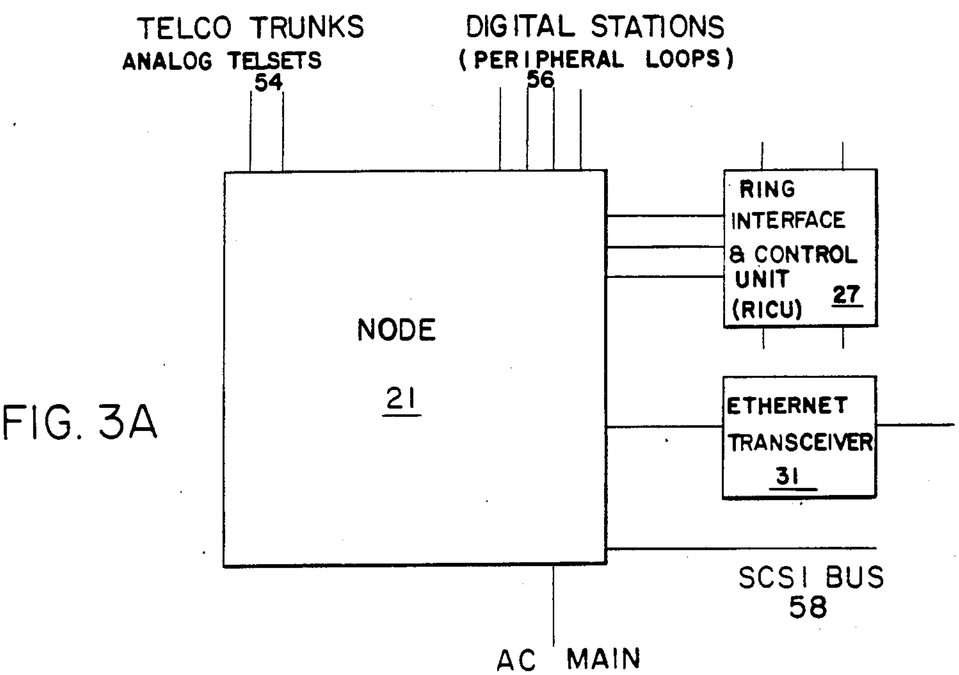
FIG. 3(*a*) is a wiring diagram of a switching node.
Figure 3B:
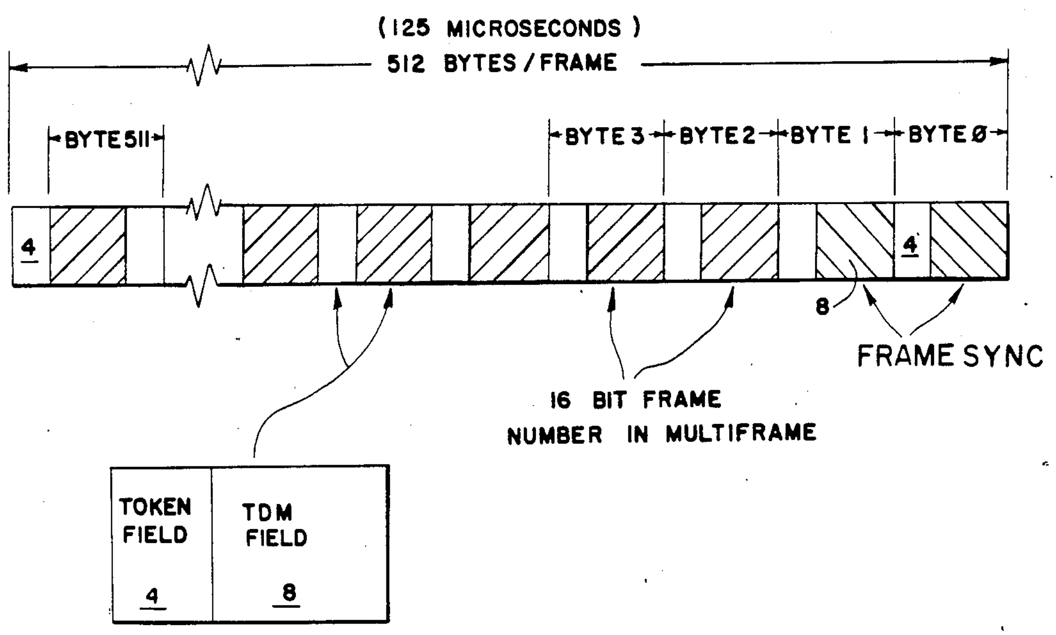

FIG. 3(*a*) illustrates a high level external wiring diagram of a switching node illustrating the communication of various signals to node 21 for switching in proper sequence. FIG. 3(*a*) shows in isolation the node 21 illustrated as part of a larger system in FIGS. 2(*b*) and 2(*c*). As also shown in FIG. 2(*c*), inputs to the switching node may typically include trunk lines 54 from the public telephone company for service to network analog teleset lines, and peripheral highways 56 to digital telephone stations. The node serves to interface such traffic and the network ring 25 via the RICU 27.

An ethernet transceiver 31, if utilized, communicates signals between the node and the LAN 23 as shown in FIG. 2(*c*). As is more fully described below, in a multinode system the LAN is used to carry messages between nodes for the purpose of establishing time slot assignments for communicating between particular nodes and for maintaining overall network control and status. In practice, the eithernet transceiver 31 or the RICU 27 may be located on the node for ease of manufacture.

Overview of Network Timing

To operate as a PBX or voice switching system the data is transmitted around the network ring at some predetermined rate, e.g. once every 125 microseconds. That transit rate is preferably set by the master timing node for the entire ring. The need for a master timing node arises from the fact that data is typically transmitted around the network ring 25 in much less than 125 microseconds. Assuming the ring is a few thousand meters in circumference, it takes only a few microseconds for data to completely transit the ring and arrive back at the master node. Thus, unless one node is able to buffer the incoming signal stream and transmit at the predetermined rate, the nodes will receive the data at some uncertain rate, which would be a function of the length of the combined network frame. All nodes may have the circuitry needed to function as a loop master, but only one node assumes that role during normal operation. When the system is initialized one of the nodes will provide frame synchronization for the network ring. Ring mastership may be determined using any of a number of well known techniques. The priority for each node may be based upon factors such as the number of interconnected local stations, the characteristics of those stations, or the address of each node. A score indicative of those priorities may be determined by each node and transmitted in response to a broadcast signal generated at start-up. Upon failure of a loop master another node may assume that role.

Figure 4:
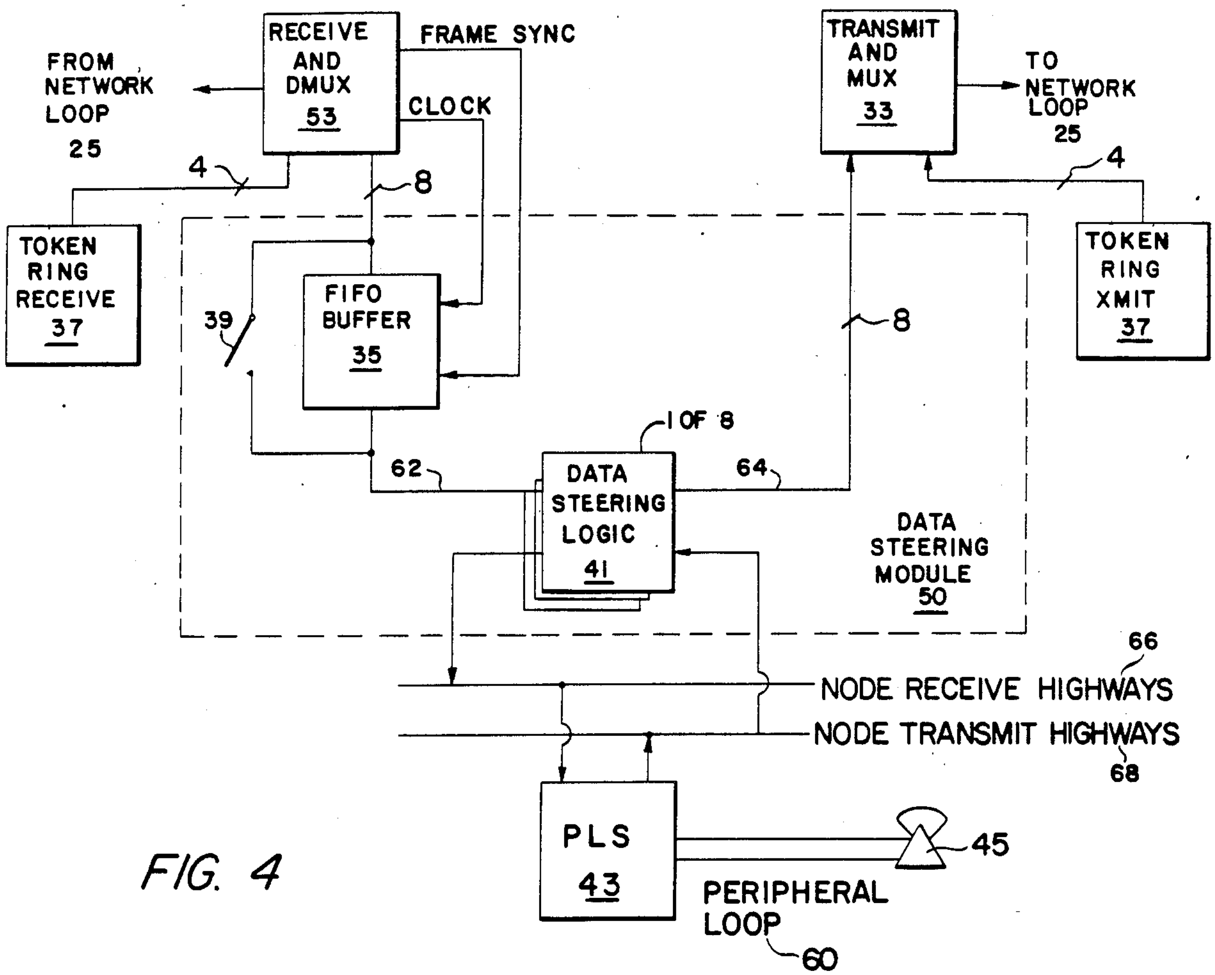
FIG. 4 is a block diagram of the network interfacing circuitry.

As is more clearly illustrated at FIG. 4, which shows the network interfacing circuitry, if the node is the master node that clocks the signal around the network ring, a switch 39 in the receive circuit is in the open position enabling the received signal to be stored in a buffer 35 until the next master frame sync signal is received.

In order to adjust the transit time to a full frame (125 microseconds), buffer 35 acts as an elastic store. Data is loaded into buffer 35, accumulated for a period of time (i.e., 125 microseconds minus the ring delay for the received data), and then unloaded from the buffer when the next frame synchronization signal is generated. The transit time of data to the slaved nodes around the ring is thereby adjusted to be one complete frame. The token ring of the network signal stream is separated by demultiplexer 53 and communicated to token ring receive logic 37. Accordingly, on the the TDM field need be communicated to the buffer 35.

The relationship between the information rate on the ring and the data rate on the internal highways, which communicate the demultiplexed network signal stream, is a function of the number and speed of the TDM highways (i.e. node transmit and node receive highways) 66,68 within the node and the speed of the token ring 25 (equivalent to an integer multiple of TDM highways). Where the representative node contains 8 TDM highways and a token ring equivalent to 4 TDM highways, the ring data rate is 12X the data rate of the TDM highways. The data rate for the presently preferred embodiment of the ring 25 is 49.152 Mbps for 4.096 MHz operation on the internal highways 66,68. If the internal highways operate at 8.192 MHz, the data rate on the ring 25 is doubled. However, it is understood that the broader aspects of the present invention are independent of the particular transmission rate. Operation of the node highways 66,68 at different data rates is described in more detail below in connection with FIG. 17.

One frame time of a 4.096 MHz TDM highway, i.e. 125 microseconds, can be divided into 64 8-bit bytes, or 512 bit time slots, as shown at FIG. 3(*b*). In order to increase the traffic capacity of the nodes and of the network, 8 TDM highways are provided in the presently preferred embodiment of the node, thus producing 512 8-bit time slots per frame, or 4,096 bit level time slots per frame.

FIG. 3(*b*) illustrates a high level view of a typical network ring frame format in a token ring implementation. In each 125 microsecond frame, 512 bytes of information are transmitted. As described in more detail, below, each byte is typically 12 bits and comprised of two fields, one of 8 bits, and one of 4 bits. The 8-bit field carries TDM data for the circuit switched paths. The 4-bit field is communicated to the token ring LAN. Bytes 0 and 1 in the TDM field may be used for the frame synchronization pattern. A conventional correlation type circuit is used to determine frame synchronization from the bit pattern carried in these two bytes, e.g. indicating the frame number. Such conventional synchronization procedures are well known in the art and are described in numerous publications such as J. Bellamy, *Digital Telephony,* (J. Wiley and Sons, U.S.A. 1982). It is understood that various types of frame synchronization techniques may be implemented within the teachings of the present invention.

Once frame synchronization is established the token field is effectively an unframed continuous bit stream whose protocol typically follows standards adopted or proposed by the United States IEEE 802 Committee. Other token ring protocols may be used equally well.

As the case with ring timing, one node is typically designated master node for ring management or control functions. That node is typically called the network manager and, for practical purposes, may be the same node that serves as the master timing node. As is also the case with frame timing, each node typically has the resources to serve as ring master, and mastership may be determined in accordance with the same priorities for determining timing mastership.

In the presently preferred embodiment, messages to the ring master, i.e. the network manager, may be transmitted as "generic" messages, which are neither messages directed to a particular address nor broadcasts processed by each node. Only the node performing the network message function operates to respond to the message by, for example, allocating ring bandwidth to the requesting device to facilitate communication between nodes. Those network control functions are described in more detail below.

Overview of Local Timing

Virtually all PBX telephone equipment operates at some multiple of 8,000 samples per second which rate can be represented by one cycle, or frame, occurs every 125 microseconds. Accordingly, for telephone applications the node TDM highways should operate at integer multiples of 8,000 samples per second to accommodate conventional digital PBX's. The majority of data communication equipment operates at speeds which are multiples of 600 bps. Because the present invention is intended to support both voice and data communications, it is necessary to find a local clocking scheme which supports both multiples of 8000 Hz and multiples of 600 Hz. simultaneous voice and data communications may be supported by choosing a clock rate, for transmission between the node and interconnected telephone equipment, that is a common multiplier of both 600 and 8,000, such as 192 kbps. It is therefore possible to simultaneously provide sampling clocks for the majority of local communications requirements by providing a signal frame including two independent channels of 8-bit voice or data communications for communication to the local station (i.e. voice, data, and local control information), and 8 bits of control information. Each 8-bit data channels provide an aggregate throughput of 64 kbps per channel. As shown in the inset at FIG. 5 the 192 kbps rate utilized in the presently preferred embodiment is apportioned into several sections; a 64 kbps data section, a 64 kbps voice or data section, a 32 kbps overhead section, and a 32 KB signaling section. Because individual devices operate at different data rates, the number of valid data bits that may be communicated during the 64 kbps section will vary. The system node will therefore communicate a variable number of valid data bits and fill bits during the 64 kbps section. The particular number of fill bits and data bits will depend upon the characteristic operation of the particular device.

Overview of Data Flow Through The Node

FIG. 4 illustrates on a broad level the flow of network ring signal traffic through the node. Details of the internal configuration of the modules used to direct the flow of traffic through the node are set forth later in the specifications following the operation description. In FIG. 4 the serial bit stream from the network ring enters a receiver and demultiplexer 53, which forms a portion of the RF modem described below at FIG. 7. In demultiplexer 53, the bit stream is demultiplexed from frames of 512, 12-bit bytes into byte portions onto an 8-bit bus and a 4-bit bus. The 4-bit bus is processed by a token logic 37. Each bit of the 8-bit TDM portion of the receive signal is communicated to a dedicated network receive highway 62 to a dedicated data steering logic element 41. Similarly, each node transmit highway 64 is dedicated to one of eight bits of the TDM data stream. Each data steering logic element 41 is connected to each of the eight node receive highways 66 and each of the eight node transmit highways 68. The data steering logic 41 can selectively communicate one or more bits from a network receive highway 62 to a node receive highway 66. Similarly each data steering logic 41 can selectively communicate one or more bits from a node transmit highway 68 to a network transmit highway 64. Each data steering logic 41 can steer data bits independent of the other elements of data steering logic 41. In the presently preferred embodiment groups of bits sequentially received on the same network receive highway (i.e. occupying the same position in a plurality of successive or periodic bytes received at the node) may be transferred by the data steering logic 41 onto a node receive highway 66 for communication to an individual station device 45 via a per line switch 43, which is typically connected to each of the node highways and to one local device. The mapping of communication paths for each bit is described in more detail below. If the network signal portion is not intended for a device connected to the particular node, the data steering logic will simply pass the portion onto transmit and multiplexer 33 where the network serial bit stream is recomposed. Alternatively, the data steering logic may both communicate the portion to a local device and to the transmit and multiplexer 33.

The data steering module 50 also illustrated at FIG. 8(*a*), generally includes a FIFO buffer 35, a switch 39 and data steering logic 41. As previously mentioned, in a multinode network only one node need act as a master for TDM timing purposes. The master node employs the FIFO buffer 35 to adjust the transit time of TDM data around the ring to exactly one frame time. Slave nodes, on the other hand, bypass the FIFO buffer by closing the switch 39. Whether the node is a master or a slave, the received data is passed into the data steering logic 41. The data steering logic 41 also includes a bit map, see FIG. 8(*a*), which depicts and controls the flow of data, bit by bit, highway by highway, from the network receive highways 62 to the node receive highways 66, and from the node transmit highways 68 to the network transmit highways 64. The contents of the bit map are established by a CPU 59 (see FIG. 5) as implemented under the control of messages from the token ring. Further description of the data steering logic and control mechanisms are set forth below.

Data from the local station 45, to be communicated to a distant station, is transmitted onto the peripheral loop 60, and through the per line switch 43 onto a selected node transmit highway 68. The node transmit highways communicate data back to the data steering logic 41. From data steering logic, data is communicated to the network transmit highways 64 and onto the network loop via the transmitter and multiplexer 33.

Figure 12:
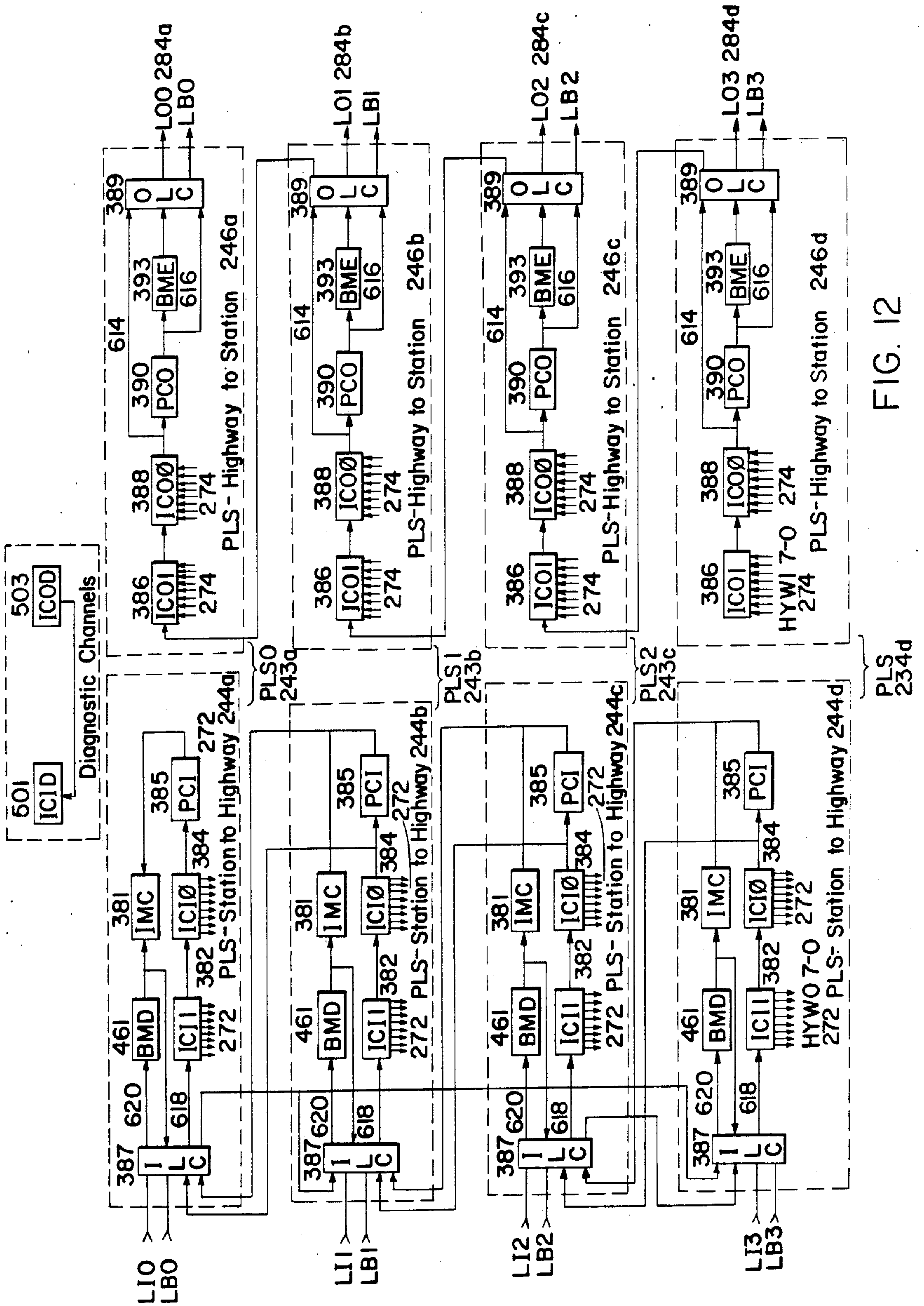
FIG. 12 is a block diagram of the connections between several of the principal portions of the QPLS.

As shown in more detail in connection with FIG. 12, each PLS 43 is connected to each of the 8 node transmit highways and 8 node receive highways. The PLS, however, is connected to only one local station, though the station may include a plurality of data communication devices. Thus, intranode communications between local stations may be effected by communicating a signal to the associated PLS which transmits that signal onto a selected node transmit highway. The data steering logic 41 may then direct that signal from the node transmit highway back to the node receive highway from which it may be communicated to another PLS, connected to the receive station. More details of the operation of the PLS and intranode communications are set forth below.

It should be noted that when the data steering module 70 connects the TDM highways to the network ring traffic, the TDM highways conceptually form a portion of the ring network. When the signal into the data steering module is not intended to be directed to a local station the TDM ring is bypassed and the signal is transmitted back onto the network ring via transmit and multiplexer circuit 33. Unless in use for network traffic the TDM highways are available for internal calls within the local ring.

Overview of Packet Data Flow Through The Node

Figure 5:
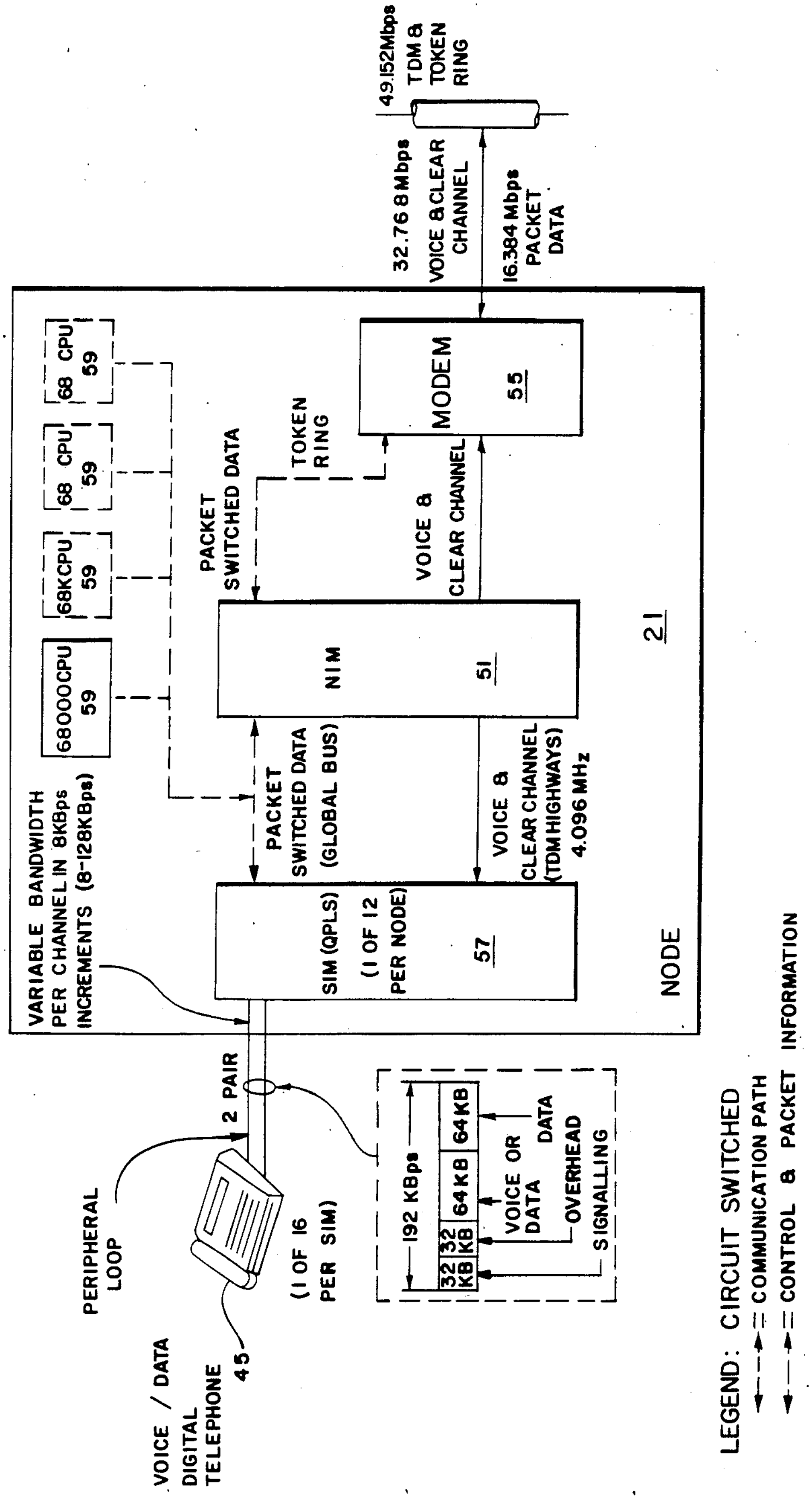
FIG. 5 is a block diagram of the data path from a digital telephone through a node to the network loop.

Another view of data flow in the system is seen in FIG. 5. That figure illustrates the differentiation between the flow of packet switched data and the flow of TDM circuit switched data. The token ring data is there referred to as packet data and the TDM data is referred to as voice and clear channel data. Packet data and voice and clear channel data enter the node via modem 55 where they are demultiplexed into separate packet channels and TDM channels. The TDM channel is communicated via the network interface module (NIM) 51 to the station interface module (SIM) 57, which contains PLS 43 (illustrated at FIG. 4). Details of the construction and operation of the NIM 51 and SIM 57 are set forth below in detail. Packet data is also communicated to NIM 51 whereupon it may be communicated to on-board processors in the NIM 51 and SIM 57, directly, or communicated to the primary node processing network 59, which may include a plurality of individual central processing units (CPU). As previously noted, the signal communicated between SIM 57 and voice data digital telephone station 45 preferably includes four bits of packet switched data carried in the 32 kbps signaling channel as illustrated in the insert. Four additional bits from each frame are used for overhead. One of those four bits encodes framing information. Another bit defines active signaling, i.e. that bit indicates that the four signaling bits contain valid signaling data. A third bit encodes an underrun condition, whereby valid signaling is present but the data bits in the signaling field are fill characters that should be ignored by circuitry in the telephone 45, instead of signaling data. The last of the overhead bits is unused in the presently preferred embodiment. The remaining portion of the packet includes eight bits of data and eight bits of voice or data. Additional description of the packet channel is set forth below.

A number of applications of the packet switched data are contemplated. One application for this data is to facilitate the initialization of calls. Messages indicating telephone handset off hook, dialed digits and other button depressions are encoded and carried in the packet switched signaling channel. These signaling messages may be passed to one of the 68000-type CPU modules 59 that execute the call processing software. In the case of a voice connection, the dialed digits may be processed by the call processing software and checked against a directory of telephone numbers active on the node. If the called number resides on this node a control message is transmitted from the 68000-type CPU to the SIM on which the telephone resides for the purpose of establishing a clear channel connection to allow a conversion to take place. If the called number resides on another node a control message is transmitted from the 68000-type CPU to the SIM on which the telephone resides via the LAN to establish a clear channel connection to allow a conversation to take place over the TDM highways.

Internal Configuration Of The Node

Figure 6B:
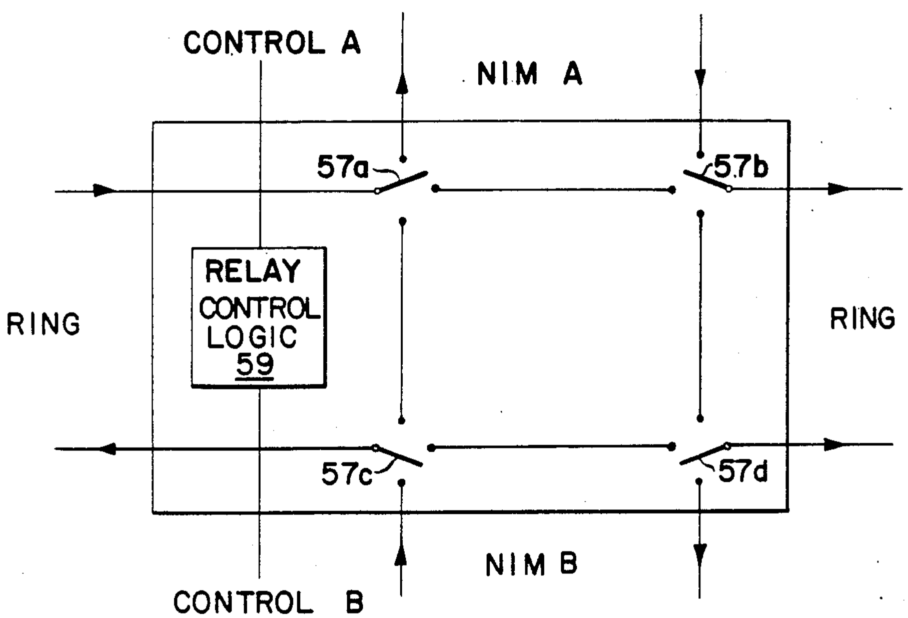
FIG. 6(*a*) is a block diagram of the internal configuration of a node with associated modules.
Figure 6A:
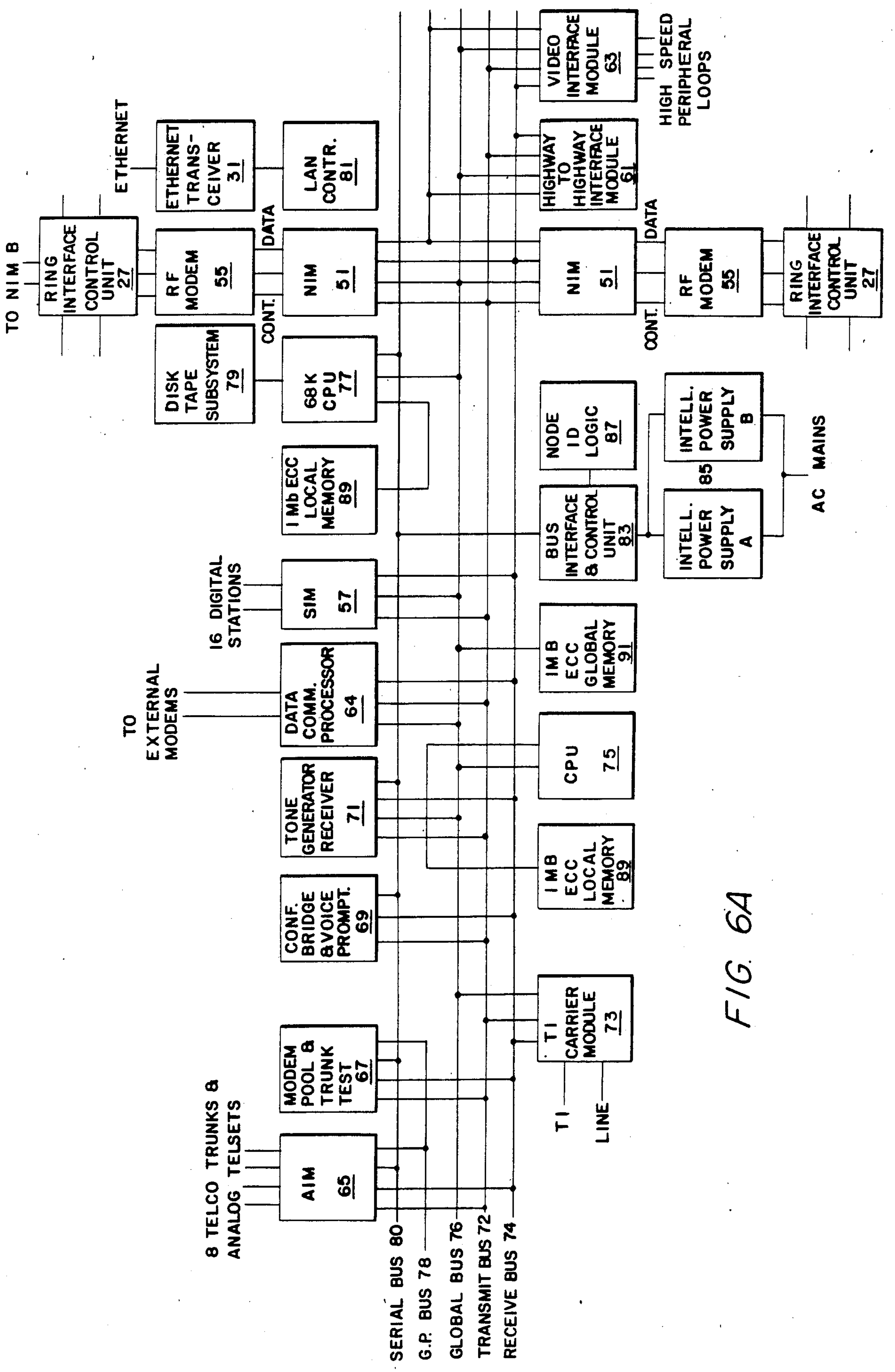

FIG. 6(*a*) is a block diagram showing the internal configuration of a switching node. A switching node is composed of the three basic classes of components: buses, plugable modules, and a power subsystem. The buses are preferably carried on the backplane of the cabinet for the system and consist of transmit highways 72, receive highways 74, global bus 76, segmented general purpose bus 78 and serial bus 80. In the presently preferred embodiment there are eight receive highways and eight transmit highways, although it is contemplated that other numbers of highways could be employed.

The global bus 76 is a high speed computer bus with parallel address, data and cqntrol lines. The general purpose bus serves several different functions depending on the application. In the presently preferred embodiment, the general purpose bus 78 is partitioned into four independent segments along the length of the backplane. One portion of the general purpose bus comprises a second computer bus which facilitates communication between a 68000 CPU 75 and a local memory card 89 such that program access does not cause contention on the global bus. The global bus may be implemented mostly as a VME bus (IEEE proposed standard 896), with the primary exception that Euro Card physical card connectors are not used. Another application of the general purpose bus 78 is as an alternate set of transmit and receive highways. In systems that employ fully redundant dual rings, two NIM's 51 are utilized. One NIM 51 communicates to the primary transmit and receive highways, and a second NIM 51 communicates with the alternate transmit and receive highways on the general purpose bus.

Other plugable assemblies that are also served by the general purpose bus 78 include the highway-to-highway interface module (HIM) 61 which facilitates the switching of time slots from one set of highways to the other. Each HIM is a plugable assembly that provides a number of variable bandwidth channels from the first level ring to the second level ring. A bridge node can be populated with a number of HIM's sufficient to provide capacity for the maximum level of connectivity required. Those variable bandwidth channels, or "tie-line channels", in the HIM's are dynamically allocated and, when not in use, do not consume bandwidth from either level ring. The HIM may also operate as a variable bandwidth time slot interchange (TSI) which makes it possible for any station on a first level ring to access any other station on another first level ring via the resources of the second level ring. The rings so tied can operate at any bandwidth, e.g. from 8,000 bps to 512 kbps. Thus, both the bandwidth and the connectivity for inter-ring communications are dynamically allocatable.

Video interface module (VIM) 63 typically interfaces 192 kbps or 448 kbps channels from the general purpose bus and mixes a 64 kbps voice channel from the transmit and receive highways 72 and 74 to service a composite high-speed voice and data peripheral loop from SIM 57. The switching functions performed by the HIM 61 and the VIM 63 are effected by the Quad Per Line Switch (QPLS) which provide the ability to switch time slots as described below.

Another application of the general purpose bus 78 is to transmit data along a number of bidirectional analog highways for communication between the analog interface module (AIM) 65 and the modem pool and trunk test module 67. Analog signals can be routed from the analog module 65 directly to an optional trunk test module (not shown) where diagnostic operations can be performed to determine the viability of the trunk circuit.

The serial bus 80 provides an economical, low speed serial communication path between various modules of the system. The serial bus carries traffic logically equivalent to the traffic that is often carried on the global bus 76, i.e. command and control messages from the CPU controller to the various peripheral cards. The serial bus 80 is dedicated to command and control information of lower priority and lower traffic volume. That traffic could equally well be carried on the global bus 76. The choice is a matter of economics. Modules along the serial bus, e.g. AIM 65, may be interconnected to the global bus via the tone generator and module 71, also referred to as the Tone Interface Module (TIM).

AIM 65 provides interconnection to the telephone company trunks and to analog telesets, the modem pool and trunk test module 67 which provides low speed dial-up modems for diagnostic and test purposes as well as analog trunk test circuitry, and a Conference Bridge and Voice Prompting module 69 which performs the algebraic summation of three, four or eight voice combinations in order that voice conference calls may be established. Conference bridge module 69 may also incorporate a voice synthesis capability to provide prerecorded messages and voice prompts.

The tone generator and receiver module 71 includes a number of read only memories to store the tone patterns required for normal operation of a PBX such as dial tone, ring back tone, error tone, and the DTMF tones associated with dialing.

SIM 57 may typically provide an interface to sixteen voice/data digital telephones on the peripheral highways. The SIM includes a micro computer (see module 139 at FIG. 10) that can execute programs which implement a portion of the X.3 Packet Assembly and Disassembly (PAD) function as well as control operations for establishing circuit connections.

The T-1 carrier module 73 provides an interface for North American standard 24 channel T-1 carrier service that permits synchronization with the entire Bell System communications network. Both common channel signaling, i.e., utilizing the services of a LAN for control signals, and in-band signaling, i.e., wherein control signals are contained in the data stream, may be supported via the T-1 standard clock.

CPU module 75 employs a microprocessor CPU with memory protection circuitry and direct memory access. The memory cards typically accommodate 1,000,000 bytes of error correcting memory and can be configured as either local memories, e.g. 1MB ECC local memory 89, or as global memories, e.g. 1MB ECC global memory 91. As a local memory the card attaches to the general purpose bus in a segment of the backplane dedicated to processor functioning. The memory uses conventional Hamming code error correction for 2-bit error detection and 1-bit error correction. The memory card can also function as a global memory in which case it operates on the global bus 76 and functions as a shared memory between two or more 68000 CPU's such as CPU 77 within the node. CPU 77 corresponds to processor 59 in FIG. 5 and functions as the main processor which implements the principle operating programs of the node and communicates instructions and receives data from on board processors within modules such as the NIM 51 and SIM 57 (see FIGS. 9, 10). Each CPU module includes a small computer standard interface bus I/O port which supports multiple master CPU's and allows up to four CPU's to share a single disc system, e.g. a 10M byte winchester desk, or multiple tape and disc systems 79.

NIM 51 provides control logic and steering logic for both the LAN controller 81 and the circuit switched TDM pathways. As is more fully described below, the network ring signal stream is communicated to NIM 51 via RICU 27 and RF modem 55. The NIM 51 provides connectivity from the network loop to the internal highways and may be connected to either the normal transmit and receive highways 72 and 74 or to the auxiliary transmit and receive highways that are part of the general purpose bus 78.

Bus interface and control unit (BICU) 83 provides access to a read only memory contained in Node ID logic 87. In addition, BICU 83 provides access to the intelligent power supplies 85 which are capable, under microprocessor control, of monitoring their own voltages.

Data communications processor 161 is a packet switching server which can be configured as an X.25 server or as a local area network bridge, depending upon the devices to be attached. Processor 161 thus provides a means of connecting the node to external packet data networks.

Ring Interface Control

FIG. 6(*b*) illustrates an embodiment of the RICU 27 that serves to bypass failed nodes or to heal the ring if cable faults occur. The system operates with an active ring. In the presently preferred embodiment each ring supports a 16 Mbps token ring and a 32 Mbps synchronous TDM ring. The token rings in both active and standby rings may be used to carry data and control traffic. The active ring may be used to carry circuit switch data and voice, and the standby ring may carry digital video in the 32 Mbps TDM bandwidth. In event of a failure which necessitates switching from the active ring to the standby ring, video transmission may be sacrificed. Similarly, if broken cables occur and the ring must be healed, video may also be sacrificed. The RICU 27 may include switching devices that can bypass a failed node or connect the two rings together on either side of a node in the event of node failure or failure in the ring path, respectively. Typically, such bypass may occur on power failure of the node, failure of either the receiver or transmitter logic, or failure of critical components within the node that render it inoperative. Monitoring of the status of the node and control of the operation of the RICU 27 is accomplished by the modem control and status logic 103 in connection with programming information residing in the on-board processor 110 in the NIM, described in more detail in connection with FIGS. 7 and 9.

In the case of broken cables, the RICU 27 directs traffic on the ring to the network interface modules (NIM's) associated with each node. See FIG. 6(*a*) RICU 27 has switches 57(*a–d*), controlled by relay control logic 59, which make it possible to connect both rings so as to heal the defective ring. The resulting structure is topologically still a ring. However, the traffic on one of the rings is sacrificed in the healing process.

In the present embodiment, one ring, denominated the forward ring, has priority over the second ring, denominated the backward ring. If carried on the backward ring, video transmission is lost in the event of a failure. Clearly, other priorities could be applied to the healing process. If two or more breaks occur in the ring, the resulting structure may autonomously operate distributed switches. This capability affords high survivability to the switching system.

Internal Configuration of RF Modem

Figure 7:
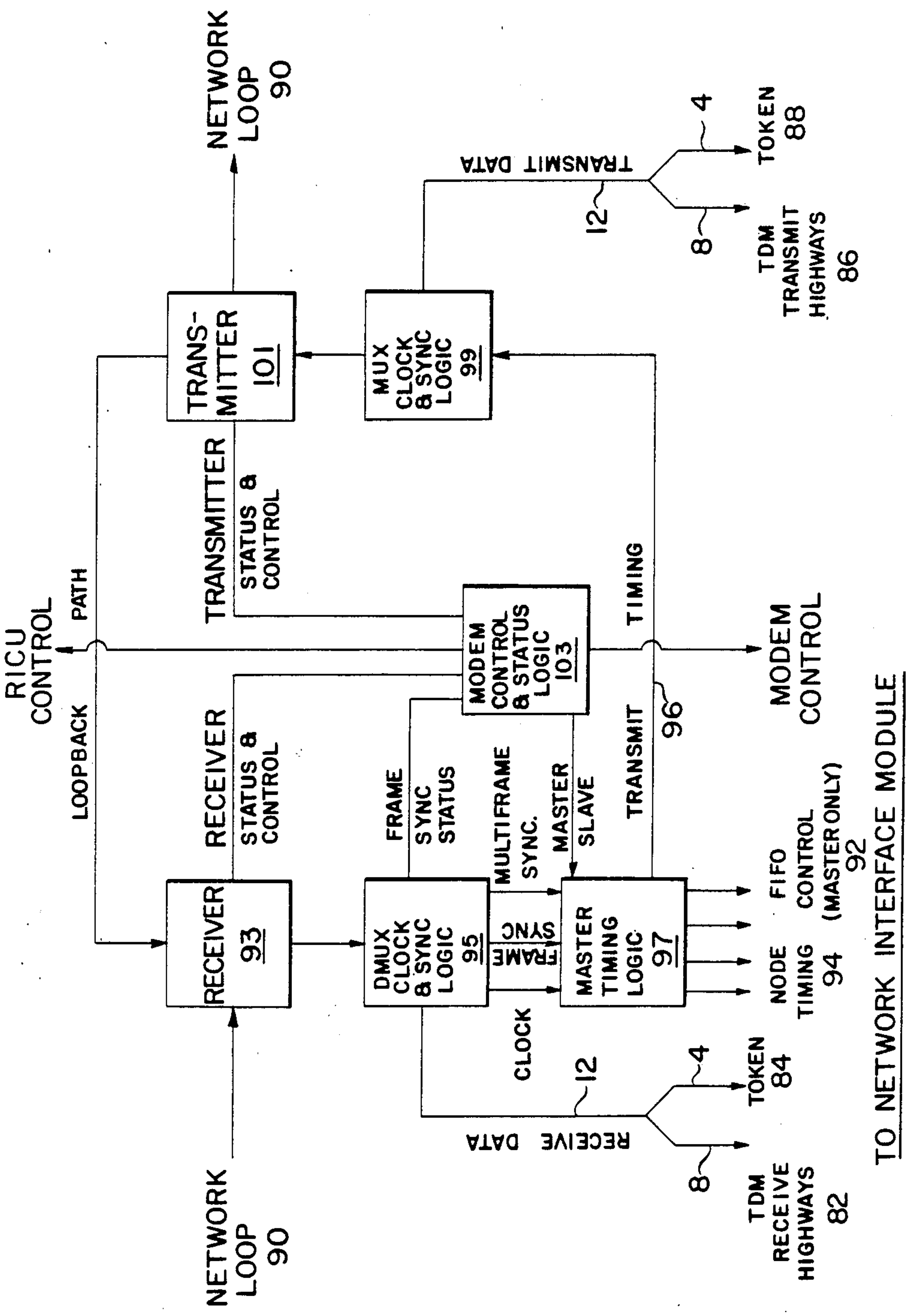
FIG. 7 is a a block diagram of an RF modem.
Figure 8A:
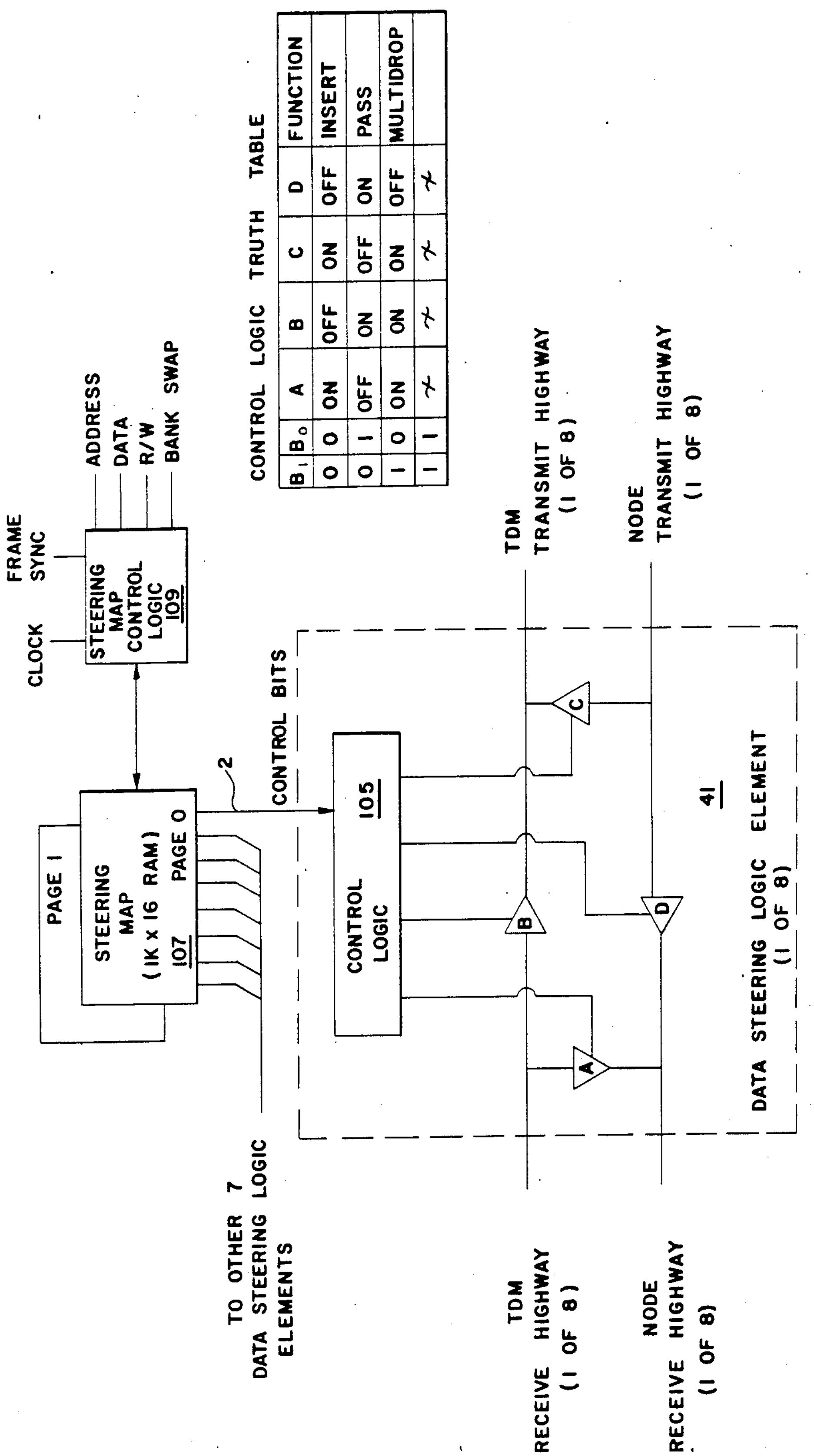
FIG. 8(*a*) is a block diagram of the data steering module that controls switching of data between the network loop and the node internal TDM highways.
Figure 8B:
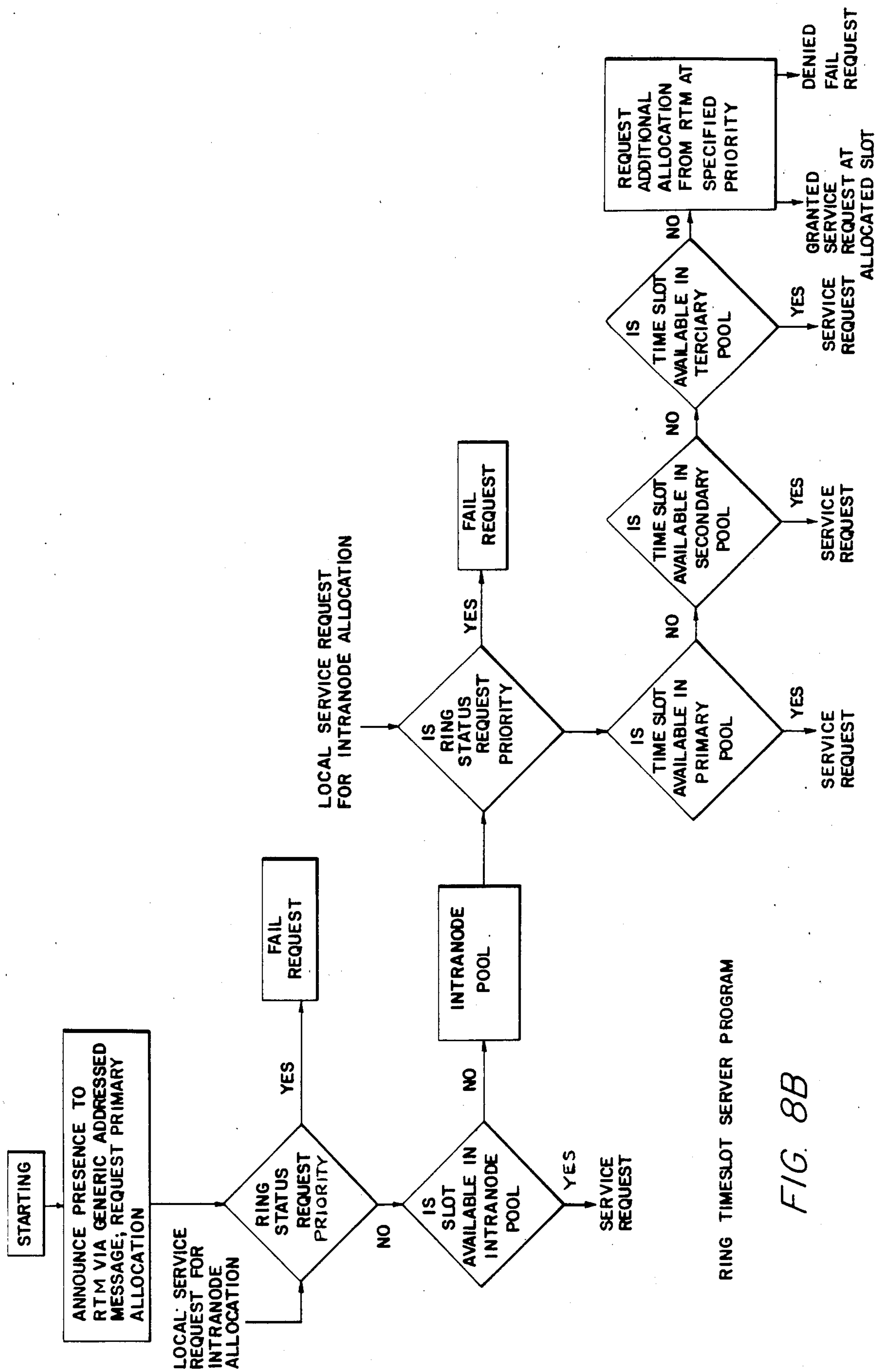
Figure 8C:
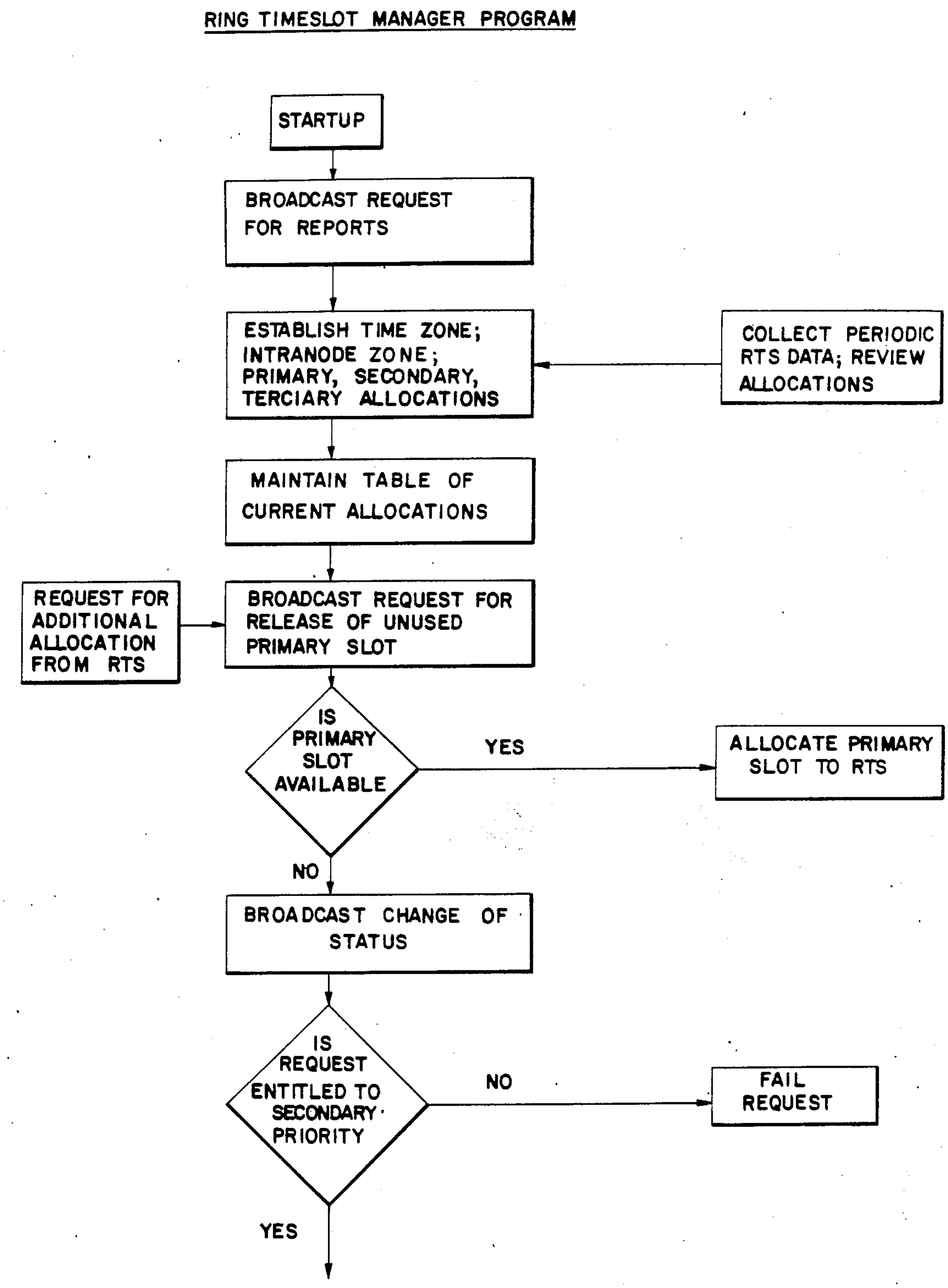
Figure 8D:
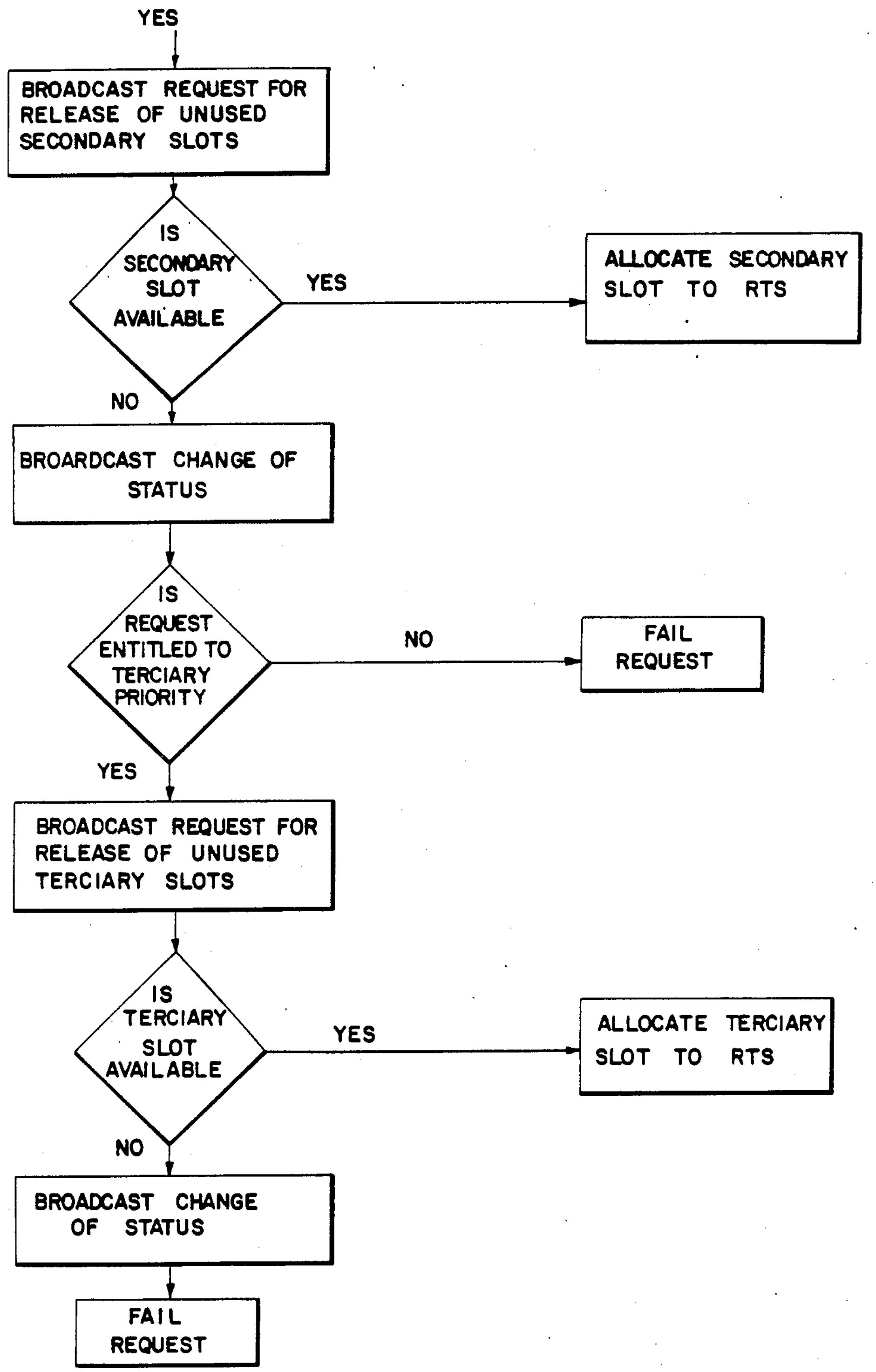

FIG. 7 is a block diagram of the RF modem 55 employed in the presently preferred embodiment of the invention. In this embodiment the transmitter 101 and receiver 93 employ skewed quadriphase shift keyed (SQPSK) modulation to encode and decode a bit stream of 49.152 Mbps. The information received is framed as shown in FIGS. 3(*b*). The output of the receiver 93 is a continuous bit stream which is processed by the demultiplexer clock and frame synchronization logic 95. Logic 95 includes correlation circuitry and a state machine which detects a 16-bit frame synchronization pattern in the bit stream and allows for two consecutive erroneous frame synchronization patterns before losing frame synchronization lock. The third and fourth bytes in the TDM field contain the 16-bit code which is the frame number within a 65,536 frame multiframe. This time code allows for process synchronization among the nodes. Both a total loss of frame synchronization and a transient frame synchronization error that does not cause a loss of frame synchronization are detected and indicated. In the present embodiment the frame synchronization logic monitors two consecutive frames for bit errors before causing a loss of frame synchronization and a search for new framing.

The TDM receive data output from the demultiplexer 95 is directed onto an 8-bit parallel bus that forms the TDM highways 82 and the token ring data is directed onto a 4-bit bus that forms token highways 84. The master timing logic 97 contains an oscillator which is used by a master node to provide clock and timing for the entire network. In slave nodes, the master timing logic block, the transmit logic, and the entire node are given from the frame sync clock and multiframe sync derived from the incoming bit stream in demultiplexer 95. In master nodes the master timing logic 97 must provide both highway timing within the node and transmit timing to the network loop. In an independent FIFO control timing scheme, the FIFO input timing may be derived from the incoming network ring bit stream 90, though the FIFO output timing 92, node timing 94, and transmit timing 96 are generated by the master oscillator itself.

On the transmit side, multiplexer clock and sync logic 99 receives eight TDM transmit highways 86 and four token ring highways 88 as a 12-bit parallel bus. Multiplexer 99 combines the data with transmit timing information, passes the data to the transmitter module 101 where the network ring bit stream 90 is discharged. The modem control and status logic monitor 103 monitors the status of the receiver input power via receiver 93, and monitors bit synchronization, and frame synchronization via demultiplexer 95. Modem control and status logic 103 also monitors the transmitter output power via transmitter 101.

An optional programmable loopback path between transmitter 101 and receiver 93 is provided for diagnostic purposes. This allows the output of the transmitter to be switched to the input of the receiver. This loopback diagnostic capability typical disconnects the path with the network loop, and therefore is used only when a node is taken off line.

The modem control and status logic 103 also processes and passes control signals to RICU 27 for the purpose of bypassing a node or healing a broken ring as described above at FIG. 2(*d*).

Internal Configuration of Data Steering Logic

FIG. 8(*a*) is a diagram of the data steering module of the NIM 51 which controls the switching of data between the network loop and the node TDM highways. In FIG. 4 above the output of the demultiplexer 53 or FIFO buffer 35 was shown to enter the data steering logic 41 where the data could be directed to the network transmit highways or node receive highways. FIG. 8 shows how the steering logic operates to enable the appropriate path in the presently preferred embodiment. A data steering logic element 105 exists for each of the eight highways. The steering map 107, which is shown as external to the data steering logic 41, is typically a 1K by 16 random access memory which uses two control bits for each highway. These control bits are labelled $B_0$ and $B_1$ in the control logic truth table on the righthand side of the Figure. The output of the control logic 105 comprises four signals which control the switches labelled (A), (B), (C), and (D). These switches operate as open collector logic or as tri-state logic. The truth table indicates which switches are on or off for the various modes of operation of the logic.

The steering map control logic 109 contains a 10-bit counter which is reset by the frame sync signal and incremented once for each clock pulse. The control of the steering map 107 is effected by the steering map control logic 109. The output of the counter is used as the address in the steering map 107. Once each clock time, the 16-bit output of the random access memory within steering map 107 is made available to the eight data steering logic elements 105. There are two pages of memory within steering map 107: an active page and a background page. The background page is part of the memory space of the CPU 47 that controls the functions of the NIM 51 (see FIG. 4). The steering map RAM may be organized as a column of 2 bits by 1K for each of eight highways. Each bit pair controls a single bit on the network loop. Thus, to steer an 8-bit byte of data from the network loop into the node and from the node back onto the network loop requires writing a desired bit pattern, e.g. 00, into eight consecutive positions in memory corresponding to the time slot being addressed. Bits which are passed from the network receive highways to the network transmit highways are not made available to the internal highways of the node. For each of those bit positions, the node transmit highways are connected to the node receive highways. The data steering logic 41 forms a TDM bus for the duration of such bit intervals. When a bit is to be steered into the node, switches B and D are opened and switches A and C are closed, enabling a bit to travel from the TDM receive highways to the node receive highways and from the node transmit highways to the TDM transmit highways. Thus, in a dynamic fashion the internal highways of the node change from a bus structure for internal calls to a ring structure for external calls.

Two other modes of operation exist. One mode provides the multi-drop capability for data communications. In this mode it is possible to allow multiple listeners for a single transmission or for multiple terminals to transmit to a host or terminal controller using a shared circuit. When a multi-drop is established at each node, all participants in the network are enabled. One embodiment of the multi-drop capability is shown in the control logic truth table wherein switches A, B, and C are on and switch D is off. This would support either half or full duplex multi-drop communication such that with switch A on, a poll message could be received by all terminals and at the same time the poll message could be propagated to the next node when the B switch is also on.

All elements of the system are typically designed such that an idling or unaddressed terminal causes the transmit highways to be in a high state. Thus, the output of switch C is typically in a high state for any inactive terminal in a multi-drop mode. In a normally operating multi-drop network only one terminal transmits at a time. Because the terminal controller is in an idle state the TDM receive highway, i.e. the output of the switch B, is high. This allows the addressed terminal to pull the junction at the output of the switch C low as required for the transmission of its messages.

The background page of the steering map memory can be read or written by the CPU on the NIM under autonomous local control or in response to control signals from the token ring or the ethernet. Once the background steering map is properly loaded to contain the most recent status of all calls a bank swap command may be generated by CPU which causes the active and background maps to switch roles at frame sync time. Thus, the map that was formerly in background becomes active and the formerly active map becomes the background. Additional call setups and/or knockdowns can be made in the background map after the bank switch operation has been performed.

Network Timeslot Management

Formation of the data steering map is controlled by the node designated as the resource manager for each level ring in the network. The remaining nodes in the ring (resource servers) may be delegated some autonomous power to communicate intranode, or internode using preassigned time slots on the signal stream. The designated resource manager, however, monitors that delegation and allocates additional timeslots as necessary.

The administration of the network control functions for the present invention may be accomplished via a hierarchy of independent resource managers and resource servers. Each resource server preferably administers one or more delegated pools of resources (e.g. timeslots) and services requests for allocations and deallocations from its pools in an autonomous fashion. If a pool should become diminished, it may request an additional allocation of resources for that pool from its resource manager. If a pool has an excess of available resource manager for redistribution. The resource manager oversees the distribution and utilization of resource and provides for administration of "fairness" and "priority" rules for its correspondent servers. All communications from resource servers to the resource manager may be via generic addressed messages. These generic messages are communicated via the token ring or the ethernet and are processed at the node that is currently hosting the resource manager for that ring. Though all nodes may receive the generic message only the resource manager node will respond to the message by modifying the allocation to the requesting network server node, as required. Thus, it is not necessary for each server in the ring to know the exact logical node address for current resource manager, which greatly simplifies the task of re-establishing control in case of a failed resource manager, since the messages will automatically be delivered wherever the resource manager is installed.

In the presently preferred embodiment, there is full redundancy of the manager function for each ring of the hierarchy, thus, any node is capable of performing resource server functions can also be a resource manager. The designation of which node will perform the resource manager function is made trivial by the fact that one node of each ring must already be designated as source of synchronization for the ring, as previously described. Thus, the designation of ring synchronization master can be made to also imply the designation of timeslot resource manager for that ring. All recovery strategies developed for line of succession of ring synchronization mastership will work equally well for recovery of the timeslot manager function. If during recovery procedures the newly inaugurated timeslot manager is for any reason unable to access the current copy of the ring allocation data, it may issue a broadcast message requesting the ring servers to report themselves and their current allocations. The responses to this broadcast may then be checked for consistency and used to rebuild the timeslot allocation data base. Programming information for affecting those functions is set forth in the accompanying NIM program listing including the Network Timeslot Manager program. A flow chart of a program to implement the functions of the network timeslot manager and the network timeslot server is set forth at FIG. 8(*b*) and 8(*c*), described below.

During initial start-up the designated timeslot manager for each ring will begin with a pool that represents all of the available timeslots on that ring. It will either have available from data-base or will build a map of the nodes (i.e. timeslot servers) on that ring and decide on initial allocations for each server either based on historical data from data-base or via pre-defined defaults.

For a Level 1 Ring (i.e. Orbit) the initial allocations to each node may include a pool of slots reserved from general distribution to create a "free-pool" for support of conflict-free intra-node calling for all the server nodes. Another pool may be reserved for distribution of tone sources to all nodes from a designated source node. Each server node in the Orbit is then initialized with the following information: the location and extent of the "free-pool" (intra-node), the "tone pool", and its primary allocation for a network timeslot pool. Once a server node has been initialized in this manner, it is then ready to begin establishing circuit switched connections both internal and network using timeslots from its known pools without need for further interaction with the ring timeslot manager until one or more of its pools are exhausted. Use of those allocations will depend upon the bandwidth requirements of the interconnected devices. Thus, each network server node need use no more of its timeslot allocation than is necessary.

When an Orbit server attempts to establish an intranod connection it looks for available slots in its "free-pool" and may use any that it finds of the correct dimensionality. In the case where no slots are available, it may borrow one or more slots from its network pool as available. When attempting to establish a connection from the network pool (inter- or intra-node) the server will first examine its primary allocation and choose from these slots if any are available. If the primary allocation is depleted, the server will next check secondary, then tertiary, etc. allocations until either it finds the required slot(s) or there are no more to check. In the latter case the server may request an additional allocation from the ring manager and if granted will add it as the last choice of all owned allocations. Whenever a server node finds a secondary or higher ordered allocation unused and has a predefined additional amount of unused resource (for hysteresis), it will voluntarily return the unused allocation to the ring manager for redistribution.

The ring timeslot manager can keep track in its data base of the pattern of additional allocation requests by various nodes to build a fairly accurate time averaged model of the "normal traffic load" for each server in its ring. This can then be fed back into the configuration data base so that each server's primary allocations will be for the most part sufficient to carry its normal traffic. The goal in this is that secondary and tertiary allocations be devices to help deal with the occasional peaks and shifts in traffic distribution, not the sustained average load. Furthermore, the dimensionality of the free-pool can also be fine-tuned empirically by examining a server parameter which reports the peak percentage utilization of the "free-pool" with the objective being to choose the value which keeps the worst case server(s) as close to 100% as possible. Finally, the ring timeslot manager can provide an ongoing measure of ring traffic loading. When its pool of available slots is nearing exhaustion it can broadcast an instruction to the server nodes to return any unused units immediately, and if this does not yield sufficient relief, it can further instruct the servers to enter a predefined load-shedding mode which will defer allocations to lower priority functions until the overload condition has subsided.

The Timeslot Manager for an Orbit Ring with 8 highways at 4 Mhz will have $$(8 \times 512) - (F \times 8) - (T \times 8) = 4096 - [(F = T) \times 8] \text{ bitslots where for example } F \text{ (Free Pool)} = 40,\ T \text{ (Tone Pool)} = 32, = 3520 \text{ bitslots}$$

available after subtracting the allocations for "Free-pool" and "Tone-pool" bytes. The free-pool allocation can overlay the slots required for frame synchronization flags so that no additional bandwidth is consumed for them.

For the Level 2 Ring (i.e. System) the allocation is similar to Level 1, but even simpler since there is no requirement for a free-pool or a tone pool. This is because typically the only nodes on the Level 2 Ring are Bridge Nodes which have no voice or data ports and hence no need to support intra-node communications. Moreover, each Orbit will contain one or more tone sources (for redundancy) so there is no need to transport tones across the System Ring. Thus the Timeslot Manager for a System Ring with 8 highways @ 4 MHz will have $$(8\times512)-(4\times4)=4080 \text{ bitslots}$$

available (after subtracting frame synch requirements) for distribution to the Timeslot Servers in the Bridge Nodes. Furthermore, since it is anticipated that a System Ring will be available with highways at 8 Mhz, it could have as many as $$(8\times1024)-(4\times4)=8176 \text{ bitslots}$$

available to carry inter-Orbit traffic for large systems. The system timeslot manager would be resident in the Bridge Node which provided System ring synchronization and would make allocations to the system servers in the Bridge Nodes based on their static (primary) and dynamic (secondary, etc.) demands.

With the above scheme establishment of a duplex network circuit for a voice or data connection becomes straightforward. The node originating the connection needs only to consult with its resident server to obtain an Orbit timeslot. If necessary, the resident server may request an additional allocation from the Orbit timeslot manager to satisfy this request. Once the timeslot is obtained the originating node sends a message to the terminating node, via the token ring or the ethernet, to establish the connection with that timeslot. If the desired connection is an intra-Orbit circuit, the terminating node receives that message, programs its data sterring module and PLS accordingly, and returns a connection established message. If the requested connection involves an inter-Orbit circuit, the message will be received by the network circuit manager (NCM) in the Bridge Node of the originator's Orbit. The NCM will request a System ring timeslot from its System timeslot orbit timeslot to the System timeslot and vice versa. It then forwards a connect request message for the System timeslot that was allocated to the NCM at the Bridge Node of the terminator's Orbit. The NCM at the Bridge of the terminator's Orbit receives this message, requests a timeslot from the pool of its Orbit timeslot server, and programs an available highway-highway link from the System timeslot to the Orbit timeslot and vice versa. It then forwards a connect request message for the Orbit timeslot to the terminating node, which programs its data steering module and PLS accordingly and returns a connection established message to the originating task.

If either the System timeslot server or the Orbit timeslot server were unable to satisfy the request for a timeslot, it would consult its respective timeslot manager for an additional allocation, and the timeslot manager would in turn broadcast a request for immediate release of unused timeslots to all the servers in its ring if it were unable to satisfy the request directly. Thus only in the case where all the servers of a ring had no available timeslots would the request for connection establishment fail.

Ring Timeslot Manager (RTM) Functions

RTM functions can be understood in connection with the flow chart provided at FIG. 8(*b*), which can be summarized as follows:

1. On ring initial start-up, establish tone zone and intra-node zone, if required, and issue primary allocation to each RTS based on prior history if available, else use default values.

2. Maintain tables of all current allocations and administer a MAX function to prevent excessive allocations to any RTS. Alert ring master diagnostic manager if any apparent cases of non-normal usage by an RTS are detected.

3. Service requests for additional allocations based on priority of requests. Dynamic computation of allocation unit size will select units of 8, 4, 2, or 1 byte depending on size of remaining pool, the current ring status level, and the number of RTS's being managed.

4. Collect periodic RTS statistics and log to data base. Also perform a periodic audit check that each RTS's allocation map is in agreement with the data in the master tables. Resolve any conflicts so detected.

5. Issue broadcasts for requesting early release of unused allocation units upon reaching ring status decrease thresholds to prevent unnecessary boundary crossings.

6. Issue broadcasts for change of ring status.

7. Return freed allocation units to available pool with recombination of continuous pieces whenever possible.

8. On recovery start-up, broadcast request to RTS's for report of current allocations, rebuild the data base, and check data obtained for consistency. Resolve any conflicts which may be found.

9. During system "least busy" periods, review current primary and intra-node allocations versus accumulated actual usage data and make strategic adjustments as required.

10. Maintain historical data base of allocations, usage, and other traffic related statistics.

Ring Timeslot Server (RTS) Functions

The functions of te RTS can be understood in connection with the flow chart provided at FIG. 8(*c*), which can be summarized as follows:

1. On start-up or restart, announce presence to Ring Timeslot Manager (RTM) via generic addressed message, and request primary allocation.

2. Service local requests for intra-node allocations as follows:

a. if (Ring Status<Request Priority) then fail request, else b. check intra-node pool as first choice, c. if (b) fails, then attempt to borrow from inter-node pool (see 3 below for inter-node allocation schema), d. if (c) fails, then request additional allocation from RTM at intra-node priority, if request fails then return failed, e. if request granted add new allocation to end of list and service the request.

3. Service local requests for inter-node allocations as follows:

f. if (Ring Status<Request Priority) then fail request, else g. check primary allocation as first choice, h. if (b) fails, then check secondary, tertiary, . . . , etc. allocations in order until success or list exhausted, i. if (c) fails, then request additional allocation from RTM at specified priority, if request fails then return failed, j. if request granted add new allocation to end of list and service the request.

4. Respond to RTM Status Poll messages.

5. Maintain local statistics for following: (in bit-slots)

k. current total of all inter-node owned l. current amount of inter-node in use at each priority level m. average amount of inter-node used since last poll n. peak amount of inter-node used since last poll o. current amount of intra-node in use at each priority level p. average amount of intra-node used since last poll q. peak amount of intra-mode used since last poll 6. Maintain value for Current Ring Status

Internal Configuration of NIM

Figure 9:
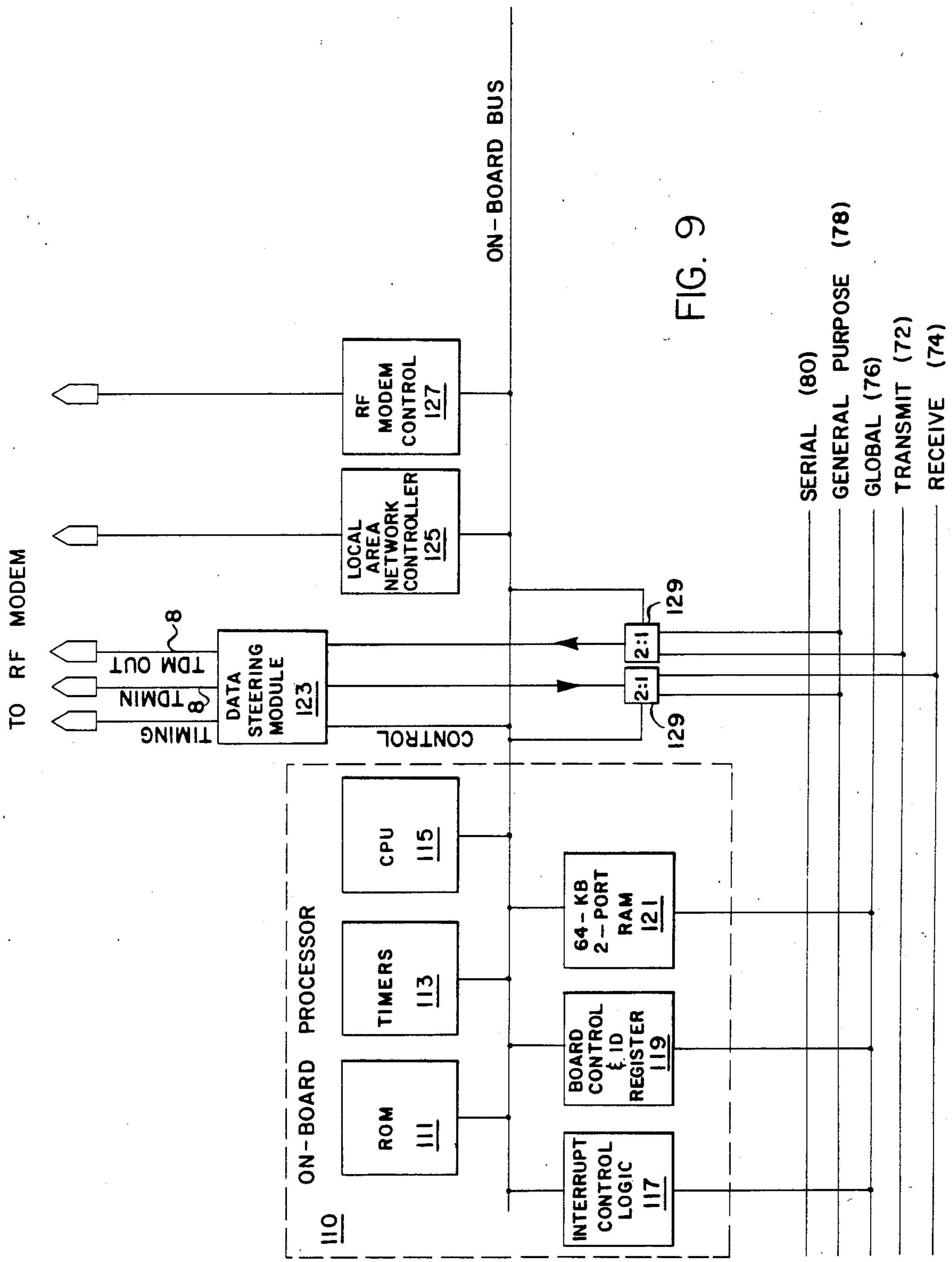
FIG. 9 is a block diagram of the internal configuration of a network interface module (NIM).

FIG. 9 is a block diagram of a NIM 51 illustrating the relationship between the data steering module, the local area network (LAN) controller and the on board processor. The details of data steering module control have previously been described. Control messages to the data steering module are provided by the CPU portion of the on board processor 110. It should be noted that on-board processor 110 is repeated in, e.g. SIM 57, HIM 61, SIM 63 and AIM 65. With the exception of some functions peculiar to those modules, the processor is programmed to perform the same function in each module. One commercially available processor that is suitable to perform the required functions is the model 8088 processor produced by Intel as Corporation, in cooperation with a 68 K Byte 2-port RAM. The on board CPU 115 obtains messages from the 68 K CPU 77 (FIG. 6(*a*)), and the circular buffers in the 64 K bytes 2-port RAM 121 of FIG. 9. As described earlier the data steering module 123 incorporates part of the memory space of the CPU 115.

As noted above the steering map of the data steering module block 107 of FIG. 8 can be conceived as having one word for each time slot on the node highways and two bit locations within each word corresponding to each of the eight highways within the node. Therefore, in order to set up a connection on the network, the CPU block 115, FIG. 9, writes into the background page of the steering map. The words correspond to the time slots to be allocated, and the bit positions correspond to the highway to be allocated. The bit values are selected from the control logic truth table on FIG. 8(*a*). The CPU 115 causes such connections to be made on demand of the 68K CPU 77, FIG. 6. CPU 77 writes control messages into circular buffers contained in the 64K Bytes 2-port RAM 121, FIG. 9. The on board CPU 115 controls the operation of the entire NIM. When the NIM is powered on for the first time an initialization program is executed from read only memory (ROM) 111. At that time complete diagnostics are also executed, and if the board is functional a code so indicating is written into the Board Control and ID Register 119. At that time, CPU 115 goes into a state awaiting acknowledgment from the CPU 77, shown at FIG. 6(*a*). CPU 77 writes a code into the board control and ID register 119 via on board bus 102, which enables CPU 115 to read and write the transmit and receive TDM buses 22 and 74, enables the interrupt logic, and enables the 64K Bytes 2-port RAM onto the global bus 76. The operational code modules for CPU 115 are loaded into the 64K Bytes 2-port RAM 121 by the CPU 77. CPU 115 then executes its code from 2-port RAM 121. The 2-port RAM 121 also contains a number of circular buffers for communication CPU 115 and CPU 77.

The NIM is event driven, wherein events are signals initiated by devices attached to the peripheral highways via the SIM 57, the AIM 65, the VIM 63, or the T-1 carrier module 73, shown at FIG. 6(*a*). The 2-port RAM 121 can be viewed as part of the memory space of CPU 77 and is accessed via the global bus 78.

Internodal control message traffic, requesting establishment of a circuit, is handled with the LAN controller 125, which communicates timeslot management control information in accordance with the previous description. LAN controller 121 may, in practice, be mounted on the NIM and therefore may be viewed as part of the NIM. However, it is understood that such a construction is not necessary to the invention.

If a node has a control message for another node, that message is typically generated and formatted by the CPU 77 and written into a circular buffer in 2-port RAM 121 of the NIM. CPU 115 then processes the message, adding the necessary protocol information and passes the message to the LAN controller 125 for transmission to the distant node. Similarly, a control message coming from a distant node via the LAN will be arriving at the LAN controller 125 and will be processed by the CPU 115, and passes the message to the CPU 77 via a circular buffer and 2-port RAM 121.

Thus, if the message traffic from a distant node were a request to establish circuit, that message would arrive in the LAN controller 125 and protocol handling would be accomplished by CPU 115, which removes the necessary protocol information. The message would then be written into circular buffer and 2-port RAM 121. The circuit request would be processed in the CPU 77, and the final request for circuit establishment would be generated by CPU 77 via a message written into a circular buffer in 2-port RAM 121. That message would then be processed by CPU 115. In a manner earlier described, the CPU 115 would load the data steering module 123 to set up calls.

When messages are written into the 2-port RAM 121 by either CPU 115 or CPU 77, the interrupt control logic 117 is employed. Messages emanating from the NIM cause interrupts to be generated for the CPU 77. Messages from the CPU 77 to the NIM cause interrupts of the processor 115 via the interrupt control logic 117.

Except for dynamically enabling the connection of node transmit highways to node receive highways, the NIM assembly is not involved in calls within a node, but it is involved in all calls between nodes. The RF modem control logic 127 is used to communicate with the RF modem for diagnostic and control purpose and for control of the RICU 27, which is a peripheral of the RF modem. The two-to-one multiplexers 129 are used to select between the normal transmit and receive highways and an alternate set of transmit and receive highways which may form a part of the general purpose bus. In redundant systems, which use two NIM's, one NIM is set up to communicate with the normal transmit and receive highways and the second NIM is set up to communicate with the alternate set of transmit and receive highways. Messages for directing such setups to occur are passed to the NIM via circular buffers and the 2-port RAM 121.

Timers 113 include a watchdog timer that is reset by the CPU 115 periodically in order to indicate proper functioning of the CPU and its associated programs. If a failure occurs which results in the inability of the CPU 115 to reset the watchdog timer portion of timer 113, that portion will activate the reset line to the CPU which will terminate its operation and cause the board control and ID register 119 to indicate that the board is inoperative. Other timers included in 113 provide timing for measuring intervals between various events of significance involved in the handling of communications protocols between nodes.

Internal Configuration of SIM

Figure 10:
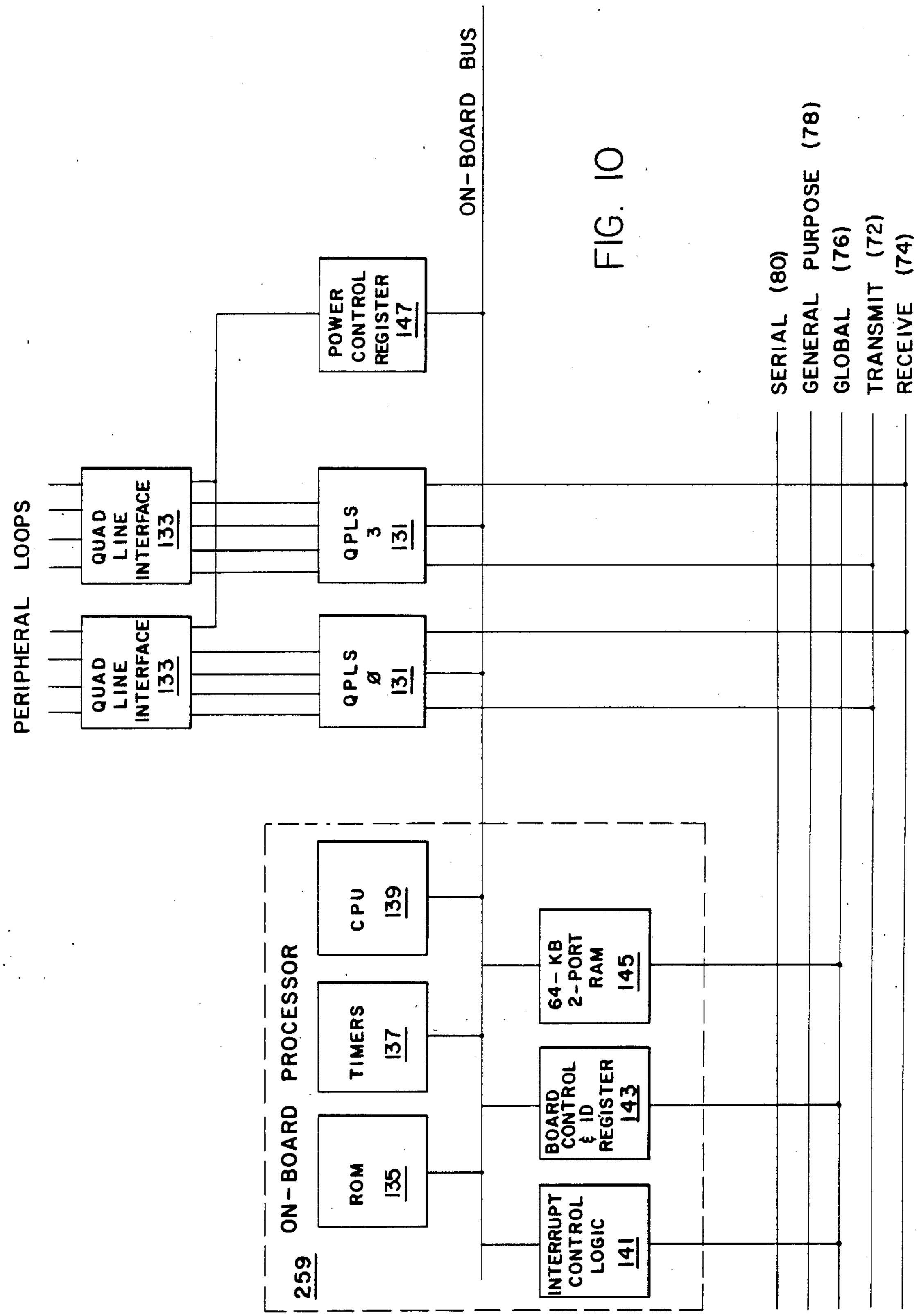
FIG. 10 is a block diagram of the internal configuration of a station interface module (SIM).

FIG. 10 is a block diagram of the station interface module (SIM). The processor portion of the SIM is similar to the NIM and all messaging and control between the SIM and CPU 77 follows the same procedures described in the NIM. The entire system described in this invention is event driven where events occur asynchronously (e.g., initiated by the various assemblies that interface to human users or to intelligent peripherals such as computers) or synchronously (e.g., initiated by various process controls). The SIM serves as an interface to the digital station equipment attached to the peripheral or local highways 104. A user of a digital teleset connected to a peripheral highway can initiate events by pressing buttons on the telephone, by lifting the handset, or by toggling the various modem control lines on the data interface portion of the station. Such an event causes a signal to be transmitted from the telephone to the SIM via the wires of the peripheral highway. Two pairs of wires typically carry DC power for a digital telephone. One pair is used to transmit to the telephone while the other pair is used to receive messages from the telephone. Quad line interfaces 133 interface the peripheral highways to the I/O ports of the quad per line switch (QPLS) 131.

It is common practice to equip a node with more peripheral highways than are actually in use. The teleset power control register (TPCR) 147 is used to selectively control the power transmission to the telephones (e.g., 16 stations) supported by the SIM. That is, any telephone can be turned on or off by setting the appropriate bit in the power control register 147. PCR 147 thus permits powering down selective peripheral highways as may be desired for various reasons, e.g. to prevent their unauthorized use, or to reduce power consumption in order to accommodate battery operation of the node in the event of a power failure.

Messages generated by stations on the peripheral highways are received by the QPLS 131, which passes the messages to the CPU 139 in on board processor 259. When a valid signaling message is received the CPU either takes immediate action or passes the message or interpretation of the message to the 68K CPU 77 (FIG. 6(*a*)) via a circular buffer in 2-port RAM 145. Messages from stations requiring immediate feedback include tone feedback to indicate valid depression of buttons and other character echoing functions for data applications. After a telephone number is dialed, the message indicating that a connection is to be established is generated by the CPU 77 and sent to the on board CPU 139 via a circular buffer of the 2-port RAM 145. The CPU 139 then processes the message and causes one per line switch (PLS) of the four within QPLS 131 to be programmed for use of the particular time slot or time slots as detailed below in connection with FIGS. 12 and 13. Intra-node connections typically require independent receive and transmit time slots, through network connections may require only a single time slot.

Brief Description of the Quad Per Line Switch (QPLS)

In the preferred present embodiment, the QPLS consists of four essentially identical Per Line Switches (PLS). Each PLS operates independently and each can switch variable bandwidth information channels of data from independent node information highway input, carrying internode or intranode signal traffic, to an external station device on a peripheral highway, or to another node information highway. The data from the external station device can therefore be switched via the variable bandwidth channels onto any selected node information highway outputs. The channel and bandwidth selections in each PLS are all completely independent of each other. In the present embodiment, sixteen independent node information highways (eight transmit and eight receive) are available for use by all PLS's. In the preferred embodiment, each PLS contains a packet channel for transferring control and general purpose data and circuit switched channels for communicating voice to and from a station device. Both the packet channel and the circuit switched channels are interlaced into a single serial signal stream communicated to and from the station device. Packet data in both directions may be monitored for errors utilizing cyclic redundancy generating and checking circuits.

The QPLS can be configured under program control such that the PLS's operate in pairs to transmit data to and receive data from two station devices at twice the normal data rate. As described below, the PLS's can also be configured to operate as a single switching unit to transfer data between the information highways and a single station device at four times the normal data rate.

When operating with local station devices, that is devices connected on the same circuit board as the QPLS, the PLS's can transfer data to and from the station devices in synchronization with the information highways. When operating with remote station devices, that is devices connected to the QPLS circuit board by transmission lines, the PLS's can operate synchronously with the devices, transmit to them in synchronization with the information highways, and receive from the devices by self-synchronization with each device. In the presently preferred embodiment the QPLS can also switch nine channels of data between information highway inputs and outputs without transferring data to or from a station device. When the QPLS is operating in this manner, information highway data may be time compressed or decompressed by setting the data rate on the information highway outputs to be a multiple or submultiple of the data rate on the information highway inputs.

Detailed Description of the Quad Per Line Switch

Figure 11:
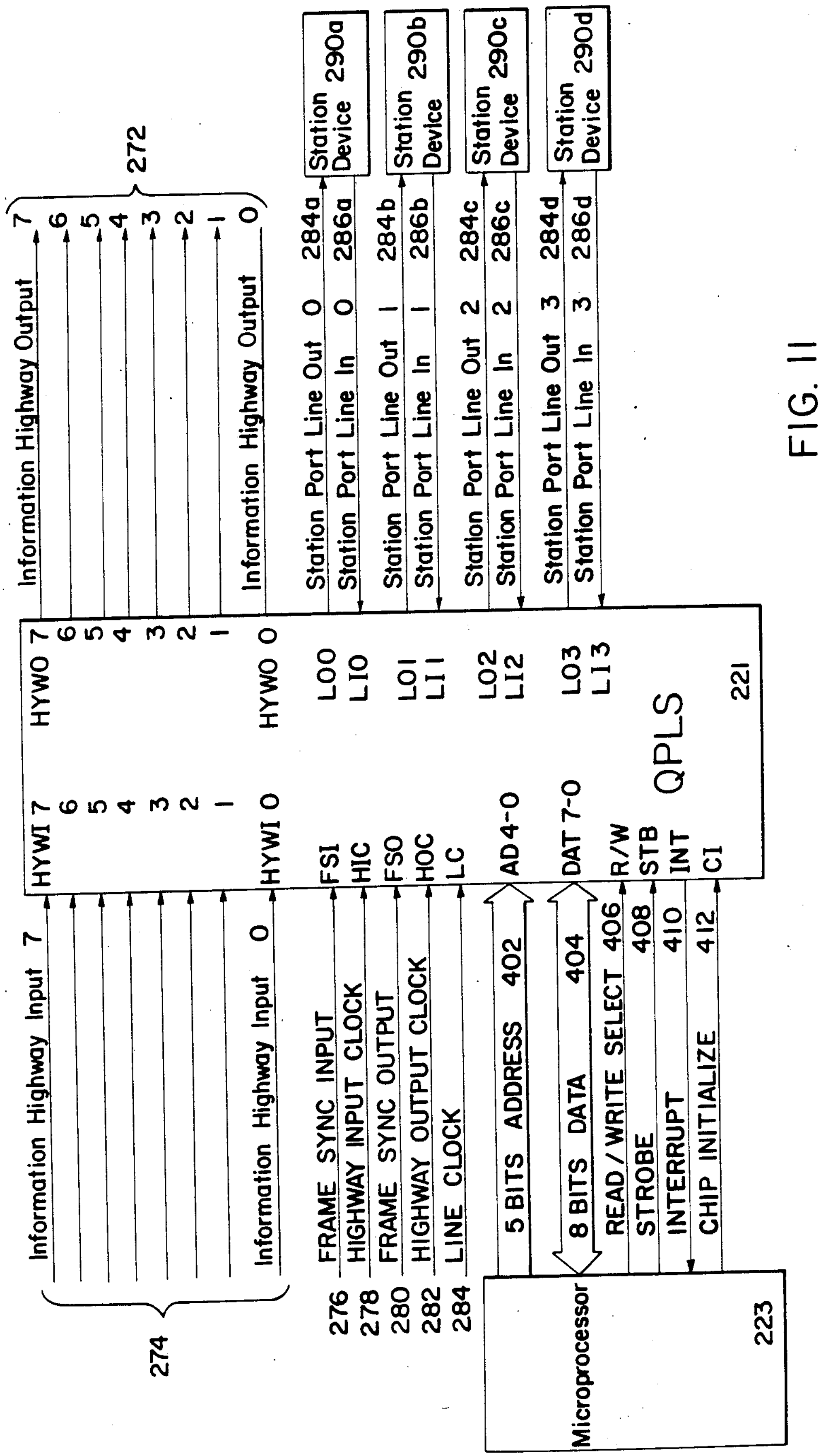
FIG. 11 is a wiring diagram of a Quad Per Line Switch (QPLS) element showing the external connections.

FIG. 11 shows a wiring diagram of the Quad Per Line Switch (QPLS) 221 in its presently preferred embodiment. The QPLS may be advantageously manufactured as a 48-pin large scale integrated circuit having the inputs and outputs shown.

The operation of the QPLS can be more easily envisioned by an understanding that the QPLS selectively routes data between one or more of the information highways (272 and 274) within the node and the station devices 290. As was described in the background and summary of the invention, the QPLS routes the data on the basis of time division multiplexing. The particular selection and timing of data transfers between the information highways and the station devices is controlled by an external control means such as microprocessor 223 shown in FIG. 11.

Because the QPLS is used to transfer data to and from information highways, a brief description of the information highways will be presented before proceeding with the detailed description of the invention. In the present embodiment, the eight information highways are identical and are used to transfer time-division multiplexed data to and from the QPLS. The eight information highway inputs (HYWI7-0) 274 are distinct from the eight information highway outputs (HYWO7-0) 272. However, in alternative implementations, the information highway inputs 274 and information highway outputs 272 can be tied together to form a bidirectional data path to and from the QPLS.

Description of the Data Transfer Formats and QPLS Configurations

Figure 17:
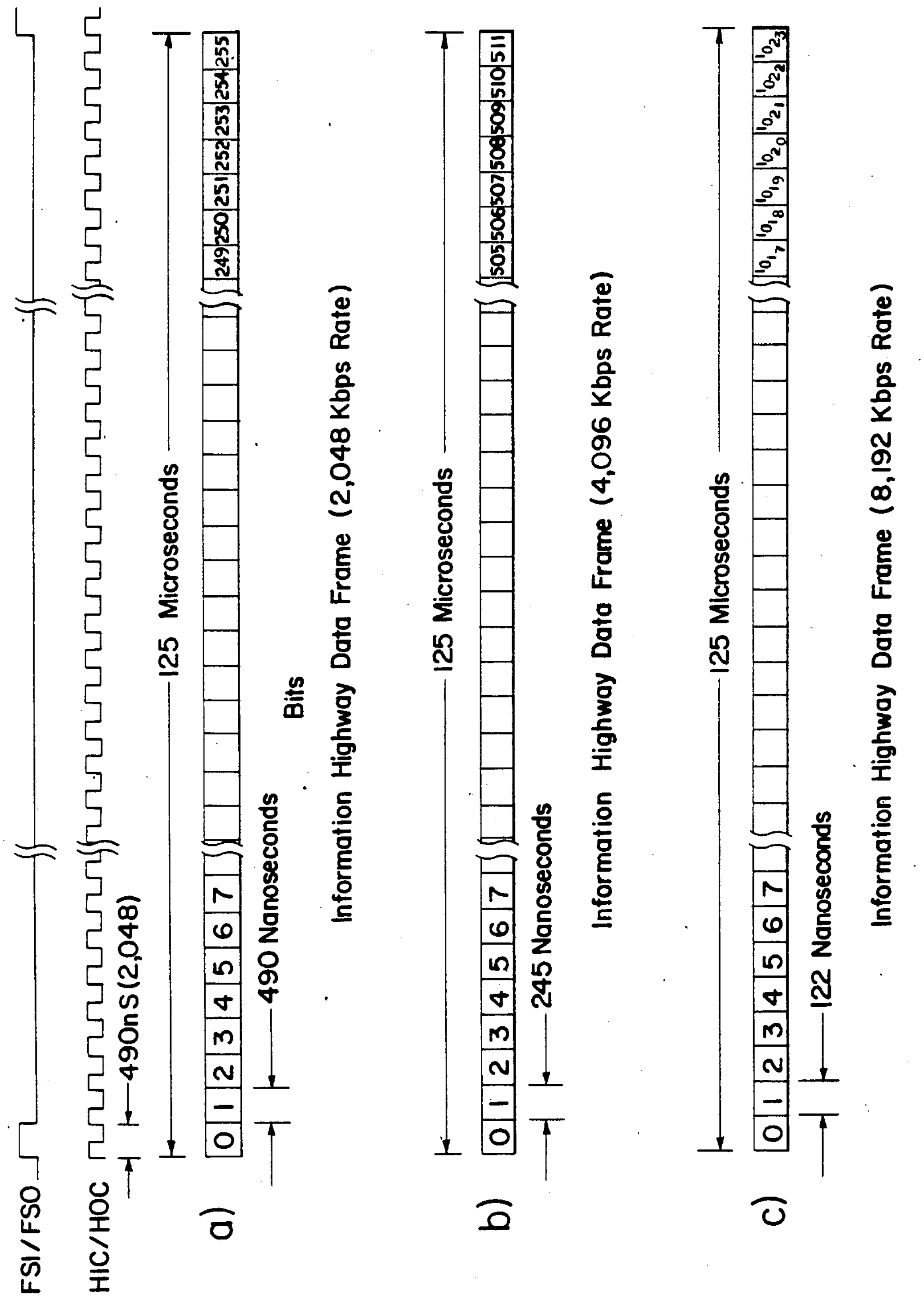
FIG. 17 is a timing diagram exemplifying the relationship between the information highway data rates.

The format of the time-division multiplexed data on the information highways is shown in FIGS. 17(*a*), 17(*b*), and 17(*c*). The serial data to and from the QPLS is transmitted in synchronization with clock signals. The information highway inputs 274 are synchronized with the highway input clock (HIC) 278, and the information highway outputs 272 are synchronized with the highway output (HOC) clock 282. Typically, the highway input clock 278 and the highway output clock 282 will be supplied from the same source and will be the same signal. In FIG. 17, the highway input clock 278 and the highway output clock 274 are shown as one signal. Alternatively, the information highway inputs 274 and the information highway outputs 272 can operate at different data rates to allow the data on the information highway inputs to be compressed or decompressed. For instance, if the highway output clock (HOC) 282 operates at twice the rate of the highway input clock (HIC) 278, the data from two information highway inputs 274 could be compressed by the QPLS and transmitted out on one information highway output 272 at twice the data rate. Decompression of data could be accomplished by operating the highway input clock 278 at a multiple of the highway output clock 282.

Data is continuously transferred to and from the QPLS on the information input highways 274 and information output highways 272. Because the information is time-division multiplexed, further synchronization of data is required. The frame sync input (FSI) 276 occurs periodically to mark the beginning of a new frame of information on the information highway inputs 274. In the present embodiment, the frame sync input 276 occurs every 125 microseconds, and thus has a repetition rate of 8000 hertz. Similarly, the frame sync output (FSO) 280 occurs every 125 microseconds, and marks the beginning of a new frame of information on the information highway outputs 272. Typically, the frame sync input 276 and the frame sync output 280 are the same signal. In the presently preferred embodiment, the highway input clock 278 and the highway output clock 282 will operate at 2048 kHz, or 256 times the repetition rate of the frame sync input 276 and frame sync output 280 (i.e., 8000×256). Thus, because the information on the highways is synchronized with the clock, there will be 256 pieces of information within each frame. Each of the pieces of information occupies a time slot in a message frame as shown in FIG. 17(*a*). Similarly, if the highway input clock 278 and highway output clock 282 operate at 4096 kHz or 8192 kHz, the number of information bits derived by the QPLS per frame will be 512 or 1024, as shown in FIGS. 17(*b*) and 17(*c*) respectively.

Figure 18:
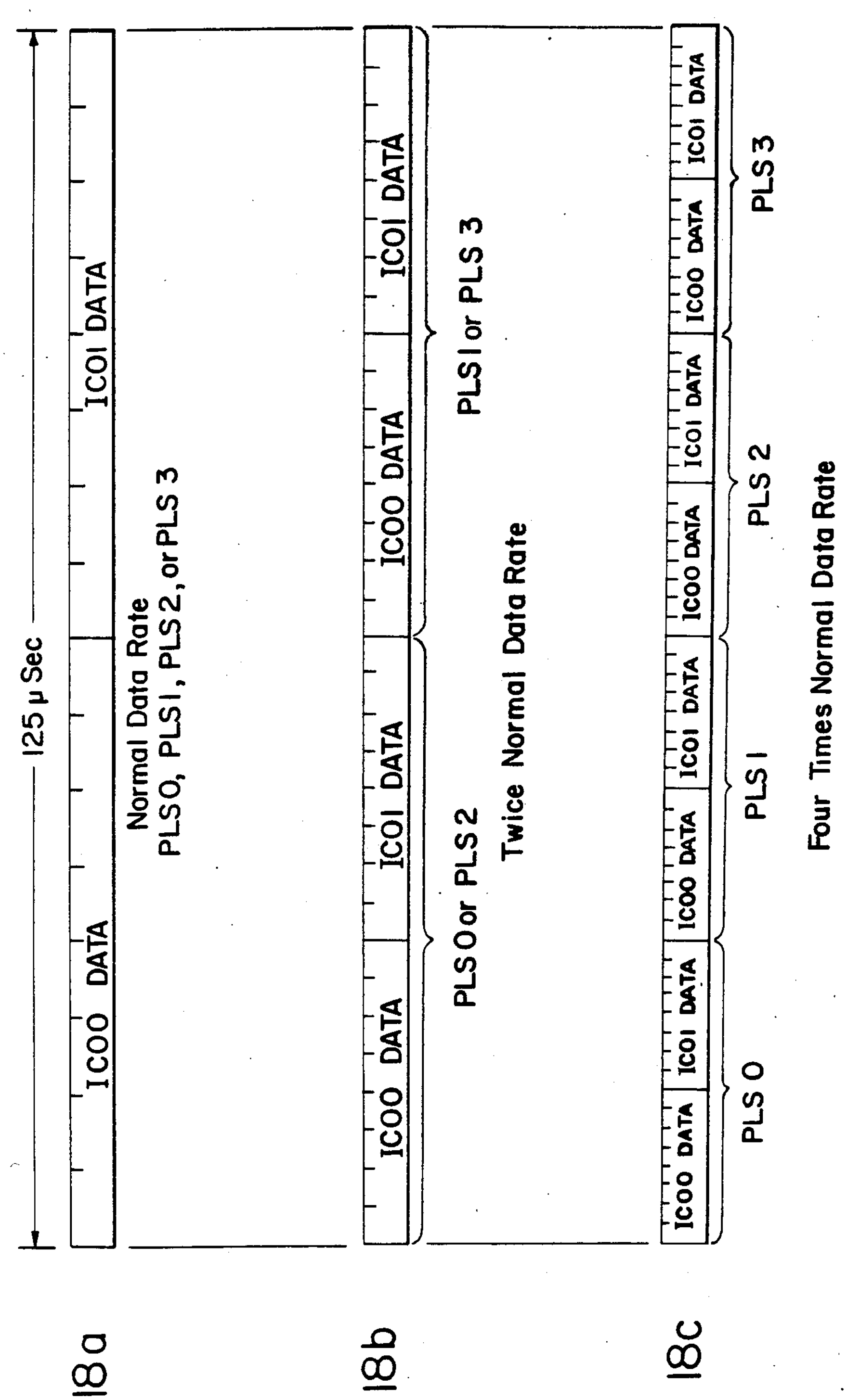
FIG. 18 is a timing diagram exemplifying the data transfer formats to a station device in the local mode.

As previously described, the QPLS transfers data between the high-speed information highways 272, 274 and the station devices 290, which operate at a slower data rate. Typically, a station device can receive data at a rate of 128 kbps. This is illustrated in FIG. 18(*a*) which illustrates the 16 time slots within the 8000 Hz frame, resulting in a 128 kbps data rate. Because a single information highway input typically transfers data at a rate 16 times higher than the station device (i.e., 2,048,000 bps, or 128,000 frames per second, each frame including 256 information bits), only selected portions of an information highway frame can be transferred to the station device. The difference in data rates can be seen by comparing the information highway data rates illustrated at FIG. 17 with the station data rates illustrated at FIG. 18.

Returning to FIG. 17(*a*), each of the 256 pieces of information in a frame on the information highways is called a data bit, or channel. The QPLS transfers selected portions of the data on the information highways from the information highways to station devices, and transfers data from the station devices to selected time slots in the message frames of the information highways. In the preferred embodiment, up to 64 bits of information can be transferred from the information highways to station devices and from the station devices to the information highways during each 125-microsecond frame. That transfer rate occurs when each of the four PLS's in the QPLS transfers 16 bits of information during a single frame.

As described below, valid data is transferred in groups comprising one to eight bits of data in each direction. The number of valid bits of data in a group is the bandwidth of the group. The location of the bit, with reference to the beginning bit of the information frame, is designated as the channel of the information. The ability of the QPLS to dynamically select the channels and the bandwidths of the data to be transferred, as will be described more fully below, is one of the advantages of the QPLS over the prior art which permits more efficient use of the network signal stream.

As will be described more fully below, the QPLS has the ability to dynamically increase the rate at which data can be transferred between the information highways and a station device. In the normal data rate configuration, the QPLS can transfer up to 128,000 bits per second (i.e. 16 bits/frame) to each of four station devices. In the medium data rate configuration, the QPLS can transfer up to 256,000 bits per second (i.e. 32 bits/-frame) to two devices. In the high data rate configuration, the QPLS can transfer up to 512,000 bits per second (i.e. 64 bits/frame) to a single station device. The formats of the data transferred in the medium data rate configuration and the high data rate configuration are illustrated in FIGS. 18(*b*) and 18(*c*).

In the normal, medium and high data rate configurations the data transfers may occur synchronously or asynchronously with the data on the information highways. In the "local" mode, data transferred to and from the station devices connected to the QPLS is synchronized with the information highway clocks 278, 282 and the frame syncs 276, 280, by direct connection to those signals. The station devices can also be controlled by the same means as the QPLS. However, if the stations devices are not on the same circuit board as the QPLS, it is not always practical to have the station devices controlled by the same clocks and synchronization signals (i.e., be in the local mode). The QPLS can also be configured in the "remote" mode to synchronously transfer data to and from such remotely connected devices without sending the highway clocks and synchronization signals to the devices. In the remote mode the transmission of data to and from remote devices by the QPLS is accomplished by synchronizing data transfers with the information highway timing. The data from the remote devices to the QPLS is self-synchronized within the QPLS by transmitting the data from the device as biphase mark encoded data in a format shown in FIG. 20. As compared with nonreturn-to-zero (NRZ) data, the biphase mark encoded data has at least one transition between the high and low state for each data bit. A decoding circuit in the node can derive a clock and a data signal from the encoded signal. Of course, other well known self-synchronizing data formats can be used.

Figure 19:
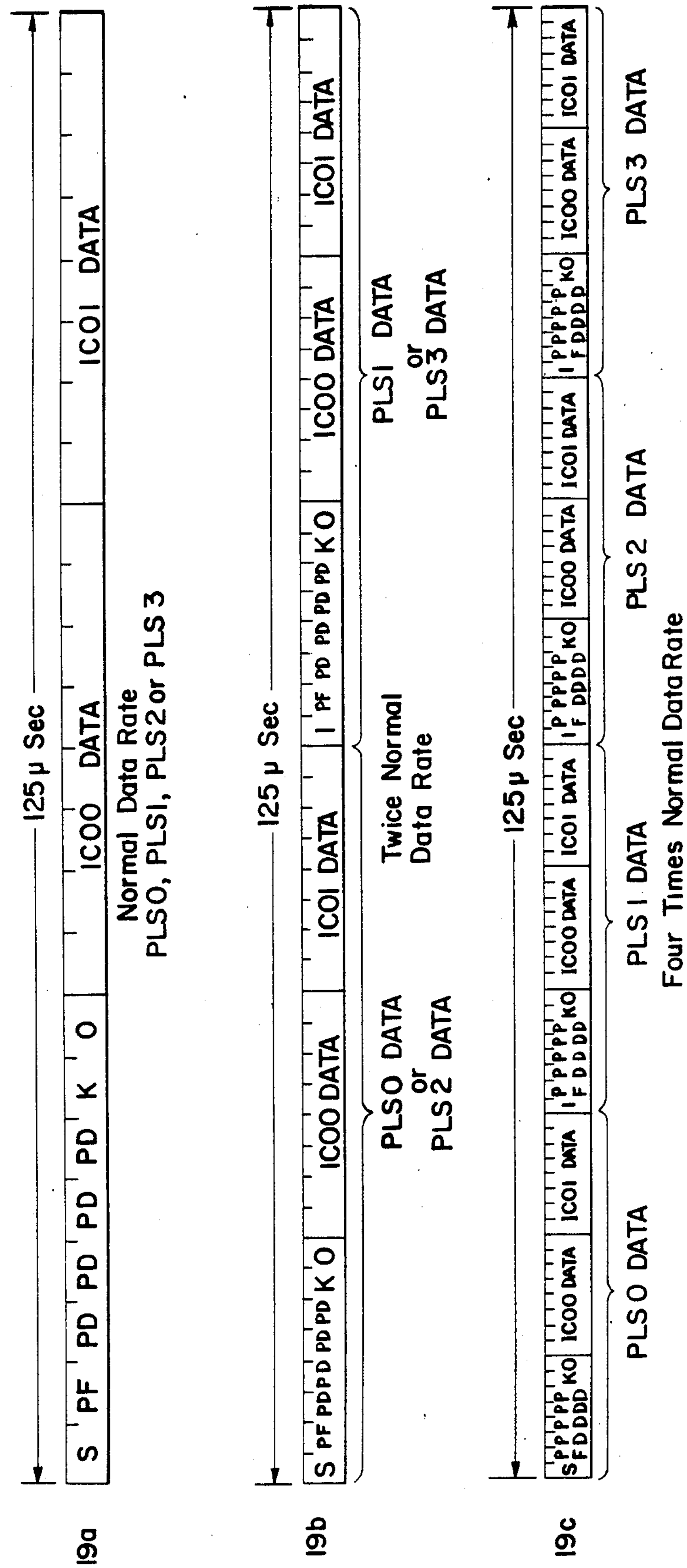
FIG. 19 is a timing diagram exemplifying the data transfer formats to a station device in the remote mode.

Furthermore, because the external means which control the QPLS is not on the same circuit board as the station devices, the QPLS must provide means of transferring synchronization information as well as control and status information between the external control means and the station devices. In the presently preferred embodiment those needs are accommodated by transferring synchronization information and control and status information within the signals transferred between the device and the QPLS. The synchronization signals and the control and status signals comprise the first eight bits of data preceding the sixteen bits of information data transferred between the QPLS and the station devices. This is illustrated in FIG. 19(*a*). As can be seen by comparing FIGS. 18 and 19, the 125 microsecond message comprises 24 data bits in the remote mode as as compared to 16 data bits in the local mode. In order to accommodate the additional eight bits of data, in the low data rate configuration, the data is transferred between the QPLS and the station device at 192 kHz, in contrast to the 128 kHz data rate in the local mode. Similarly, as shown in FIGS. 19(*b*) and 19(*c*) for the medium and high data rate configurations, in the remote mode the data is transferred between the QPLS and the station devices at 1.5 times the corresponding data rates in the local mode.

The QPLS can also be reconfigured to selectively bypass any of the station devices. In this "loopback" mode, the information from the QPLS which would normally be transferred to a station device is instead transferred from selected information highway inputs 274 to selected information highway outputs 272. That configuration can be advantageously used for diagnostic purposes or for switching between information highways.

More detailed descriptions of the local/remote mode, the low data rate/medium data rate/high data rate mode, and the normal/loopback mode will be disclosed below in connection with the detailed drawings.

Again referencing FIG. 11, the QPLS 221 transmits data to the four station devices 290 on the line outputs (LO3-LO0) 284 and receives data from the four station devices 290 on the line inputs (LI3-LI0) 286. In the local mode, the data on the line outputs and line inputs is synchronized with the data on the information highway inputs (HYWI7-0) 274, and with the information highway outputs (HYWO7-0) 272 by the line clock (LC) 288. The line clock (LC) 288 operates at the data rate of the information highways (2,048; 4,096; or 8,192 Kbps). In the remote mode the line clock operates at higher rates, e.g., 12,288 Kbps, and facilitates encoding and decoding of data communicated between the station devices and the information highways over transmission lines. Upon receipt of data from the information highways in the remote mode, the line clock is used to generate biphase mark encoded data transmitted to the station devices on the line outputs. Upon receipt of data from a station device in the remote mode, the line clock is used to decode the biphase mark encoded data received from the station devices on the line inputs by sampling the input signal at sixteen times the maximum input data rate. The biphase mark encoded data is sometimes referred to as biphase Manchester encoded data.

QPLS Control Lines

The QPLS 221 is controlled by a microprocessor 223 which represents the SIM on-board processor 259 (FIG. 10) as updated by the 68 K CPU 77 (FIG. 6(*a*)). Principal control signals are communicated to the QPLS via the address lines (AD4-AD0) 402, the data lines (DAT7-DAT0) 404, the read/write control line (R/W) 406, and the strobe (STB) 408. The QPLS signals the microprocessor upon the occurrence of internal events by activating the interrupt line (INT) 410. The QPLS is initialized by the microprocessor or by external power-on reset logic by activation of the chip initialize line (CI) 412. The five address lines (AD4-AD0) 402 are controllable by the microprocessor and determine the interface operation to be performed. The read/write control line (R/W) 406 determines whether data or control information is transmitted from the microprocessor to the QPLS in the write mode, or whether data or status information is transmitted to the microprocessor from the QPLS in the read mode. Such data, control or status information is transmitted over the eight bidirectional data lines (DAT7-DAT0) 404. The strobe (STB) 408 clocks data into the QPLS in the write mode and indicates completion of the data transfer in the read mode. The chip initialize line (CI) 412 functions to cause the QPLS to be initialized to certain known conditions when it is activated by the microprocessor or power or reset logic. In particular, the QPLS is disabled from communicating with the information highways or the station devices until specifically activated by the microprocessor.

General Description of Data Flow From Highways to Station Devices

As shown in FIG. 12, the QPLS 221 is composed of four essentially identical per line switches (PLS's) 243 a, b, c and d. Functionally, each PLS 243 consists of a station-to-highway circuit 244 and a highway-to-station circuit 246 which operate independently or in conjunction with the corresponding circuits in the other PLS's. The highway-to-station circuit 246 (forming the right hand portion of FIG. 12) receives serial information data from the information highway inputs 274 and transfers the data in the selected format to the station device 290(a–d), (see FIG. 21) connected to the respective PLS. The highway-to-station circuit 246 includes information channel output circuits (ICO1 386 and ICO0 388), the packet channel output circuit (PCO 390), the biphase mark encoder circuit (BME 393), and the output logic control circuit (OLC 389). As shown in more detail in FIG. 13(*a*), each information channel output circuit ICO1 386 and ICO0 388, selects an information highway input 274, a starting bit for a channel on the highway and a channel bandwidth independently of the other. In the preferred embodiment, both ICO1 386 and ICO0 388 each receive up to eight bits of data from the information highway inputs 274 in one 125-microsecond frame. The data is transmitted to the station device 290 during the following 125-microsecond frame in one of the formats shown in FIG. 18 or 19. In the local mode, in the preferred embodiment, the PCO 390 and BME 393 are bypassed by line 614, thus eliminating the packet channel portion of the signal. In the remote mode, in the preferred embodiment, the PCO 390 appends eight bits of packet data, consisting of synchronization bits and control information, to the data signal, from the information channel output circuits. The total 24 bits of serial information transformed to biphase mark encoded data by BME 393 and are transmitted at 1.5 times the local data rate in the 125-microsecond frame in the format described in more detail in connection with FIG. 19(*a*).

General Description of Data Flow From Station Devices to Highways

The station-to-highway circuit, e.g. 244*d* in PLS 243*d* (the left hand side of FIG. 12), consists of the input logic control (ILC 387), the biphase mark decoder (BMD 461) the information channel input circuits (ICI1 582 and ICI0 584), the packet channel input logic circuit (PCI 385) and the input message control logic circuit (IMC 381). The station-to-highway circuit 244 in PLS 243*d* receives serial data on LI3 286*d* from the device 290*d* connected to the station port and transfers that data to selected channels on selected information highway outputs 272. Each of the information channel input circuits, ICI1 382 and ICI0 384, independently selects an information highway output 272, a starting bit for a channel on the highway and a channel bandwidth. In the local mode, only 16 bits of data are input to the PLS 243*d* and the packet channel input logic circuit 385 in the station-to-highway circuit 244*d* is not used. The data from the station device 290*d* is typically in non-return-to-zero (NRZ) data format, and the biphase mark decoder logic 461 is not used. This is accomplished under the control of ILC 387 which channels data directly to ICI1 382 rather than to BMD 561. The IMC 381 allows the data to be clocked in synchronization with the information hihway outputs 274. In the remote mode, the biphase mark decoder (BMD) 261 in the station-to-highway circuit 244*d* receives encoded data from ILC 387 and derives NRZ data and a clock from the encoded data. The first eight bits of the 224 bits of data are used by the packet channel input circuit (PCI) 385 to derive data and status information from the station device for transmission to the microprocessor. The derived NRZ data is then communicated via OLC 387, to the highway outputs in ICI1 and ICI0,, and to the PCI 385. Data from PCI 385 is accessed by the microprocessor 223 via data lines (DBA7-0) shown on FIG. 25. The PCI 385 and IMC 381 function to verify that the received data is synchronized.

Interconnection of the PLS's for Higher Data Rates

As shown in FIG. 12, the PLS's are interconnected to allow data transfers to occur at higher data rates. In the low data rate configuration, each PLS 243 operates independently and transmits up to 16 bits of data to and receives up to 16 bits of data from its corresponding station device 290 in the local mode, or 24 bits in each direction in the remote mode. As described below, the PLS's may function in pairs, or four at a time to accommodate higher data rates.

Higher Speed Data Rate Configurations (a) Highway-to-Station Interconnections

In the medium data rate configuration, the interconnections of the highway-to-station circuits 246 of two PLS's, such as PLS0 and PLS1, allow the two PLS's to operate as a single unit. The output of ICO0 388 or PCO 390 of PLS1 is input to ICO1 386 of PLS0 via OLC 389. Thus, in the local mode, the output of PLS0 to the station device is 16 bits of data from PLS0 followed by 16 bits of data from PLS1, and will be transmitted on line LOφ 284*a* to the station device 290*a* connected to OLC 389 of PLS0. The resulting 32-bit data signal is transmitted to the station device 290*a* in 125 microseconds at twice the low data rate in the format shown in FIG. 18(*b*). In the remote mode, the data signals from the highways and the accompanying control and signaling information to the station device, e.g. 48 bits of signal total, are transmitted to the station device 290*a* in one frame, e.g. 125 microseconds. No data is transmitted to an external device on PLS1, and BME 393 of PLS1 is bypassed via line 616, because the data will be encoded by BME 393 in PLS0. The operation of PLS2 and PLS3 in the medium data rate configuration is substantially identical to that set forth in connection with PLS0 and PLS1. The data received from the information highway inputs 474 selected by ICO1 386 and ICO0 388 in PLS2 and PLS3 is transmitted to the station device 290*c* connected to OLC 389 of PLS2.

In the high data rate configuration, the highway-to-station circuits 246 in the four PLS's are interconnected so as to cooperatively transmit data to the station device 290*a* connected to PLS0. All four PLS's are interconnected in a fashion similar to the PLS interconnections in the medium data rate configuration, with the data output of PLS2 (ICO0 388 or PCO 390) transferred to ICO1 386 of PLS1. In the local mode, data signals from the highways connected to ICO0 and ICO1 of each PLS, e.g. up to 64 bits, are transmitted to the station device connected to PLS0 during each 125-microsecond frame at four-times the normal data rate, in the format shown in FIG. 18(*c*). In the remote mode, data and control signals from ICO0 388, ICO1 386, and PCO 390 of each PLS, e.g. 96 bits are transmitted to the device in the format shown in FIG. 19(*c*).

(b) Station-to-Highway Interconnections

The station-to-highway circuits 244 in each PLS 243 may be similarly interconnected to operate at different data rates. In the medium rate configuration of the station-to-highway circuits 244, data is received from the station devices 290*a*, 290*c* connected to PLS0 and PLS2. The data from the station device 290*a* connected to PLS0 is input through ILC 387 of PLS0. In the remote mode, the data signals and the accompanying control and signaling information, e.g. 48 bits, from the station device 290*a* are clocked through ILC 387 of PLS0, and NRZ data and clock are derived from the encoded signal by BMD 461 of PLS0. The data is then clocked through ILC 387, ICI1 382, ICI0 384, and PCI 385 of PLS1, then back through ILC 387, ICI1 382, ICI0 384, and PCI 385 of PLS0. In the remote mode, clocking and synchronization of the data is controlled by IMC 381 of PLS0. BMD 461 of PLS1 is not used in this configuration since the clock and data have been derived by BMD 461 of PLS0. In the local mode, the data signals, e.g. 32 bits, from the station device, are input through ILC 387 of PLS0, then through ILC 387, ICI1 382, and ICI0 384 of PLS1, then back through ILC 387, ICI1 382 and ICI0 384 of PLS0. The interconnections between PLS2 and PLS3 are similar to the interconnection of PLS0 and PLS1 in the medium data rate configuration, and the data is input from the station device 290*c* connected to ILC 387 of PLS2.

In the high data rate configuration of the station-to-highway circuits 244 data is received from the station device 290*a* connected to ILC 387 of PLS0. In the remote mode, the signal data and control and signaling information, e.g. 96 bits, from the station device 290*a* is clocked through ILC 387 of PLS0 where NRZ data and clock are derived by BMD 461 of PLS0. The data is then clocked through ILC 387, ICI1 382, ICI0 384, and PCI 385 of PLS3, PLS2, PLS1 and PLS0, in that order. Synchronization and clocking are controlled by IMC 381 of PLS0. In the local mode, the signal data, e.g. 64 bits, from the station device 290*a* connected to ILC 387 of PLS0, is clocked through ILC 387 of PLS0, then through ILC 387, ICI1 382, and ICI0 384 of PLS3, PLS2, PLS1 and PLS0, in that order.

General Description of the Loopback Mode

Another feature of the QPLS is the ability to configure the PLS's in the loopback mode. In the loopback mode, each PLS can independently select the output of OLC 389 as the input to ILC 387. Thus, data on the input of the highway to station circuit is transferred to the output of the station highway circuit without any communication to the station device. The effect is to permit information transfer between highways via the QPLS. Referencing FIG. 12, the loopback mode has the effect of routing data from the information highway inputs 274 selected by the information channel output circuits (ICO1 386 and ICO0 388) of the PLS to the information highway outputs 272 selected by the information channel input circuits (ICI1 382 and ICI0 384) of the same PLS. Thus, a PLS in the loopback mode can switch data between selected information highway inputs 274 and selected information highway outputs 272 without involving a station device. This ability can be implemented at the various QPLS data rates. For example, in the medium data rate configuration, the input of ILC 387 of PLS0 selects the output of OLC 389 of PLS0. This has the effect of routing the data from the information highway inputs 274 selected by ICO1 386 and ICO0 388 of PLS0 to the information highway outputs 272 selected by ICI1 382 and ICI0 384 of PLS0, respectively, and routing the data from the information highway inputs 274 selected by ICO1 386 and ICO0 388 of PLS1 to the information highway outputs 272 selected by ICI1 382 and ICI0 384 of PLS1, respectfully. Additionally, in the remote mode, a PLS in the loopback mode routes the packet data from the microprocessor through PCO 390 and back through PCI 385 where it can be accessed by the microprocessor. Thus, the operation of the packet channel logic can be tested prior to routing any data to a station device connected to that PLS. The operation of PLS2 in the loopback mode in the medium data rate configuration has similar effects on PLS2 and PLS3. In the high data rate configuration, ILC 387 of PLS0 selects the output of OLC 389 of PLS0. The data from the information highway inputs 274 selected by the information channel output circuits (ICO1 386 and ICO0 388) of each PLS is routed to the information highway outputs 272 selected by the corresponding information channel input circuits (ICI1 382 and ICI0 384) of each PLS.

General Description of the Diagnostic Channel

Figure 16:
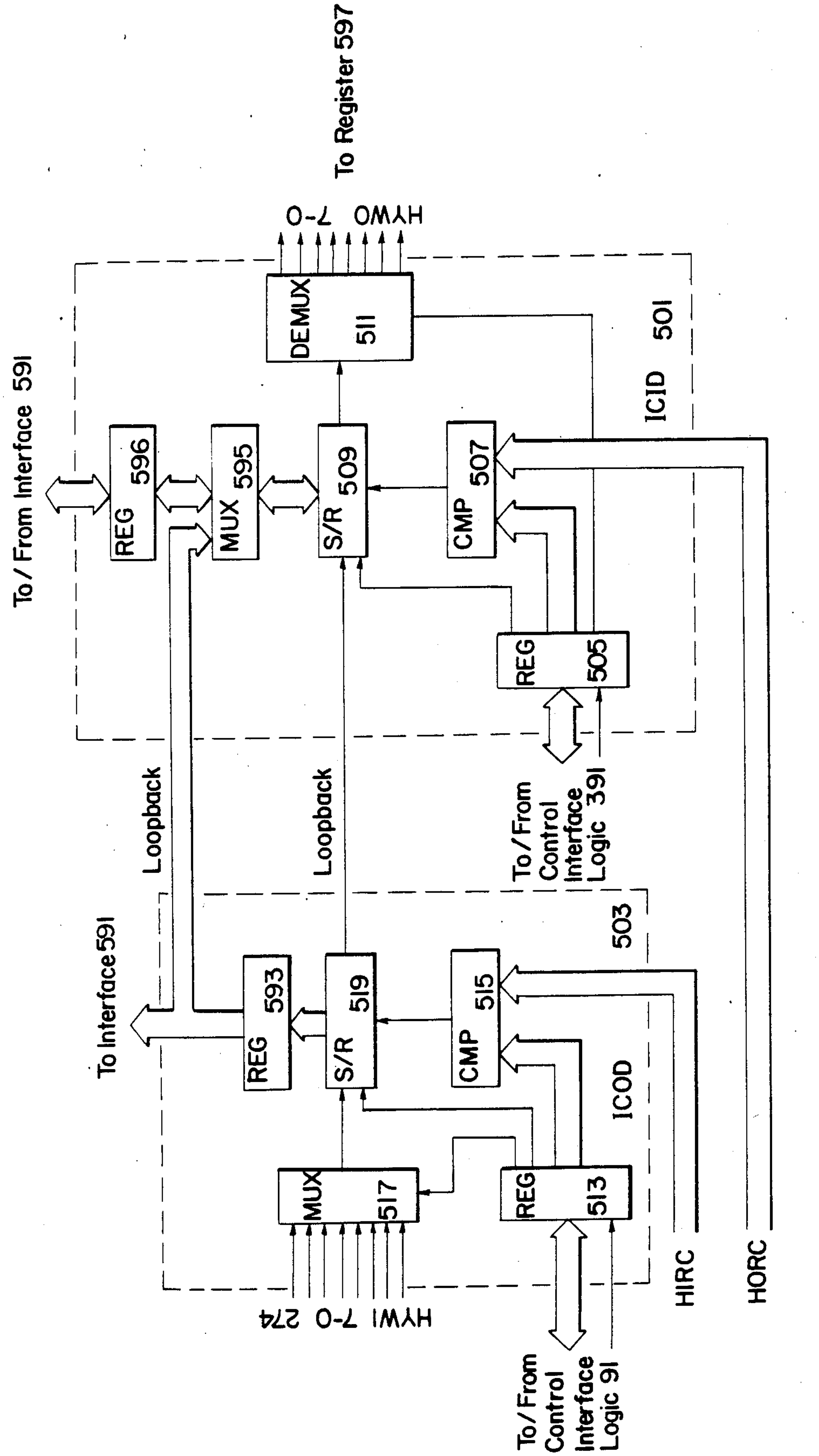
FIG. 16 is a block diagram of the optional diagnostic channel.

FIG. 16 is a block diagram of the optional diagnostic channel of the QPLS. As shown in FIG. 16, the diagnostic information highway read channel (ICOD) 503 receives serial information of a selected bandwidth from a selected channel of a selected information highway input 274. The serial information received is stored as eight bits of parallel data in holding register 593, and can be read by the microprocessor. The diagnostic channel can operate in either the loopback mode or in the microprocessor controlled mode. In the diagnostic channel loopback mode, the stored data in register 593 is available to the diagnostic information highway write channel (ICID) 501, which can then transfer the data to a selected channel of a selected information highway output 272 at a selected bandwidth. Alternatively, in the normal mode, the microprocessor can communicate eight bits of data to a holding register 596 in ICID 501 via the control interface logic 591, shown in FIG. 14. In this mode, the data from the microprocessor can be transmitted to the selected information highway until changed or disabled. The diagnostic channel may be used to test the information highways by providing a means of switching data between information highway inputs 274 and information highway outputs 272, or between information highway inputs 274 and outputs 272 and the microprocessor 223 without using the PLS's or a station device.

DETAILED DESCRIPTION OF THE QPLS

Figure 13A:
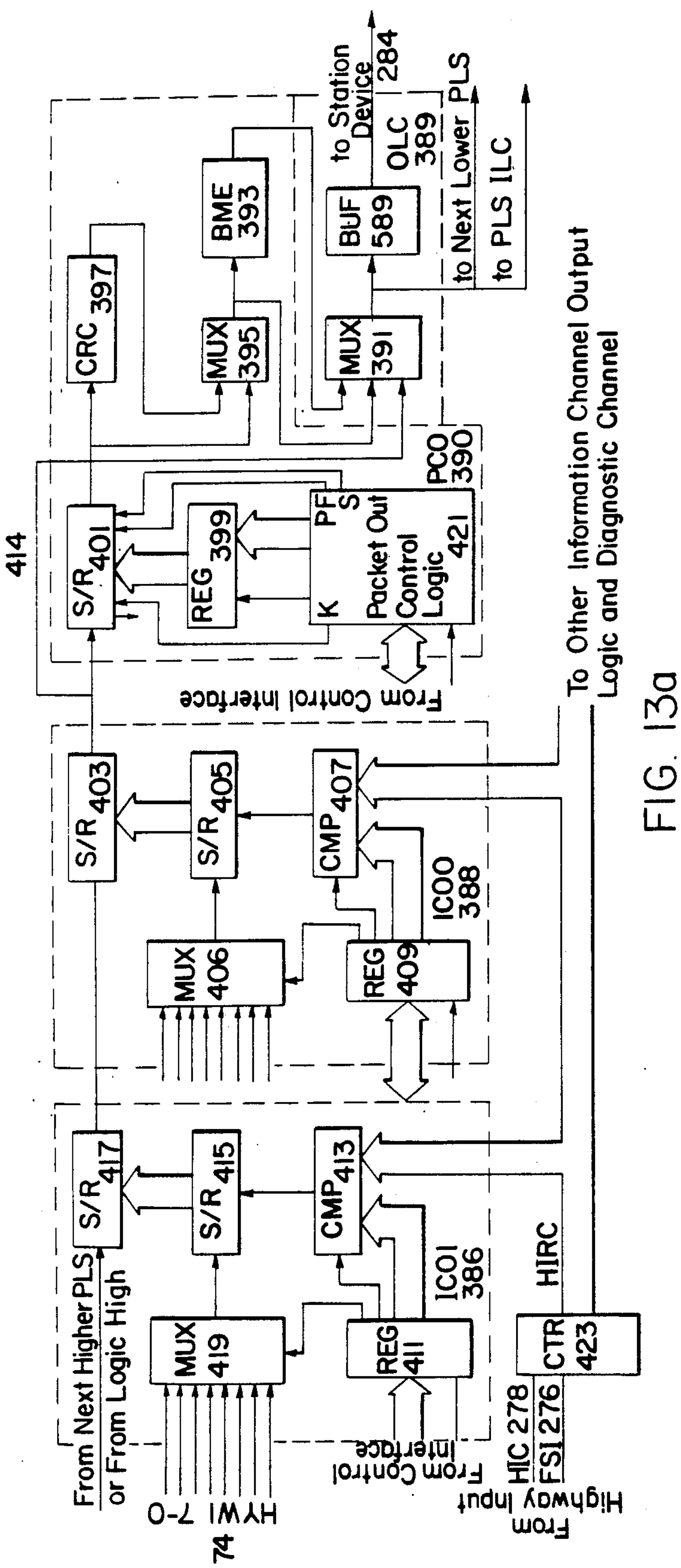
FIG. 13(*a*) shows data flow from the information highways to the station port.
Figure 13B:
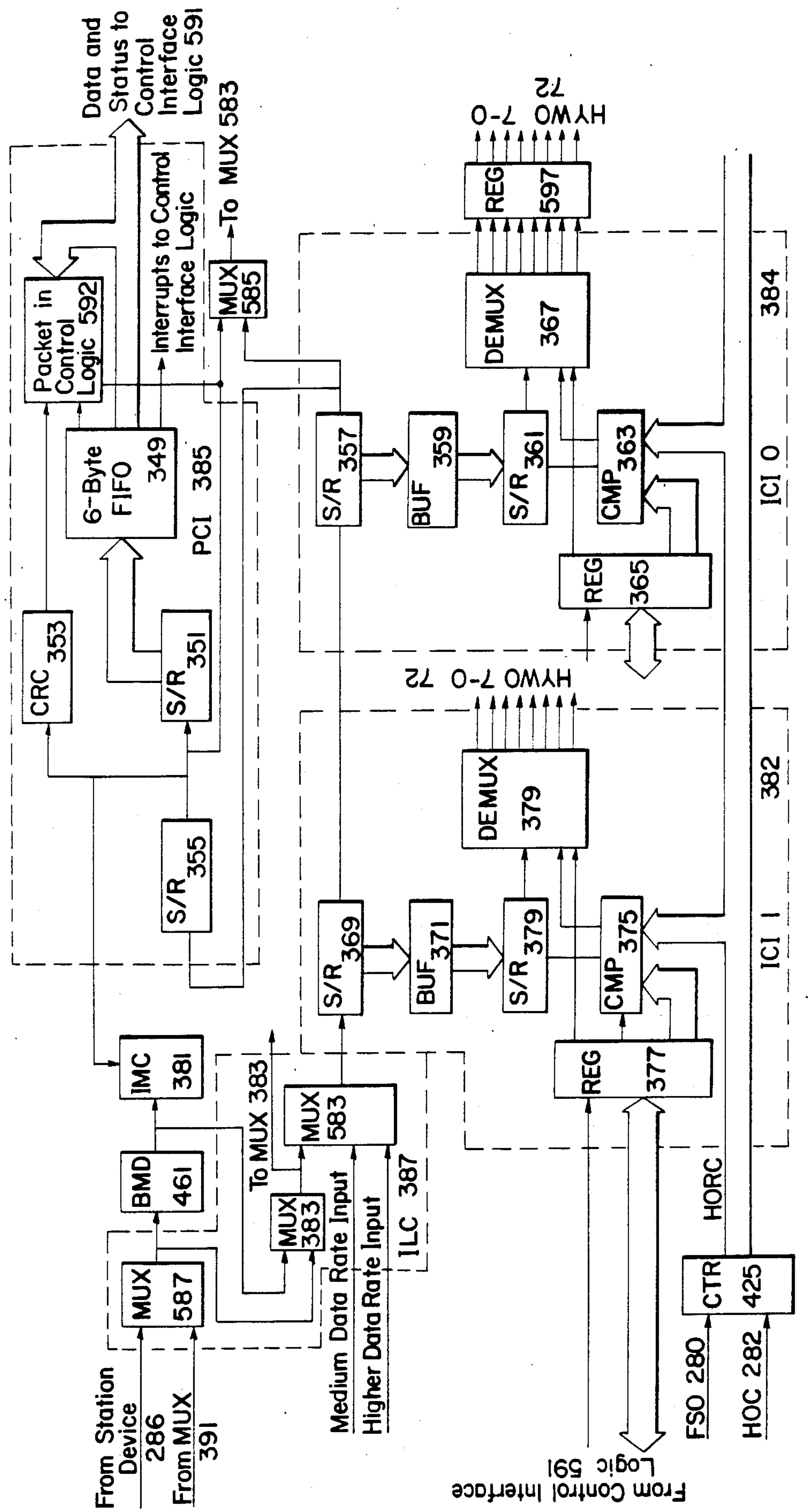
Figure 13C:
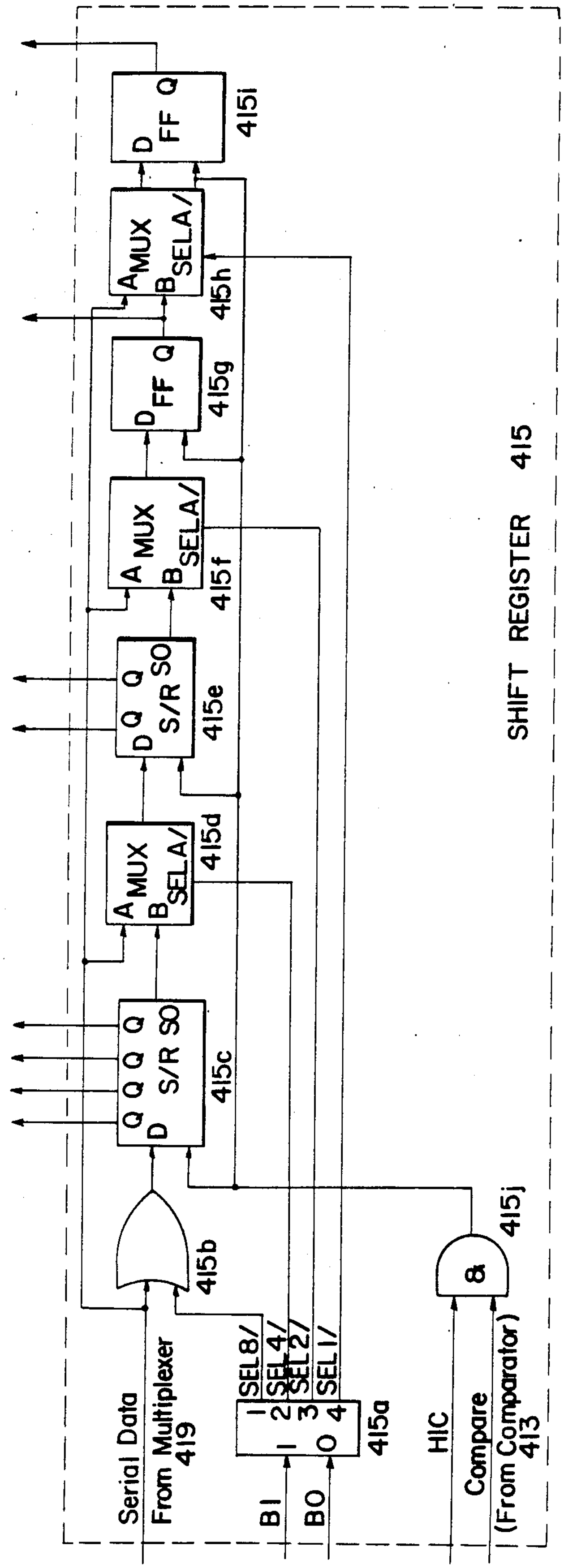
Figure 15:
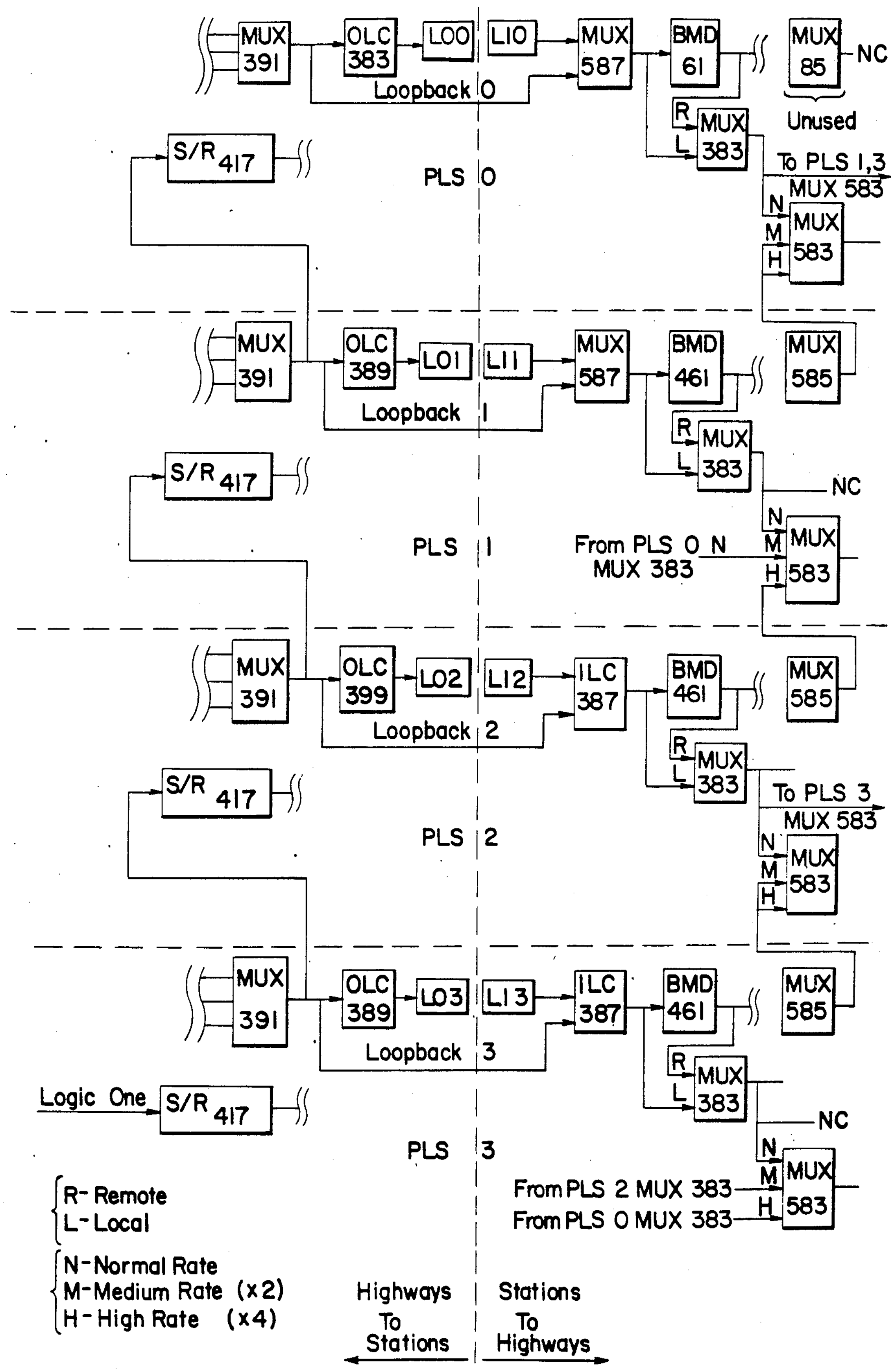
FIG. 15 is a block diagram showing the interconnections between four exemplary PLS's.

A more detailed description of the operation of the various parts of each PLS follows and is referenced to the detailed block diagrams of FIGS. 13, 15 and 16, and the QPLS I/O Address Assignment Table.

Description of the Information Channel Output Circuits

As shown in FIG. 13(*a*), information channel output circuit 1 (ICO1 386) and information channel output circuit 0 (ICO0 388) are substantially identical and the following description of the operation of ICO1 is applicable to ICO0. In the preferred embodiment, information channel register 411 is a 16-bit register which receives the control information for ICO1 386. The control information in register 411 is loaded from the SIM on-board microprocessor 223 via control interface logic 591 (shown in FIG. 14) which represents a portion of the SIM on-board processor 259 shown at FIG. 10. Selection of the particular bandwidth and highway is accomplished by operation of the network management program, previously described. Information regarding the operating characteristics of the transmitting or receiving station is maintained in the 68K CPU 77 of the respective server nodes, which implemented the network server programs.

The signal from microprocessor 223 to register 411 sets register 411 to enable an input from an information highway at a particular time, and for a particular bandwidth. Since the microprocessor transfers data in bytes of eight bits, the data required for register 411 is transferred in two eight-bit bytes. The first eight-bit byte of data is stored in a temporary register (not shown), and both bytes are transferred to register 411 when the second byte is transferred from the microprocessor. In the preferred embodiment, the format of the data in the information channel registers 411 and 409 is as follows:

| Information Channel Register Format |
|---|
| H2 H1 H0 B1 B0 E C9 C8 C7 C6 C5 C4 C3 C2 C1 C0 |

The 3 most significant bits of the register 411, H2, H1 and H0, control the multiplexer 419 which gates one of the eight information highway inputs (HYW17-HYW10) to the shift register 415. The highway selection is typically encoded as follows:

| H2 | H1 | H0 | Highway |
|---|---|---|---|
| 0 | 0 | 0 | HYWI0 |
| 0 | 0 | 1 | HYWI1 |
| 0 | 1 | 0 | HYWI2 |
| 0 | 1 | 1 | HYWI3 |
| 1 | 0 | 0 | HYWI4 |
| 1 | 0 | 1 | HYWI5 |
| 1 | 1 | 0 | HYWI6 |
| 1 | 1 | 1 | HYWI7 |

The least significant ten bits in register 411, C9-C0, define the starting location of a message time slot in the information frame. Referring to FIG. 17, the data on the information highway inputs during each cycle of the highway input clock occupies a time slot in the information frame. Each time slot has a duration of approximately 490 nanoseconds at 1,024 kilobits per second, 245 nanoseconds at 2,048 kilobits per second, and 122 nanoseconds at 8,192 kilobits per second. In the preferred embodiment, the information frame has a duration of 125 microseconds, and the time slots are thus repeated 8,000 times per second. The ten bits, C9-C0, can provide the binary representation of each of the 1,024 time slots in the message frame operating at 8,192 kilobits per second. Only nine bits, C8-C0, are required to represent each of the 512 time slots at 4,096 kilobits per second, and only eight bits, C7-C0, are required to represent the 256 time slots at 2,048 kilobits per second.

Bits C9-C0 from register 411 are compared in comparator 413 with the output of counter HIRC 423. Counter HIRC 423 is a ten-bit binary counter which is reset to zero (0000000000) with each occurrence of an active signal on the information highway frame sync input FSI 278. Each of the clock signals on the highway input clock HIC 276 will cause HIRC 423 to increment by one count. Thus, the ten outputs of HIRC 423 will provide the binary representation of the current time slot location within an information frame. If the information rate on the input highways is 8,192 kilobits per second, HIRC 423 will count from zero (0000000000) to 1,023 (1111111111) before being reset by FSI 278. Similarly, at 4,096 kilobits per second, HIRC 423 will count from zero to 511, and at 2,048 kilobits per second, HIRC 423 will count from zero to 255.

If the ten binary outputs of HIRC 423 match bits C9-C0 from register 411, the output of comparator 413 will be active to enable shift register 415 and shift the data from the selected information highway from multiplexer 419 into shift register 415. The number of bits of data shifted into shift register 415 will depend upon the bandwidth selected by bits B1 and B0 of register 411. The bandwidth selection is typically encoded as follows:

| B1 | B0 | Bandwidth |
|---|---|---|
| 0 | 0 | 1 bit |
| 0 | 1 | 2 bits |
| 1 | 0 | 4 bits |
| 1 | 1 | 8 bits |

The bandwidth bits, B1 and B0, are also inputs to comparator 413 and selectively disable the three least significant bits of the comparator. If the selected bandwidth is one bit, all ten bits of HIRC 423 must be the same as C9-C0 of register 411 before the output of the comparator will be active to enable shift register 415. Thus, there will only be one successful comparison in each information frame, and, as explained in more detail in connection with FIG. 13(*c*), shift register 415 will only shift in one bit from multiplexer 419. If the selected bandwidth is two bits, the least significant bit of the comparator is disabled. Thus, there will be two successful compares per information frame since the comparator cannot distinguish between two counts differing only by the least significant bit. For example, count 19 (00010011) will compare the same as count 18 (00010010). The output of comparator 413 will therefore enable the shift register 415 to shift in two bits from multiplexer 419. In like manner, comparator 413 will not check the least significant two bits of HIRC 423 to allow register 415 to shift in four bits, and will not check the least significant three bits to allow register 415 to shift in eight bits. In an alternative embodiment (not shown), the bandwidth can be selected as 3, 5, 6, or 7 bits.

Control register 411 also has a bit designated as E. this bit when set enables the output of the comparator 413. If it is not set, the output of comparator 413 is disabled and shift register 415 will not be enabled at any time during the information frame. Thus, a bandwidth of zero can be selected.

At the end of the information highway frame, the data in shift register 415 is parallel loaded into shift register 417. As previously described, the transfer to shift register 417 is controlled by the status of B1 and B0. Although illustrated as a single shift register in FIG. 13(*a*), shift register 415 is, in the preferred embodiment, comprised of multiple stages as illustrated in FIG. 13(*c*). Decoder 415(*a*) generates one of four output signals, se18/, se14/, se12/ or se11/ depending upon the bandwidth selection by bits B1 and B0 described above. B1 and B0 activate se18/ when an eight bit bandwidth is desired. When se18/ is activated, OR-gate 415(*b*) will enable the serial data from the information highway input multiplexer 419, described above. Eight HIC clock edges enabled by comparator 413 through AND-gate 415(*j*) will cause the data from OR-gate 415(*b*) to be shifted through the four-bit shift register stage 415(*c*), multiplexer 415(*d*), two-bit shift register 415(*e*), multiplexer 415(*f*), flip-flop 415(*g*), multiplexer 415(*h*) and into flip-flop 415(*i*). The Q-outputs of 415(*c*), 415(*e*), 415(*g*), and 415(*i*) will be transferred to shift register 417. Multiplexers 415(*d*), 415(*f*) and 415(*h*) are adapted to select their B inputs because their select lines are inactive in the eight-bit bandwidth configuration.

If a bandwidth of four bits is selected, decoder 415(*a*) will activate the se14/ line. OR-gate 415(*b*) will not be enabled by se18/ and, therefore, will force all "ones" into shift register 415(*c*). In response to se14/, multiplexer 415(*d*) will select the direct serial data from multiplexer 419. Four HIC clock edges enabled by comparator 413 through AND-gate 415(*j*) will shift the data through shift register 415(*e*), multiplexer 415(*f*), flip-flop 415(*g*), multiplexer 415(*h*) and into flip-flop 415(*i*). Shift register 415(*b*) will have four "ones" on its outputs.

The operation of the circuits for bandwidths of two and one are similar, with the first data bit in the input stream from multiplexer 419 shifted into flip-flop 415(*i*) and the remaining data bits or fill data of all ones shifted into the other shift registers. As a result of the selective shifting of data through the stages of register 415, the most significant bit of data from the information highway input will be in the most significant bit position of register 415 at the end of the frame for any selected bandwidth. Thus, the data will be transferred to shift register 417 with the most significant bit of data from the information highway input in the most significant bit portion of shift register 417.

The operation of information channel output 0 (ICO0 388) is independent of but identical to information channel output 1 (ICO1 386). It can select an information highway and a time slot on the highway totally independent of the selection of ICO1. As described previously, the information channels do operate together to shift the information data from shift registers 417 and 403 to the station device. In order to accomplish this, the serial output of shift register 417 of ICO1 386 is the serial input to shift register 403 of ICO0 388 as shown in FIG. 13(*a*).

In order to provide the interconnections to configure the highway-to-station circuits of the PLS's in the medium and high data rate configurations, the input to shift register 417 of ICO1 386 will be the output of the output line control logic of the next higher numbered PLS. For example, the input to shift register 417 for PLS0 will be the output of the output line control logic (OLC 389) of PLS1. The connections to implement the higher speeds of operation are effected by enabling interconnection of the PLS's under program control implemented by the SIM on-board processor in response to directions from the 68K CPU 77 (FIG. 6(*a*)). In the local mode of the higher speed configuration, multiplexer 391 in the output line control logic (OLC 389) of the next higher PLS is similarly controlled such that the input to shift register 417 of a PLS will be the output of shift register 403 of the next higher numbered PLS. In the remote mode, multiplexer 391 of the lower numbered PLS selects the unencoded output of shift register 401 through multiplexer 395 in the packet channel logic (PCO 390). FIG. 15 shows the interconnections between the PLS's which provide for the transfer of serial information between the PLS's in the medium and high data rate configurations.

Description of the Packet Channel Output Logic Circuit

As previously described, the packet channel output (PCO 390), FIG. 13(*a*), is bypassed in the local mode, and the output of shift register 403 is communicated directly to multiplexer 391 in the output line control logic OLC 389. The output of OLC 389 is in turn communicated to the station port, via buffer 589, or in the higher data rate configurations, to ICO1 386 of the next PLS, as shown in FIGS. 12 and 13(*a*).

Figure 14:
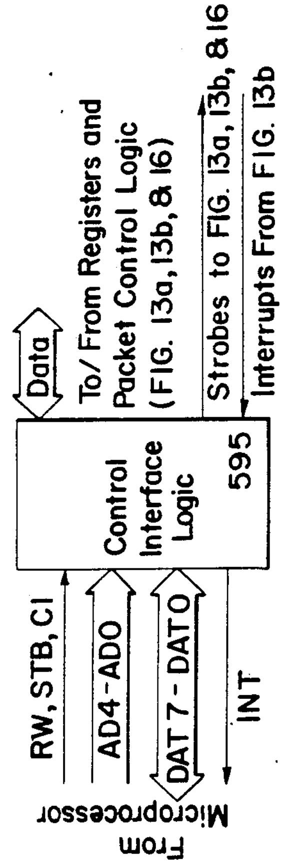
FIG. 14 is a block diagram of the control interface logic.

In the remote mode, the packet out control logic 421 receives timing signals derived from the highway input clock (HIC) 278, the highway frame sync input (FSI) 276, and the line clock (LC) 288, and receives control signals from the microprocessor 223 via the control interface logic 591 (shown in FIG. 14). In response to the control and timing signals, the packet out control logic 421 controls the contents of the first eight bits of data in each frame sent to the device 290 connected to the station port. The format of the first eight bits of data sent to the station port through output line control (OLC) 389 is shown in FIG. 19 and implemented as illustrated in connection with FIGS. 13(*a*) and 24. During those periods in which no packet data is being transmitted to the station device by the external control means, the eight bits will contain the following idle states. The first bit to be transmitted is the sync bit, S, which alternates states once each frame. The second bit to be transmitted is the packet flag bit which will be in the reset state (1). The third through sixth bits to be transmitted comprise the four packet data bits which, during idle periods, contain all ones. The seventh bit to be transmitted is the K flag which, during idle periods, is in the reset state (1). The eighth bit to be transmitted is always in the zero state.

When the packet data register 399 is loaded, a packet flag within the packet out channel control logic 421 is set. This action causes PCO 390 to exit the idle state and enter a busy state, and an indication of this status (busy) is made available to the external control means. At the beginning of the frame following the frame in which the packet data was loaded, the shift register 401 will be loaded with the following states. The first bit will be loaded with the current state of S, the second bit will be loaded with the set state (0) of the packet flag PF, the third through sixth bits will be loaded with the four least significant bits of the loaded packet data from register 399, the seventh bit is loaded with the reset state (1) of the K flag, and the eighth bit is loaded with a zero. The next consecutive frame will contain the same status with the updated state of S and the four most significant bits of packet data from register 399.

If the microprocessor does not cause the packet register 399 to be reloaded with data within 250 microseconds (two frames), following the last load, the K flag is set (0) to indicate that the data in the next frame is fill data, of all 1's within an active packet message, which should be ignored by the device connected to the station port. The packet out control logic 421 will continue to send packet data as received or send fill data until the microprocessor causes the packet flag (PF) to be reset by executing a write command to the appropriate address of the control interface logic 591 (shown in FIG. 14). When that occurs, the internal packet flag is reset. The PLS will typically send four additional frames of packet data, which will consist of the sixteen bits of cyclic redundancy checking (CRC) data, before resetting the packet flag in the data sent to the station device. After outputting the CRC data, the packet out control logic 421 will re-enter the idle state with operation as previously described.

A typical format for the control and signaling information generated by the packet channel output logic PC0 390 at different data rates is shown in detail in FIGS. 19(*a*), 19(*b*) and 19(*c*). The four bits labelled "PD" are the bits from the microprocessor; "K" is the K flag; "PF" is the packet flag to the station device; and "S" is a synchronization bit which alternates between its set and reset states in successive frames.

The data from shift register 401 is communicated to the cyclic redundancy generation circuit (CRC 397). Only the four bits of recognizable packet data from each frame are shifted through the CRC 397. Furthermore, only that packet data with the packet flag (PF) set (0) and the K flag reset (1) is shifted through. When the packet flag (PF) is reset (1), the packet out control logic 421 causes the sixteen bits of data accumulated by the CRC 397 to be communicated to the multiplexer 395 and to be subsequently output to the station device as the last four frames of packet data. When a typical station device receives the reset packet flag, it can perform a cyclic redundancy check on the accumulated data to determine whether there were any errors in the received data. Cyclic redundancy generation and checking circuitry is well known to the art. For example, a description of a typical cyclic redundancy generating and checking circuit can be found in *Encyclopedia of Computer Science and Engineering,* 2nd Ed., Van Nostrand Reinhold Co., Inc., 1983, at pp. 434–437.

Description of the Biphase Mark Encoder Circuit

Figure 20:
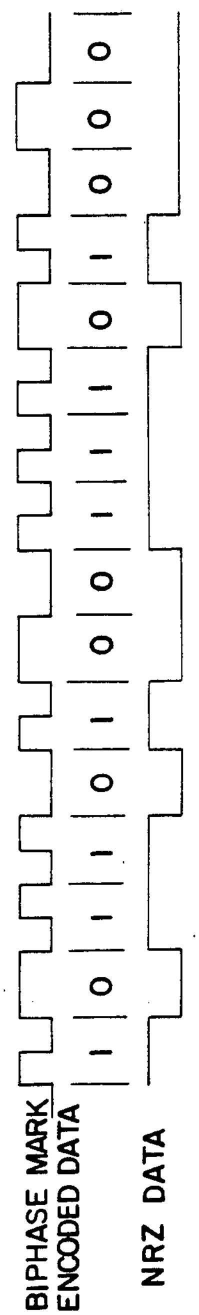
FIG. 20 is a timing diagram illustrating an exemplary data encoding format applied to nonreturn-to-zero (NRZ) data.

The output of multiplexer 395 is input to the biphase mark encoder (BME 393) which converts the nonreturn to zero (NRZ) output of multiplexer 395 to biphase mark encoded data. In general, the biphase mark encoder assures that each bit time of the output data will include at least one transition from the high to low logic state, or vice versa, and an exemplary format is shown in FIG. 20. Each "1" in the data stream is represented by two transitions in the bit time and each "0" by only one transition per bit time. A circuit in the receiving device can derive data and clock from the encoded signal.

The output of the biphase mark encoder 393 is transferred to multiplexer 391 which is part of the output logic circuitry 389. The other input to multiplexer 391 is the output of shift register 403 which bypasses the packet channel output logic (PCO 390) in the local mode as described above. The output of the multiplexer 391 is buffered through buffer 589 and then transmitted to an external pin to which the station port device 290 is connected. The output of the multiplexer 391 is also available in the loopback mode as an input to the input logic circuitry of the same PLS, and is available as the input to the next lower numbered PLS, as shown in FIGS. 12, 13 and 15, for configuring the PLS's as units of two or four devices for medium data rate and high data rate operation.

The synchronization bits generated by each PLS are all active when the PLS's are configured in the low data rate mode. In the medium data rate mode, only PLS0 and PLS2 have active synchronization bits, and PLS1 and PLS3 force their synchronization bits to an inactive (1) state. In the high data rate mode, only PLS0 has its synchronization bit active and PLS1, PLS2 and PLS3 all force their synchronization bits to an inactive (1) state.

Description of the Information Channel Input Circuits

As illustrated in FIG. 12, and as shown in more detail in FIG. 13(*b*) and in FIG. 15, the data from the station devices 290 is input to each PLS through the input logic circuitry ILC 387. Also, in response to the configuration commands, each ILC 387 provides the means of configuring a plurality of the PLS's to operate in conjunction in the medium and high data rate configurations. Exemplary means of interconnecting the PLS highway input circuit in the different modes and configurations are described below.

Local Mode

As shown in FIG. 13(*b*), multiplexer 587 of each PLS selects either the data from the station port in the normal mode or the data from the output of the corresponding highway-to-station circuitry in that PLS in the loopback mode. As described above with regard to the data flow from the information highways to the station ports, the output of the PLS in the loopback mode can be NRZ data or encoded data, depending upon whether the QPLS is in the local or remote mode.

In the local mode, multiplexer 383 of each PLS selects the output of multiplexer 587 of that PLS. In the remote mode, multiplexer 383 selects the output of the biphase mark decoder (BMD) 461 of that PLS. Similarly, multiplexer 585 selects either the output of shift register 357 of ICI0 384 in the local mode or the output of shift register 341 of PCI 385 in the remote mode. In the medium and high data rate configurations, the output of multiplexer 585 is an input to the next lower numbered PLS to provide a means of interconnecting the station-to-highway circuitry of the PLS's.

Multiplexer 583 in each PLS selects the input to ICI1 382 of that PLS, depending upon whether the QPLS is in the low, medium or high data rate configuration. In the low data rate configuration, multiplexer 583 selects the output of multiplexer 383 of the same PLS. As shown more clearly in FIG. 15, in the medium data rate configuration, multiplexer 583 of PLS3 selects the output of multiplexer 383 of PLS2; multiplexer 583 of PLS1 selects the output of multiplexer 383 of PLS0; multiplexer 583 of PLS2 selects the output of multiplexer 585 of PLS3; and multiplexer 583 of PLS0 selects the output of multiplexer 585 of PLS1. As also shown in FIG. 15, in the high data rate configuration, multiplexer 583 of PLS3 selects the output of multiplexer 383 of PLS0; multiplexer 583 of PLS2 selects the output of multiplexer 585 of PLS3; multiplexer 583 of PLS1 selects the output of multiplexer 585 of PLS2; and multiplexer 583 of PLS0 selects the output of multiplexer 585 of PLS1.

In the local mode, in the low data rate configuration, the data in each PLS is transferred from the output of multiplexer 587, through multiplexer 383, and through multiplexer 583 to the serial input to shift register 369 of ICI1 as shown in FIG. 13(*b*). Typically, sixteen clock edges per frame generated by control interface logic 591 (shown in FIG. 14), using timing signals derived from the highway input clock (HIC) 278 and frame sync input (FSI) 276 as a reference, will cause the data to be shifted through shift register 369 of ICI1 and shift register 357 of ICI0 until the first bit of information data is in the most significant bit position of shift register 357. In the medium data rate configuration in the local mode, typically 32 clock edges will cause the information data entering through multiplexer 587 of PLS2 in one frame to be shifted through shift registers 369 and 357 of PLS3 and then through shift registers 369 and 357 of PLS2 via multiplexer 585 of PLS3 and multiplexer 583 of PLS2. Similarly, information data entering through multiplexer 587 of PLS0 will be shifted through shift registers 369 and 357 of PLS1 and then through shift registers 369 and 357 of PLS0 via multiplexer 585 of PLS1 and multiplexer 583 of PLS0. In the high data rate configuration, the information data will enter through multiplexer 587 of PLS0, and, typically after 64 clock edges, the data will be shifted through registers 369 and 357 of PLS1, and registers 369 and 357 of PLS0, in that order, via the multiplexer selections described above.

Remote Mode

In the remote mode, the shifting of the input data is similar except, as previously described, the data from the station devices comprises control and signaling information as well as the information data. In the low data rate configuration, the data from each station device is input through multiplexer 587 of each PLS and then through the biphase mark decoder (BMD) 461 which generates a synchronous clock and NRZ data from the encoded signal. The control and signaling information is encoded into the data from the station device by a unit such as a microtelephone controller (MTC), at the local station. Details of the structure and function of an exemplary MTC are set forth below.

The NRZ output of BMD 461 is transferred through multiplexer 383 and multiplexer 583 to shift register 369 of ICI1. After 24 clock edges, the data will be shifted through shift register 369 of ICI1 and shift register 357 of ICI0 and then through shift register 355 of PCI 385. The control and signaling information in each frame will be in shift register 355 after the shifting is complete. In the medium data rate configuration in the remote mode, 48 clock edges derived by BMD 461 of PLS2 will shift the data from BMD 461 of PLS2 through shift registers 369, 357 and 355 of PLS3 and then through shift registers 369, 357 and 355 of PLS2 via the previously described connections. Similarly, the data from BMD 461 of PLS0 will be shifted through the corresponding registers of PLS1 and PLS0 by 48 clock edges from BMD 461 of PLS0. In the high data rate configuration in the remote mode, after 96 clock edges derived by BMD 461 of PLS0, the data from BMD 461 of PLS0 is shifted through shift registers 369, 357 and 355 of PLS3, PLS2, PLS1 and PLS0 in that order via the previously described connections. In each of the data rate configurations, the input message control (IMC) 381 of each PLS will monitor the packet flag and fill flag in the control and signaling data shifted through shift register 355 of PCO 385 of the PLS and will verify that the message is in synchronization by checking the alternating state of the sync bit S. If the packet flag is set and the fill flag is not set, the four bits of packet data in each frame will be shifted from shift register 355 into shift register 351 and into cyclic redundancy checker (CRC) 353 of PCI 385. The further operation of PCI 385 will be described in more detail below.

Transfer of Data Within Information Channel Input Circuits

The operation of the station-to-highway circuitry in ICI1 and ICI0 of each PLS is substantially the same whether the QPLS is configured in the low, medium or high data rate configurations or whether the QPLS is in the local or remote mode. In either the local or the remote mode, the parallel output of shift register 369 of ICI1 may be transferred to buffer 371 upon receipt of the next frame sync output signal on FSO 280. The data in buffer 371 from the previous frame may be simultaneously transferred to shift register 373 on the same signal on FSO 280. Thus, the data in shift register 369 is delayed by one full frame (125 microseconds) before being transferred to shift register 373. This allows the synchronization of data from an asynchronous station port to the frame timing of the information highway outputs 272. In like manner, the parallel output of shift register 357 is transferred to buffer 359 and then to shift register 361 in ICI0. In the local mode, buffers 371 and 359 can be bypassed if the line buffer bypass bit (B) is set in the control interface logic 591 (shown in FIG. 14). Typically, this will be done if the highway input clock (HIC) 278 and highway output clock (HOC) 282 are tied together, and the frame sync input (FSI) 276 and the frame sync output (FSO) 280 are tied together. This would cause the information highway inputs 274 and information highway outputs 272 to be synchronized.

In the preferred embodiment, register 377 in the information channel input logic (ICI1 382) shown in FIG. 14 has the same format as register 409 and register 411 in the information channel output logic (ICO0 and ICO1). Those formats are set by SIM on-board processor 259 (FIG. 10) in response to information received from the 68K CPU 77 (FIG. 6(*a*)). The information in the 68K CPU is derived from the LAN network which processes information representative of the bandwidth requirements of the transmitting and receiving stations.

The ten-bit counter (HORC 425) is reset with a signal on frame sync output (FSO) 280 and is clocked by the highway output clock (HOC) 282. The ten bits from the counter (HORC 425) are input to comparator 375 and are compared with the channel selection information in the ten least significant bits of register 377. Bits B1 and B0 of register 377 control the compare logic 375 in the same manner as the compare logic 407 and 413 in the information channel output logic. When the output of HORC 425 is identical to the channel selection bits (C9-C0) in register 377, the compare logic will generate 1, 2, 4, or 8 clock edges, depending upon the bandwidth selected by bits B1 and B0, and will shift data out of shift register 373 into the demultiplexer 379. Thus, C9-C0 and B1-B0 define a time slot on a highway. The demultiplexer 379 is controlled by bits H2, H1, and H0 of register 377 and selects one of the eight information highway outputs. If bit E of register 377 is set, the data from shift register 373 will be inserted on the selected information highway output (HYWO7-HYWO0) 272 after being synchronized with HOC 282 in register 597.

Otherwise, the selected information highway output 272 will not be affected.

The control register 365, compare logic 363, and demultiplexer 367 in information channel input 0 (ICI0 384) operate in the same manner as in information channel 1 (ICI1 382). The operation of information channel input 0 (ICI0 384) and information channel input 1 (ICI1 382) in each PLS is controlled independently.

It should be noted that although the allocation of highways and timeslots for communications between local devices connected to a common node need not require network bandwidth, such allocations must be consistent with network allocations. As previously noted, the 68K CPU 77 (FIG. 6(*a*)) in conjunction with the SIM on-board processor, functions to allocate timeslots from the node free pool (if available) and assign particular highways for a communication path. Intranode traffic can be channeled in a manner that takes into account the timeslots and highways assigned to internode traffic, and avoids conflicting assignments.

Alternative Embodiment

In an alternative embodiment, the amount of circuitry required for implementation of the device can be reduced by providing only one channel register for each of the two channels in each PLS. Thus, rather than considering the station-to-highway and highway-to-station sections of each channel separately as has been done heretofore (i.e., ICO1 and ICI1), each channel of each PLS can be considered as a unit. One register can then be used to select the time slot during which the channel is active and to select the direction of data flow on the selected information highways. A separate bit in the register selects the direction of data flow. Each channel operates on two information highways which are selected by the register. Each channel will receive data from one information highway and transmit data on another information highway. If the status of the direction bit is changed, the use of the two information highways is reversed. In this alternative embodiment, the information highway inputs 274 and the information highway outputs 272 are the same physical units, and data can be sent in either direction on the highways under control of the direction status bit in each PLS. The use of this alternative embodiment can enhance the utilization of the available time slots in a given information frame since two PLS's can accomplish complete bidirectional (i.e., full duplex) communication in only one time slot. One PLS will transmit on one highway during the time slot while receiving on another highway. The PLS with which it is communicating will transmit on the highway on which the first PLS is receiving and will receive on the highway on which the first PLS is transmitting. Changing the status of the direction bit in each of the two PLS's will reverse the direction of data flow on the two information highways. This has been found to be particularly advantageous at a system level wherein the allocation of time slots for communications between two PLS's at a local level must be compatible with the system allocation. Thus, since full duplex communications between two PLS's can be accomplished with only one time slot, this alternative implementation can effect a savings in system resources as well as a savings in device complexity. In this alternative embodiment, the highway input clock (HIC) 278 must be the same as the highway output clock (HOC) 282 and the frame sync input (FSI) 276 must be the same as the frame sync output (FSO) 280.

Description of the Packet Channel Input Logic

Referencing FIG. 13(*b*), the packet in control input logic 592 of each PLS will keep track of the control data input to the PLS in the remote mode. When eight bits of packet data have been shifted into shift register 351, the packet in control logic 592 will, providing that the end-of-message (E) status is not set and providing that six bytes of packet data are not already stored in the FIFO 349, parallel load the packet data into the six-byte first-in/first-out register, FIFO 349. The data available status bit (D) is set for that PLS. The status bits (D0 for PLS0, D1 for PLS1, etc.) are available as inputs to the SIM on-board microprocessor to indicate which FIFO's 349 have active packet data. The first byte of data in the FIFO 349 is available on the output of the FIFO 349 to be read by the SIM on-board microprocessor. The FIFO 349 has an internal FIFO counter which is incremented for each byte of packet data received from the device connected to the station port, and is decremented for each byte of packet data which is read by the microprocessor. The FIFO counter is not affected by fill data. When the fifth byte of data is loaded into the FIFO the FIFO full (FF) flag is set (1) which causes the status interrupt flag (I0 for PLS0, I1 for PLSI, etc.) to be set (1) and causes an interrupt to be transmitted to the microprocessor. The microprocessor can read the QPLS interrupt status (Address 08) to determine the source of the interrupt via interupt control logic 141 (FIG. 10). Although it is recognized that various signal formats may be implemented without departing from the scope of the invention, the format of the interrupt status in the presently preferred embodiment can be as follows:

I3 I2 I1 I0 D3 D2 D1 D0

The FIFO 349 will hold one additional byte after the FIFO full (FF) flag is set. If a seventh byte of packet data is attempted to be loaded into the FIFO 349, the FIFO overrun (OR) flag is set (1). Only the first six bytes of data in the FIFO are retained.

The packet data received by the QPLS with the packet flag (PF) set (0) and the fill flag (K) reset (1) is also transferred in the cyclic redundancy checker CRC 353. When the packet flag (PF) is reset (1) in the input data stream, the outputs of the CRC 353 are checked to determine whether an error has been detected. If an error is detected, the CRC status bit (C) will be set (1) and will be available to the microprocessor when the PLS packet status is read. The resetting of the packet flag (PF) also sets (1) the end of message status bit (E), which causes the interrupt flag (I0 for PLS0, I1 for PLS1, etc.) to be set (1), and causes and interrupt to be transmitted to the microprocessor on the interrupt line (INT) 610. When the end of message status bit (E) is set, the last two bytes of data in the FIFO 349 typically should be ignored since they contain data which was generated by the CRC generator in the station device and do not contain packet message data; however, some diagnostic tests may utilize this CRC data.

If the overrun status bit (OR) becomes set after the end of message status bit (E) is set, there has been an overrun of packet messages such that the station device began sending a second message while the FIFO has data from the first message.

Description of Input Message Controller

Each remote station device will input station messages in a synchronized manner to maintain an in-frame sync state. This is monitored in the input message controller IMC 381 of each PLS which hunts for the alternating polarity of the message sync (S) bit (first bit of a station message) in the station input. When sync is located, the station message bit counter count is adjusted to coincide with it. Whenever the in-frame sync state is lost, the IMC 381 will set a frame error flag (FE) (which must be reset by the microprocessor) and automatically enters a hunt-frame sync state until the in-frame sync state is re-established. While hunting, the status bit hunt (H) will be active and data transfers from the associated station device are inhibited until the next full frame after sync is re-established.

Description of Additional Features of QPLS

The QPLS also has the optional capability (not shown) of making the current data outputs of the CRC checker available as inputs to the microprocessor or other external control means. If the received CRC read enable bit (CR) is set, all PLS's in the QPLS operate in this mode. The OPLS also has the capability of setting the transmitter CRC read enable bit (CS) which will transmit the CRC data to the station device as the four-bit packet information in each frame rather than the actual packet data. These two modes are principally used for chip testing and are not necessary for normal operation.

Loopback Mode and The Diagnostic Channels

The QPLS also has two independent diagnostic channels; one, ICOD 503, for reading from information highway inputs 274, and the other, ICID 501, for writing to the information highway outputs 272. The diagnostic channels are shown in FIGS. 12 and 16 and have been briefly described above. The operation mode of the diagnostic channels is controlled by status bit, L4, which selects either the normal (L4 reset (0)) or the loopback (L4 set (1)) mode. In both modes, the diagnostic output channel (ICOD 503) reads data from the selected channel of a selected information highway input 274 into an eight-bit shift register 519 (FIG. 16) in the manner previously described for ICO1 386, utilizing the same timing. The information highway input 274 is selected by multiplexer 517 under control of register 513 and comparator 515. The data is loaded from the information highway shift register 519 into register 593 on the occurrence of the frame sync signal on FSI 276. The data stored in register 593 may be read by the microprocessor via the QPLS parallel port.

The diagnostic input channel (ICID 501) writes data to the selected channel of the selected information highway output 272 in the manner as described for ICI1 382, utilizing the same timing. The source of the data to be written to the highway is controlled by the selected mode. In the normal mode, data stored in register 596 by the microprocessor through the control interface logic 591 (shown in FIG. 14) is transferred through multiplexer 595 to shift register 509 at the occurrence of an active signal on FSO 280 in each frame. The data in shift register 509 is shifted through demultiplexer 511 to the information highway outputs 272 under control of register 505 and comparator 507.

In the loopback mode, the data stored in register 593 is transferred through multiplexer 595 to shift register 509 at the occurrence of the signal on FSO 280 in each frame. The data in shift register 509 is shifted through demultiplexer 511 to the information highway outputs 272 under control of register 505 and comparator 507.

Interface Logic and Address Assignments

The QPLS also contains random interface logic, shown on the block diagram in FIG. 14 as control interface logic 591, which receives address, data, read/write control and a strobe from the microprocessor, and generates the internal control signals which cause the microprocessor data to be routed to the various internal registers. This is accomplished by activating select signals to the multiplexers shown in the block diagrams. The OPLS I/O address assignments are shown in the QPLS I/O Address Assignment Table. As will be apparent to those skilled in the art, various address assignments may be used without departing from the scope of the invention. The address assignments set forth below and in the QPLS I/O Address Assignment Table in hexadecimal format are thus only exemplary of the preferred embodiment of the invention. The control interface logic 591 also contains frequency conversion logic for developing the clocking required by the shift registers and other logic by deriving clocks at various rates from the line clock input on LC 288 and from the outputs of the biphase mark decoders 461.

OPLS I/O ADDRESS ASSIGNMENT TABLE

| Address (HEX) | READ | WRITE |
|---|---|---|
| 00 | Packet data in 0 | Packet data out 0 *3 |
| 01 | Packet status 0 *1 | Reset PF0 |
| 02 | Packet data in 1 | Packet data out 1 *3 |
| 03 | Packet status 1 | Reset PF1 |
| 04 | Packet data in 2 | Packet data out 2 *3 |
| 05 | Packet status 2 *1 | Reset PF2 |
| 06 | Packet data in 3 | Packet data out 3 *3 |
| 07 | Packet status 3 *1 | Reset PF3 |
| 08 | Interrupt Status (I3–I0, D3–D0) | Packet status Reset *4 |
| 09 | QPLS Status | (V5-0, EF, SA) — |
| 0A | Mode-L (0,0,N,L4-0) | Mode-L Same as READ |
| 0B | Mode-H *2 | Mode-H Same as READ |
| 0C | HDW REG | SAME AS READ |
| 0D | HDR REG | — |
| 0E | DIAG CHAN REG OUT | SAME AS READ |
| 0F | DIAG CHAN REG IN | SAME AS READ |
| 10 | PLS0 CHAN REG 0 out | Same as READ |
| 11 | PLS0 CHAN REG 0 in | Same as READ |
| 12 | PLS0 CHAN REG 1 out | Same as READ |
| 13 | PLS0 CHAN REG 1 in | Same as READ |
| 14 | PLS1 CHAN REG 0 out | Same as READ |
| 15 | PLS1 CHAN REG 0 in | Same as READ |
| 16 | PLS1 CHAN REG 1 out | Same as READ |
| 17 | PLS1 CHAN REG 1 in | Same as READ |
| 18 | PLS2 CHAN REG 0 out | Same as READ |
| 19 | PLS2 CHAN REG 0 in | Same as READ |
| 1A | PLS2 CHAN REG 1 out | Same as READ |
| 1B | PLS2 CHAN REG 1 in | Same as READ |
| 1C | PLS3 CHAN REG 0 out | Same as READ |
| 1D | PLS3 CHAN REG 0 in | Same as READ |
| 1E | PLS3 CHAN REG 1 out | Same as READ |

-continued

| OPLS I/O ADDRESS ASSIGNMENT TABLE | | |
|---|---|---|
| Address (HEX) | READ | WRITE |
| 1F | PLS3 CHAN REG 1 in | Same as READ |

*1 (FE,H,OR,C,OE,PB,FF,E)
*2 (S1,S0,CI,B,CS,CR,R1,R0)
*3 sets associated PF flag
*4 (3-0) resets FE, OR, C, E in the selected PLS's
FE = Frame Error
H = Hunting
OR = Overrun
C = CRC error
OE = Output empty
PB = Packet busy
FF = FIFO Full
E = End of message
CI = Chip initialize
CS = CRC send data
R = Rate select
HDR = Highway Data Read
out = data transferred from QPLS to external device/PCB logic
in = data transferred for external device/PCB logic to QPLS
I = Interrupt
D = Data available
V = Version number
EF = Even frame
SA = Second address
N = Local mode
L = Loopback
S = Highway data rate
B = Line buffer bypass
CR = CRC receive
HDW = Highway Data Write Addresses 00 through 07 are used to access the packet channel logic. For example, Packet Data In 0 which is read from the QPLS when the microprocessor imposes address 00 in the address lines, is the data on the output of the six-byte FIFO 349 in PLS0. Similarly, Packet Data Out 0 is that data which may be written into the packet channel output register to be sent to the device connected to the station port for PLS0. When the microprocessor writes to address 00, it also sets the packet flag (PF) for PLS0. The packet flag is reset by executing a write to the address 01.

If the microprocessor reads from address 01, it receives the packet channel status for PLS0. The format of the packet channel status received may be as follows:

FE H OR C OE PB FF E

FE status bit is used to indicate that the packet channel input logic has previously received a frame error on the data input. The H status bit is used to indicate that the packet channel input loic is in the hunt-frame sync state. The OR status bit is the FIFO overrun indicator. The C status bit is the CRC error indicator. OE is the output empty status bit which indicates to the microprocessor that the next byte of packet data can be loaded. PB is the packet channel busy status bit which indicates that packet data message has been initiated by the microprocessor. It remains set until after the packet flag is reset by the microprocessor and all CRC data has been transmitted. FF is the FIFO full status bit. E is the end of message status bit which indicates that the packet in control logic 392 has detected the end of the message from the device connected to the station port. H, QE, and PB are self-clearing when the associated condition has been cleared. H will reset (0) when the in-frame sync state is true. OE will reset (0) when a byte of data is loaded into PCO 390 by the microprocessor, and will set (1) after the loaded packet data has been transmitted to the device connected to the station port. PB will reset after the CRC data of the current message has been sent to the station port. FF is reset (0) by performing a read from its associated FIFO address. E, OR and C are reset (0) by writing to the packet status reset address. FE requires a write to the packet status reset address after H has been reset and the PLS is in in-frame sync. The packet status reset address uses only the lower four bits of the data to that address. Data bit 0 resets the status of PLS0, data bit 1 resets the status in PLS1, data bit 2 resets the status of PLS2 and data bit 3 resets the status in PLS3.

If the microprocessor reads from address 09, the QPLS transmits status to the microprocessor. The six most significant bits of the data transmitted will contain the version number of the QPLS. This version number is a six-bit binary number which can be part of the mask which creates the integrated circuit. Typically, it will be used to communicate the particular revision number of the unit to the microprocessor 23 and can be used by the microprocessor to select the appropriate software to be used to control each version of the QPLS.

The least significant bit of the QPLS status is the status of the second address (SA) which may be used to determine which byte (upper byte or lower byte) is being addressed when accessing addresses 0E through 1F, the eighteen 16-bit channel registers. SA is reset (0) by activating the chip initialize input (CI) 412. Since the channel registers contain sixteen bits of information, and since the microprocessor data is typically transferred in groups of eight bits, two accesses to a register are typically required to transfer data between the channel registers and the microprocessor.

The next least significant bit, EF, is the even frame status bit. This bit is forced to the even frame state when the QPLS initialize mode bit is set, and will toggle upon receipt of each signal on the information highway frame sync output (FSI) 276 after the initialize mode bit is reset. This will enable multiple QPLS EF bits to be set to the same state.

A write to address OA sets the bits in mode-L register, which is random logic contained within the control interface logic 591 (shown in FIG. 14). The mode bits, which control functions within the QPLS, are as follows:

O O N L4 L2 L1 L0

The two most significant bits of the mode register controlled by this address are not used. Bit 5, N, is the local/remote mode select. When set, the QPLS is typically in the local mode. When reset, the QPLS is typically in the remote mode. Bit 4, L4, controls the diagnostic channel. When set, the diagnostic channel is in the loopback operation which has been described above. The four least significant bits L3, L2, L1, L0 control the normal and loopback operation for each of the corresponding PLS's. When the corresponding bit is set, the PLS associated with that bit will be in the loopback mode as described above. When the bit is not set, the corresponding PLS will be in the normal mode. The current contents of this mode register can be determined by reading from the same address. In the present embodiment, a signal on chip initialize sets each of the loopback bits, L4, L3, L2, L1, L0, to their active states, and bit N to the remote state.

A write command to address OB sets certain status bits in the mode-H register. The format for the data bits in this register is as follows:

S1 S0 CI B CS CR R1 R0

The most significant two bits, S1 and S0, are the highway data rate selection bits. Station port clock synchronization for proper transfer of data between station port shift registers and information channel shift registers typically requires the setting of the S1 and S0 bits to match the highway data rate reference clock (HIC) 278. Typical settings are as follows:

| S1 | S0 | Highway Data Rate |
|---|---|---|
| 0 | 0 | 2048 kbps (256 bits per frame) |
| 0 | 1 | 4096 kbps (512 bits per frame) |
| 1 | 1 | 8192 kbps (1024 bits per frame) |

The third most significant bit, CI, is the chip initialize/normal bit. When this bit is active, highway output drivers are inhibited. The highway input station port input shift registers are therefore forced to load fill bits and the station port output lines are clamped to a constant "1" state. The chip initialize is active following power on conditions and whenever changes are performed in data rate configuration selection. In the later case, the chip initialize will prevent data from being transmitted to remote station devices or to the highways until the reconfiguration is completed. Initialize mode also resets the QPLS interrupt to prevent further interrupts from occurring and forces the EF status bit to the even frame state. When chip initialize is placed back in the normal state, all information channels will typically continue to be disabled until the occurrence of the next frame sync signal. The status bits in mode-L register and mode-H register are initialized to known states by the chip initialize signal.

The chip initialize/normal mode bit operates similarly to the QPLS input pin (CI) which is activated at power-on time or when specifically set by the external circuitry. The QPLS chip initialize input pin also forces certain mode selections which assist in QPLS testing as follows: the four station ports are placed in the loopback mode and in the high data rate (i.e., the four PLS's are interconnected); the receive CRC read and the transmit CRC read are disabled; the line buffer bypass is placed in the normal mode; the QPLS chip initialize/normal status bit is placed in the initialize mode, which will operate as described above; the remote/local mode select is placed in the remote mode; and the highway data rate selection is in the low speed mode, i.e., 2048 kbps (256 bits per frame). The chip initialize state will remain set until specifically reset by resetting the CI bit in the mode H register via the parallel port.

The fourth most significant bit in the mode-H register is the line buffer bypass bit, B, which typically causes buffers 371 and 359 to be bypassed in the local mode.

The fifth most significant bit, CS, is the transmit CRC enable bit. When set, the transmit CRC shift register data is typically sent as packet data to the station port.

The sixth most significant bit, CR, is the receive CRC read enable bit which typically is set to allow the microprocessor to read the current output of the packet channel input CRC circuitry rather than the packet data.

The least significant two bits, R1 and R0 are the station port data rate selection bits. When R1 and R0 are both reset, the normal data rate is typically selected and the four station ports are configured as four independent units. When R1 is not set and R0 is set, the station ports may be configured as two units with PLS3 connected to PLS2 and PLS1 connected to PLS0 and the PLS's operate at the medium data rate. When R1 and R0 are both set, the four PLS's may be connected as one unit with PLS3 connected to PLS2, with PLS2 connected to PLS1, and PLS1 connected to PLS0, and the PLS's thus operating at the high data rate. The fourth state, R1 set and R0 reset, may be used to support other implementations as the particular application requires. The data rate selection is summarized as follows:

| R1 | R0 | Station Port Data Rate |
|---|---|---|
| 0 | 0 | Normal |
| 0 | 1 | Medium |
| 1 | 1 | High |

Address OC is the highway data write register in the diagnostic channel input (ICID 501) which is used by the microprocessor to write data to the selected information highway input 274 when the diagnostic channel is enabled. This register can be read by the microprocessor by using the same address.

If the microprocessor executes a read command on address OD it receives the information in the highway data read register 519 in the diagnostic channel output (ICOD 503). The information will be information selected by the diagnostic channel from an information highway input 274.

Addresses OE and OF access the diagnostic channel control registers ICOD and ICID and addresses 1O through 1F access the PLS channel registers as shown on the QPLS I/O Assignment Table. Addresses 0E-0F and 10-1F can be written to by the microprocessor, and can be read by the microprocessor to verify their current contents.

Detailed Logic and Timing Diagrams of QPLS Operation

As one of ordinary skill in the art will readily recognize, the structure and functions of the QPLS, described in connection with the previous drawings, may be implemented by various alternative arrangements of the logic elements. Although such equivalent detailed implementations may be used, as a matter of design choice, the particular arrangement of elements implemented in the presently preferred embodiment is set forth in FIGS. 21 through 41 in the interest of total disclosure of the present invention.

Figure 21:
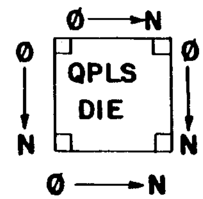
FIG. 21 is a reference table for the signals on the pins of the QPLS.
Figure 22:
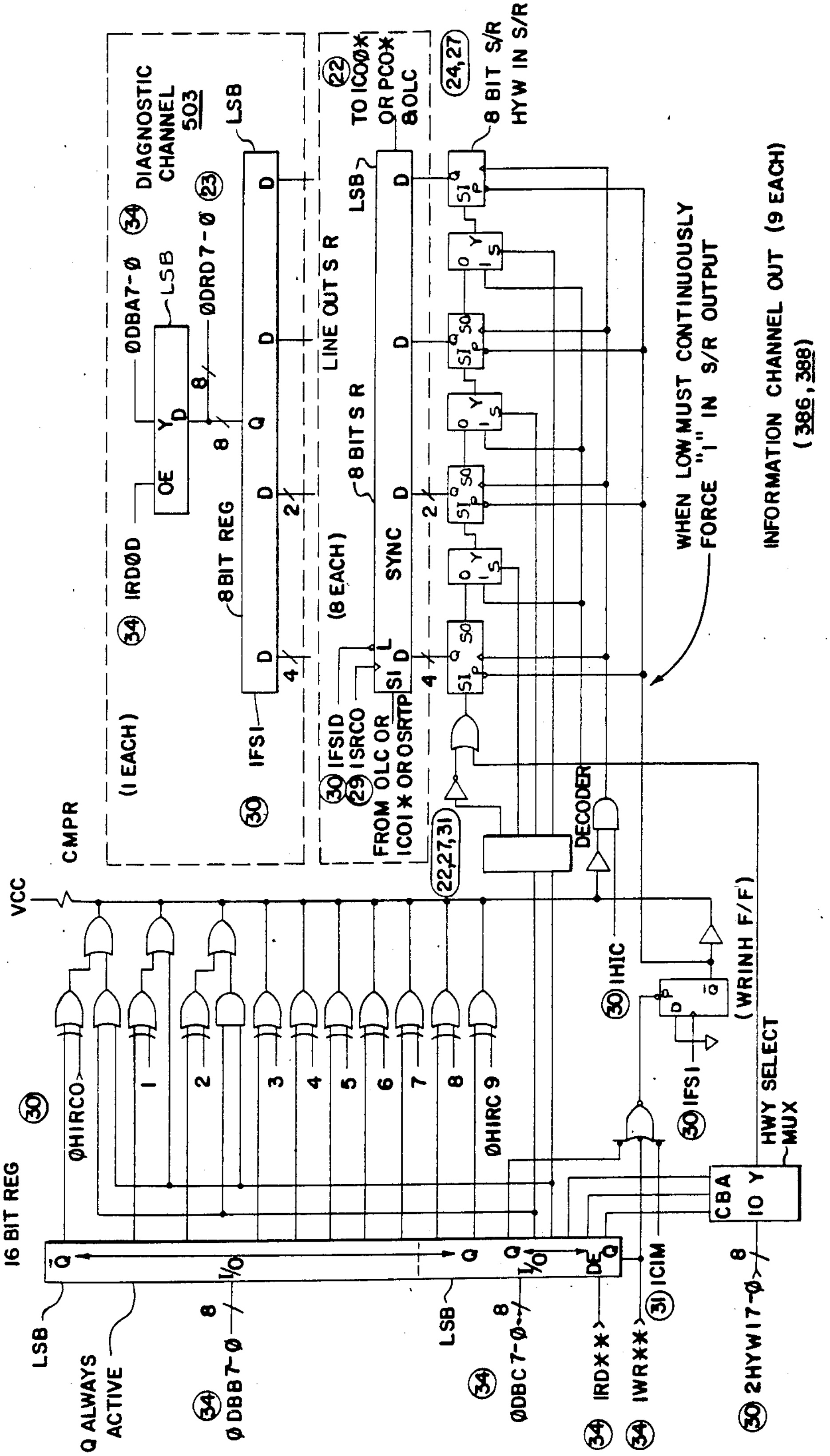
FIG. 22 is a detailed logic diagram of the QPLS Information Channel Out (ICO).

FIG. 21 is a reference table for the pin numbers and pads on the QPLS. FIG. 22 includes the logic diagram for the information channel out (386,388), (from station port), illustrated more generally at FIG. 13(*a*). The HIRC 0–9 signals entering the vertical array of OR gates to the right of the 16-bit register are from the highway in reference counter 223 illustrated at FIG. 13(*a*). When the data stored in the 16-bit register is equal to the HIRC 0–9 information, the compare line (CMPR) is enabled which disables the write inhibit flip-flop (WRINH F/F) and enables the HIC clock to clock in information to the highway in shift register network comprising the serial shift registers at the lower portion of the page. Information to the highway in shift register network is provided on 2HYWI7-0 at the lower left corner of the figure, are the highway select multiplexer which is set for the appropriate highway by the 16-bit input shift register. Information from the highway in shift register is communicated to the 8-bit line out shift register, shown directly above the highway in shift register, where it is communicated to the packet channel output, as shown at FIG. 13A. Eight of the channels of the PLS will include the line out shift register as shown in the lower dashed box. By contrast, the diagnostic channel will replace the line out shift register with the storage register shown in the upper dashed box. The data communicated to the storage register of the diagnostic channel output 503 is clocked into the storage register by the FSI signal and is output back onto the highways via the DRD7-0 line. The diagnostic channel storage register may be accessed by the microprocessor network via a tri-state driver, shown above the storage register.

The output of the line out shift register may be communicated to the packet channel channel out, information channel output 0, or the output logic control. As can be seen by comparison to FIG. 12, the output selection depends upon whether the QPLS stays in the local or remote mode. Moreover, depending upon the configuration of the QPLS, i.e. low speed, medium speed or high speed, the output logic control may either output to the local station or be looped back to the input of the next PLS. In the higher speed mode, the input to the line out shift register will come from the OLC, as shown on the left of the line out shift register.

Figure 23:
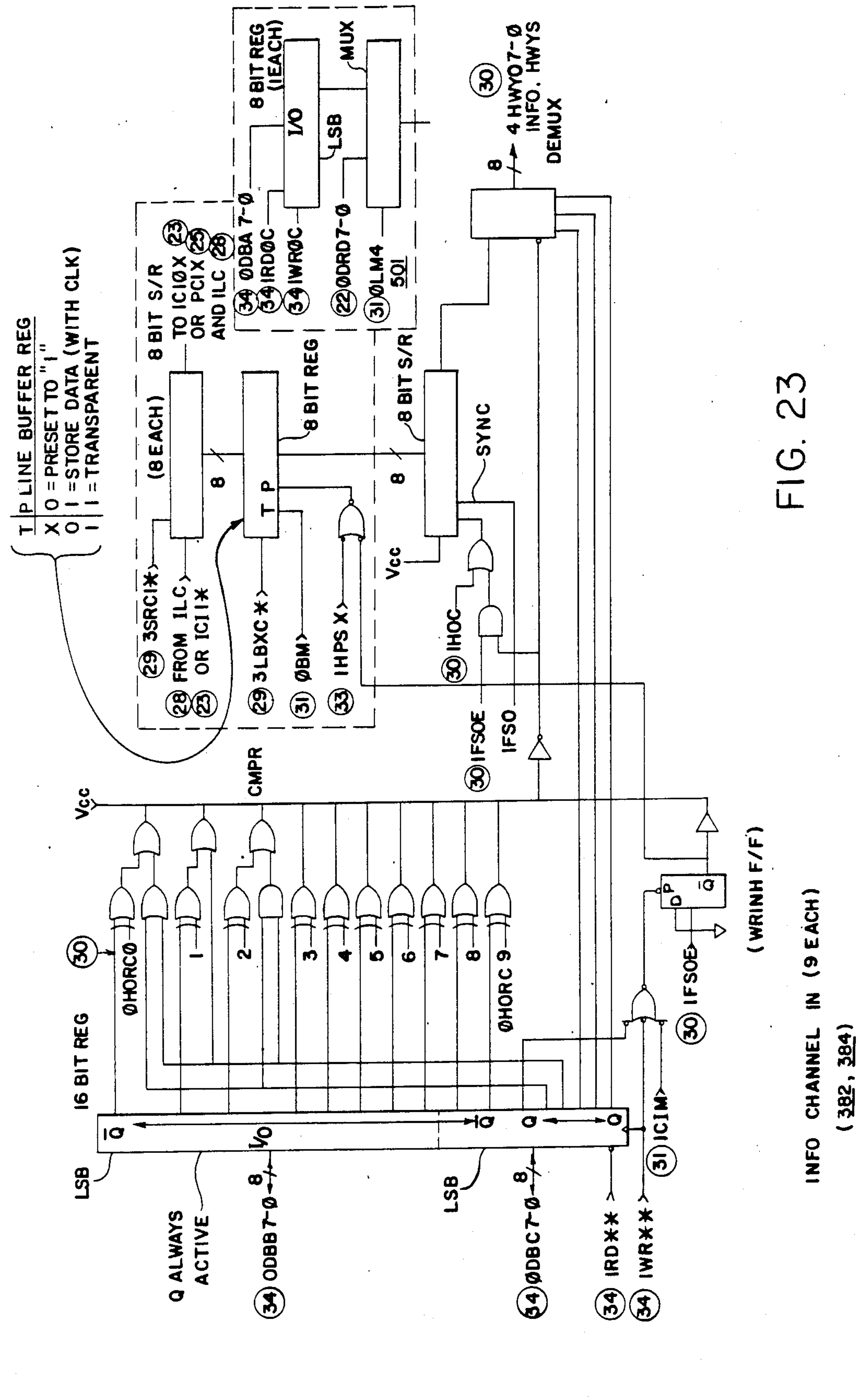
FIG. 23 is a logic diagram of the QPLS Information Channel In (ICI).

FIG. 23 illustrates the logic for the information channel in (382,384) (from station port), shown in FIGS. 12 and 13(*b*). The 16-bit shift register and comparator network, set by HORC 0–9, functions similarly to the input circuit previously described in connection with the information channel out circuit. The output from the highway output reference counter (HORC) sets the comparator network to enable a compare the compare line when the input signal corresponds to that setting. The write inhibit flip-flop (WRINH F/F) also functions similarly to the write inhibit flip-flop in the information channel out circuit.

Data from the station device enters the circuit from the ILC 387 through the 8-bit line input shift register shown in the upper central portion of FIG. 23. The data from the ILC 387, or from the ICI 1 272 of the previous per line switch, if in a higher speed configuration, is clocked into the 8-bit shift register by the signal 3SCRI, where it remains until the end of the frame. At the end of the frame, the S0 signal goes low to provide a load signal. The information from the ILC 387, or ICI 1, 272, is shifted through a line input buffer into an 8-bit D shift register, located in the central portion of the figure. When the comparator signal is true, the information in the lower 8-bit shift register will pass through a demultiplexer, at the lower right hand portion of the figure, for output to the information highways. As long as the compare signal remains true, the clock signal HOC can drive the input signal through the lower 8-bit shift register and out to the highways through the demultiplexer.

The dashed enclosure to the right of the figure represents diagnostic input circuitry 501 that may be used to replace the line input shift register and line input buffer shift register shown in the dashed box to the left. The alternative circuit provides the ability to receive external data from the DBA 7-0 connection and store that data in the highway data write shift register. Upon receiving a compare signal, the information in the highway data write shift register can be communicated to the highways via the multiplexer, shown directly below. The DRD 7-0 input to the multiplexer comes from the diagnostic channel and provides the ability to put diagnostic data onto the highway or to take data from one highway and transfer it to another highway.

The output of the write inhibit flip-flop is also communicated to a NOR gate which also receives an HPS signal. The output of the NOR gate serves to force the 8-bit shift buffer to transfer all ones through the system until a compare signal is enabled. This prevents the passage of spurious data through the system when a compare signal is not present.

Figure 24:
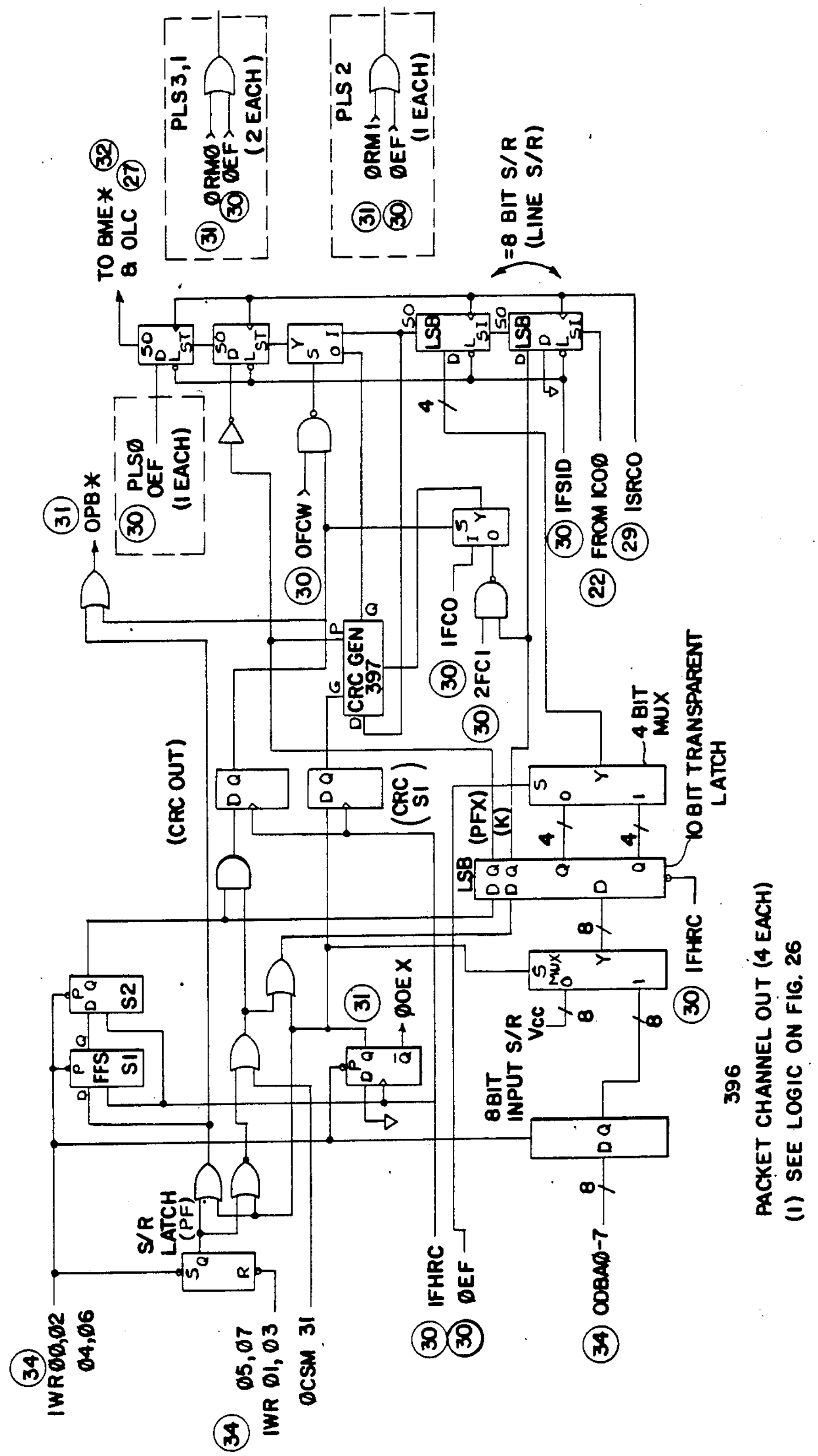
FIG. 24 is a logic diagram of the QPLS Packet Channel Out (PCO).

FIG. 24 illustrates the logic of the packet channel out (PCO) circuit 390. This circuit permits the passage of data and control information to the station port. Data enters the packet channel out circuit 390 via the IC0/0 line, shown in the bottom right hand portion of the figure, and is transmitted through two 4-bit line shift registers and the 2-bit multiplexer network for communication to the biphase mark encoder circuit (BME) 393. depending upon which PLS channel is being considered, the dashed box marked PLS 0 is replaced by the alternative dashed boxes, marked PLS 3,1 and PLS 2, to the right of the figure. In different data speed configurations, a plurality of PLS channels may be interconnected as previously described. In the higher speed configurations, only one PLS of the serial group need serve as master for purposes of biphase mark encoding. The illustrated larger circuitry permits bypass of the biphase mark encoding and output logic control in the server PLS's, when configured for higher data rates.

When a message is written into the packet out channel, the SR latch, on the upper left portion of the figure, the S-1 and S-2 flip-flops in the upper left portion of the figure, and the output (OE) flip-flop are enabled. Data is loaded into the input 8-bit shift register, shown in the lower left portion of the figure. The input signal stored in the 8-bit input register is passed through an adjacent idle multiplexer to a 10-bit latch. A 4-bit multiplexer to the right of the 10-bit latch will sequentially select two nibbles for communication to the G shift line register to the right.

As information is stored in the 10-bit latch, the PFX flag is forced low, indicating to the shift register in the output circuit that valid packet data is being communicated from the 4-bit multiplexer connected to the 10-bit latch. The CRC generator 397, shown in more detail at FIG. 26, receives input from the line shift register when output empty (OE) enables the CRC shift in register (CRC SI). The CRC generator 397 shifts information out when the SR latch is disabled by one of the write/-read lines, thus forcing the output empty (OE) signal high and enabling the CRC output flip-flop. The CRC output flip-flop enables the multiplexer below the CRC generator to select the FCO signal to clock information into the CRC generator. CRC information is interjected into the output stream so as to form a 4-bit window that does not interfere with the ICO 1 and ICO 2 signal clocked to the output.

The K-bit of the 10-bit latch is a fill bit which forces all ones through the system, to prevent spurious signals when data is not loaded into the input shift register. The packet busy (PB) flag, shown at the upper central portion of the figure, provides an indication to the outside world that the packet channel message is started.

Figure 25:
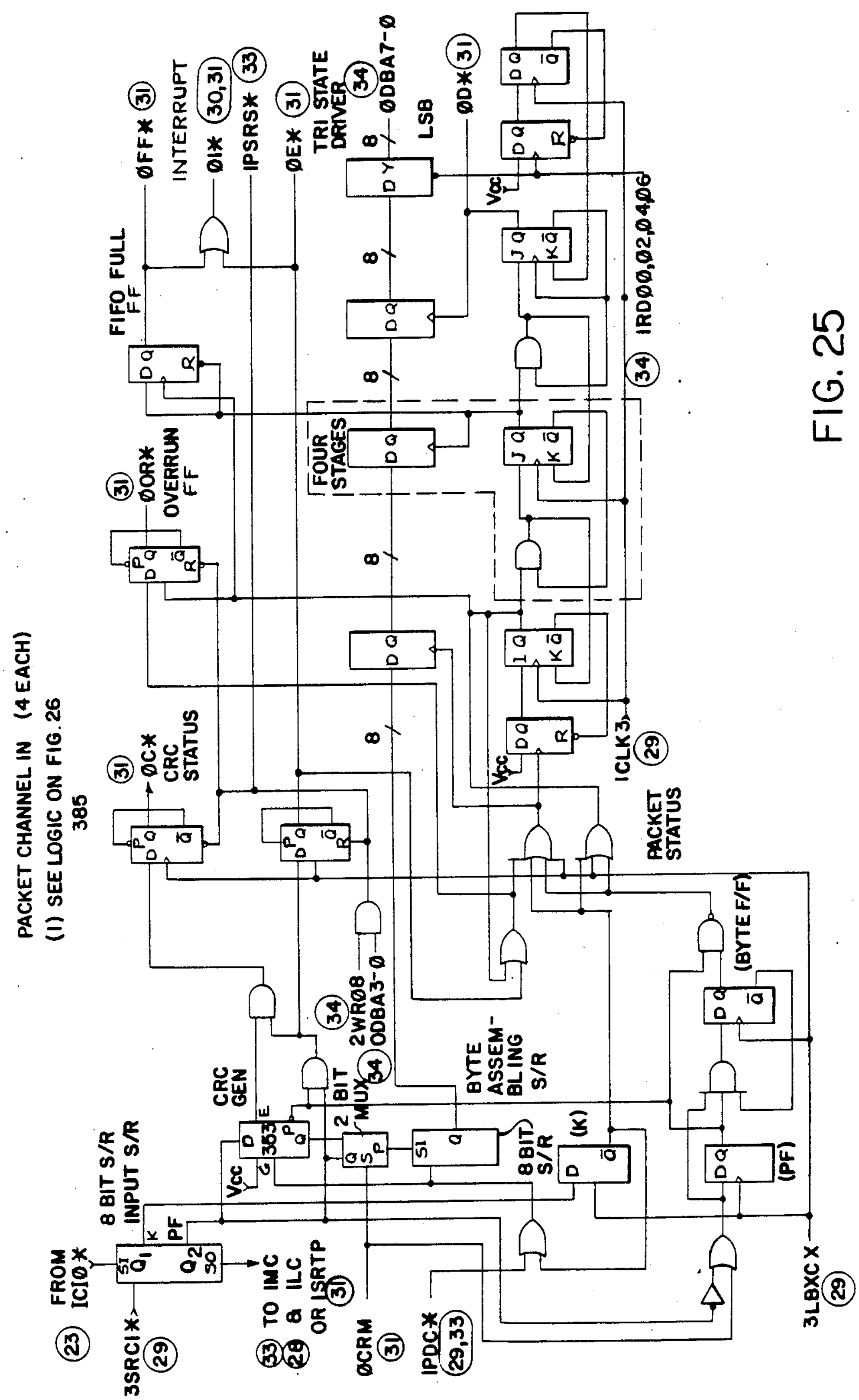
FIG. 25 is a logic diagram of the QPLS Packet Channel In (PCI).

FIG. 25 illustrates the packet channel in (PCI) logic 385, shown more generally at FIG. 13(*b*). This current enables communication of control messages from the station device to the node processors. The 8-bit input shift register at the upper left hand portion of the figure receives information from ICI0 and communicates that information to the input message control 381, or the input logic control 387 when the PLS is in a higher speed configuration. The information in the input shift register is tapped at bits Q2 and Q7 which correspond to the packet flag bit and K-bit respectively. When the packet flag bit is low, the packet flag (PF) flip-flop, in the lower left portion of figure, will be turned on. The four following bits of data will then be shifted out of the input shift register at the Q2 port, and input into the two-bit multiplexer, clocked by the OCRM signal. Information is then transferred to an 8-bit byte assembling shift register, which is clocked by the PDC signal. Subsequent input from the Q2 port is communicated to the byte flip-flop, in the lower portion of the figure. The output from the byte flip-flop is communicated to a packet status OR gate which enables the overrun flip-flop and FIFO flip-flop to output information regarding the status of the packet channel. The output of the byte flip-flop also enables the data storage OR gate to clock information from the byte assembling shift register into the D storage flip-flop, number 6. Once information is stored in the D storage flip-flop, the signal is communicated to the JK flip-flop network which ripples the signal to the right where it ultimately sets the D flag to indicate that packet information is stored in the flip-flop. Each successive byte of information moves along the D storage flip-flop to the D1 flip-flop to the right, from which it may be accessed by node processors 77,25 via the state driver. The rightmost JK flip-flop maintains the D flag on until a read is performed on RD00,02,04,06, connected to the tri state driver, which also turns off the rightmost JK flip-flop.

The output from the D1 flip-flop is communicated to a tri-state driver, which drives the internal data bus so that the external world can read the data. If 4 bytes are stored in the D storage units, the signal on the Q port on the JK flip-flop number 4 will communicate a signal to the FIFO full flip-flop, shown in the upper right portion of the figure. The FIFO full flip-flop will generate a FIFO full flag, which in turn will generate an interrupt indicating that the storage unit is full. Actually, only five storage units are full at that time, however, the flag allows sufficient response time for the microprocessor before an overrun condition occurs, as indicated by the overrun flip-flop, located in the upper central portion of the figure. The overrun flag may also be set by the output of the E flip-flop, in the center of the figure, indicating the end of message. The end of message flag indicates that packet flag has become inactive and the message is completed. The E flip-flop generates an interrupt signal via the interrupt OR gate connected also to the FIFO full flip-flop.

Figure 26:
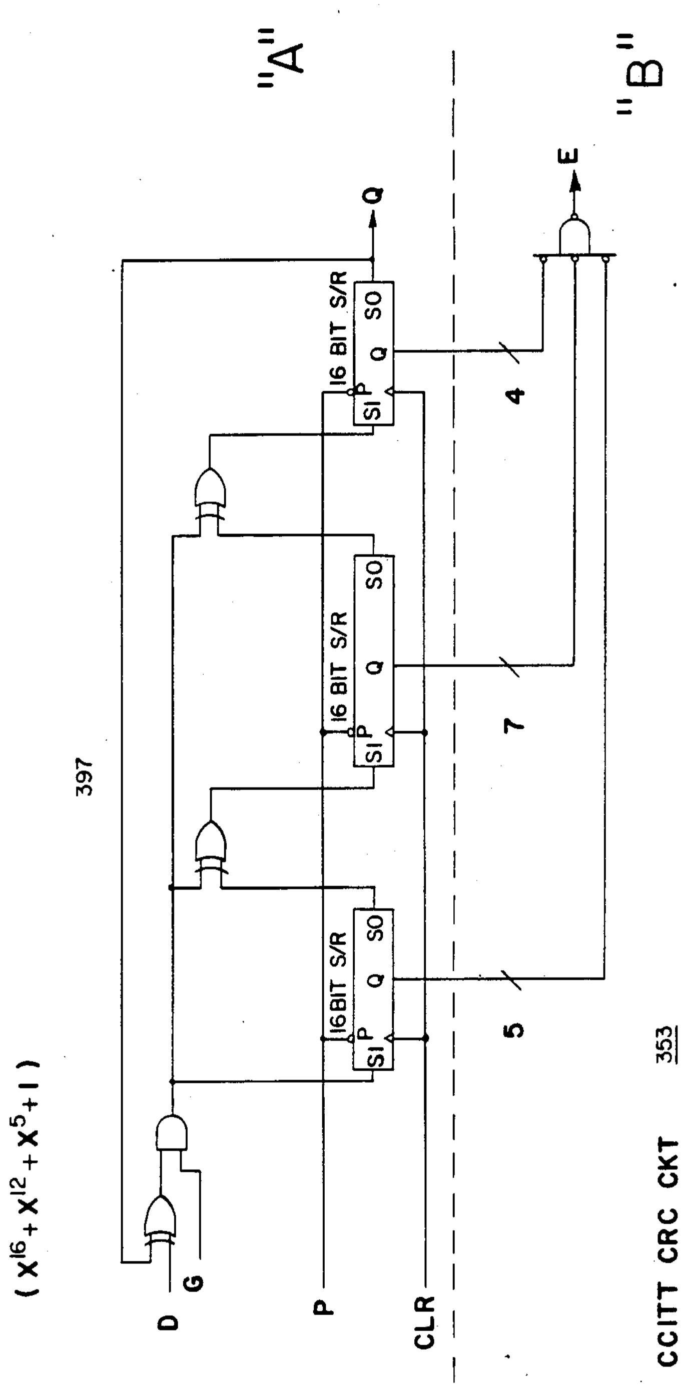
FIG. 26 is a logic diagram of the QPLS CRC Circuit (CCITT).

The CRC status register, shown in more detail at FIG. 26, is enabled by the same signal that enables the end of message register. At the end of the message, the output from the E pin of the CRC generator 353, on the upper left portion of the figure, is communicated to the CRC status register. If the (E) output is not a zero, the CRC status register will indicate that something is wrong with the data that has been communicated.

The K-bit is sampled from the Q7 port of the input shift register. The K-bit is communicated to the K flip-flop, in the lower left hand portion of the figure. When the K-bit goes to a zero, it will inhibit the clock passing through the packet status comparator and the data storage comparator. The K-bit may also inhibit the packet data clock (PDC) from clocking the CRC generator or the byte assembling shift register. The CRM input signal is communicated to the two-bit multiplexer and will shift that multiplexer from passing data from the input shift register to passing data that is in the CRC generator 353. This permits monitoring the activity in the CRC generator for diagnostic purposes.

FIG. 26 illustrates the CRC circuit, 353, referenced earlier in FIGS. 24 and 25. In the presently preferred embodiment, each PLS includes eight CRC circuits on the QPLS chip. The preset version of the CRC circuit uses the standard CCITT polynomial, $X^{16}+X^{12}+X^{5}+1$. MSI chips that perform the same polynomial are commercially available from a variety of sources. The "A" portion of the CRC circuit, above the dashed line, is used in the packet channel out circuit, which does not need the checking circuitry, "B", located below the line. The PCI circuits all incorporates both A and B portions. To enter data into the D input, the G input must be high. That will allow data to pass through the exclusive OR circuits and be shifted in the three 16-bit shift registers. Data is output from the CRC circuit at Q. For CRC checking, the signal on the P input sets all of the Q flags at 1 to cause the E circuit to go low if the circuits are operating properly.

Figure 27:
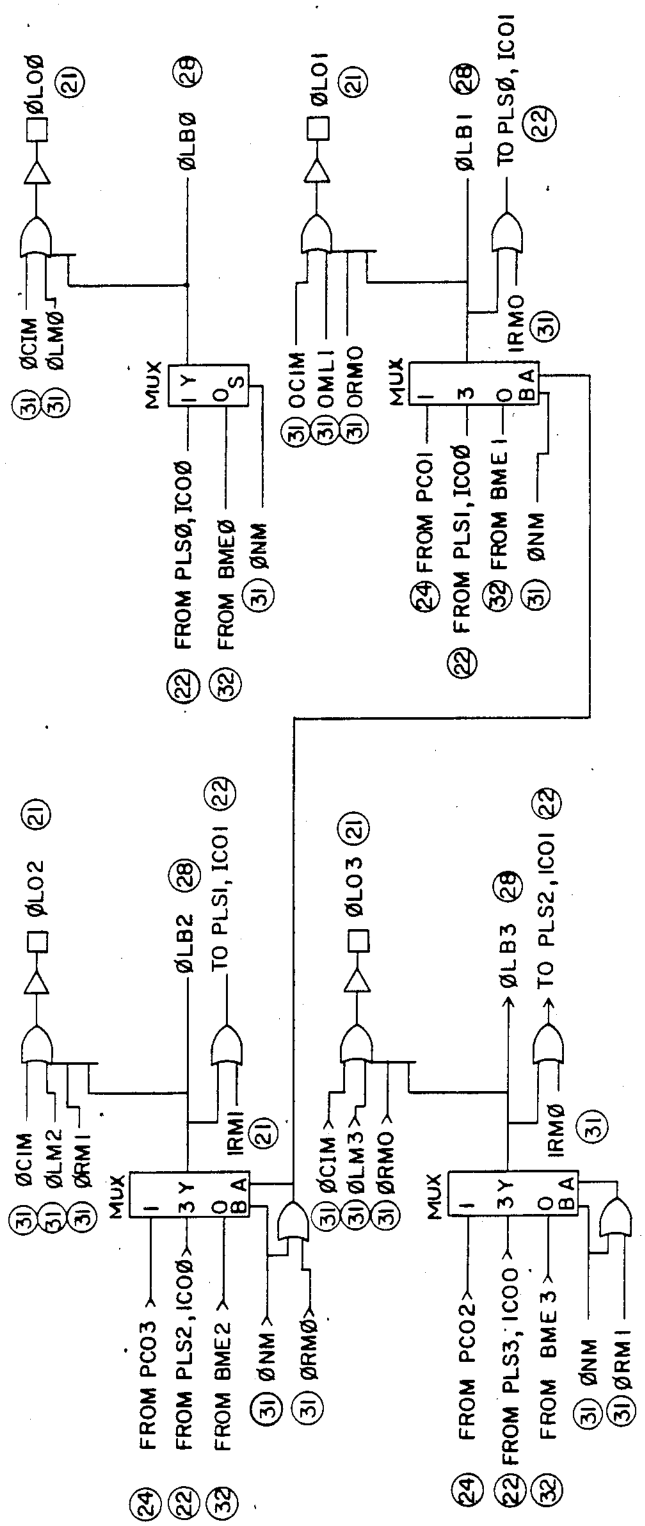
FIG. 27 is a logic diagram of the QPLS Output Line Control (OLC).

FIG. 27 illustrates the logic of the output line control (OLC). The output line control circuit for each PLS is shown in the figure. Each circuit includes a multiplexer which selects an appropriate input depending upon the mode of operation, i.e. local or remote, and the data speed configuration, as previously described in connection with FIG. 12. Inhibit signals are communicated to OR gates and may prevent transmission of a line out signal during chip initialize time, and during other diagnostic functions where it is desirable that the external device does not receive the test data stream. The output may also be inhibited during high data rate modes during which output may be input to the next lower PLS. As previously noted, signal may also inhibit the output of all PLS's except PLS0 will output a signal in any data rate configuration. The NM signal to the multiplexers bipasses the biphase mark encoding logic to permit output of NRZ data instead of biphase mark encoded data to the station device in the local mode.

Figure 28:
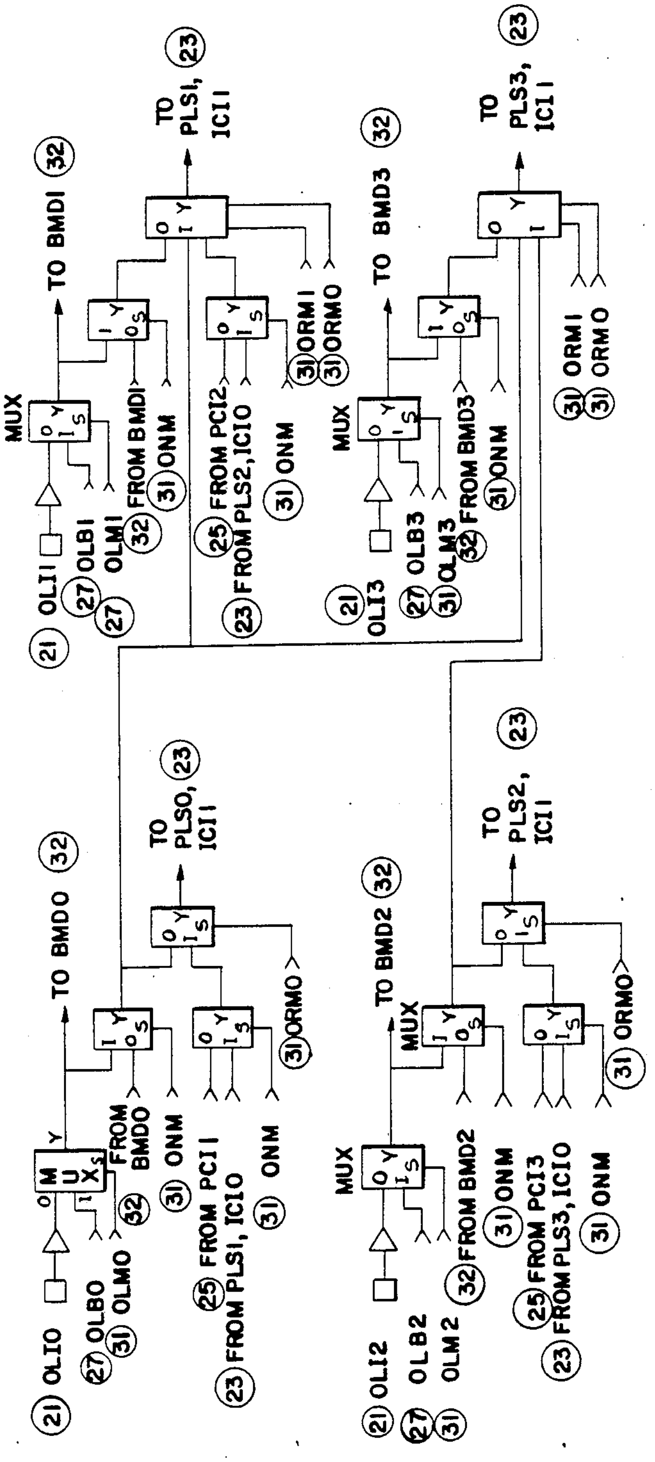
FIG. 28 is a logic diagram of the QPLS Input Line Control (ILC).

FIG. 28 includes the logic for the line in control circuit. The purpose of the line in control logic is similar to that of the line out control logic. The line in logic decides what data to send to the QPLS. In low speed mode (not loopback) the line in data will go to the particular PLS line in registers. In a remote mode, the input will go to the biphase mark decoder prior to going to the line in shift registers, where it can be decoded back into NRZ data and extracted clock. The rate mode signal similarly configures the PLS connections in one, two, or four serial circuits as previously described in connection with FIG. 12. In the high speed mode, data on the line input, LI 0 of PLS 0, comes into the upper left multiplexer from which it is communicated to biphase mark decoder 0 (BHD0), as can be seen in connection with FIG. 12. The data from the biphase mark decoder is then returned to the PLS 0 channel through the multiplexer immediately below. In a high speed mode, the output from the BMD 0 multiplexer is communicated to the PLS 3 channel (lower right), where it is transferred to the PLS 3 ICI 1. The data then shifts through PLS 3, to the PLS 2 input (from PLS 3, ICI 0), where it is input into a multiplexer network and is communicated to PLS 2, ICI 1. The signal is then communicated to PLS 2 (upper right) where it is again transmitted through two multiplexers to be communicated to PLS 1, ICI 1. The resulting signal is then communicated back to PLS 0 (upper left) from PLS 1, ICI 0, where it is communicated through two multiplexers and then goes through PLS 0, ICI 1. In the local mode, the data will be similarly communicated except that the biphase mark decoder circuit 461 will be bipassed by the signal NM applied to the biphase mark decoder multiplexer.

Figure 29:
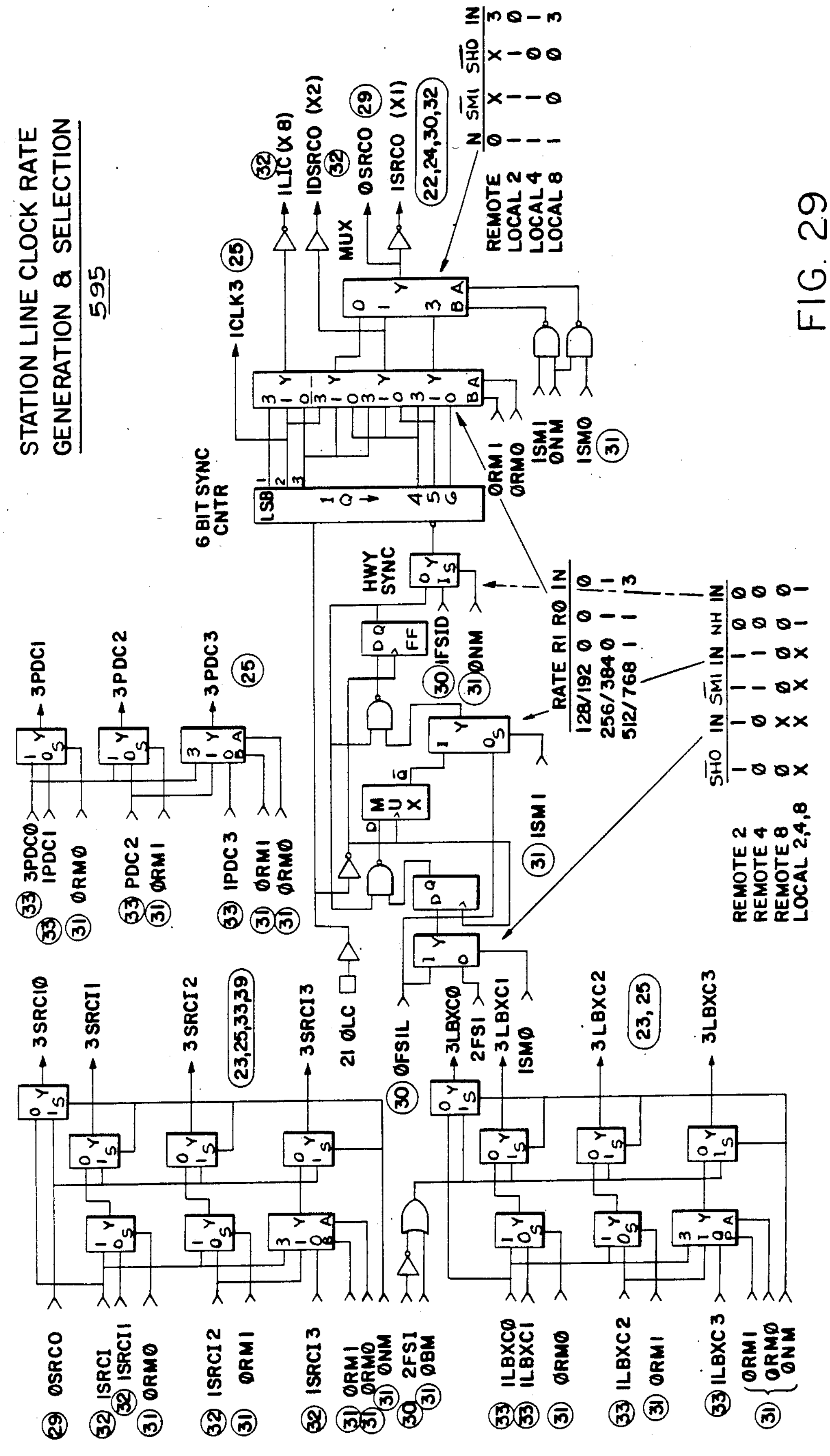
FIG. 29 is a logic diagram of the QPLS Line Clock Rate Registers (CRGS).

FIG. 29 illustrates the logic diagrams for the station line clock rate generation and selection circuit in the control interface logic 595, shown generally at FIG. 14. In the lower left hand portion of the Figure is the multiplexer network that selects the source for the line buffer transfer clock signals (LBXC) for each PLS. The upper left hand circuit is the multiplexer circuit that selects the decoded shift register clock in for each PLS. The upper center of the Figure is the multiplexer circuit that selects the packet data clock (PDC) from whatever PLS is supplying that signal. The remaining portion of the Figure is the line rate clock generator and selection circuit for the signals SCR0, LIC and CLK3.

The shift register clock output (SRCO) is derived at the output of the Y multiplexer at the right hand side of the Figure. The double shift register clock out (DSRCO) and the line in clock (LIC) are derived from the same logic. The SRCO signal provides the basic rate of the output line and would, in the remote mode, run at 192, 384 or 768 kHz, depending upon the data rate configuration. In the local mode the SRC clock would run at 128, 256 or 512 kHz. The double shift register clock out runs at twice the frequency of the SRCO clock in the remote and is used to decode the NRZ data to develop the biphase encoded data to be sent out to the station device. The line input clock runs at eight times the SRCO rate and is used to decode the biphase mark encoded data being received from the station device. The clock 3 signal (CLK 3) runs at a constant 3 megahertz in the remote mode and is used to drive the packet channel in FIFO.

The 6-bit counter is synchronized with the frames and provides outputs for a full frame sync pulse at 4 megahertz and 8 megahertz, and for a half frame sync pulse operation on the highways. The counter is reset at the trailing edge of the FSID signal, regardless of the particular data rate.

The LC clock clocks the D flip-flop, to the left of the 6-bit synchronous counter, such that its Q output passes through the multiplexer to clear the 6-bit counter. In the remote mode frame sync is occurring at either 2, 4, or 8 megahertz and the frame sync must occur at a different time. The tables on the lower portion of the Figure illustrate the signals on the inputs to the respective multiplexers and indicate what inputs are selected in each mode. In the remote mode, at 2 megahertz operation, the Y multiplexers in the lower portion of the Figure will have a 1 on the SM0 and SM1 pins. The input to the multiplexers is from the 1 pin, which is from the FSIL signal in the first multiplexer and is the output from the 2 input D multiplexer, in the second multiplexer. The right portion of the table indicates the state of the NM pin on the multiplexer adjacent the 6-bit synchronous counter. As can be seen from the table, when NM is 1 the system is operating in the local mode and therefore it doesn't matter what the previous multiplexers are set to because their rates do not affect the highway rate which is being applied to the counter via the frame sync in delayed signal (FSID). The next table to the right indicates the RM 1 and RM 0 values in the various data rate configurations. The rightmost table indicates the SM1, NM and SM0 values, and the inputs selected for the remote and various local modes.

Figure 30:
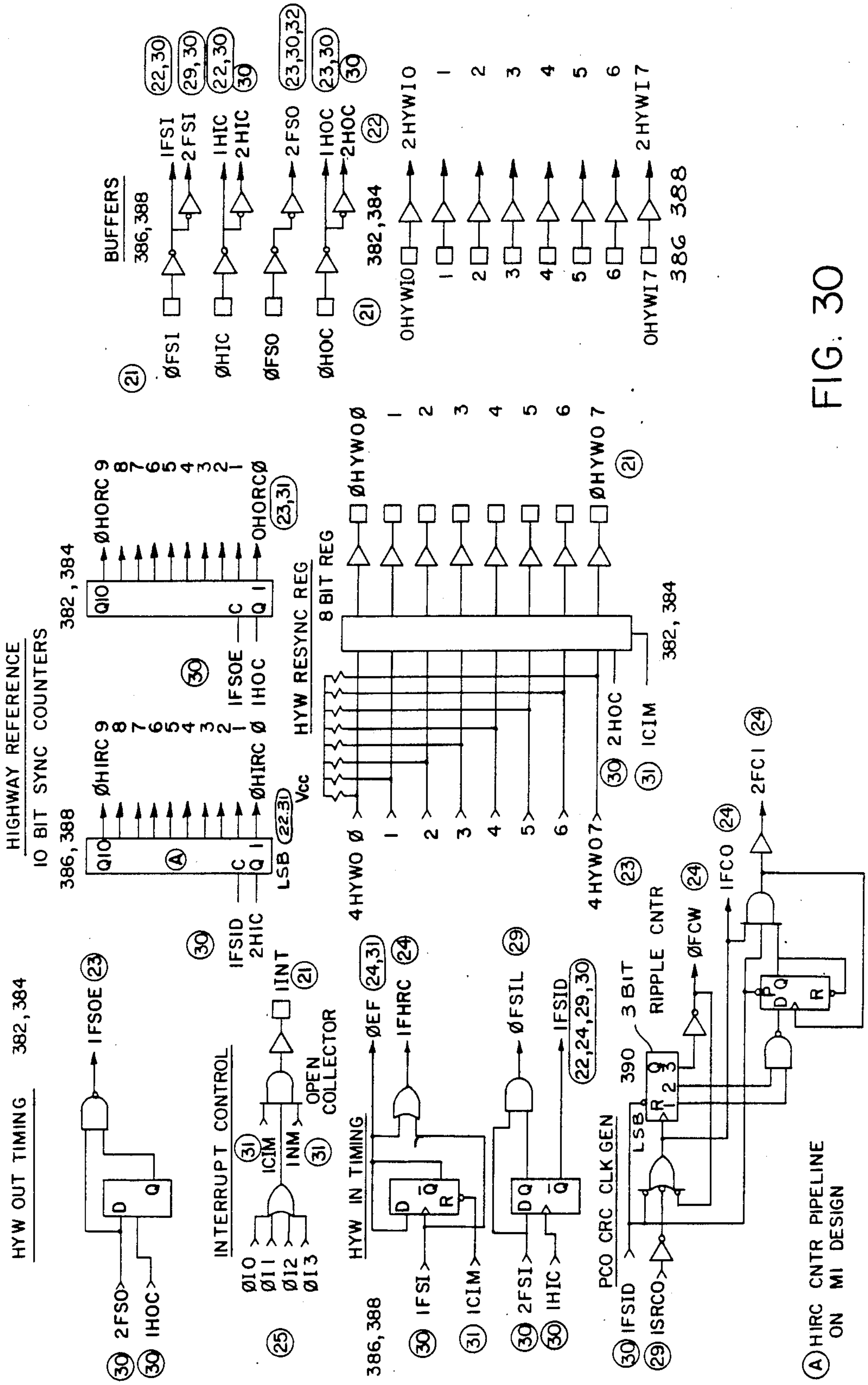
FIG. 30 is a logic diagram of the QPLS Internal Control, Timing, and Buffers.

FIG. 30 illustrates the various timing logic required by the QPLS circuitry to generate various timing signals. The highway in reference counter (HIRC) is clocked by the HIC clock and is cleared by the frame sync in delayed signal (FSID). The highway output reference clock (HORC) is clocked by the highway output clock (HOC) after being cleared by the signal frame sync out early (FSOE) signal. Those signals are provided externally from the QPLS chip and allow the reference counters to keep in step with frame timing.

The counter that develops the FSOE signal is shown in the upper left portion of the Figure. The FSOE signal is derived from the externally supplied signals frame sync out (FSO) and highway out clock (HOC). As FSO goes high the output of the multiplexer will go high. A half a bit later, the signal HOC will clock the D flip-flop to go low and terminate the frame sync out early pulse.

The interrupt control logic produces an interrupt whenever inhibited by the chip initialize signal or the NM local bit. Additionally, an interrupt may come from the packet channel input of each of the PLS's. The interrupt signal is communicated from the chip via an open collector driver.

The highway in timing circuitry generates timing signals that facilitate operation of the packet channel output and packet channel input. The FSI input signal is provided from the external world and clocks the upper flip-flop as long as the chip initialize signal (CI) is not present. The upper flip-flop will output an even frame signal (EF) that is used to generate the frame holding register clock (FRHC). Every other FSI pulse passes through the flip-flop and generate EF signal. FHRC is generated when EF is low and is used to load the data in the PCI output register into the holding register and also sample the data status flip-flops.

Frame sync in delayed (FSID) and frame sync in late (FSIL) is generated by the lower flip-flop. HIC clocks the FSI signal through the lower flip-flop to produce an output that is the same width as FSI, but delayed one-half a bit. That signal is labelled FSID. FSID is produced when the FSI signal and the Q output from the flip-flop are both positive. The PCO, CRC clock generator circuit clocks FSID and SCRO signals. A 3-bit counter is provided that clocks in accordance with SCRO and produces an output signal which is then inverted, labelled FCW. That signal is fed back to the input of the OR gate which stabilizes the 3-bit counter. Once every frame a FSID pulse reset the counter. The FSID pulse maintains the counter on as it forces the FCI signal to remain high. FSID also forces the Q output of the D flip-flop to remain high. Upon the end of the FSID pulse the flip-flop will be driven by the clock to produce 4 FCI clocks and 4 FCO clocks.

The highway resync register is illustrated in the center of the Figure. Each output from the 8-bit shift register is connected to an open collector driver that drives the outputs to the chip. The 8 highways, HYW 0–7 on the left side of the chip are the 8 output highways that are internal to the QPLS. Those highways are driven by the ICI demultiplexers, as shown in FIGS. 22 and 23(*b*). The 8-bit register is clocked by the highway output clock (HOC). In the chip initialize mode the register is preset to prevent output of transient signals.

The right side of the Figure illustrates the signal inputs FSI, HIC, FSO, and HOC which are highway timing signals. The Figure illustrates the input pads, buffers and inverters for each of those signals. The lower portion of the buffer section illustrates the highway inputs HWI 0–7 and their respective pads and buffers. The output signals are directed to the multiplexers illustrated in the lower left hand portion of FIG. 22.

Figure 31:
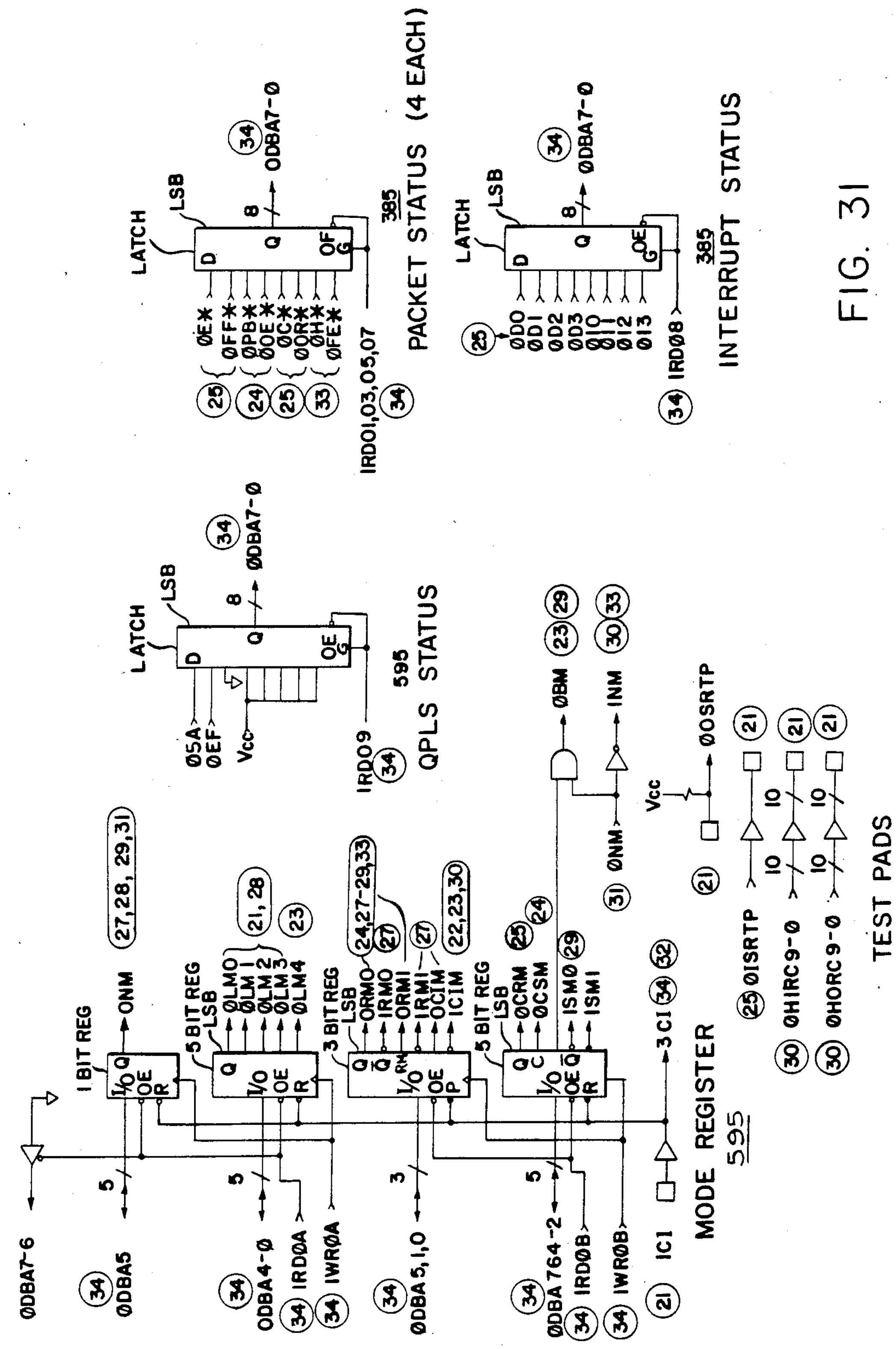
FIG. 31 is a logic diagram of the QPLS Mode Register/Status.

FIG. 31 illustrates the mode and status logic in the QPLS. The node registers and QPLS status register form a portion of the control Interface Logic 595. The packet status and interrupt status registers are a portion of the packet channel input 385. The register on the upper left side of the Figure produces the local mode bit, NM. The next lower register indicates the loopback mode (LM). The loopback mode register LM produces a loopback mode control signal for each of the PLS's and for the diagnostic circuitry (LM4). The next lower register 9RM is used to indicate the remote mode for channel 0 and channel 1, and the chip initialize mode. The lowest left side register C is used to indicate the CRC read mode, the CRC send mode, buffer mode, and the two highway selector modes, SM 0 and SM 1.

In the lower center of the figure is circuitry illustrating the input and output pads for OSRTP, ISRTP, HIRC and HORC. The STRP signals allow testing of the shift register in the line circuitry of all chips.

In the upper middle of the figure is the QPLS status latch. The latch allows access to the status bit second address (SA) and to even frame (EF), which is the state of the even frame flip-flop. The latch also allows access to the different portions of the QPLS to allow the software to operate on that portion in a manner that it requires.

In the upper right side of the figure is the packet status latch that allows access to the status bits provided from the packet channel out (PCO) and the packet channel in (PCI). The input message bits include output empty (OE), FIFO full, packet busy (PB), output empty (OE), CRC error (C), overrun error (OR), hunting (H), and frame error (FE).

On the bottom of the page is the interrupt status latch that allows access to the state of the D-flag and I flag from the packet channel in circuit illustrated at FIG. 25. One bit is provided for each PLS. The I-bit is active whenever the message flag is on or the FIFO full flag is on. When the I-flag is on, the external device will read the interrupt status latch to determine what PLS generated the interrupt. The external device may determine that more than one interrupt flag is interrupted and can read the appropriate FIFO until the D-flag becomes inactive. At that point, the FIFO is empty and the external device can proceed to the next interrupt to repeat the process.

Figure 32:
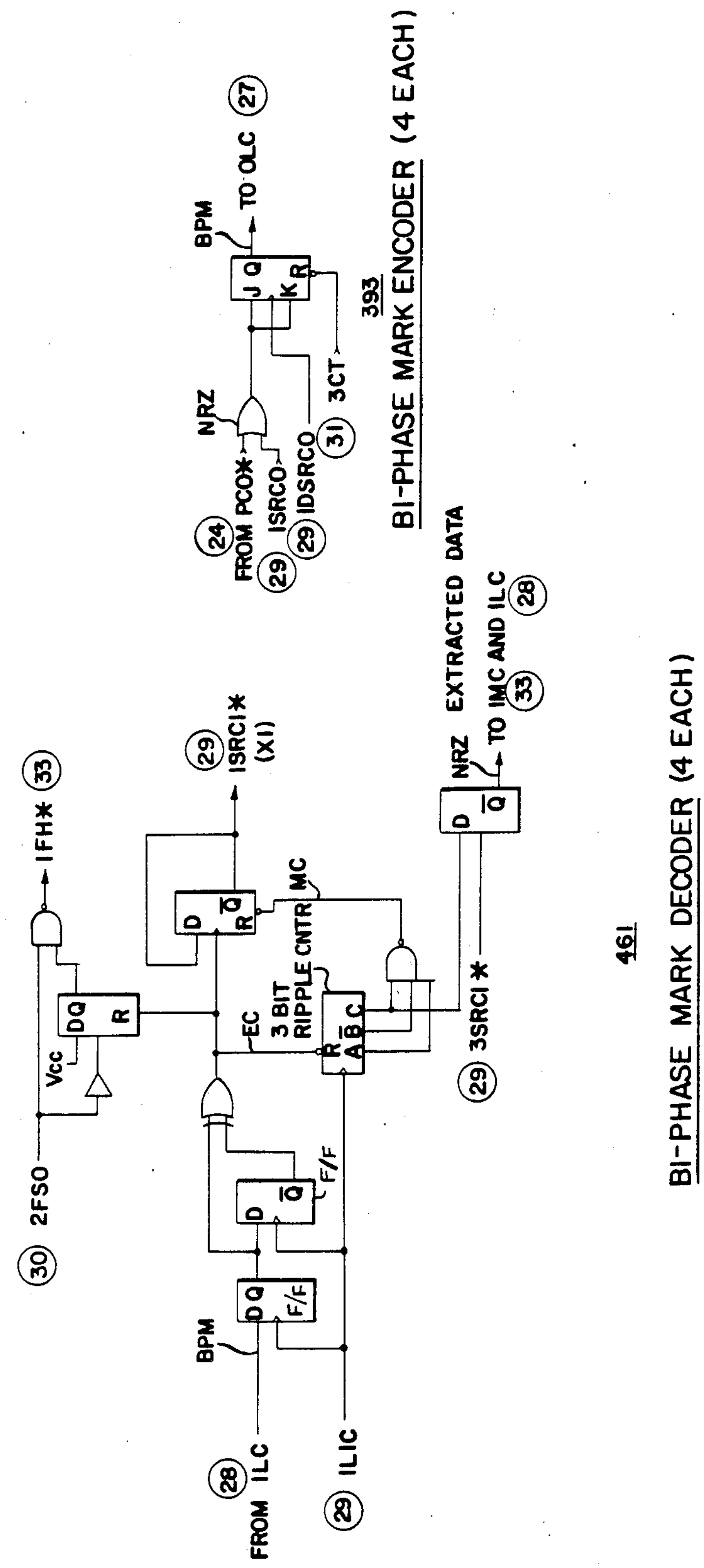
FIG. 32 is a logic diagram of the QPLS Biphase Mark Encoder/Decoder (BME/BMD).

FIG. 32 illustrates the bi-phase mark decoder 461 and bi-phase mark encoder logic 393. In the bi-phase mark encoder logic the JK flip-flop is initialized by the signal 3CI, which is useful in testing the chip. The state of the JF flip-flop is not used to determine the particular state of the input. The relevance of the JK flip-flop is to note the point at which the input changes state. The input to the JK flip-flop is received from the OR-gate which is input by the packet channel out (PCO) and the shift register clock out (SRCO). That data is then clocked by the double shift register clock out signal (DSRCO). The JK flip-flop will change state at least once per shift register clock out. The data out will appear to the output line control as the shift register clock out delayed by a quarter bit.

In the bi-phase mark decoder circuit 461, on the left side of the figure, data from the input logic control is applied to the first of two D flip-flops. The D flip-flops are clocked by the line in-clock (LIC) which is running at eight times the data rate appearing at the ILC. The exclusive OR circuit connected to the flip-flop outputs provides an edge detector signal (EC) that identifies state changes at the ILC. Every time a clock edge is detected, the first flip-flop will change state. The exclusive OR will also change state producing an edge clock so that it goes low whenever the two flip-flops do not contain the same data. On the next clock, the second flip-flop will follow, or copy the first flip-flop state, which will remove the clock. Thus, the output from the exclusive OR is referred to as the edge clock (EC). When the edge clock goes low it resets the 3-bit ripple counter. The edge clock will also reset the bi-phase mark missing detector flip-flop in the upper portion of the figure and will go low on the input of the SCRI flip-flop, which produces the extracted clock signal register clock in (SCRI). One LIC clock pulse later, the EC pulse will go inactive. That action will cause the SCRI flip-flop to change states producing a clock edge. Also, the 3-bit counter can begin counting. A subsequent ILC pulse resets the 3-bit ripple count before it normally completes counting, thus preventing the 3 input NADD-gate from passing a reset signal (MAX clock) to the SRCI flip-flop. If there is no ILC signal transition before the 3-bit ripple counter completes counting, a MAX clock signal will be generated from the 3-input NAND-gate which will force the SCRI signal high.

Extracted data from the ILC 387 is output as NRZ data from the NRZ flip-flop and communicated to the IMC and ILC. The NRZ flip-flop is clocked by at 3 SRCI, which is a delayed SRCI signal. One feature of the decoder design is that it automatically corrects for possible phase errors in the extracted data. If the bi-phase data is out of phase with the clocking signal a circuit will automatically correct it.

The bi-phase mark missing detector circuit notifies the external data controller when no data is being received from an external source. If clock edges are continually being received, or if at least one clock edge is received between every frame sync, the bi-phase mark missing detector flip-flop will always be reset and will never be able to drive the signal FH. If no transitions are received in the input line for two frame syncs then the flip-flop will come on on the first FSO signal and the NAND-gate will be inhibited. If no clock edges have occurred by the next FSO signal, then FH will be forced to be true and will stay true until the edge clock occurs again. The FH signal is communicated to the PCI status logic and forces the status bit frame error in hunt signals to be true.

Figure 33:
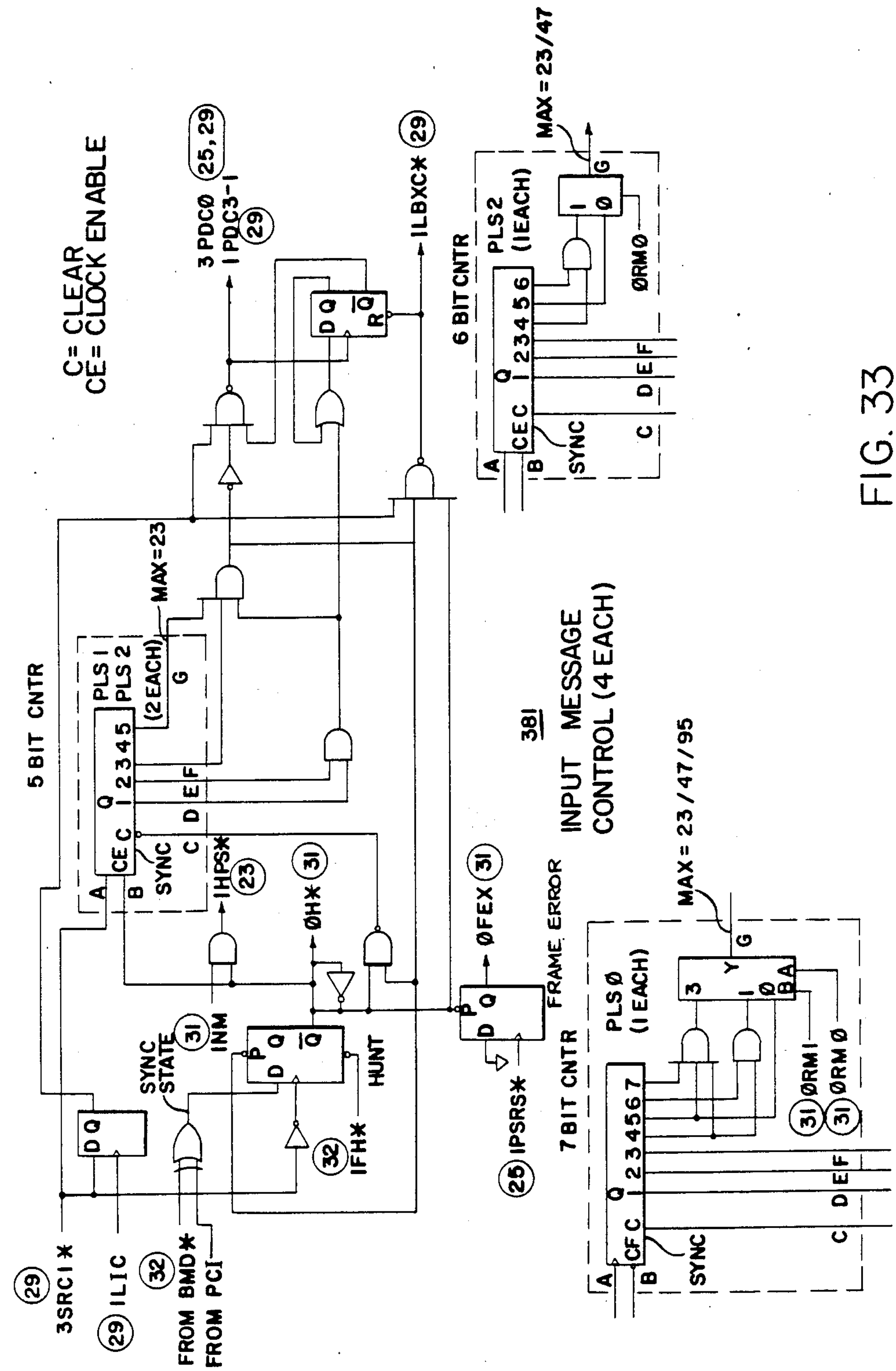
FIG. 33 is a logic diagram of the QPLS Input Message Control (IMC).

FIG. 33 illustrates the input message control (IMC) logic 381, shown more generally at FIG. 13(*b*). This circuit functions to search out and locate the message synchronization. Three different versions are illustrated. The circuit in the dashed box in the upper center of the figure may be replaced by the two circuits on the lower left and lower right hand portions of the figure. The embodiment illustrated in the principal figure includes a 5-bit counter which counts from zero to 23. The alternative embodiments, which accommodate different data rates, include the 6-bit counter, on the lower right hand side, which counts to 47, and the 7-bit counter on the lower left side, which counts to 96. The circuit operates to compare the BMD and PCI signals at the exclusive OR-gate in the upper left portion of the figure to see if there synchronization bits are in an alternating state. If the synchronization bits are opposite, indicating proper synchronization, then the hunt (H) flip-flop will not get reset and the H signal will not go active. When the hunt flip-flop is reset, a signal is sent to the frame error (FE) flip-flop which indicates the frame error condition. Once the frame error flag is active it can only be reset by the PSRS signal from the external processor. However, the hunt signal can go inactive once synchronization occurs. The 5, 6 or 7-bit counters function to time the BMD and PCI comparisons at the proper moment in view of the data rate configuration in which the QPLS is operating. The different counting circuits are necessary to accommodate different data rate configurations. The output LBXC is the line buffer transfer clock, which represents the frame signals on the highway side of the frame sync in and frame sync out circuits, which may include a variable delay depending upon the time that is involved in the circuit between the remote device and the PLS. The PDC signals facilitate shifting the line in data and the packet channel input into the bit assembly register. Once a bit is there assembled it is transferred to the FIFO, as previously described.

Figure 34:
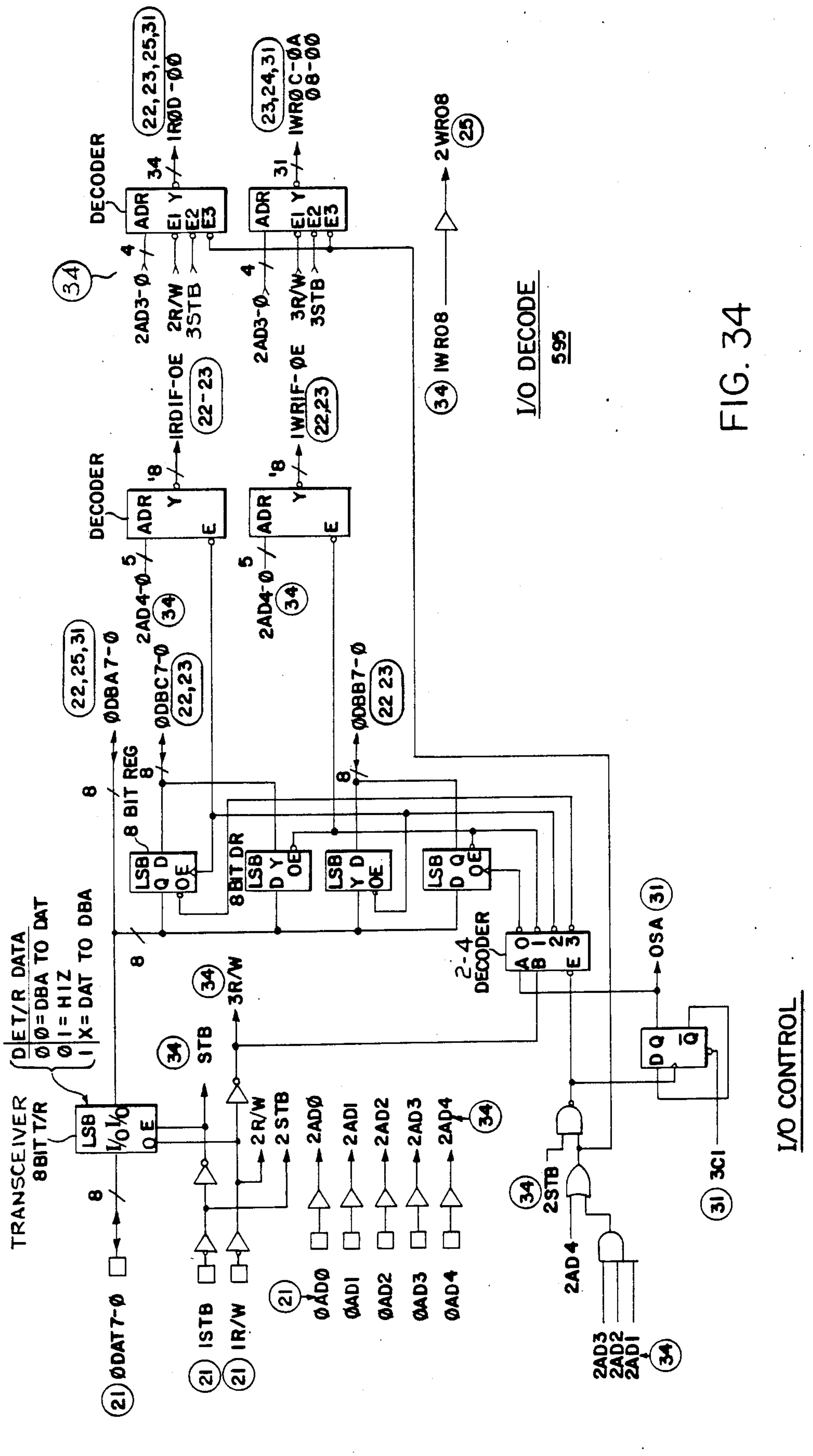
FIG. 34 is a logic diagram of the QPLS Input/Output Decode/Control.
Figure 35:
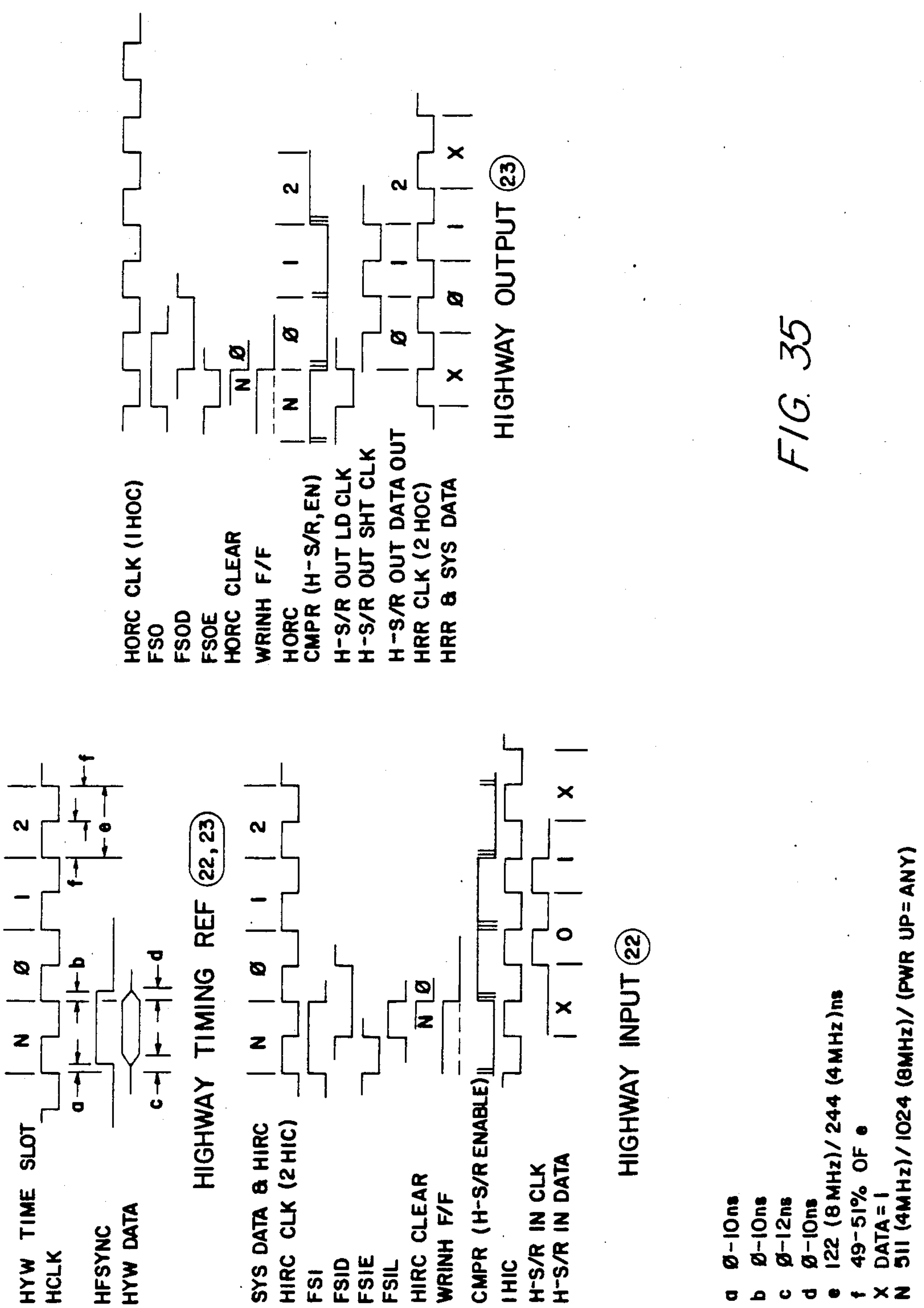
FIGS. 35–41 are logic diagrams of the QPLS Reference Timing.
Figure 36:
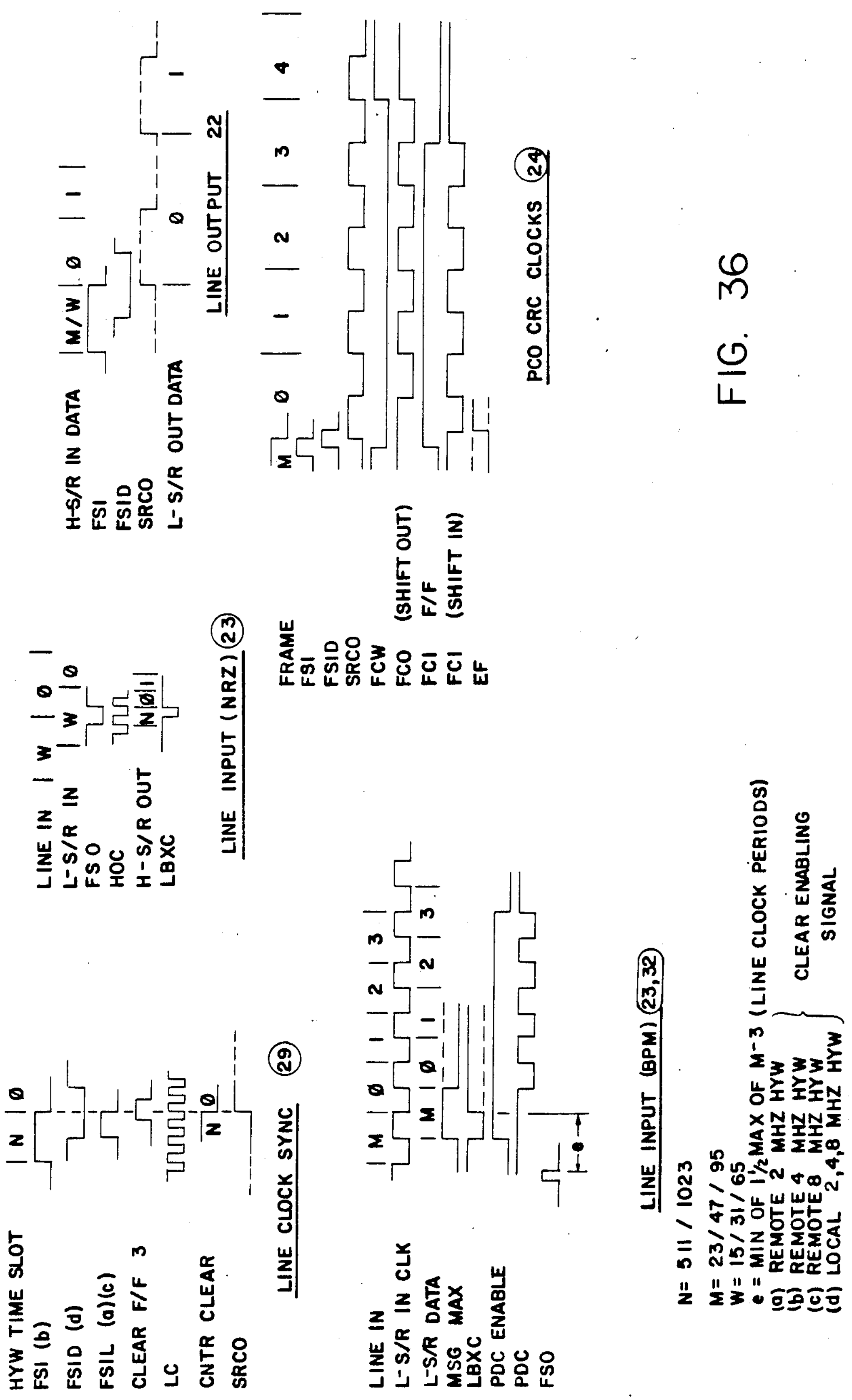
Figure 37:
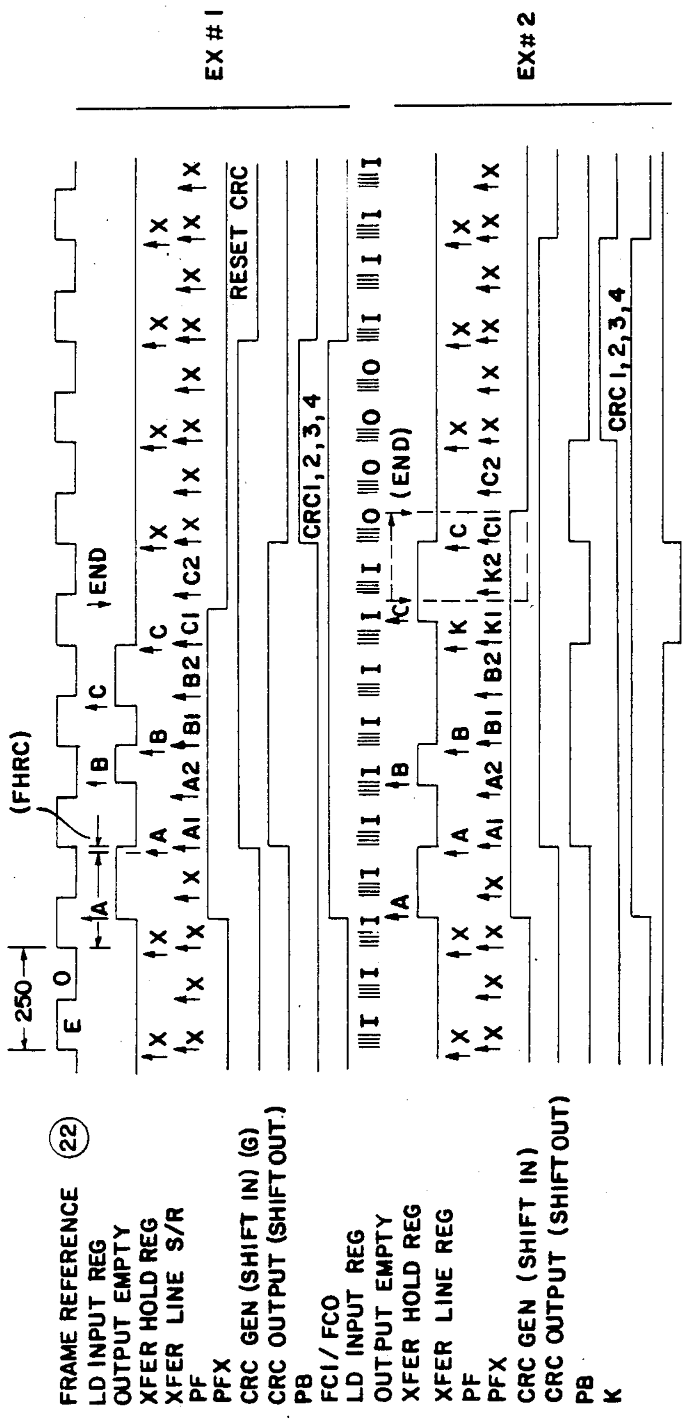
Figure 38:
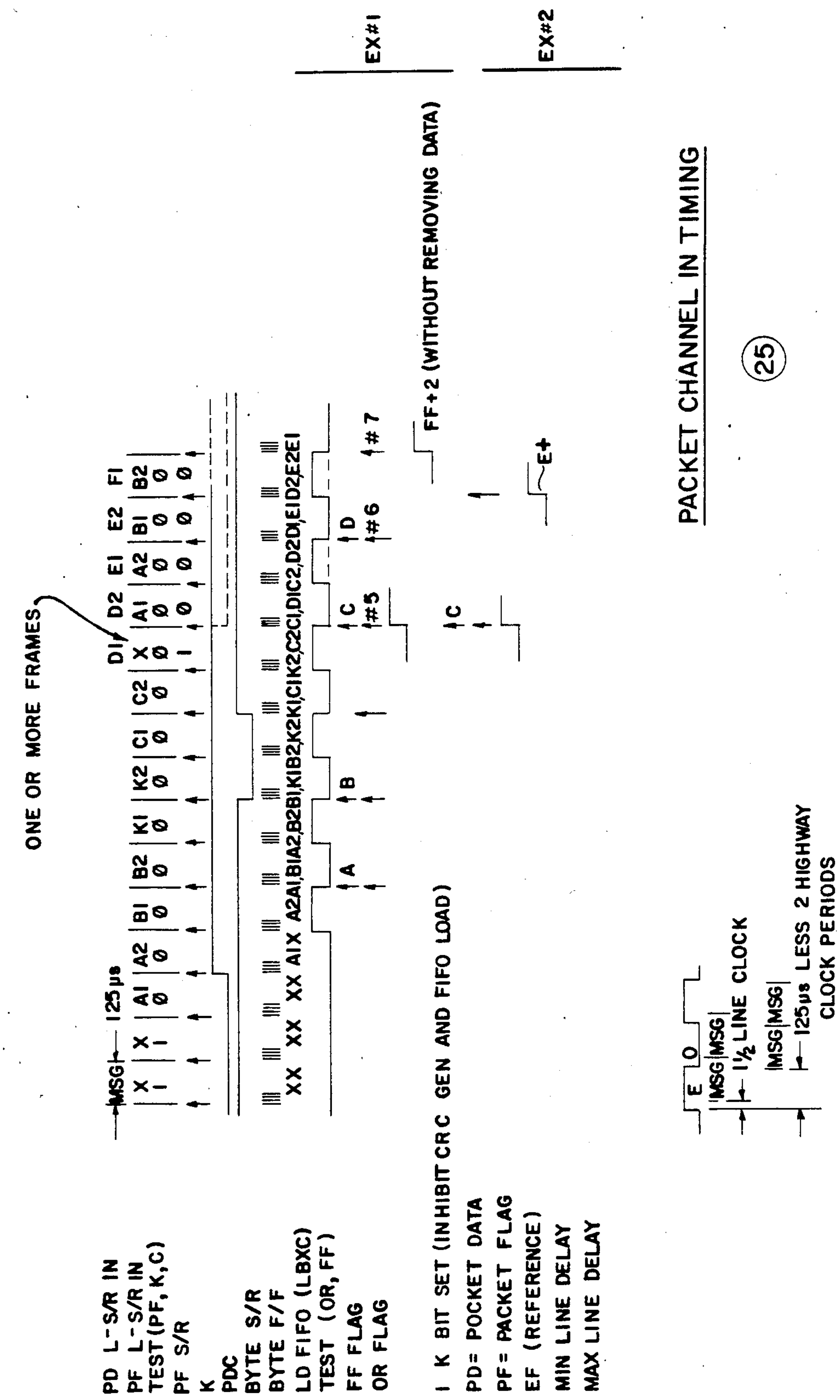
Figure 39:
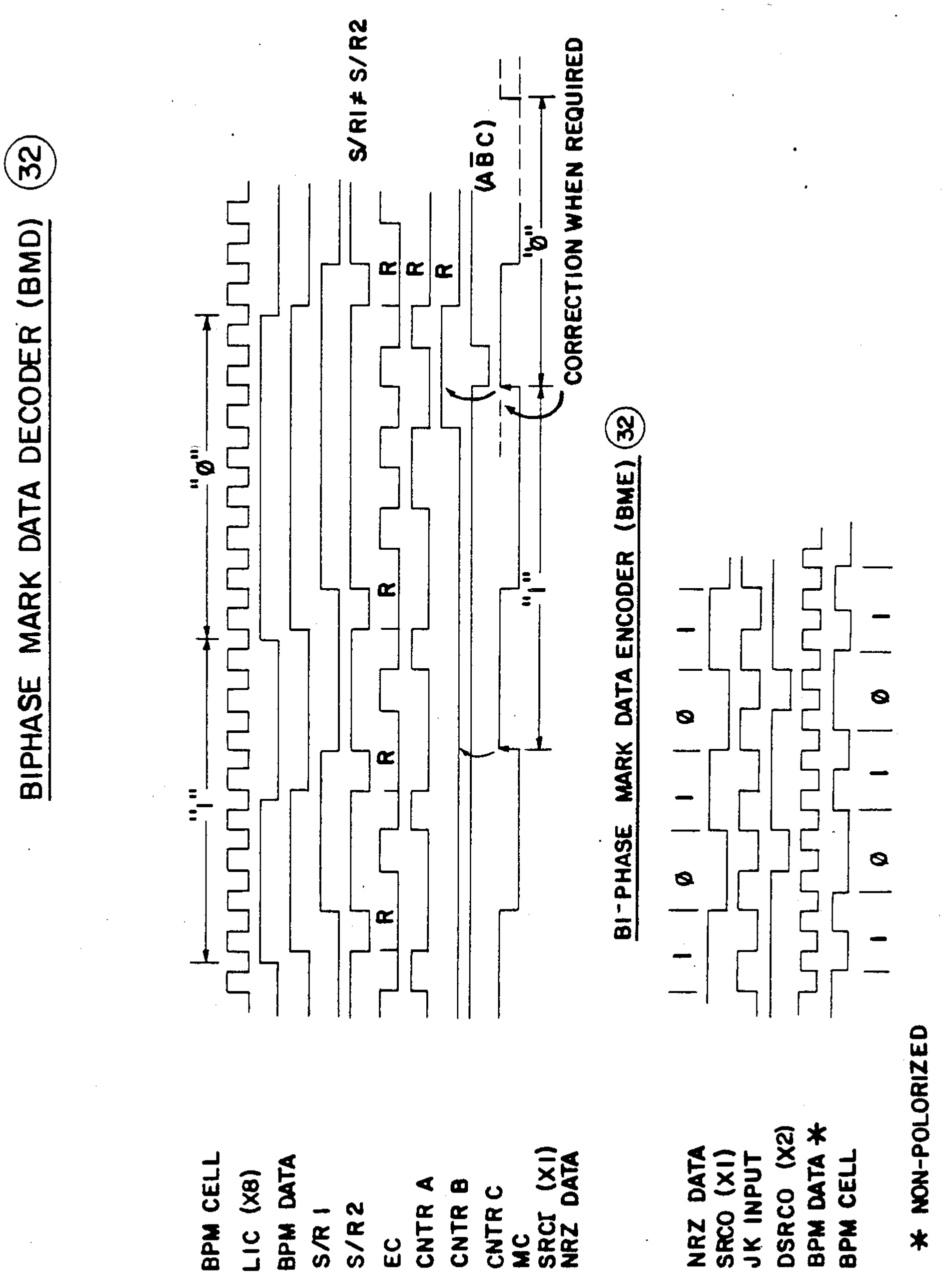
Figure 40:
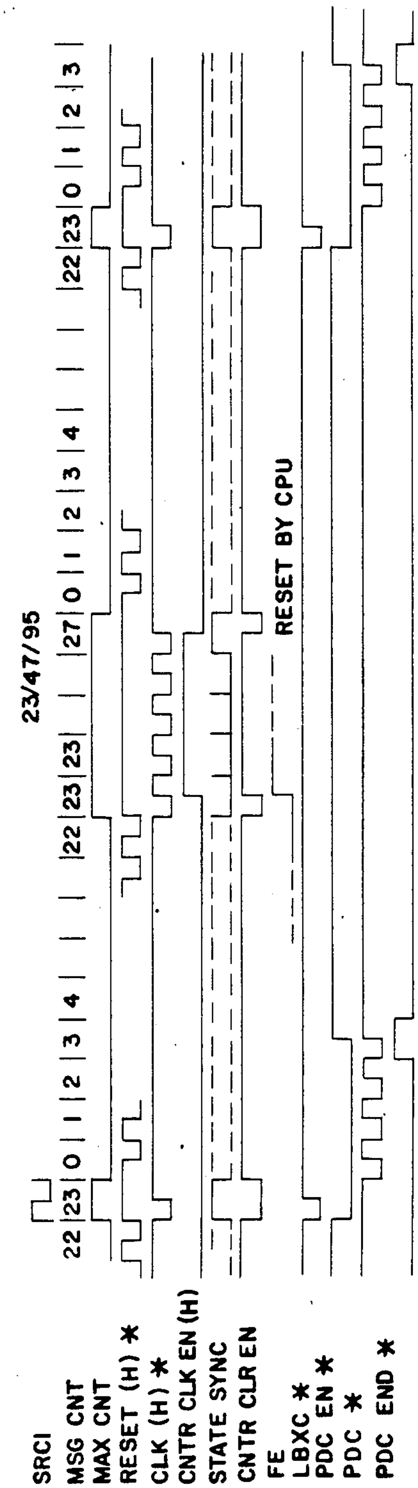

FIG. 34 illustrates the input/output control and decode logic that form a portion of the control Interface Logic 595. The figure contains the decode logic for all the different addresses here utilized. Some addresses require a single read or write to accomplish the operation and others require two reads or two writes to accomplish the operation. If an operation is going to be an 8-bit operation, then it is completed in a single read or write. Data enters the circuit in the upper left hand portion of the figure (DAT 7-0) where it is communicated to an I/O transceiver that determines what signal will drive the internal data bus, or the external data bus. The transceiver is controlled by the signals read/write (R/W) and strobe (STB). The R/W signal sets the direction and the STB signal enables the transceiver. When the R/W signal is low, the data on the DAT lines will appear on the DBA lines. The strobe signal then enables the particular decode address that is applied. The decoder logic is shown on the right side of the figure. The upper decoder, RDOP, forms a read operation and the lower decoder, WROC, performs a write operation. Those decoders are controlled by the state of the addresses 0–4. E3 on the 2-4 decoder is derived from the AD 1-4 inputs on the lower left side of the figure. The other enabling inputs on the decoders are STB and R/W. The two other decoders, RD8F and WRIF, to the immediate left, decode the double write and double read sequences. Those decoders utilize an 8-bit data bus from the external world from an internal 16-bit data bus. To write to a 16-bit internal data bus the address for that location is from the AD 1-4 inputs on the lower left hand side of the figure, would be strobed through the NAND-gate and communicated to the 2-4 decoder in the lower portion of the figure. The address signal also clocks the SA flip-flop at the lower portion of the page which inputs to the 2-4 decoder. The 2-4 decoder sets the 8-bit shift registers and 8-bit drivers in the center of the figure to receive two bytes of 8-bit data from the DBA inputs and clock that data simultaneously, in a 16-bit group to the DBC and DBB lines. The output sequence on the DBC and DBB lines is reversed for the read and write operations.

On the left side of the figure are the AD0–AD4 input buffers for the address lines. On the lower right side of the figures is an inverter circuit that inverts the WR 8 signal that is communicated to the PCI to develop the packet status reset signal.

FIGS. 35–40 are timing diagrams illustrating the signals previously described in connection with the earlier diagrams.

Figure 41:
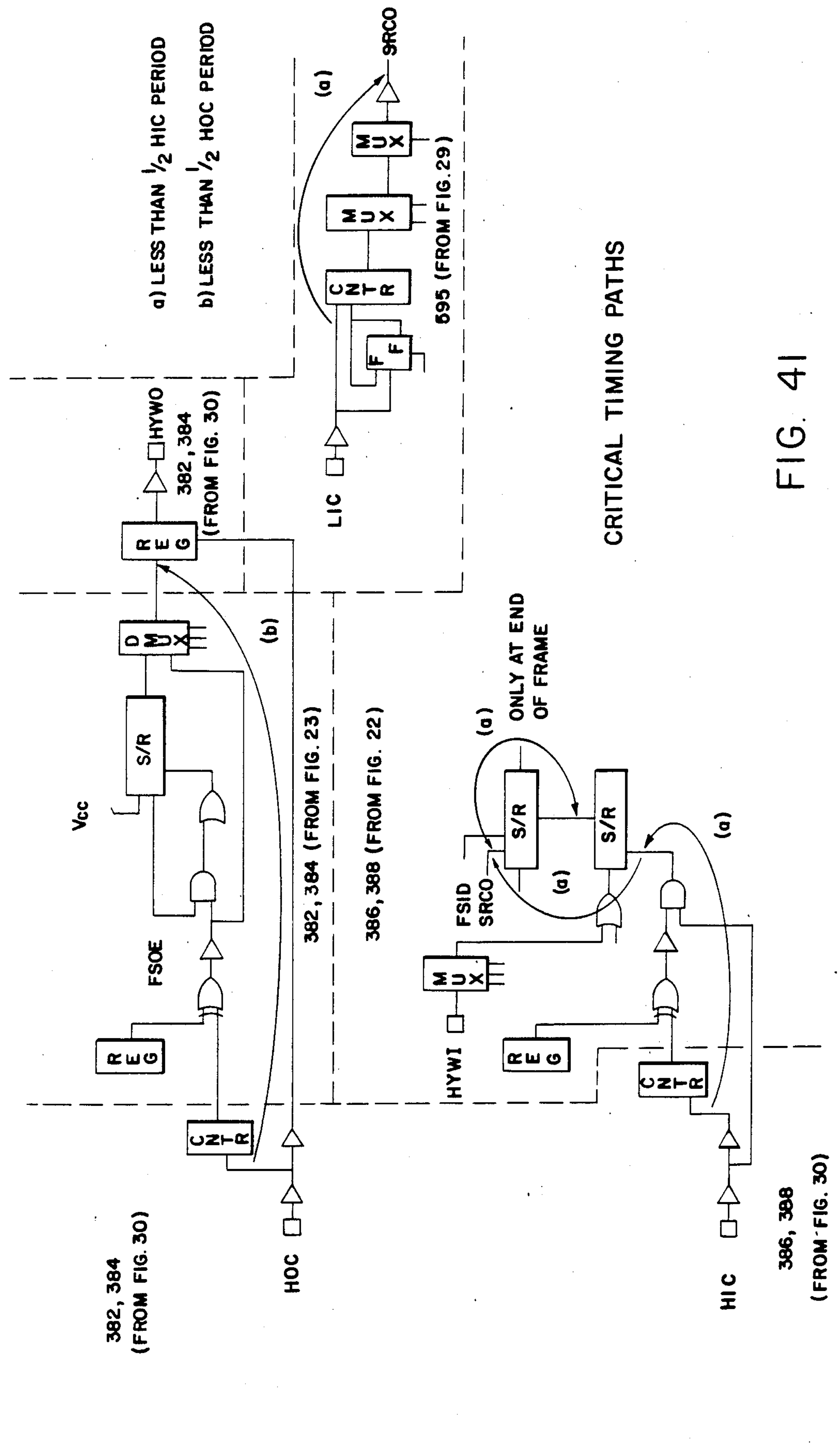

FIG. 41 illustrates several timing paths in the QPLS circuitry. Three simplified logic diagrams are presented, the circuitry for which is shown in more detail in connection with the previous logic diagrams. In the upper left portion of the figure, a critical timing path for the signal HOC is illustrated. The heavier lines represent the path that is assumed to be critical. In that path the highway output clock (HOC) is input to a 10-bit counter that is developing the HORC circuitry that goes into an exclusive OR comparator, and through an inverter to enable the clock shift register connected to FSOE. The signal from the inverter also enables the demultiplexer to allow data that is in the shift register to appear at the input of the highway resync register one-half a bit after the leading edge of the HOC clock. The trailing edge of the HOC clock will clock that data into the highway register. Therefore, the data must be valid at the register input before the clock changes state.

The logic diagram illustrated at the lower left hand portion of the figure illustrates a critical path for accessing data from the highway. Data appearing at the highway inputs (HIWI) passes through a demultiplexer, through an OR-gate into a shift register. The highway in clock passes through an inverter, a counter, a comparator, enables an AND-gate that will allow the edge of the clock to clock the data into the shift register before the highway data has changed. Also, the SRCO signal must go high within a half-bit time while the FSID signal is true, in order to load the data into the line out shift register.

The logic circuit for developing the SRCO signal at the critical is shown in the right portion of the figure. In that circuit, the line-in clock is communicated to a counter which is cleared by a flip-flop to allow the line-in clock to pass through the multiplexers and through an inverter to permit SRCO to go high as necessary in connection with the previous drawing.

While the principles of the QPLS have been described above in connection with specific apparatus and applications, it is understood that this description is made by way of example only and not as a limitation on the scope of the invention.

Description of the Microtelephone Controller (MTC)

As previously indicated, the microtelephone controller (MTC) is adapted to receive the serial output from the QPLS to one or more digital telephone and/or voice stations. The MTC demultiplexes data from the node, and multiplexes signals to the node so as to integrate circuit and packet switched data into a single signal stream transmitted and received by the local station. The discussion below initially presents an overview of the functions of the MTC and the relationship of the various signals passing therethrough. After that discussion a more detailed description is given of the components in the MTC that facilitate the specified functions.

Figure 42:
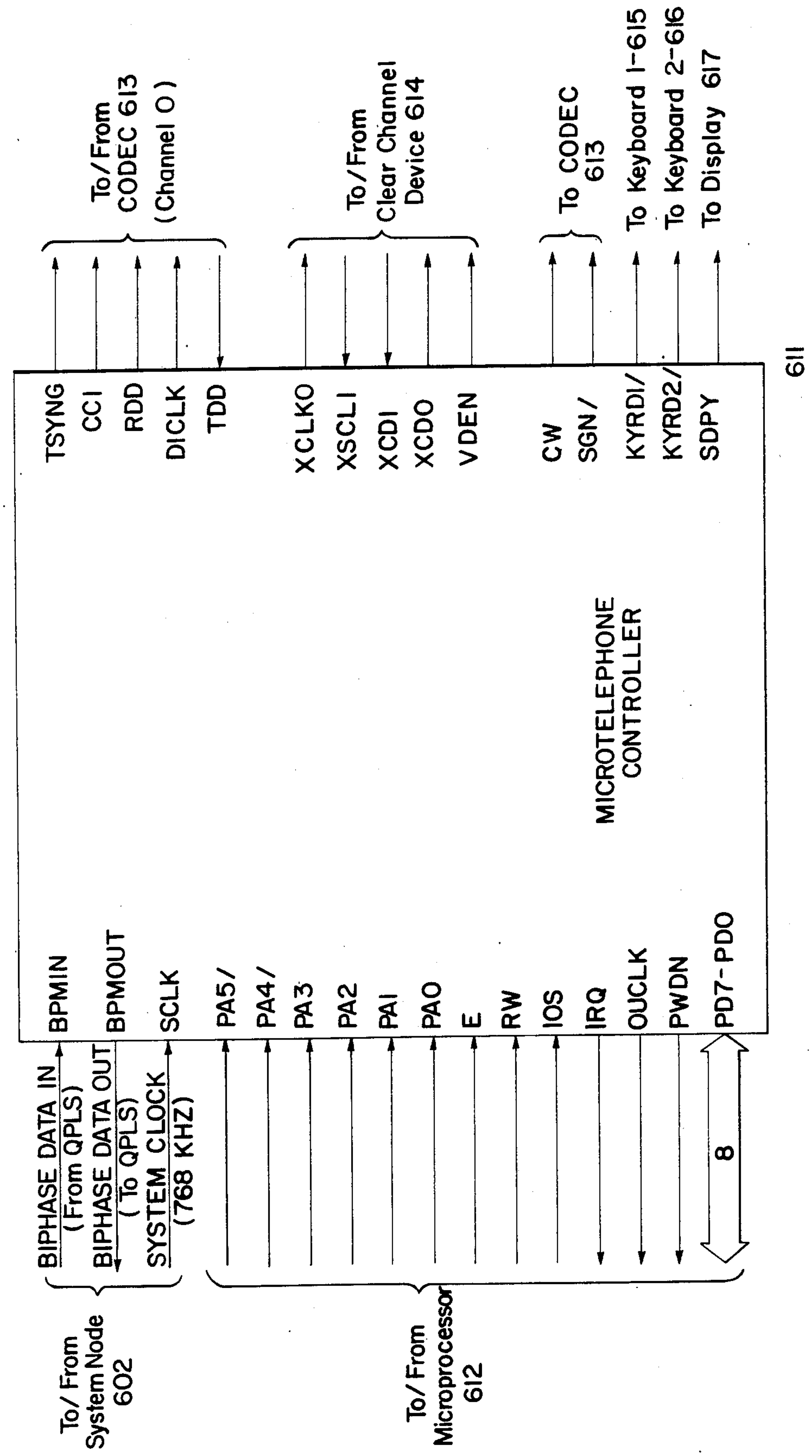
FIG. 42 is a wiring diagram of one implementation of the microtelephone controller (MTC) showing the external connections.
Figure 43:
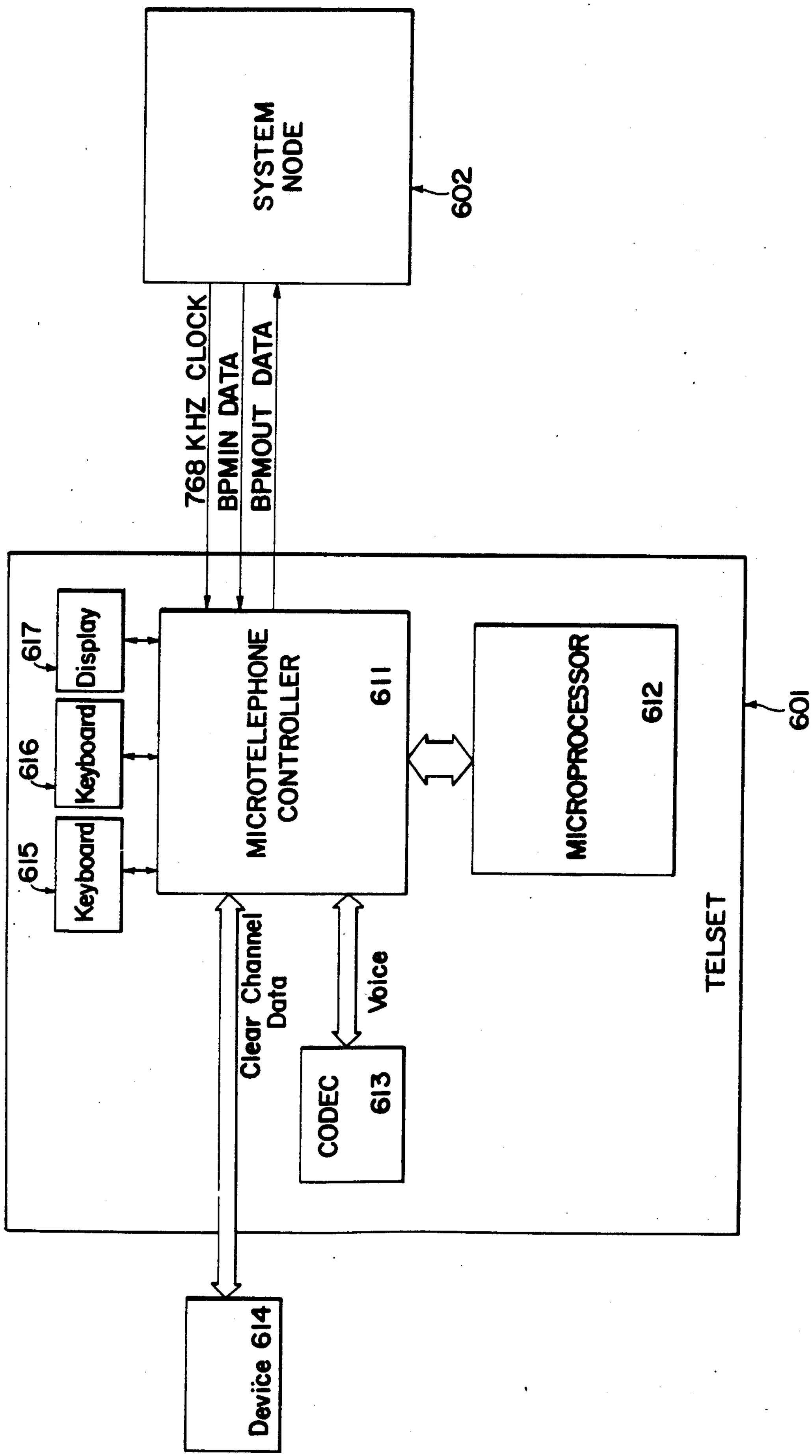
FIG. 43 is a high level block diagram showing a typical implementation of the MTC in a digital telephone station.
Figure 44:
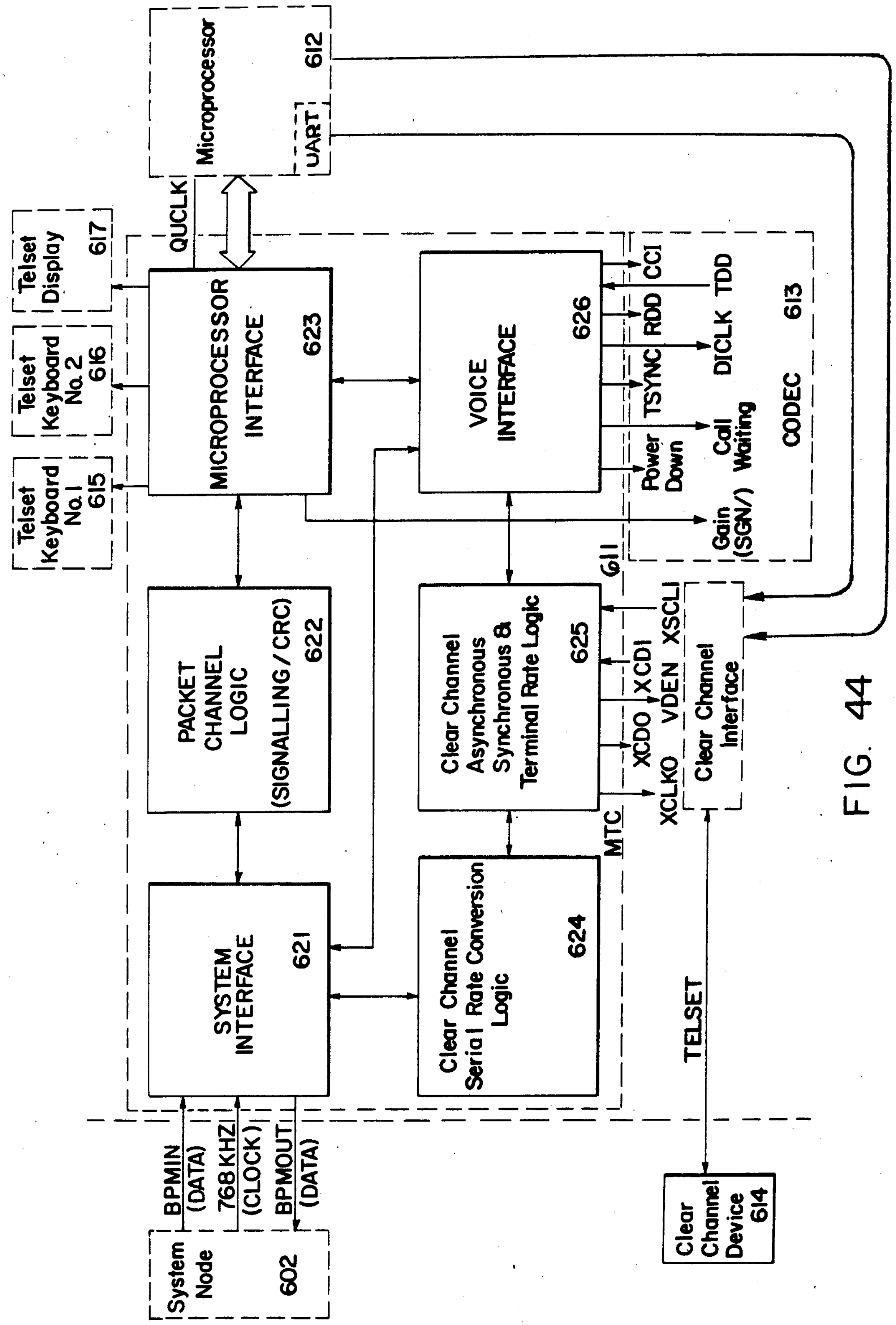
FIG. 44 is a functional block diagram of the internal configuration of the MTC.

In a preferred embodiment, the MTC can be a large scale integrated circuit in a 40-pin package. As shown in FIGS. 42, 43, and 44, the MTC 611 may interface with a system node 602, a microprocessor 643, a voice CODEC 613, and a clear channel communications device 645. The MTC can also provide enable signals to other devices such as keyboards 646, 647 and to a display unit 648. The MTC can communicate control information from the system node 602 to the microprocessor 643. Microprocessor commands can, in turn, enable the selected devices to gate data to or from the system node 602 via the MTC.

FIG. 43 illustrates a typical implementation of the MTC 642 and its function as the interface between the system node 602 and the voice and/or data devices at the local station. The system node 602 may function to interface the voice and/or data communications between the local station and the system network, as previously described. The MTC 611, disposed in telset 601, may receive serial biphase encoded data from the station port of system node 602 and reformat the data, in accordance with internal register configurations for transmission to one or more voice CODEC's 613 and/or to one or more clear channel devices 645. It can also receive serial data from one or more voice CODEC's 613 and/or clear channel devices 645 and can transmit that data to the system node 602 as biphase encoded data. The MTC 611 may also receive parallel address and data information and control from the microprocessor 643 or other control means and generate enable signals to the CODEC 613, keyboards 615 and 616, and display 617. The MTC 611 may also respond to commands from the microprocessor 612 by reconfiguring its internal registers or by sending internal MTC status information to the microprocessor 612. In a typical implementation, the MTC 611 can also receive parallel control and signalling information from the microprocessor 612 and send that information to the system node 602 in serial form, or receive control and signalling information from the system node 602 in serial form and send that information to the microprocessor 612 in parallel form.

The MTC functional block diagram in FIG. 44 shows the MTC as six functional units for description purposes. It should be understood, however, that the enumerated functions are typically dispersed through the device in the actual implementation. The system interface 621 can receive the biphase encoded data (BPMIN) at a 192 kHz rate from node interface 165 and a 768 kHz clock from the clock recovery unit 171. The system interface 621 also generates the biphase encoded data out (BPMOUT) to node 602 via node interface 165. The serial information stream on BPMIN from node 602 typically has the format shown in FIG. 45(*a*). In the preferred embodiment, once every 125 microseconds node 602 transmits a 24-bit information frame consisting of a synchronization bit, seven bits of signal/control information, an eight-bit voice channel and an eight-bit clear data channel. The data is continuous, with the synchronization bit of one frame following immediately after the last clear data bit of the previous frame.

Figure 46:
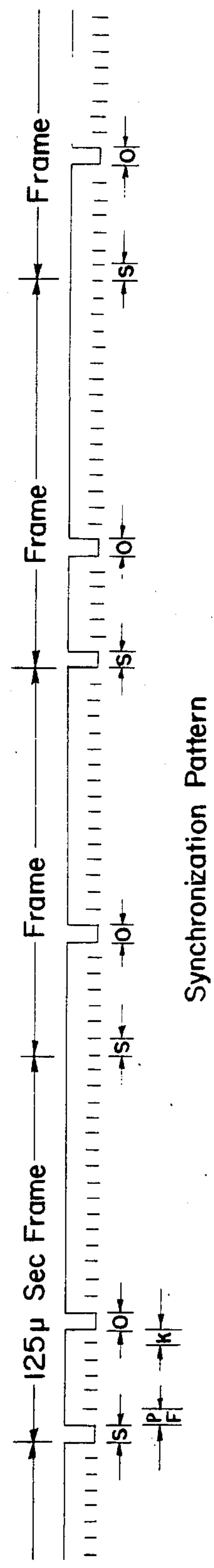
FIG. 46 is a timing diagram exemplifying the synchronization pattern of the data received by the MTC in the absence of any information data.

The synchronization bit, S, alternates between set (1) and reset (0) in each frame. If this synchronization pattern of alternating set and reset in the sync bit is not maintained, the information from the system node 602 is not considered valid and typically is not transmitted on the voice or clear data channel. As shown in FIG. 46, if no messages are being transmitted by the system node 602, the message frames consist of the alternating sync bit with the remaining bits in the frame all 1's except for the eighth bit, which is a constant 0.

The system interface 621 converts the biphase, encoded data to nonreturn-to-zero (NRZ) data using well known techniques previously described. That data is then made available to the other MTC functional units illustrated at FIG. 44 as set forth below. The system interface 621 counts the information bits received from the system node 602. The seven bits following the sync bit are the packet channel information bits and are transmitted to the packet channel logic 622 from the system interface 621. The next eight bits are the voice information bits which are typically transferred from the system interface 621 to the voice interface 626. The last eight bits in a frame are the clear channel data bits which are typically transferred from the system interface 621 to the clear channel serial rate conversion logic 624. The system interface 621 typically generates a synchronization signal for each of the three functional subsystems which indicates to the appropriate subsystem that the serial data can be gated to that subsystem. See FIG. 45(*b*). Thus, the packet channel logic 622 typically responds to data during the packet channel enable (BSEN) time. Voice data is typically enabled to the voice channel output of the voice interface 626 during channel 0 enable (VEN) time. The clear channel asynchronous, synchronous and terminal rate logic 625 responds to data during the channel 1 enable time (DEN).

Figure 47:
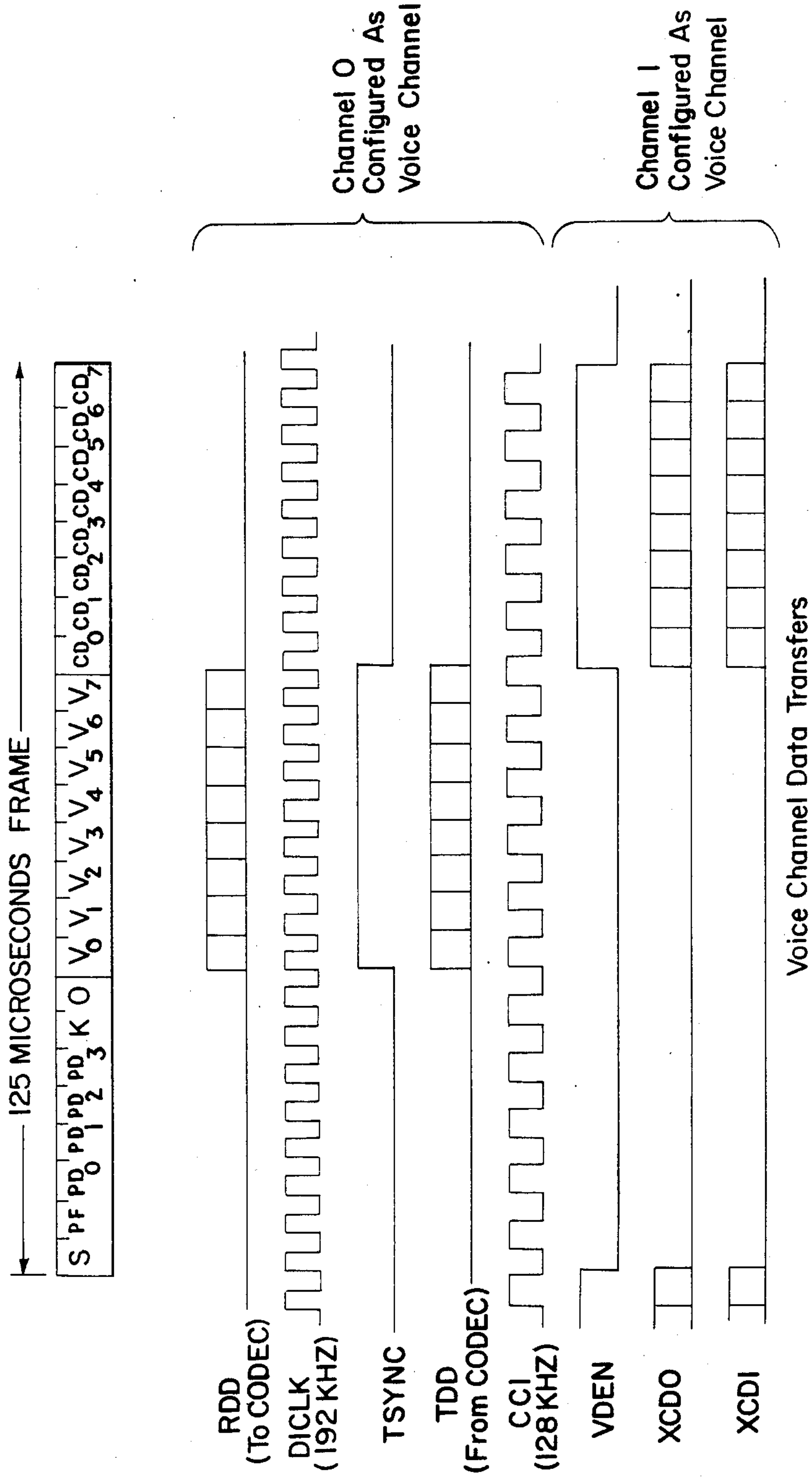
FIG. 47 is a timing diagram exemplifying the relationship between the data from the system node to the voice channel CODEC.

The voice interface 626 typically need not alter the data received from systems interface 621 before transmitting that data to the CODEC 613. If the voice channel is not disabled, the data received is enabled to the voice data channel output (RDD) (shown in FIGS. 43 and 44) during the channel 0 enable time. The presence of an active signal TSYNC can indicate to the CODEC 613, or other device connected to the voice terminal output (RDD), that the data is valid and should be clocked into its serial input. The signal on TSYNC is typically active only for the eight bit times when the voice data is valid. The voice channel interface 626 provides a 192 kHz clock (DICLK) to synchronize the data out to the CODEC 613. The voice channel interface 626 also provides a 128 kHz CODEC filter clock (CCI). The 128 kHz CODEC filter clock can be used internally by the CODEC 613 for digital filtering. The voice data is clocked out to the CODEC 613 from the voice channel interface 626 on line RDD shown in FIGS. 42 and 44. Voice data is clocked into the voice channel interface 626 from the CODEC 613 on line TDD also shown in FIGS. 42 and 44. The data on RDD and TDD is typically synchronized with DICLK. The foregoing is more clearly described in connection with FIG. 47, which illustrates the respective timing signals.

The voice interface 626 can also operate in the loopback mode for diagnostic purposes. When configured in that mode, data from the output port of the voice interface logic 626 is typically gated back into the voice interface logic 626 without passing through an external device. Data from the external device to the voice interface 626 is disabled in the loopback mode.

Figure 48:
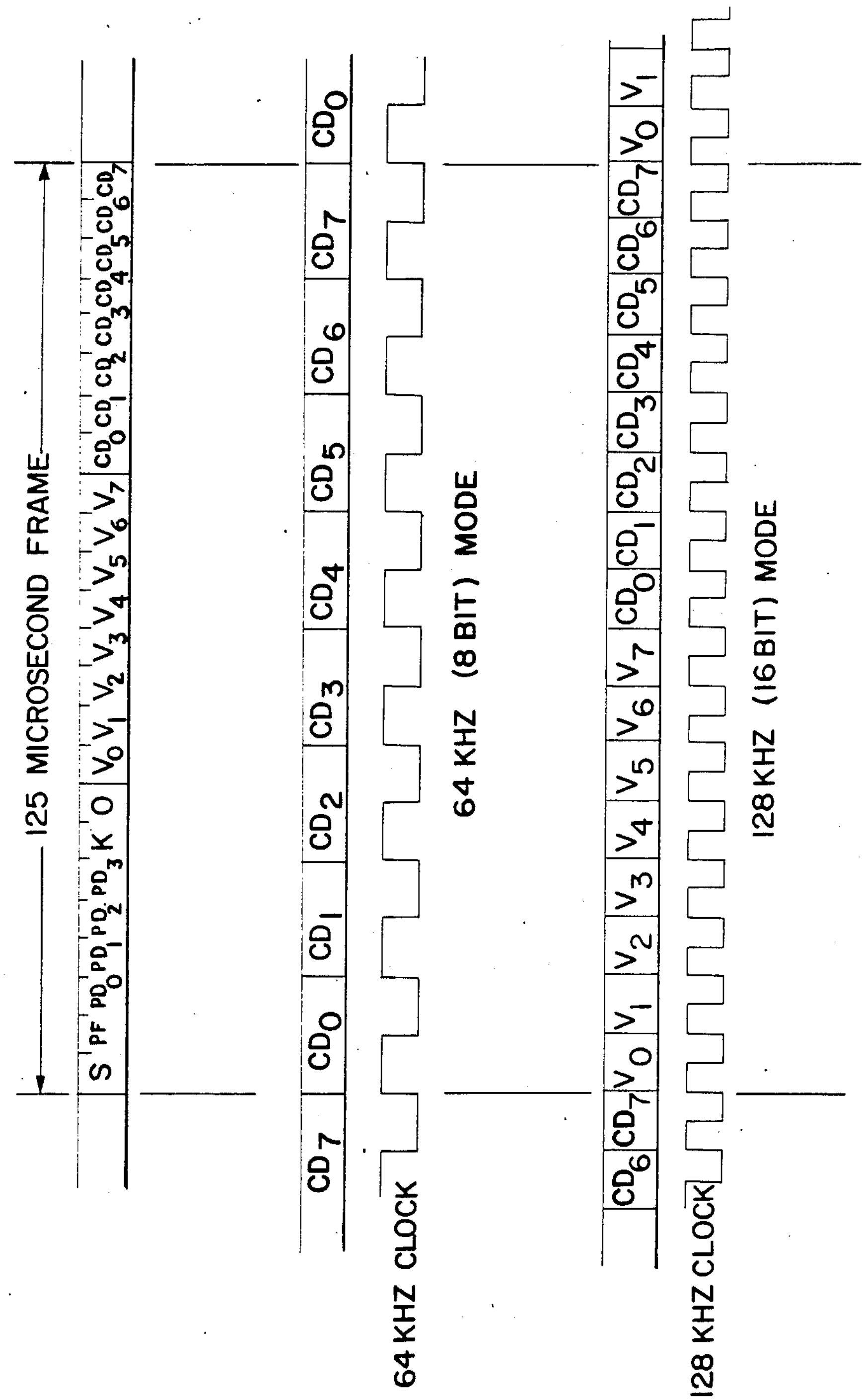
FIG. 48 is a timing diagram exemplifying the relationship between the data received by the MTC from the system node and the internally generated PBX data formats.

The first portion of the clear channel logic, i.e. the clear channel serial rate conversion logic 624, can provide serial data rate conversion (i.e., convert the eight or sixteen bit bursts of clear channel data, received from the system node 602 in at 192 kHz, into a steady continuous data stream at a lower rate.) The timing associated with that function is illustrated in FIG. 48. If the clear channel asynchronous, synchronous and terminal rate logic 625 is configured to be a second voice channel, the data can be transmitted without conversion to the clear channel data output rate (XCDO). (See FIG. 47). The voice data enable output (VDEN) 674 from the clear channel asynchronous, synchronous and terminal rate logic 625 is enabled during the last eight bits of a message frame. At that time, the data bits are transmitted to a CODEC (not illustrated) connected to the clear channel logic 625 in synchronization with the voice port data clock output (DICLK). Similarly, data can be clocked into logic 625 on the clear channel data input (XCDI) in synchronization with DICLK. Thus, the last eight bits of data in a frame are transmitted to a CODEC unchanged in a 192 kHz burst similar to the operation of the voice channel.

If not configured as a second voice channel, the clear channel serial rate conversion logic 624 can convert the last eight bits of data in a frame, to an eight-bit per frame data stream at 64 kHz. (Eight bits of data at 64 kHz occupies the same 125 microsecond frame as 24 bits of data as 192 kHz.) This 64 kHz data stream is transferred to the clear channel asynchronous, synchronous and terminal rate logic 625 to be transmitted to the data device 614. Alternatively, the clear channel logic 625 can be configured to receive the entire sixteen bits of data in a frame from the system node. (The voice channel logic would typically be disabled in that mode.) In this mode, the sixteen bits of data can be transmitted to the clear channel asynchronous, synchronous and terminal rate logic 625 from logic 624 at 128 kHz. Data transfer formats for two modes of the clear channel serial rate conversion logic 624 are exemplified in FIG. 48.

Figure 49:
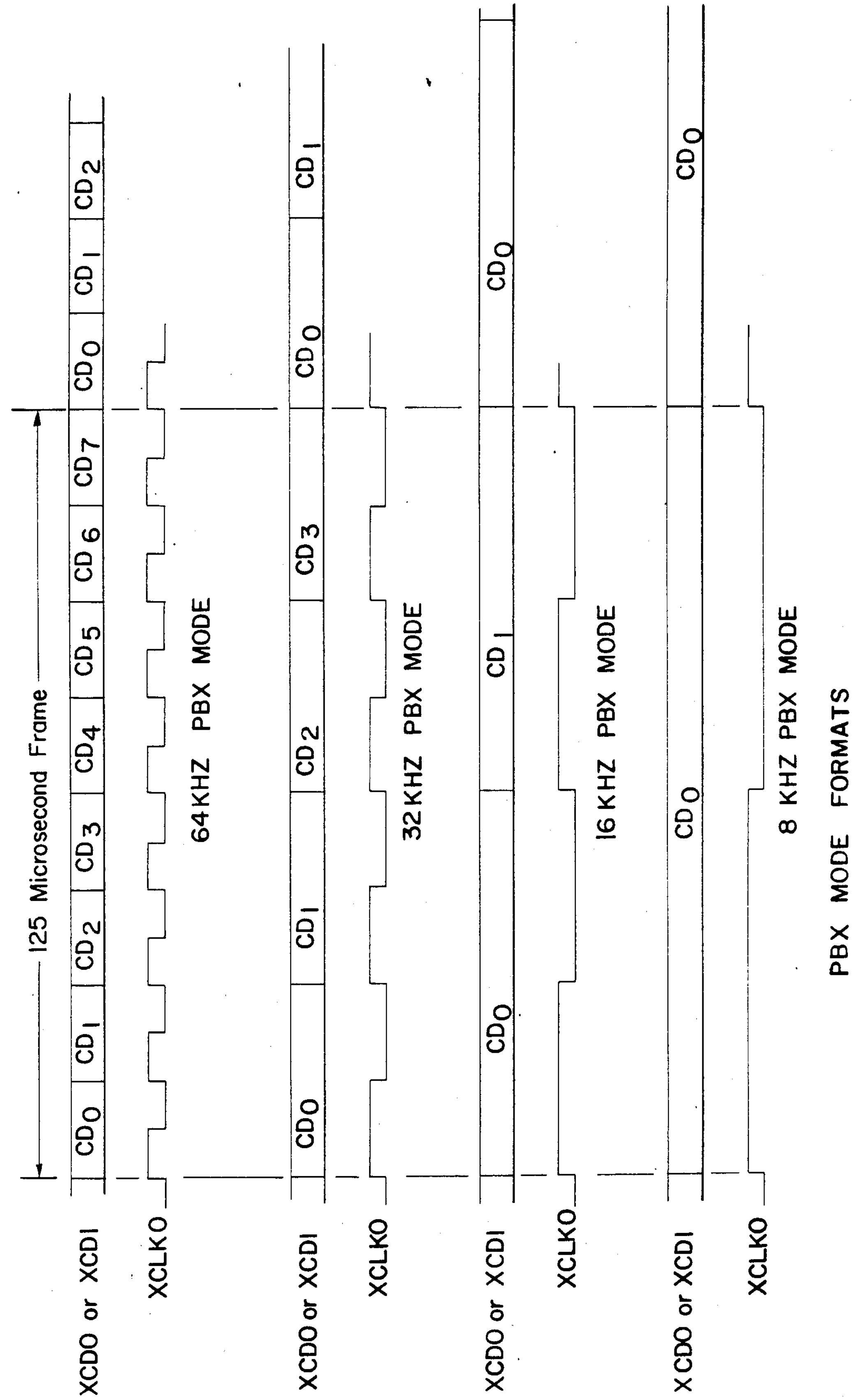
FIG. 49 is a timing diagram exemplifying the relationship between the lower rate PBX data formats and the 64 kHz PBX data formats.

The clear channel logic 625 also functions to generate data in synchronous or asynchronous formats, and at multiple data rates for each format. As previously described, the clear channel asynchronous, synchronous and terminal rate logic 625 receives data from the clear channel serial data rate conversion logic 624 as eight bits of 64 kHz data per frame or as sixteen bits of 128 kHz data per frame. This data can be transmitted directly to the channel 1 output XCDO typically after a delay of one frame. Thus, the data is clocked into the MTC 611 at 192 kHz during one frame and clocked out at the selected PBX data rate on the next frame. In the 128 kHz PBX mode, the sixteen data bits are transmitted to the device 614 connected to the channel 1 output, XCDO. Similarly, sixteen bits of data can be received from the device 614 in one frame and be transmitted to the system node 602 during the next frame. In the 64 kHz PBX mode, eight bits of data can be transmitted in one frame to the device 614 connected to channel 1 output, XCDO, As shown in FIG. 49, the channel 1 logic 624 and 625 can also operate in 8 kHz, 16 kHz or 32 kHz PBX modes. In those modes, one, two or four bits, respectively, per frame are transmitted to and received from the device 645 connected to the clear channel logic 625. Data is clocked out on the data output line, (XCDO), and is clocked in on the data input line, (XCDI) 670. Typically, the output data is clocked out on the falling edges of XCLKO and the input data is clocked in on the rising edges of XCLKO.

For non-PBX rates (synchronous or asynchronous), the MTC functions to append framing signals to the signal from the clear channel device and communicates that combined signal to the system interface. By the reverse of that procedure the receiving station can extract the same amount of information and thereby duplicate the original signal through the use of conveniently sized signal channel. Moreover, as detailed below the number of appended bits can be monitored and adjusted, as necessary, to correct for any variations where the local device is providing the clocking for the signal it transmits to the MTC, as occurs in the asynchronous mode. Such "bit stuffing" and bit monitoring is unnecessary where the local device operates at a PBX rate, which can be readily synchronized with the entire system.

Figure 50:
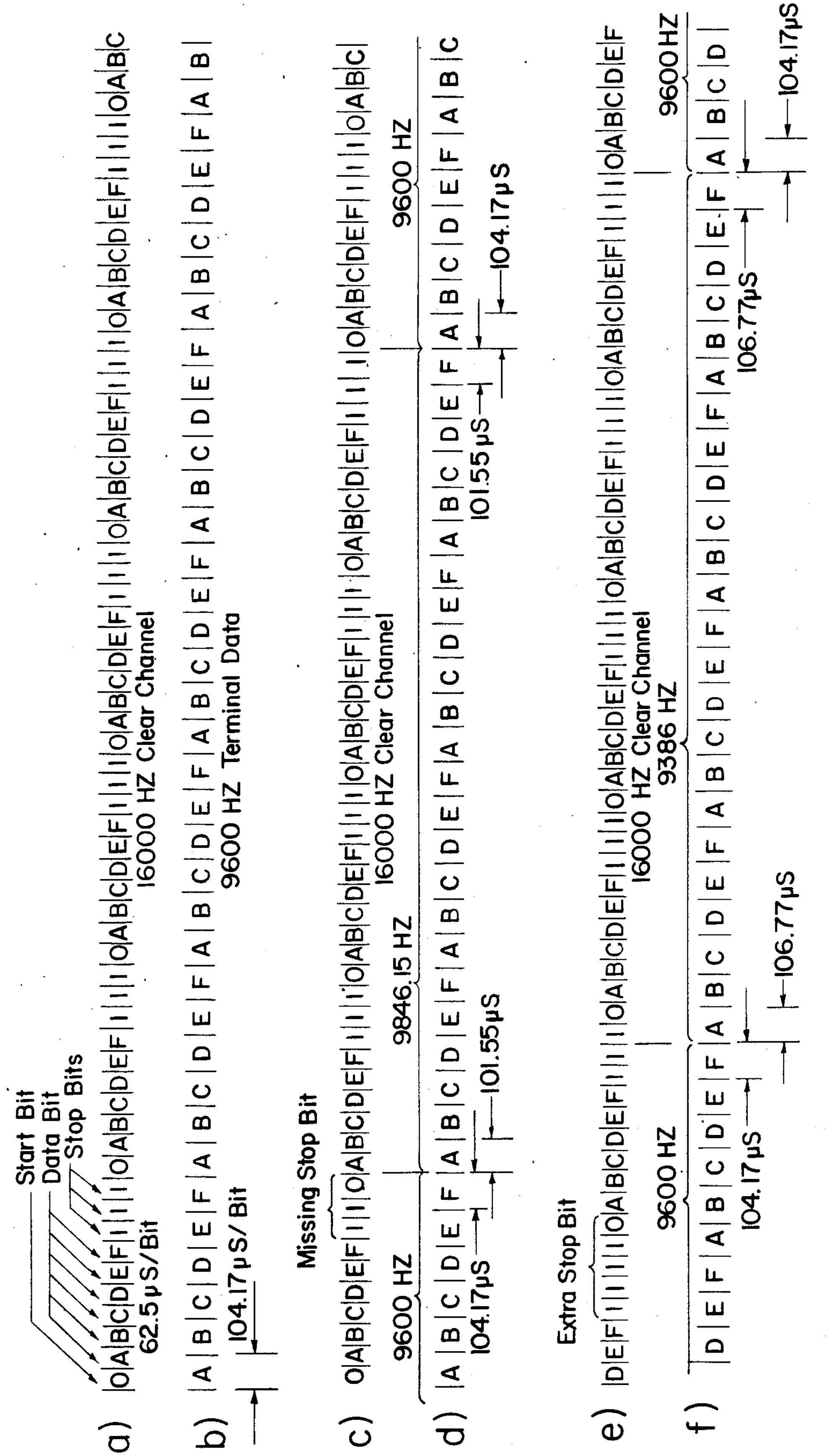
FIG. 50 is a timing diagram exemplifying the resynchronization of terminal data when a missing stop bit or an extra stop bit is received by the MTC.

In the synchronous terminal mode of operation the format of the data character constructed by the MTC is typically a start bit, a six-bit character and three stop bits, for a total of ten bits per character. This is depicted in FIGS. 50(*a*) and 50(*b*) which illustrate data received from the system node 602 as 16 kHz data which is to be transferred to the station device 614 as 9.6 kHz data. In the synchronous mode the clear channel asynchronous, synchronous and terminal rate logic 625, shown in FIG. 44, detects the start bit and counts the number of bits until it receives the first stop bit. The start bits and stop bits typically are not used by the device 614 connected to the MTC. The remaining six-bit character can be buffered for the duration of two characters, and then shifted out to the device 614 connected to the channel 1 output XCDO at the selected data rate. The data rate typically can be 19.2 kHz, 9.6 kHz, 4.8 kHz, 2.4 kHz or 1.2 kHz. The output data can be synchronized to the device 614 with the data clock output, (XCLKO).

In the synchronous terminal mode (i.e. MTC provides clock), the data from the device 614 connected to the channel 1 logic 625 is clocked into the MTC with the MTC data clock output, (XCLKO). The synchronous data from the device 614 is continuous; however, the MTC operates with the incoming data as if it were 6-bit characters. After six bits of data are shifted into the MTC, a start bit and three stop bits are typically added to form a character consisting of ten bits. (See FIG. 50(*a*).) The MTC can be programmed to increase or reduce the number of stop bits depending upon the data rate of the clear channel device. That data character is typically transferred to the system interface 621 at the next highest PBX data rate compared to the data rate of the signal from terminal 614. Thus, if the terminal data rate is 9.6 kHz, the data is transferred to the system interface 621 at 16 kHz. Similarly, 19.2 kHz terminal data is transferred at 32 kHz PBX rate. Terminal data at 4.8 kHz, 2.4 kHz and 1.2 kHz is transferred at 8 kHz PBX rate. Data is typically transmitted to and received from the system node 602 at the same rate (i.e. 192 kHz) for any of the various MTC internal PBX modes. The data between the PBX data rate logic and the terminal data rate logic within the clear channel asynchronous, synchronous and terminal logic 625 can be buffered to allow for the varying data rates.

Although the signal to the system node is typically maintained at a constant data rate, i.e. one message frame every 125 microseconds, the valid informational content of the message frame will vary in accordance with the particular data rates of the MTC as interconnected to each given device. At the 32 kHz PBX rate mode, the data is transferred to the system node 602 at four-bits bandwidth per frame. In the 16 kHz PBX node two bits per frame are transferred and in the 8 kHz bandwidth mode on bit per frame is transferred. The system node that receives the variable bandwidth of valid information typically receives programming information indicating the number of valid information bits in each portion of the message frame and can discard the remaining information. The receiving MTC is configured the same as the transmitting MTC and is interconnected to a device typically operating at the same speed as the transmitting device. Therefore, the same portion of the message frame that contains valid information is extracted and communicated to the interconnected device.

Referring again to FIGS. 44 and 50, in the synchronous terminal mode where the external device 614 provides the data input clock, data is received from the device 614 on the data input line (XCDI). The data is clocked into the MTC 611 in synchronization with the terminal data clock (XSCLI). The data is formatted for transmission to the system node 602 as set forth in the foregoing description of the synchronous terminal mode where the data was clocked in using the MTC data clock output.

Since the XSCLI clock may vary with respect to the MTC terminal clock output, potentially the variations in clock rates between the MTC 611 and the terminal device 614 can cause a loss of synchronization and, therefore, a loss of information. If the terminal device clock XSCLI is faster than the MTC terminal clock by a small amount, the data from the terminal device 614 will be received on XCDI at a higher rate than the MTC transfers the data to the system node 602. Similarly, if the terminal device clock is slower, the MTC will be transmitting data to the terminal device at 614 a rate slightly higher than the device 614 can receive it. The clear channel asynchronous, synchronous and terminal rate logic 625 automatically corrects for the variations in the data rate from the terminal device 614 and thereby prevents the loss of any data. The details of the structure provided to monitor and correct for variations in the bit rate is provided below in connection with FIG. 41(*d*). The discussion immediately below describes the functions performed by that structure upon the occurrence of the stated conditions.

If the external terminal clock on XSCLI 668 is faster than the MTC clock, the clear channel asynchronous, synchronous or terminal rate logic 625 will occasionally send out a character on the 16 kHz clear channel which has a stop bit missing. In other words, the formulated character will consist of a start bit, six character bits, and two stop bits, rather than three stop bits. The start bit of the succeeding character will start in the location where the third stop bit would have been. See FIG. 50(*c*). In this manner, the MTC is able to continue inputting data at the rate of the terminal. After the character is transmitted, the remaining characters return to the typical mode of one start bit, six character bits and three stop bits per character.

The clear channel asynchronous, synchronous and terminal rate logic 625 in the MTC 611 receiving the data with a missing stop bit, can detect the missing stop bit because the count between start bits will consist of nine rather than ten bits. When the missing stop bit is detected, the clear channel asynchronous, synchronous and terminal rate logic 625 will increase the data clock, XCLKO, to the terminal by a factor which will allow its terminal device 614 to maintain pace with the received data. As illustrated in FIG. 50(*d*), the clear channel asynchronous, synchronous and terminal rate logic 625 will increase the transmit clock, XCLKO, to the terminal device 614 from 9.6 kHz to 9.84615 kHz for the duration of 24 terminal bit periods. At the end of the 24 terminal bit periods, the data to the terminal device 614 should be caught up with the 16 kHz clear channel data and the transmit clock, XCLKO, to the terminal device 614 is again adjusted to 9.6 kHz. When the next character with a missing stop bit is received, the transmit clock, XCLKO, to the terminal device 614 will again be adjusted for 24 bit periods to re-synchronize with the clear channel data.

If an MTC 611 connected to a terminal device 614 which supplies its own clock does not receive data fast enough from that terminal device 614, the clear channel asynchronous, synchronous and terminal rate logic 625 will occasionally insert an extra stop bit in the ten-bit character being transmitted to the system node. This is illustrated in FIG. 50(*e*). Thus, the MTC will occasionally transmit a character consisting of eleven bits. When that data stream is received by the receiving MTC 611 elsewhere in the system, the clear channel asynchronous, synchronous and terminal rate logic 625 in the receiving MTC 611 will temporarily adjust the transmit clock, XCLKO, for the data being transmitted to its terminal device 614 to 9.3685 kHz. As seen in FIG. 50(*f*), after transmitting 24 bits of terminal data at the lower rate, the clock is again adjusted to 9.6 kHz and the data transmitted to the terminal device 614 is again in synchronization with the 16 kHz clear channel data.

The fast clock, which synchronizes the terminal data as illustrated in FIG. 50(*d*), can be derived from the 768 kHz system clock by first multiplying the system clock by a factor of two to 1.536 MHz and then dividing the times-two system clock by 156 to obtain a 9.84615 kHz signal. The normal data rate clock at 9.600 kHz can be derived in the like manner by dividing the 1.536 MHz by 160. Finally, the slow data rate clock of 9.3685 kHz, which synchronizes the terminal data as illustrated in FIG. 50(*f*), can be derived by dividing the 1.536 MHz clock by 164. In like manner, if the system is operating at 19.2 kHz, the fast clock can be derived by dividing 1.536 MHz by 78, and the slow clock can be derived by dividing the 1.536 MHz by 82. Since the clear channel data will be received at 32 kHz, the missing or extra stop bits will be compensated for in 24 terminal rate bit periods as was done in the 9.6 kHz mode. It should be clear to those skilled in the art that analogous clock connection schemes using the same or other clock and data rates may be implemented without departing from the scope of the present invention.

The channel 1 asynchronous, synchronous and terminal rate interface logic 625 can also receive data from and transmit data to the terminal device 614 in the asynchronous mode at 19.2 kHz, 9.6 kHz, 4.8 kHz or 2.4 kHz. The data can be typically transmitted and received in message lengths of 6, 7, 8, 9, 10, 11 or 12 bits. In the presently preferred embodiment, the MTC 611 has an internal clock generated by the clear channel serial rate conversion logic 624 which samples the incoming data from the terminal device 614. The sampling of the incoming message is done by using a clock operating at ten times the incoming data rate and synchronizing on the start and stop bits. As with the synchronous terminal data, the data is typically transmitted to the system node at the next higher PBX data rate.

The clear channel asynchronous, synchronous and terminal rate logic 625 can also be configured to operate in the loopback mode. In this mode, the data out of the clear channel asynchronous, synchronous and terminal rate logic 625 is gated into the clear channel asynchronous, synchronous and terminal rate logic 625 for diagnostic purposes. Typically, data is not transmitted to or received from an external device while logic 625 is in the loopback mode.

Packet channel data is communicated between the system node 602 and the MTC 611 in order to monitor the status of the MTC and interconnected devices, to control the flow and format of data in response to the monitored conditions, and to perform other management functions.

Alternatively, the packet channel can be used as a separate data channel to communicate data between device 614 and some other device or portion of the node, without establishing a circuit path through the node data steering logic. The capability to send data on the packet channel not only provides further data transport capacity, but permits direct access to the node processor from the station device 614. Thus, an operator may utilize the services of the node processor to perform analytical or management functions interactively with the transmission or reception of data via the information channels.

Figure 44A:
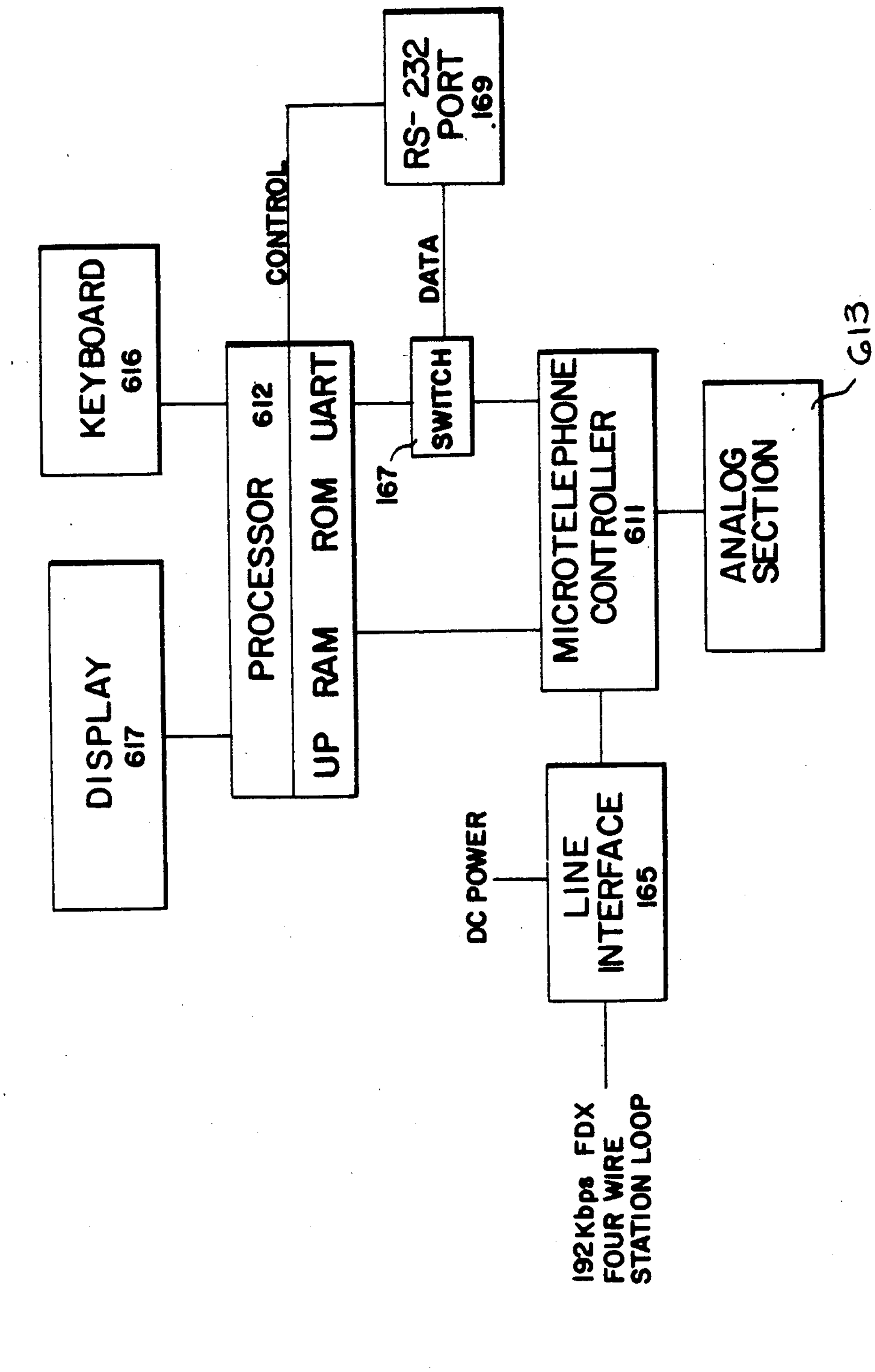
FIG. 44A is a functional block diagram of the MTC and associated teleterminal devices.

This capability is depicted in FIGS. 44 and 44A. Referencing FIG. 44, a user who desires data access to the packet channel would generate a signal at the data device 614 which would be read by the microprocessor 612. The microprocessor would then enable a switch to communicate the information from the clear channel interface to the microprocessor, where it could be communicated to the packet channel logic 622 via the microprocessor interface 623.

The capacity to send data signals via the packet channel is further illustrated at FIG. 44A. In that figure data is communicated from a station device connected to RS-232 port 169 to switch 167. The switch 167 can either communicate data directly to the microtelephone controller 611, where it is communicated as packet switch data. If the user activates designated keys in the station device, a microprocessor will recognize that signal as a request to access the packet channel and will disable the packet channel connection to the microtelephone controller 611. When packet channel access is indicated, the data from the RS-32 port 169 will be communicated to the microprocessor 612 which will format the data for transmission to the packet channel connection to the microtelephone controller 611. Circuit switch data and packet channel data are communicated to the node via the node interface 165. Voice data is communicated to analog section 613.

The capabilities provided by the alternative communication paths dramatically enhance the functional capacity of the teleterminal without necessitating cumbersome and inconvenient connections to the system node. The user may communicate with a distant station via the packet switched channel while viewing control information on a display 617, on a printed page generated by keyboard 616 and/or while conversing with a distant station via analog section 613. Details of synchronization of the various communication paths are provided below.

The synchronization and monitoring provided by the packet channel logic facilitates synchronization of the MTC with the operation of the node, and is beyond the station device synchronization techniques implemented by the clear channel logic, as previously described. In the preferred embodiment, packet channel data from the system node 602 is configured according to the convention provided below. It is, however, understood that various other conventions may be implemented without departing from the scope of the invention.

Figure 45:
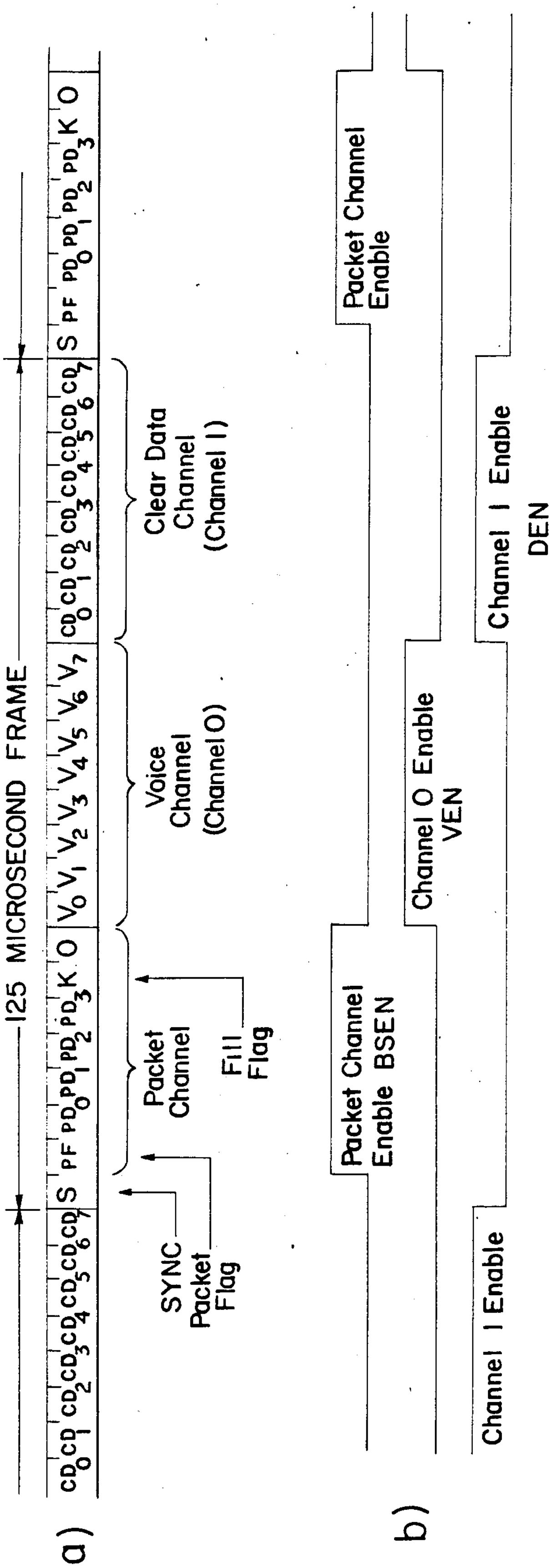
FIG. 45 is a timing diagram exemplifying the relationship between the data format received by the MTC and the internally generated synchronization signals.

The packet channel logic 622 monitors the six bits following the sync bit. FIG. 45 illustrates a typical format for the packet data in a frame. If the second bit in an information frame is set (0), the packet flag (PF) is active, indicating that the system node is sending packet data to the MTC. If the seventh bit, K, is reset (1), the four bits of packet data are active data rather than fill data. If PF is set and K is reset, the packet channel logic 622 will load the four bits of packet data into a shift register in logic 622. When an additional four bits of packet data are received with PF set and K reset, the packet channel logic 622 sets the input ready flag which can be read by the microprocessor 612 by accessing the status register of the MTC. The microprocessor 612 then executes a packet data read to input the data prior to the accumulation of the next eight bits of packet data by the packet channel logic 622. If the microprocessor 612 does not read the packet data within 250 microseconds and the system node 602 has transmitted eight additional bits of data, an overrun flag bit will be set to indicate the occurrence of this condition. Any data received with the packet flag active and the K flag active (set) can be ignored as fill data. When the packet flag goes inactive, the packet channel logic 622 will check a counter to determine whether an even number of four-bit nibbles have been received by the MTC. If an odd number of nibbles are received, the underrun flag can be set to indicate that a complete message was not received.

The packet data received by the MTC 611 with the packet flag active and the K flag inactive is also gated through cyclic redundancy checking logic (CRC) 716 in packet channel logic 622. (See FIG. 51(*a*).) The last sixteen bits of data (two bytes) received by the MTC 611 prior to the inactivation of the packet flag are typically error-checking bits generated by the CRC in the system node 602. When the inactive packet flag is received, the output of the CRC should be all zeros, indicating that a valid message was received. If the output of the CRC is not all zeros, the CRC error flag is set by the packet channel logic 643 to indicate the occurrence of an error in the received data. Notwithstanding the condition of the CRC outputs, the packet channel logic 643 sets the end of message status bit to indicate to the microprocessor 612 that the message is completed.

Packet data to the system node 602 typically is received by the MTC 611 from the telset microprocessor 612 as eight-bit bytes. The eight-bit bytes are typically accumulated in the MTC 611 and then communicated to the system node in four-bit nibbles as packet data. The data to the node is routed through an internal CRC generator described below in connection with FIG. 51(*a*). If the MTC 611 does not receive an additional eight bits from the microprocessor 612 before the start of the third frame following receipt of the first 8 bits, the packet channel logic 611 typically presumes that the microprocessor 612 has no further data to send to the system node 602. The packet channel logic 43 then sets a busy flag which indicates to the microprocessor 612 that the microprocessor should not send further packet data to the packet channel logic 622. The packet channel logic 622 then appends the internally generated CRC data to the last message sent. Four frames are typically required to send the sixteen bits of CRC data in the four-bit packet data location in the message frames. The busy flag remains set during those four frames and typically for two extra frames following the completion of the transmission. The packet flag is typically inactivated at the end of the sixteen bits of CRC data. The extra two frames of delay are optionally provided to allow the system node 602 to perform any processing which it may require at the end of each message. The MTC packet channel logic 622 need not utilize the K flag for transmission to the system node 602 since it does not have to send fill data. However, in alternative embodiments of the MTC, the K flag can be used to allow the microprocessor 612 to temporarily quit sending data to the MTC 611 without causing the packet channel logic 622 to terminate the message as described above.

Referencing FIGS. 44 and 51(*a*), the microprocessor interface 626 can receive parallel data from and send parallel data to the telset microprocessor 612 on eight data lines, PD7-PD0. The functions performed by the MTC are typically determined by the address information on lines PA5-PA0, the select line, IOS, and the read/write control line, RW. If the address lines and select line from the microprocessor 612 select the MTC 611, the microprocessor interface logic 623 can cause the MTC to transfer data to (RW=0) or receive data from (RW reset) the microprocessor 612 when the enable line, E, is activated by the microprocessor 612. The microprocessor interface 623 can also respond to certain commands from the microprocessor 612 by generating enable signals to devices connected to the TELSET 601. When an enable signal to an external device is activated, the MTC 611 typically does not receive data from or send data to the microprocessor 612.

Detailed Descriptions of the Functional Units

A more detailed description of the particular circuits that may be implemented to perform the above mentioned functions of the MTC will be set forth below in connection with FIGS. 51(*a*)–51(*e*) and 52.

System Interface

FIG. 51(*a*) shows a detailed block diagram of the system interface 621 and the packet channel logic 622, shown more generally in FIG. 44. Data is received from the system node in the form of biphase mark encoded data, sometimes referred to as biphase Manchester encoded data. The generation and decoding of biphase mark encoded data is well-known in the art. A brief description of the characterization and manner of processing such data is set forth below.

Figure 51A:
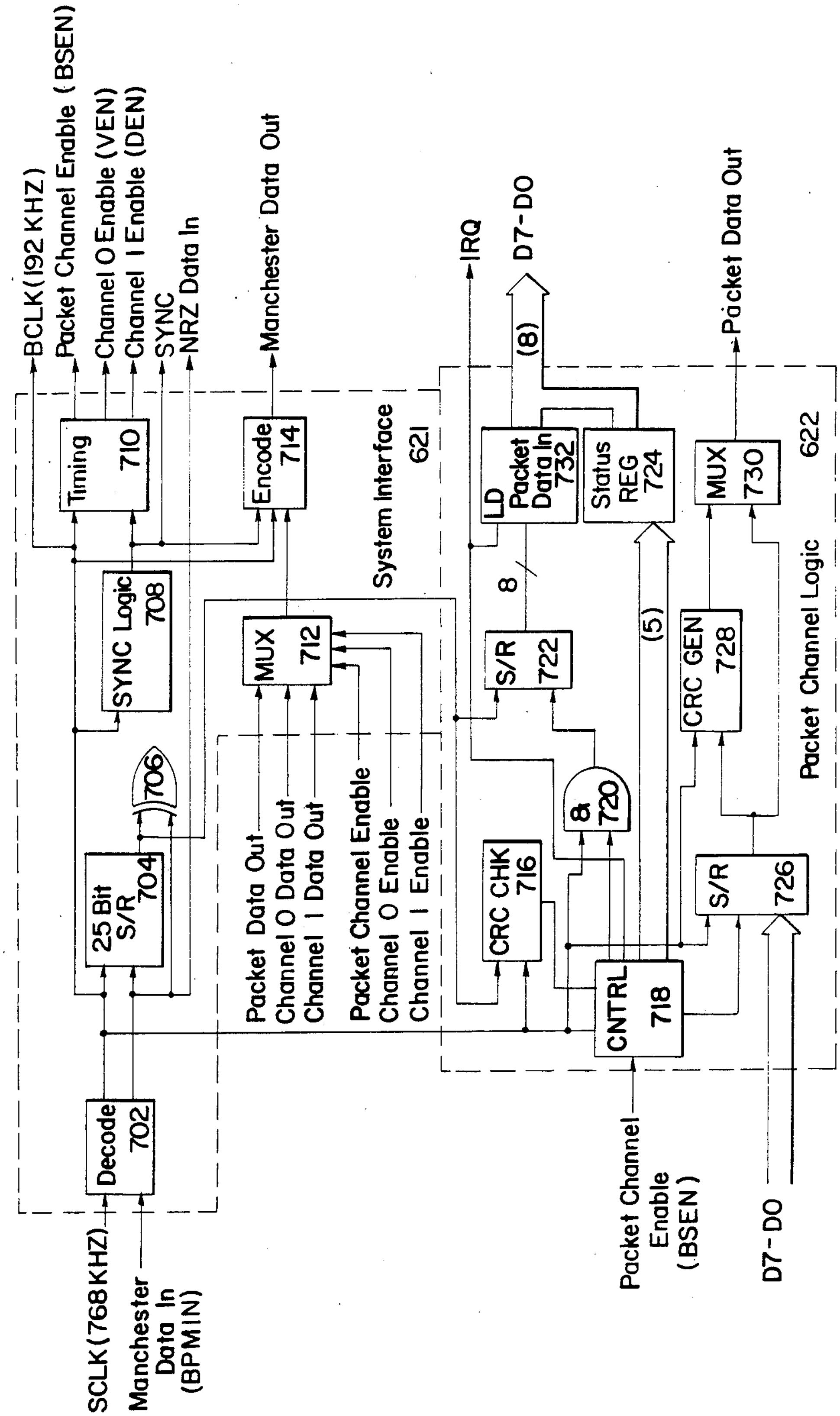
FIGS. 51(*a*), (*b*), (*c*), (*d*) and (*e*) are more detailed block diagrams of the functional units of the MTC generally illustrated at FIG. 44.
Figure 51B:
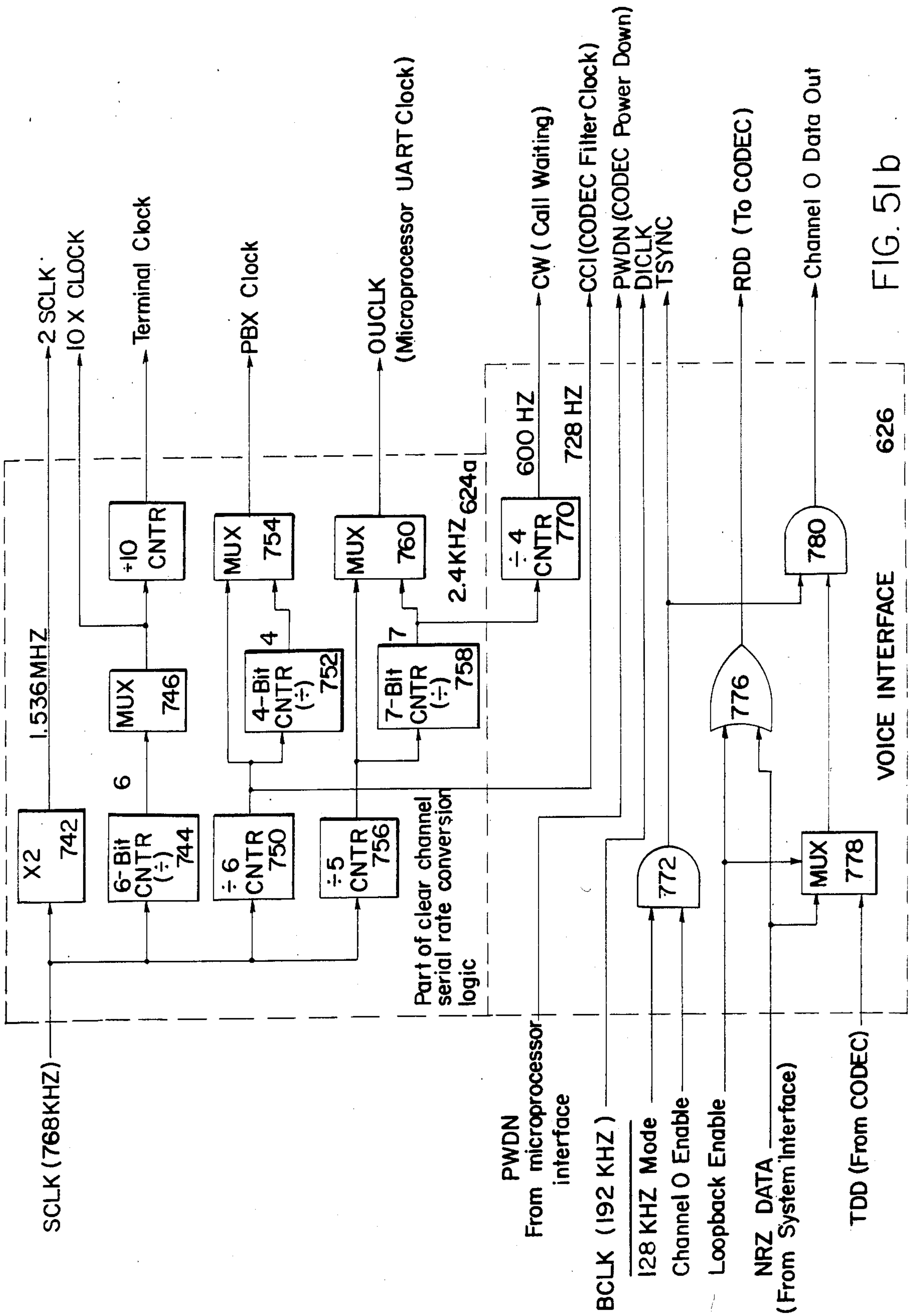
Figure 51C:
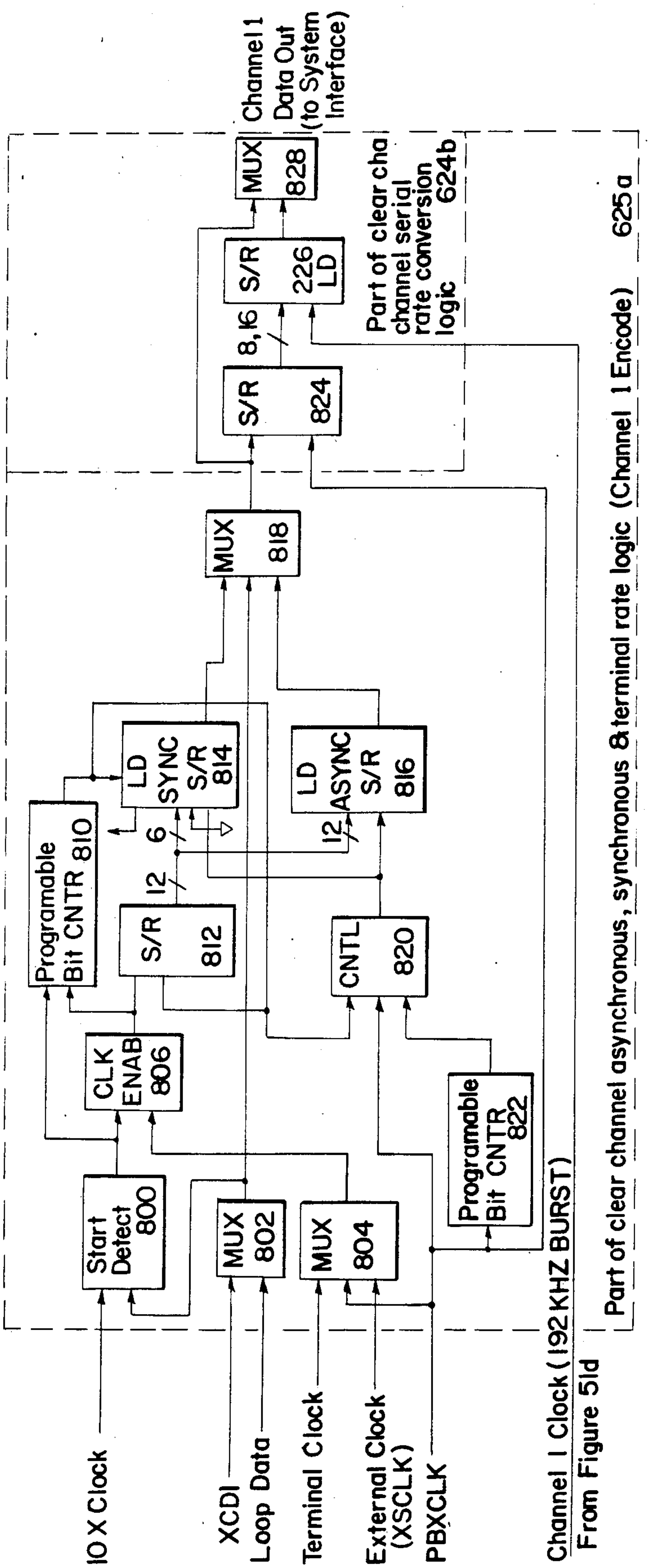
Figure 52:
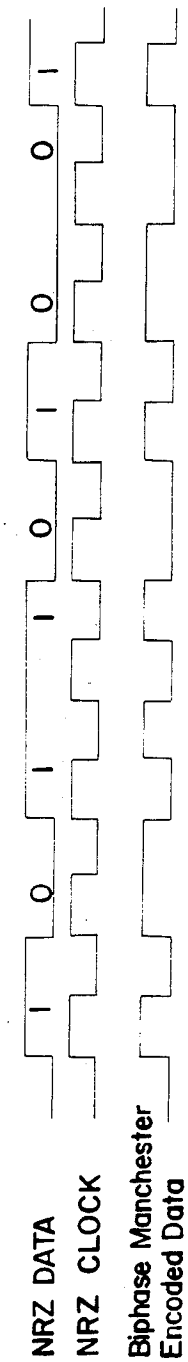
FIG. 52 is a timing diagram showing the relationship between biphase mark encoded data and NRZ data.
Figure 51D:
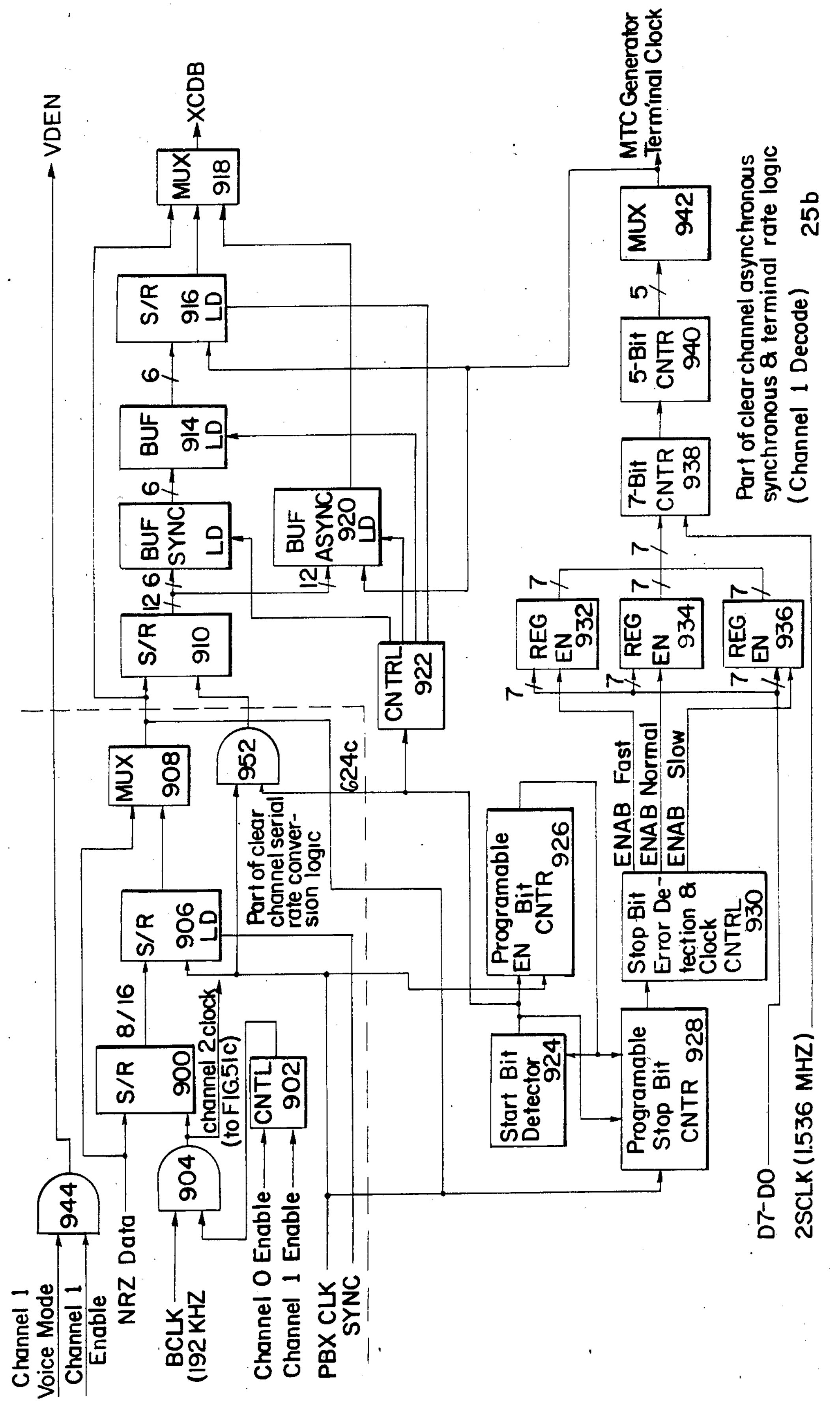
Figure 51E:
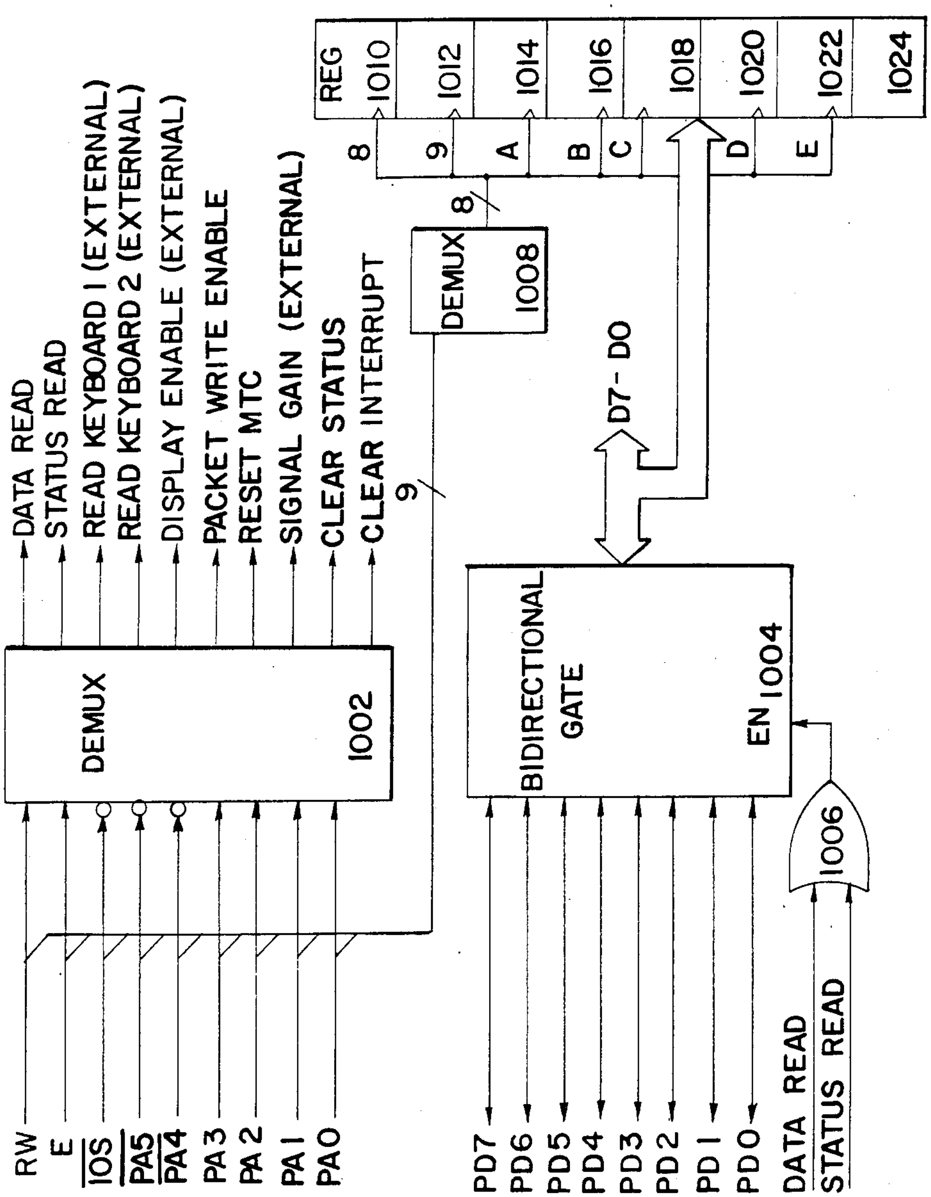

As seen in FIG. 52, biphase mark encoded data can be characterized by having at least one data transition per bit period. Nonreturn-to-zero (NRZ) data can be characterized as having the bit value represented by the logic level of the signal throughout the duration of the bit time (i.e., a 1 is represented by a high voltage level and a 0 is represented by a low level). In order to extract the NRZ data, the receiving device typically must also receive a clock or other synchronization signal to define the bit periods. The biphase mark encoded data can be transmitted without a clock since each bit position has at least one transition. If two transitions occur in one bit position, the decode logic 702 (FIG. 51(*a*)) of the system interface outputs a logic one in the NRZ format. If only one transition occurs in a bit position, the decode logic 702 outputs a zero in the NRZ format. An NRZ clock is typically generated by the decode logic 702 to synchronize the NRZ data with the MTC logic.

The NRZ data received from the system node is shifted into a 25 bit shift register 704. The twenty-fifth bit of the shift register can be compared with the first bit of the shift register by the exclusive-OR gate 706. When the two bit positions are different, the output of the exclusive-OR is a logic one which indicate that the bit was different in succeeding frames. If this is the first bit position in a frame, the sync logic 708 will output the sync signal that controls the timing chains within the MTC. The timing logic 710 generates three timing signals as shown in FIG. 45. The packet channel enable signal (BSEN) gates the packet data into the packet channel logic 43. The channel 0 (voice) enable (VEN) gates the voice channel data into the voice interface logic 626. The channel 1 (clear channel data) enable (DEN) gates the channel 1 data into the clear channel serial rate conversion logic 624 and into the clear channel asynchronous, synchronous and terminal rate logic 625.

Multiplexor 712 in the system interface 621 can also receive data from the packet channel 622, the voice interface 626 and the clear channel logic 624. That data can be gated out of the MTC through the encode logic 714 as biphase mark encoded data.

Packet Channel

The packet channel logic 622 receives the NRZ data and clock from the system interface 621. The data is typically gated into the control logic 718 when the packet channel enable signal is active. The control logic 718 detects whether there is an active packet flag (PF) and whether the fill flag is inactive. If both conditions are met, the data is gated into an eight-bit shift register 722 in the packet data in logic 732 through AND-gate 720 at a rate of four bits per frame. When eight bits of packet data are accumulated, the data input ready status bit can be set and an interrupt request can be sent to the microprocessor 612 via the microprocessor interface 623 shown at FIGS. 44 and 41(*e*). An interrupt is generated once every two frame times, synchronized with the active signal on VEN. If the data byte ready bit occurs in the odd frame, the interrupt will synchronize to it. This adjustment only occurs once (i.e., on the first byte received). The output of shift register 722 is loaded into input register 732. The occurrence of the ready bit informs the microprocessor that it should perform a status read to determine what condition has occurred. The microprocessor reads the packet data input via the microprocessor interface 623 before the accumulation of the next eight-bit byte of data in the packet data logic 622. If the packet data is not read before the accumulation of the next eight bits, the overflow status bit is typically set.

The valid data received by the packet channel is also gated through the CRC checking logic 716. The CRC checking logic 716 accumulates the four bits of data received during each frame in a cyclic redundancy checking circuit. When the data received from the system node has the packet flag reset, the accumulated data in the CRC checker causes the output of the CRC to be zero, indicating that no errors were received in the incoming packet data. If an error was received, the CRC error bit is typically set in the status register 724.

The receipt of the packet data with the packet flag reset can also cause the control logic 718 to set the end of message status bit in the status register 724. If the end of message occurs when only four bits of data have been accumulated in the packet data in shift register 722, a message underflow status bit can be set to indicate that an incomplete message was received from the terminal node. The end of message can also indicate to the microprocessor that the last two bytes of data received were the CRC check bytes generated by the system node and can be ignored as packet data.

The packet channel logic 622 can also formulate packet data to be sent to the system node. The eight bits of data from the microprocessor are loaded into shift register 726 and are shifted out through multiplexer 730 at a rate of four bits per frame. The packet flag can be set by the packet channel logic 622 to indicate to the system node that the packet data is valid. The packet data is also routed through a CRC generator 728 which generates and accumulates CRC data to send to the system node 602 at the end of the message.

When the microprocessor does not send an additional eight bits of data within two frames (e.g. 250 microseconds), the control logic 718 typically resets the packet flag going to the system node and enables the output of the sixteen bits of accumulated CRC data from the CRC generator 728 during the next four frames. The control logic 718 can also set the busy status bit in the status register 724 to inform the microprocessor that the MTC cannot receive any further packet data until the completion of the message transfer. The busy flag typically remains set until two frames following the transmission of the CRC data. The fill flag is typically not used in the above-described mode.

In an alternative embodiment, the control logic 718 will set the fill flag when system interface 621 does not receive an output from the microprocessor within 250 microseconds after the previous microprocessor output. The control logic 718 will cause all ones to be sent in the packet channel and will not route the packet data through the CRC generator 728. The packet flag will not be reset in this alternative embodiment until the microprocessor sends a command to the MTC to indicate that the packet flag should be reset.

Voice Interface

The voice interface logic 626, shown in FIG. 44 and illustrated in more detail as part of FIG. 51(*b*), can generate signals to the codec 613 and transfer data to and from the codec 613. If the MTC is not in the 128 kHz PBX mode, the voice interface generates the TSYNC signal during the channel 0 enable time. During the time that TSYNC is active, the codec 613 can receive the NRZ data from the system interface on the RDD line using the 192 kHz clock on the DICLK line. The TSYNC signal also causes AND-gate 780 to gate NRZ data from the codec 613 (TDD) through multiplexer 778. This data is typically available to the system interface 621 as channel 0 data output to be gated to the system node 602 during the channel 0 time. In the previously described loopback mode, multiplexer 778 selects the NRZ data from the system interface 621 to be gated back to the system interface 621. In the loopback mode, the loopback input to OR-gate 776 typically forces all 1's on the read data line, RDD to the codec 613.

Clear Channel Serial Rate Conversion Logic

The clear channel serial rate conversion logic 624 shown in FIG. 44 is illustrated in more detail as parts of FIGS. 51(*b*), 51(*c*) and 51(*d*). It can convert the system clock of 768 kHz to the various clock rates required by the other logic in the MTC. FIG. 51(*b*) is a block diagram of the clock generation circuitry of the clear channel serial rate conversion logic 624(*a*). The times-two logic 742 multiplies the system clock by two to create a 1.536 MHz clock to be used by the clear channel asynchronous, synchronous and terminal rate logic 625. The terminal clock is generated by the six-bit counter 744, the multiplexer 746 and the divide-by-ten counter 748. The counter 744 generates clock rates which are ten times the terminal clock rate. The multiplexer 746 will select the appropriate rate, and the divide-by-ten counter 748 will convert the rate to the terminal clock rate. The output of multiplexer 746 is also available as a times-ten clock for the start detection logic in the asynchronous mode.

The divide-by-six counter 750, the four-bit counter 752 and multiplexer 754 generate the PBX clock. The multiplexer 754 can select the 128 kHz output of counter 750 for the 128 kHz mode. Otherwise, the multiplexer can select one of the four outputs of the four-bit counter 752 for the 64 kHz, 32 kHz, 16 kHz, or 8 kHz PBX mode.

The divide-by-five counter 756 and the seven-bit counter 758 can generate a times-eight clock for the microprocessor universal asynchronous receiver and transmitter (UART). The selectable output of 153.6 kHz, 76.8 kHz, etc. can provide the times-eight clock typically required by the microprocessor UART on line OUCLK. In addition, the 2.4 kHz output of the seven-bit counter 758 is the input to the divide-by-four counter 770 in the voice interface logic 626. Counter 770 generates the 600 Hz call waiting signal which is available on line CW.

Clear Channel Asynchronous, Synchronous and Terminal Rate Logic

FIG. 51(*c*) is a detailed block diagram of the channel 1 encode logic 625(*a*) and part of the clear channel serial rate conversion logic 624(*b*). The encode logic 625(*a*) is part of the clear channel asynchronous, synchronous and terminal rate logic 625 shown in FIG. 44. Encode logic 625(*a*) can receive data from the terminal device 614 and prepare it for transmission to the system node 602. In the asynchronous mode or in the terminal mode where the MTC provides the clock, the terminal clock is selected. In the synchronous mode with an external clock, XSCLI, the external clock is selected. In the PBX mode, the internal PBX clock is selected. Multiplexer 802 selects either the input data from line XCDI in non-loopback modes, or from the NRZ output in the loopback mode. The start detector 600 can be used in the asynchronous mode to detect the occurrence of the start bit in the asynchronous data. Start detector 800 can utilize the 10X clock to sample the incoming data until the start bit is detected. The output of the start detector enables the selected clock through the clock enable circuitry 806. The selected data from multiplexer 802 is shifted into shift register 812 utilizing the clock generated by the clock enable circuitry 806. The programmable bit counter 810 can function to determine when a full character of data has been received and can load the data into the synchronous shift register 814 and the asynchronous shift register 816.

As described above, six bits of data per character are typically transmitted by the terminal device 1014 in the synchronous mode. Therefore, shift register 814 is typically loaded with the six bits of data and the start bit and the first stop bit. In the asynchronous mode, the entire character of data typically will be transmitted to the system node 602. Therefore, up to twelve bits of data can be loaded into the shift register 816 from shift register 812.

In the terminal mode, control logic 820 can receive inputs from programmable bit counter 822 and programmable bit counter 810 to determine when the data in synchronous shift register 814 and asynchronous shift register 816 should be clocked out at the PBX data rates. Multiplexer 818 can select either the asynchronous data from shift register 816, the synchronous data from shift register 814, or the direct data input from multiplexer 802. The direct data input is selected in the PBX mode or in the second voice channel mode. The data from multiplexer 818 can be shifted into shift register 824, which is part of the clear channel serial rate conversion logic 624(*b*) also shown in FIG. 51(*b*), at the PBX data rate. If the data received is an additional channel of voice data, the output of multiplexer 818 is a direct input to multiplexer 828 to be shifted out during the channel one enable time at the system data rate. Shift register 826 can be loaded with the output of shift register 824 and can be shifted out serially at the 192 kHz data rate. The data shifted into shift register 824 and shifted out of shift register 826 is typically eight bits length. In the 128 kHz PBX mode, sixteen bits of data may be shifted into shift register 824 and out of shift register 826 during the channel 0 and channel 1 enable times. In the 128 kHz PBX mode, the channel 0 voice interface logic is typically disabled.

As previously described, the number of bits transmitted and received by the MTC in the preferred embodiment in each 125-microsecond frame is constant, i.e. 24 bits; however, the MTC accommodates the different data rates by varying the number of valid data bits transmitted or received during each frame. For example, in the 64 kHz PBX mode, the eight bits labelled CD7-CD0 are valid data bits. (Eight bits per frame times 8,000 frames per second equals 64,000 bits per second.) To accommodate the 128 kHz PBX data rate, the MTC must disable the voice channel and use the eight bits of voice channel data, V7-V0, as additional clear channel data bits. Conversely, if less than a 64 kHz data rate is required, the MTC does not utilize all eight bits in the clear channel portion of the message frame. For instance, in the 32 kHz PBX mode, the MTC will transmit and receive valid data with bits CD3-CD0, and bits CD7-CD4 will be undefined. Although bits CD7-CD4 will be transmitted, the system node will be programmed to ignore them, just as the MTC will ignore bits CD7-CD4 when received. Since the system node will ignore the bits, they will not occupy part of a system time slot.

FIG. 51(*d*) is a detailed block diagram of the channel 1 decode logic 625(*b*) which forms part of the clear channel asynchronous, synchronous and terminal rate logic 625, and is also a detailed block diagram of the clear channel serial rate conversion rate 624(*c*), both generally shown in FIG. 44. In the normal mode of operation NRZ data and the 192 kHz system clock can be received from the system interface 621 by shift register 900 in the clear channel serial rate conversion logic 624. In the second voice channel mode, the NRZ data can be gated through multiplexer 908 and multiplexer 918 directly to the output where it is shifted out during the channel 1 enable time. Circuits within the clear channel serial rate conversion logic, represented by AND-gate 944, can generate the voice data enable signal (VDEN) which gates the data out during the channel one enable time. In all other modes, the NRZ data from system interface 621 can be shifted into shift register 900 by the 192 kHz system clock during the channel 1 portion of the message frame. The output of control logic 902 enables the 192 kHz clock for eight (normal mode) or sixteen (128 kHz mode) clock periods through the logic represented by AND-gate 904. Responsive to the output of AND-gate 904, shift register 900 receives eight bits of data, in the normal mode, or sixteen bits of data in the 128 kHz PBX data mode. Shift register 906 can be loaded once per frame with the output of shift register 900. The data shifted out of shift register 906 at the PBX clock rate is input to multiplexer 908.

In the PBX rate modes, multiplexer 918 of the clear channel asynchronous, synchronous and terminal rate logic 625(*b*) can select the output of multiplexer 908 for direct output to the terminal device. In the synchronous or asynchronous terminal modes, the output of multiplexer 908 can be shifted into shift register 910 of the clear channel asynchronous, synchronous and terminal rate logic 625(*b*) at the PBX clock rate. The number of clock edges required to gate shift register 910 can be determined by the start bit detector logic 924. That logic searches for the occurrence of the first start bit and can shift data into shift register 910 until the occurrence of the next stop bit. In the asynchronous mode multiplexer 918 selects the output from asynchronous buffer 920 for terminal communication to the terminal devices. In the synchronous mode, multiplexer 918 selects the output of shift register 916. In either the synchronous or asynchronous terminal modes, the output rates may be monitored and controlled as described below.

The output of the programmable bit counter 926 can also control the programmable stop bit counter 928. Counter 928 can count the number of stop bits from the last data bit until the occurrence of the next start bit as indicated by detector 924. The output of the stop bit counter 928 is input to the stop bit error detection and clock control circuit 930. In the presently preferred embodiment the stop bit counting and detection circuitry operates to provide a nominal output when three stop bits are detected. If three stop bits are detected, the enable nominal clock rate signal typically enables the output of register 934 to the seven-bit tri-state bus which is input to the seven-bit counter 938. If less than three bits are detected, the enable fast clock output of clock control circuit 930 can enable the seven-bit output of register 932 to the tri-state bus. If more than three stop bits are detected, the enable slow output of clock control logic 930 can enable the seven-bit output of register 936 to the tri-state bus. The tri-state registers 932, 934 and 936, are loaded with a seven-bit value which represents a value by which the 1.536 MHz clock is to be divided to generate the terminal clock frequency as previously described. The registers can be loaded with the contents of the least significant seven bits on the data lines (D6-D0) by a write command from the microprocessor 612. In the preferred embodiment, the fast frequency register is typically loaded with a value of 39; the nominal rate register is typically loaded with a value of 40; and the slow rate register is typically loaded with a value of 41. At the end of each terminal character output, the seven-bit counter 938 is loaded with the seven-bit value from the selected tri-state register. The 1.536 MHz clock is then divided by that value to result in a frequency of 39,230 Hz for the fast clock, 38,400 Hz for the nominal clock and 37,951 Hz for the slow clock. The clock control logic 930 can enable the fast or slow register output for the duration of 45 terminal bit periods. At that time, the nominal clock rate register will be re-enable until the occurrence of the next extra or missing stop bit. The output of the seven-bit counter is counted down by the five-digit counter 940 to achieve the requisite clock rates for the terminal clock. In the present embodiment, multiplexer 942 can select one of the five clock rates from 5-bit counter 940. If the nominal clock is selected, the output of multiplexer 942 can be 19.2 kHz, 9.6 kHz, 4.8 kHz, 2.4 kHz, or 1.2 kHz. The particular clock rate employed is selected in response to the requirements of clear channel device 1014.

The terminal clock output of multiplexer 942 can clock the asynchronous shift register 920 and the synchronous shift register 916 and can also be sent to the terminal device on XCLKO 666. In the asynchronous mode, the terminal clock is typically the nominal clock frequency, and the output of the asynchronous shift register 920 can be gated through multiplexer 918 to the terminal device on XCDO. In the synchronous mode, the output of the synchronous buffer 912 can be gated through buffer 914 and through shift register 916 before it is shifted out through multiplexer 918 by the MTC terminal clock. As previously described, the terminal clock may be affected by the selection of the fast or slow clock rates. The gating of data from buffer register 912 through buffer 914 into shift register 916 is controlled by control logic 922 to assure that the data is synchronized in the transition from the PBX clock rate of shift register 910 to the MTC terminal clock rate of shift register 916.

FIG. 51(*d*) also illustrates how the MTC accommodates the varying data rates. Shift register 900 receives eight bits of data per frame (sixteen bits per frame is 128 kHz PBX mode) which are shifted in at the 192 kHz system clock rate. At the end of each frame, the data in shift register 900 is parallel loaded into shift register 906. Although at least eight bits of data are loaded into shift register 906 in any of the modes, only the valid data will be serially shifted out of shift register 906. For instance, at the 32 kHz data rate, shift register 906 will only receive four clock edges in the interval from the time it is loaded at the end of one frame until it is loaded again at the end of the next frame. Thus, the invalid data bits do not get shifted out of shift register 906 to be propagated through the MTC.

In the synchronous terminal mode, synchronous buffer 912 strips the start bits and stop bits from the incoming data stream by only loading the six bits of data following the start bit which have been shifted into shift register 910. Thus, only six of the ten bits that were shifted into shift register 910 at 32 kHz will be shifted out of shift register 916 at 19.2 kHz.

Microprocessor Interface

The microprocessor interface 623 is shown in FIG. 51(*e*). Referencing FIG. 44 also, the microprocessor interface 623 can receive parallel data from and send parallel data to the telset microprocessor 612. The microprocessor interface 623 can decode the address lines PA5, PA4 and from the microprocessor 612 to determine whether it is being accessed by the microprocessor 612. The microprocessor interface 623 can decode the least significant four address lines (PA3-PA0) from the microprocessor 612 to determine the function to be performed. The two most significant address lines (PA5 and PA4) typically must both be reset (0) to indicate that the MTC 611 is being accessed by the microprocessor 612. If either or both are set, the MTC does not respond to any of the microprocessor commands. The demultiplexer logic 1002 can decode the microprocessor addresses, PA5, PA4, PA3-PA0, the enable line, E, the input/output select line, IOS/ and the read/write select line, RW to determine the operation to be performed by the MTC 611.

The read/write input, RW, informs the MTC which direction data is being transmitted. If RW is a logic one (read), the microprocessor 612 typically is initiating a read cycle which indicates that the MTC 611 or another device (i.e., keyboards 615 or 616, or display 617) should output data on the data bus. If RW is a logic zero (write), the microprocessor 612 will typically be driving the data bus to provide information to the MTC 611 or to another device. Data between the MTC 611 and the microprocessor 612 can be transmitted and received on the eight bidirectional data lines, PD7-PD0. The enable input, E, determines when the data lines are active during a read or write. The input/output select IOS/ is an additional input which can determine when the MTC should respond. When it is low, the MTC 611 can respond to microprocessor commands.

The operations typically performed by the MTC 611 in response to commands from the microprocessor 612 are summarized in the following exemplary MTC Control Register Definition Table. The addresses shown in hexadecimal format are those addresses decoded from PA3, PA2, PA1 and PA0. The bit assignments refer to PD7-PD0.

MTC CONTROL REGISTER DEFINITIONS

The following table defines each control register bit within the MTC. Descriptions are from the standpoint of a microprocessor accessing the MTC's parallel port, so the symbol IN: refers to data read by the microprocessor from th MTC, and OUT: refers to data written into the MTC.

| ADDRS | BIT | DESCRIPTION |
|---|---|---|
| 00 | 7-0 | IN: SIGNALING DATA |
| | 7-0 | OUT: SIGNALING DATA |
| 01 | 0 | IN: SIGNALING DATA IN READY WHEN LOW |
| | 1 | SIGNALING DATA OUT BUSY WHEN LOW |
| | 2 | SIGNALING DATA IN OVERFLOW WHEN LOW |
| | 3 | SIGNALING DATA IN CRC ERROR WHEN LOW |
| | 4 | SIGNALING DATA IN END MESSAGE WHEN LOW |
| | 5 | SIGNALING DATA IN UNDERFLOW WHEN LOW |
| | 7-6 | NOT USED |
| | XX | OUT: RESET MTC (Does not affect control registers) |
| 02 | 7-0 | IN: READ KEYBOARD MATRIX #1 |
| | 7-0 | OUT: SIGNAL GAIN AND CALL WAITING CONTROL |
| 03 | 7-0 | IN: READ KEYBOARD MATRIX #2 |
| | XX | OUT: NOT USED |
| 04 | 7-0 | IN: DISPLAY READ INTERNAL RAM ADDRESS POINTER |

-continued

| ADDRS | BIT | DESCRIPTION |
|---|---|---|
| | | (DD &CG) |
| | 7-0 | OUT: DISPLAY COMMAND WRITE |
| 05 | 7-0 | IN: READS DATA FROM DISPLAY (DD/CG) |
| | | OUT: WRITES DATA TO DISPLAY |
| 06 | 7-0 | IN: NOT USED |
| | XX | OUT: CLEAR STATUS WORD |
| 07 | 7-0 | IN: NOT USED |
| | XX | OUT: CLEAR INTERRUPT FROM MTC |
| 08 | 7-0 | IN: NOT USED |
| | 0 | OUT: MODEM MODE WHEN LOW; TERMINAL MODE WHEN HIGH |
| | 1 | ASYNCHRONOUS MODE WHEN LOW; SYNC WHEN HIGH |
| | 2 | LOOP CHANNEL 0 WHEN HIGH |
| | 3 | LOOP CHANNEL 1 WHEN HIGH |
| | 4 | PBX RATE WHEN LOW; TERMINAL RATE WHEN HIGH |
| | 7-5 | RATE SELECTION: |

| | ASYNC | PBX | SYNC |
|---|---|---|---|
| 000 | NONE | 128K | NONE |
| 001 | NONE | 64K | NONE |
| 010 | 19.2K | 32K | 19.2K |
| 011 | 9.6K | 16K | 9.6K |
| 100 | 4.8K | 8K | 4.8K |
| 101 | 2.4K | 8K<br>1.2K | 2.4K |
| 11x | NONE | NONE | NONE |

| ADDRS | BIT | DESCRIPTION |
|---|---|---|
| 09 | 7-0 | IN: NOT USED |
| | 0 | OUT: NOT USED |
| | 3-1 | BITS PER MESSAGE-CXC SIDE |
| | | 000 12 |
| | | 001 11 |
| | | 010 10 |
| | | 011 9 |
| | | 100 8 |
| | | 101 7 |
| | | 110 6 |
| | | 111 NOT USED |
| | 5-4 | NOT USED |
| | 6 | 128K MODE WHEN HIGH (USES BOTH CHANNELS) |
| | 7 | CHANNEL 1 IN VOICE MODE WHEN HIGH |
| 0A | 7-0 | IN: NOT USED |
| | 0 | OUT: NOT USED |
| | 3-1 | BITS PER MESSAGE-TERMINAL SIDE (SEE 109, BITS 3-1) |
| | 5-4 | NOT USED |
| | 7-6 | BITS PER FRAME: |
| | | 00 1 |
| | | 01 2 |
| | | 10 4 |
| | | 11 8 |
| 0B | 7-0 | IN: NOT USED |
| | 2-0 | OUT: MICROPROCESSOR UART CLOCK |
| | | 000 19.2K BAUD |
| | | 001 9.6K |
| | | 010 4.8K |
| | | 011 2.4K |
| | | 100 1.2K |
| | | 101 .6K |
| | | 110 .3K |
| | | 111 .15K |
| | 3 | UART CLOCK ENABLE WHEN HIGH |
| | 4 | NOT USED |
| | 5 | PWDN OUTPUT HIGH WHEN HIGH |
| | 6 | NOT USED |
| | 7 | NOT USED |
| 0C | 7-0 | IN: NOT USED |
| | 6-0 | OUT: FAST CLOCK VALUE FOR SYNC TERMINAL MODE |
| | | 19.2K–4.8 27 |
| | | 2.4K–1.2K 4F |
| | 7 | NOT USED |
| 0D | 7-0 | IN: NOT USED |
| | 6-0 | OUT: NOMINAL CLOCK VALUE FOR SYNC TERMINAL MODE |
| | | 19.2K–4.8 28 |
| | | 2.4K–1.2K 50 |
| | 7 | NOT USED |
| 0E | 7-0 | IN: NOT USED |
| | 6-0 | OUT: SLOW CLOCK VALUE FOR SYNC TERMINAL MODE |
| | | 19.2K–4.8 29 |
| | | 2.4K–1.2K 51 |
| | 7 | NOT USED |

**NOTE: The last three registers (10C, 10D, 10E) contain counter pre-load values for -continued

| ADDRS | BIT | DESCRIPTION |
|---|---|---|
| varying the outbound clock that the MTC provides for synchronous terminals that operate at other than power-of-2 frequencies. | | |
| 0F | 7-0 | IN: NOT USED |
| | 4-0 | OUT: STOP BIT COUNTER PRESET VALUE |
| | | 19.2K–2.4K 1E |
| | | 1.2K 14 |
| | 7-5 | NOT USED |

The data read (address 00) can cause the eight bits of data from the packet channel input logic 622 to be gated through the bidirectional gate 1004 to the microprocessor data bus (D7-D0). The status read (address 01) can cause the status bits from the packet channel interface logic 622 to be gated through the bidirectional gate 1004. The format of the status bits transmitted to the microprocessor 612 is shown in the MTC Control Register Definition Table. The packet enable line, activated by a write to address 00, goes to the packet channel logic 622 to cause eight bits of data to be gated through the bidirectional gate 1004 to the packet channel shift register 726 in FIG. 51(*a*). The reset MTC line, activated by a write to address 01, causes certain initial conditions of the MTC to be set. The clear status line, activated by a write to address 06, clears the status register in the packet channel logic. The clear interrupt line, activated by a write to address 07, clears the packet channel logic interrupt.

If the microprocessor 612 performs a read command on address 602, the MTC 611 generates an enable signal to a keyboard matrix 614 which typically causes that keyboard matrix to enable its data output to the eight bidirectional data lines. When this occurs, the MTC 611 typically does not drive the data lines. Similarly, a microprocessor read command on address 603 will cause an enable signal to go to the other keyboard matrix 615. In the same fashion, addresses 604 and 605 are used by the microprocessor 612 to read from or write to the display 616. The MTC 611 participates in the access by generating enable signals to the display 616 when either address is decoded. Typically, the MTC 611 neither drives the data lines nor inputs the data for these two addresses.

If a microprocessor write command is performed on address 602, the MTC 611 activates the gain signal SGN/, to the telset 601. This informs the speaker phone or another device in the telset that the data bus contains control information for the speaker phone or the handset speaker. This data is typically used by the speaker phone or some other device to control the data and also to enable the call waiting signal CW. In conjunction with this use, the MTC can also generate a constant 600 Hz signal on CW which can be gated to the handset speaker or to the internal speaker to generate the call waiting signal tone.

A write on command address 0B with bit five set will generate the power down (PWDN) signal which can be used by a codec 613 or other device to turn its power off when not in use.

The multiplexer 1008 generates enables which cause the eight bits of data from the microprocessor to be gated through bidirectional gate 1004 into registers 1010, 1012, 1014, 1016, 1018, 1020, 1022 and 1024. These eight registers hold the status bits described in the MTC Control Register Definition Table and are activated by write commands to addresses 8, 9, A, B, C, D, E, and F respectively.

The bidirectional gate 1004 is a tri-state gate in each direction and does not affect the microprocessor data bus (PD7-PD0) except when a status read or a data read activates the enable line to the bidirectional gate 1004 through OR-gate 1006.

DETAILED LOGIC DIAGRAMS OF MTC MODULES

FIGS. 43 through 54 are detailed logic diagrams representing individual logic elements that may be included in the MTC modules described and illustrated in connection with the previous drawings.

As one of ordinary skill in the art will readily recognize, the structure and functions described in connection with the previous drawings may be implemented by various alternative arrangements of the logic elements. Although such equivalent detailed implementations may be used, as a matter of design choice, the particular arrangement of very basic elements is set forth in FIGS. 43 through 54 in the interest of total disclosure of the present invention.

Figure 53:
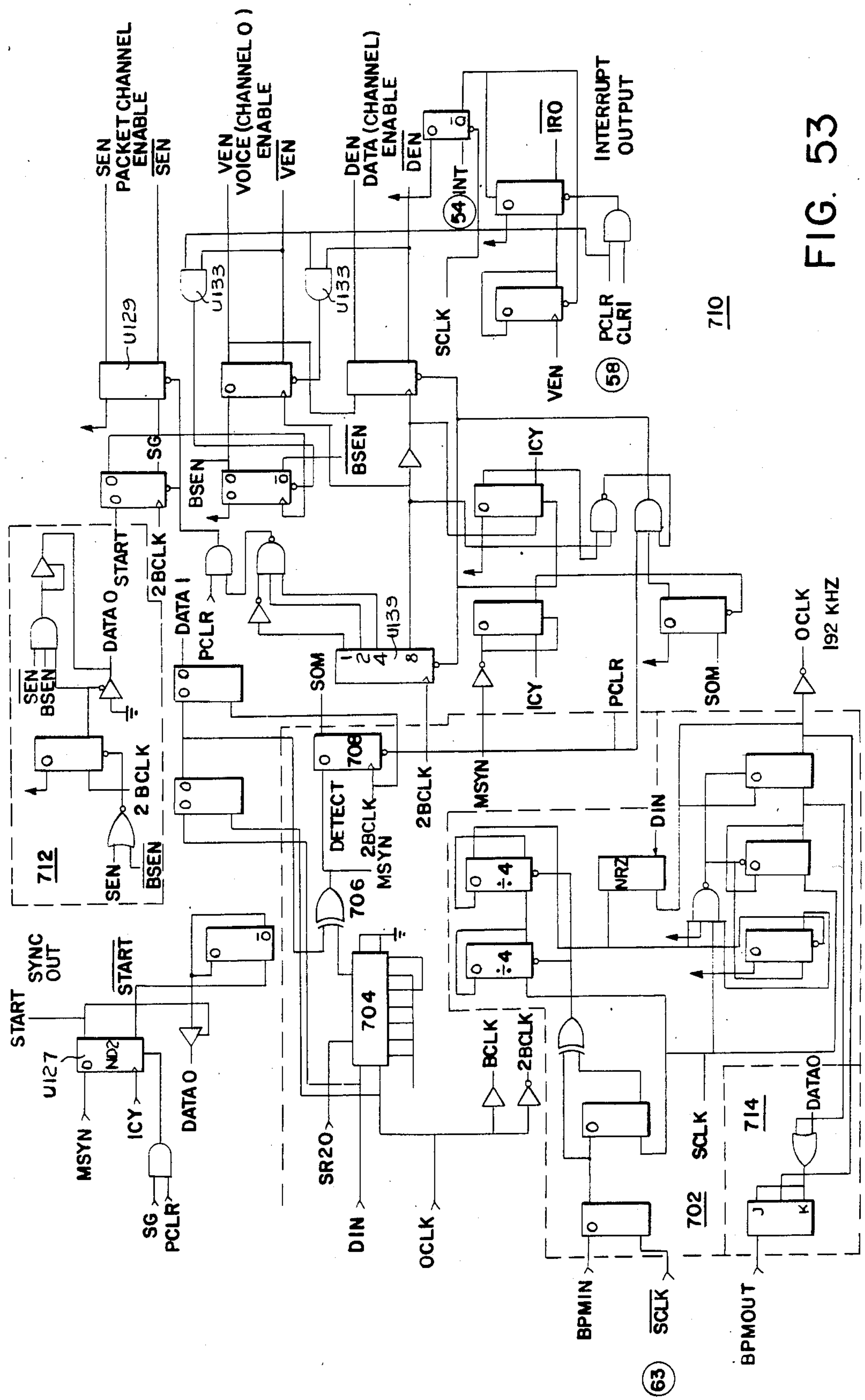
FIG. 53 is a logic diagram of the MTC system interface.

FIG. 53 illustrates the logic for the system interface 621, shown more generally at FIG. 51*a*. The inputs to the system interface are the system clock (SCLK) and the biphase Manchester encoded data in (BPMIN). The output to the system node is the biphase Manchester data out (BPMOUT). The data in (BPMIN) is input through the decoder logic 702 through two D flip flops and two divide by four flip flops, and is output from the NRZ flip flop as NRZ data (DIN). The decode circuit also drives the 0 clock (OCLK) which operates at 192 kHz. OCLK drives both the NRZ data in and the data out passing through decoder logic 714. Data in is communicated to the 25 bit shift register 704 which operates as a frame synchronous detect circuit. Shift register 704 detects the alternating synchronization bit every frame time, i.e. every 24 bits. Comparator 706 compares the first and twenty fifth bits of the data in and outputs a signal to the detect flip flop in the synchronous logic 708. As long as output of the detect flip flop remains active the MTC remains in synchronization with the data in. The remaining portion of FIG. 43 is the timing logic 710 which generates the various timing signals used in the MTC. The four bit counter in the center of the figure enables three timing windows which are used to formulate the packet channel enable (SEN), voice (channel 0) enable (VEN), data (channel 1) enable (DEN). The synchronous output signal (START) is generated at the upper left portion figure. The data out signal (DATAO) which is generated in the upper center of the figure is an OR of everything that is generating data in the system. The interrupt output signal (IRQ) is active every 250 microseconds and operates to synchronize the MTC with the incoming receive packet channel data.

Figure 54:
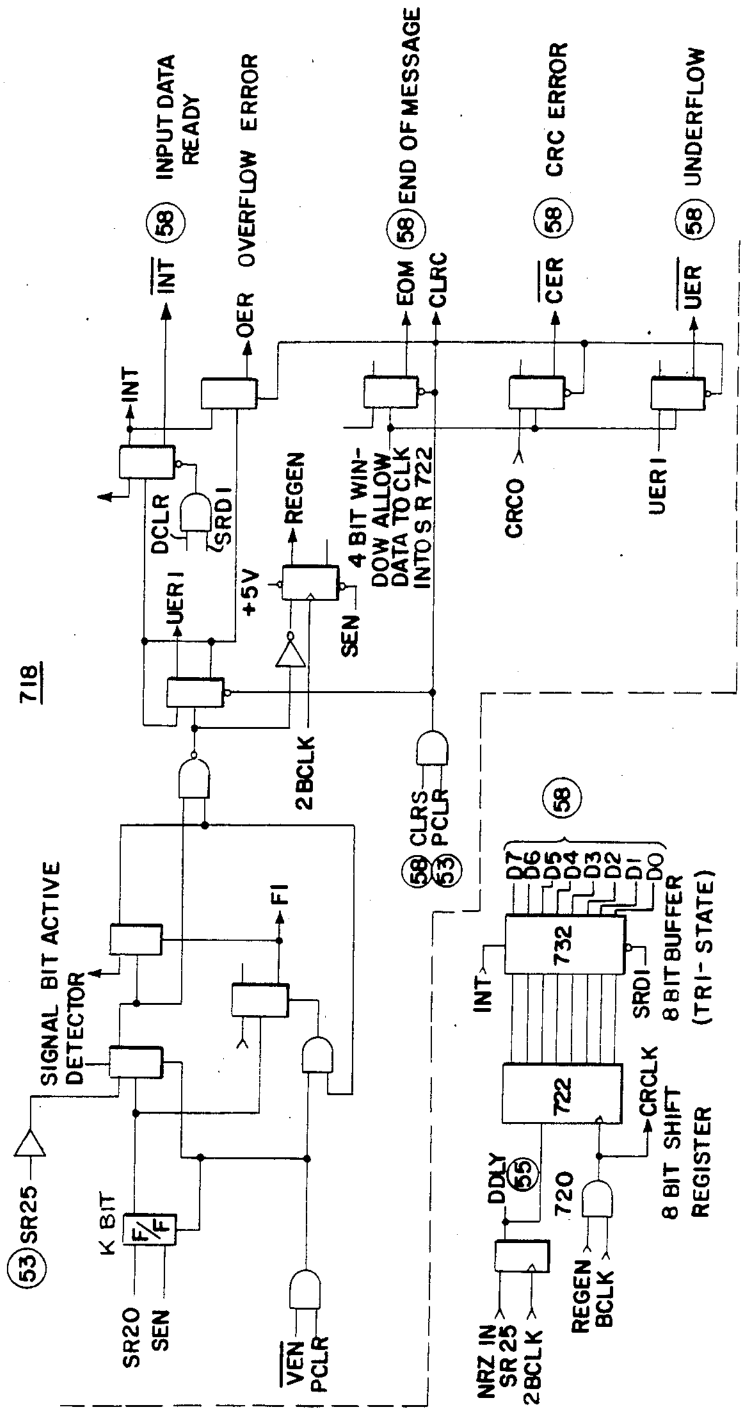
FIG. 54 is a logic diagram of the MTC packet channel receive logic.

FIG. 54 illustrates the packet channel receive logic. This circuit functions to receive data from the 25 bit shift register in the system interface, track the CRC status, and formulate the data into 8 bit bytes to be read by the microprocessor. The input from the 25 bit shift register, which is NRZ data delayed by 25 bits, (SR25) is input to a detector which determines whether valid data is being received. The signal bit active detector also receives an input from the k bit flip flop which indicates whether the k bit is active. If the k bit is active, meaning that fill data is being sent, then the NRZ data will not be communicated to the microprocessor. The right hand portion of the figure includes logic circuitry that keeps track of certain status conditions and generates signals corresponding to those conditions. The input data ready (INT) signal indicates that data is ready for communication to the microprocessor. The overflow error (OER) flag indicates that there has been an overflow condition. The end of message flag (OEM) indicates that no further valid data is to be sent. The CRC error flag (CER) receives information from the CRC checking circuit illustrated at FIG. 55 and indicates if there has been an error in the CRC checking. The underflow error flag (UER) indicates that an incomplete message has been received. The REGEN flag enables a 4 bit window to allow data to clock into the shift register 722 via AND gate 720, shown in the lower left portion of the figure.

Figure 55:
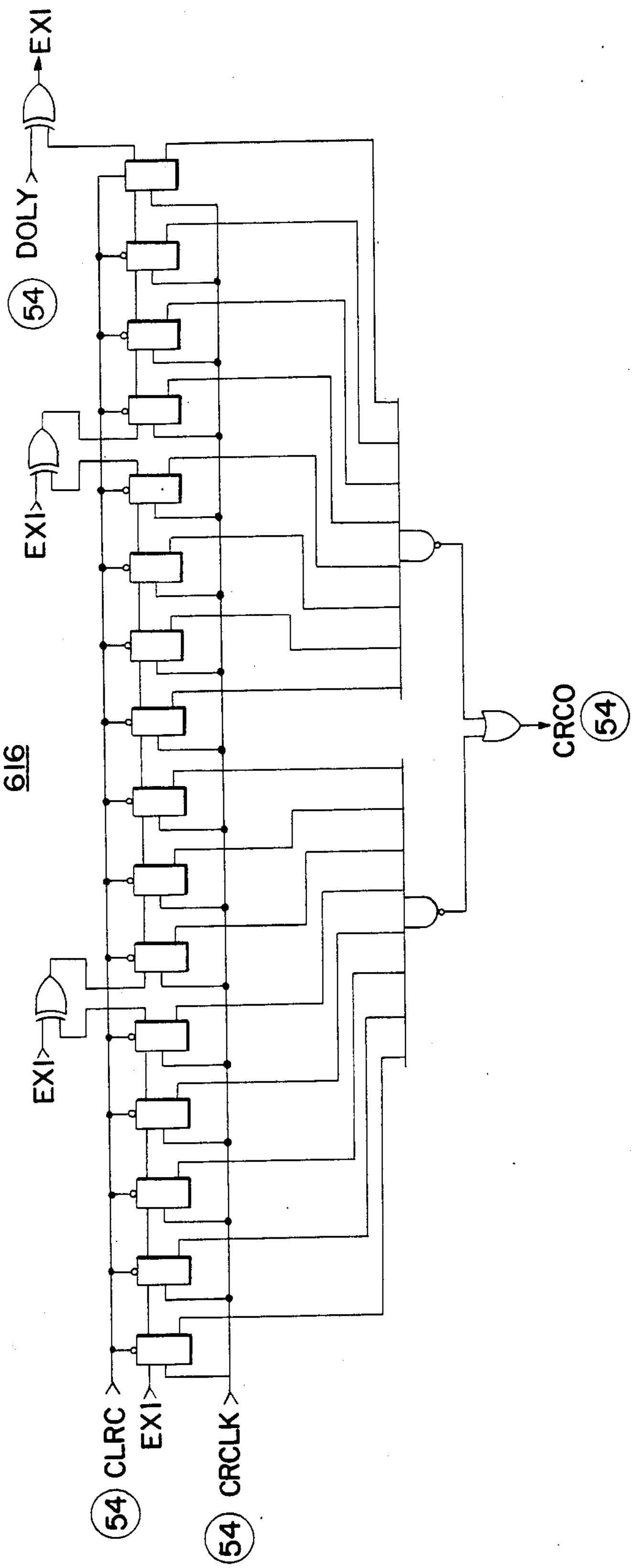
FIG. 55 is a logic diagram of the MTC CRC checking logic.
Figure 57:
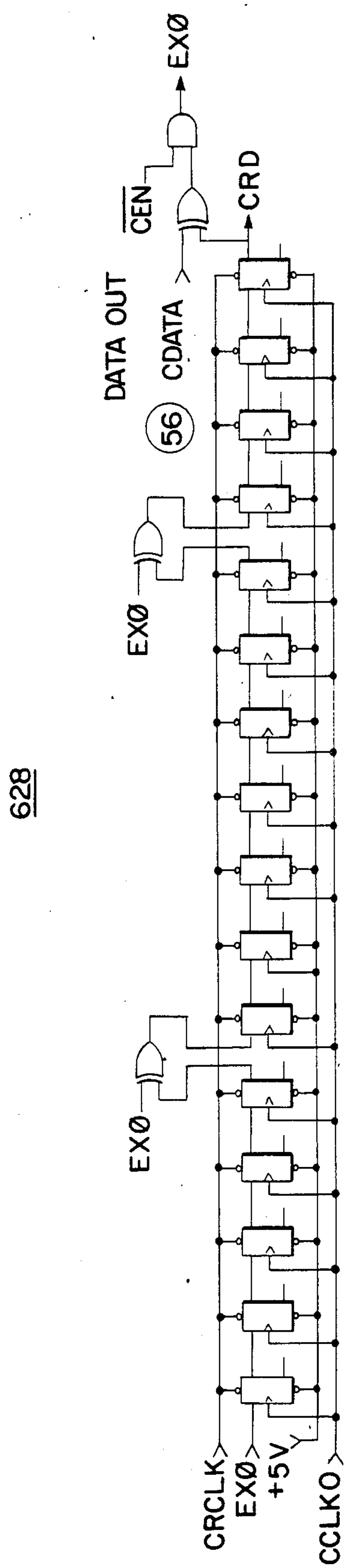
FIG. 57 is a logic diagram of the MTC CRC generating logic.

FIGS. 55 and 57 illustrate the CRC checking logic and the CRC generating logic respectively. The input to the CRC checking circuit (DDLY) is input to a comparator, the output of which is input to the serial network of shift registers at three different points. Both the CRC checking circuit and the CRC receiving circuit operate in accordance with the CCITT polynomial, $X^{16}+X^{12}+X^{5}+1$. If the received information is properly in accordance with that standard the CRC error signal (CRCO) will remain inactive. If the received signal is not in accordance with that polynomial an error signal will be communicated to FIG. 54 and a CRC error will be indicated.

The circuitry of FIG. 57 operates in the accordance with the same polynomial. The data out (CDATA) is communicated to a comparator simultaneous with its transmission. The CDATA signal is used to derive an EXO signal which is communicated to the serial shift register network at several locations. The resulting signal (CRD) is appended to the output signal transmitted from the MTC. When the resulting signal is received at the PLS it will be checked to insure proper CRC generation, as described in connection with FIG. 55.

Figure 56:
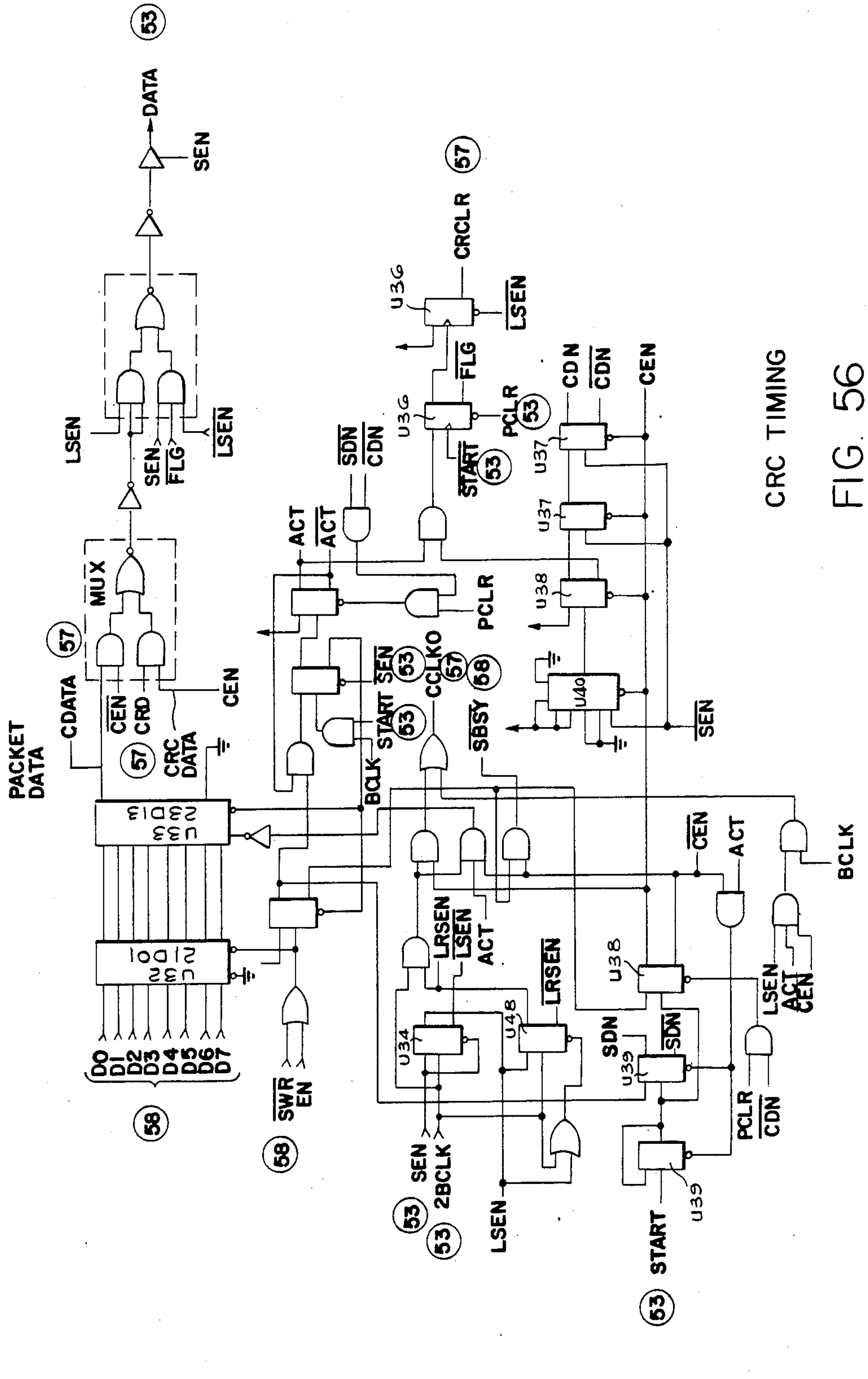
FIG. 56 is a logic diagram of the MTC CRC timing logic.

FIG. 56 illustrates the CRC timing logic. The microprocessor writes to the timing logic via the U32 buffer, in the upper left portion of the figure. That operation causes data to be output in the packet channels. Information from the buffer is communicated the to U33 8 bit shift register, from which it is output at 4 bits per frame until there is no more information being written by the microprocessor. The packet data (CDATA) is multiplexed with the CRC data in multiplexer U72, the output of which is then multiplexed with a signaling flag bit (FLG) such that the data is injected at the beginning of the signaling channel each frame time for as long as the message is active. The output signal (DATAO) serves as the input to the flip flop which generates the DPM data out as shown in the decoder circuit 714, at FIG. 53. The remaining circuitry of FIG. 56 includes timing circuitry to gate the CRC and packet data to the output, as well as status flip flops. The active signal (ACT) indicates that there is a message active that can be output. The CRCLR signal initializes the CRC checker at the beginning of a message. The status busy signal (SBSY) indicates that the output channel is busy so that the microprocessor cannot write a new byte until the SBSY signal goes inactive. The SBSY signal is derived from the internal timing which indicates whether the internal buffer has been emptied.

Figure 58:
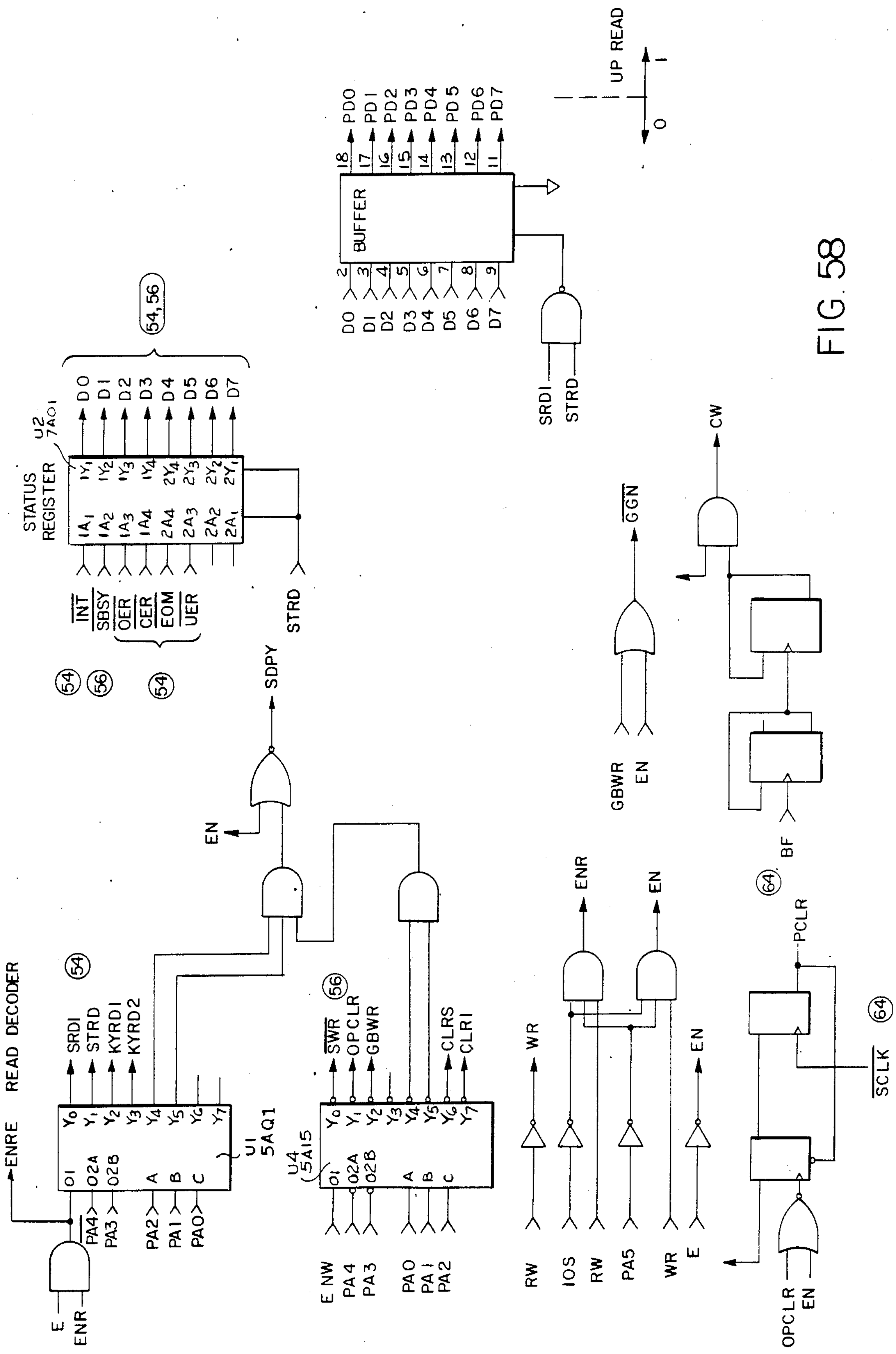
FIG. 58 is a logic diagram of the MTC decoding logic.

FIG. 58 illustrates the decoding logic for the MTC. Sixtéen addresses are decoded by the MTC. The decoded signals are placed on an internal bus for use by the MTC's internal registers. Address 0 of the read decoder, shown at the upper left portion of the figure is SRDI, which is the incoming signaling packet channel data. Thus, when the microprocessor reads address 0 it is receiving incoming packet data. Address 1 is the status read (STRD) address provides the status of the packet channel in and the packet channel out. KYRD1 and KYRD2 addresses function to read the telset keyboards.

Status register 724, shown to the right of the read decoder, communicates status information to the microprocessor. INT is the incoming packet data ready bit. SBSY is the busy packet out bit. The remaining inputs are monitors for the status of the incoming packet channel. Those inputs include overflow (OER), CRC error (CER), end of message (OEM) and under-run (UER).

The display driver signal (SDPY) is generated from two addresses from the read decoder and two addresses from the write decoder. Among the other addresses on the write decoder is SWR, which enables writing to the packet output register. OPCLR clears all the timing circuits associated with the incoming and outgoing serial bit streams in the MTC. The OPCLR signal is gated with an enable signal (EN) to generate the PCLR signal synchronous with the system clock, as shown in the lower left portion of the figure. The signal GDWR is gated with the enable signal (EN) in order to produce the signal SGN which enables writing to the gain register. The clear status signal (CLRS) serves to clear the packet status bits illustrated at FIG. 54. The clear interrupt signal (CLRI) occurs when the microprocessor has performed a read operation after an interrupt flag has become active.

Below the write decoder is further decoding circuitry for the read and write circuitry. Also illustrated is the logic circuitry to generate the call waiting signal (CW), which is a 600 Hz output used for a call waiting tone. To the right of the figure is an 8 bit bidirectional buffer which is normally in the input mode. There are only two pertinent read operations, which occur when the microprocessor effects a status read and data read. Those operations are accommodated via the STRD and SADI signals, respectively.

Figure 59:
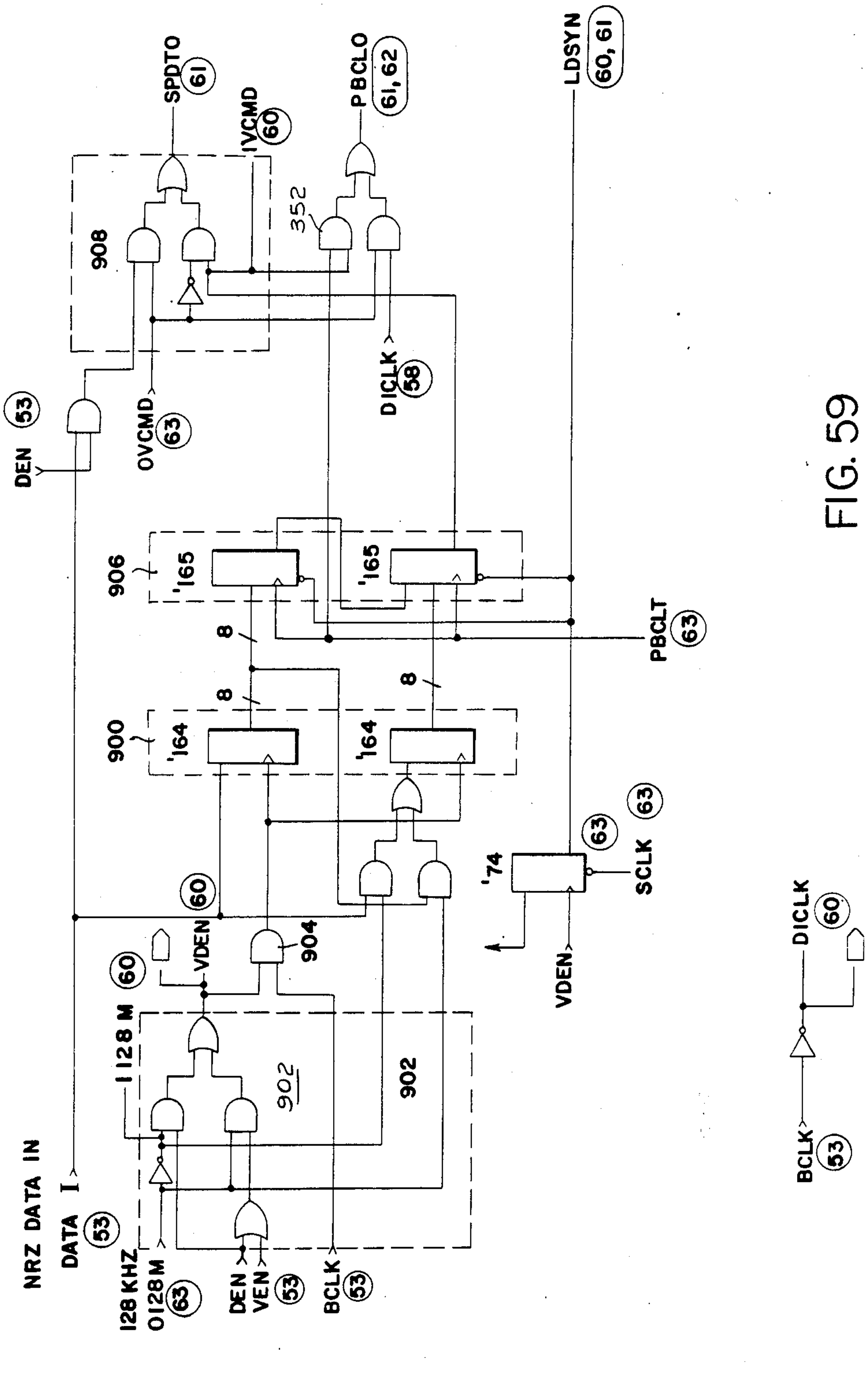
FIG. 59 illustrates a portion of the MTC clear channel rate conversion logic.

FIGS. 59-64 all pertain to the circuit switch data paths in the MTC. Shown more generally in connection with FIG. 41*d*. In FIG. 59 the NRZ data in is communicated on the DATAI line to one or both of the '164 shift registers, depending upon the mode the MTC is operating in. If the MTC is in the 120 kHz mode, both shift registers will be loaded with 8 bits. At the end of the frame the 164 shift register will load into the 165 buffers. The 165 buffers are clocked by the PBX clock rate (PBCLI). Thus, the incoming 192 kHz clock rate is smoothed to whatever the PBX clock rate is. The outgoing data is communicated at a continuous rate via the SPDTO output. The signal VCMD enables the MTC to use channel one as a voice channel by turning on the VCMD signal. In so doing, the 192 kHz DATI signal is gated directly out on the SPDTO line and the clock out (PBCLO) would be a function of the 192 kHz clock (DICLK).

Figure 60:
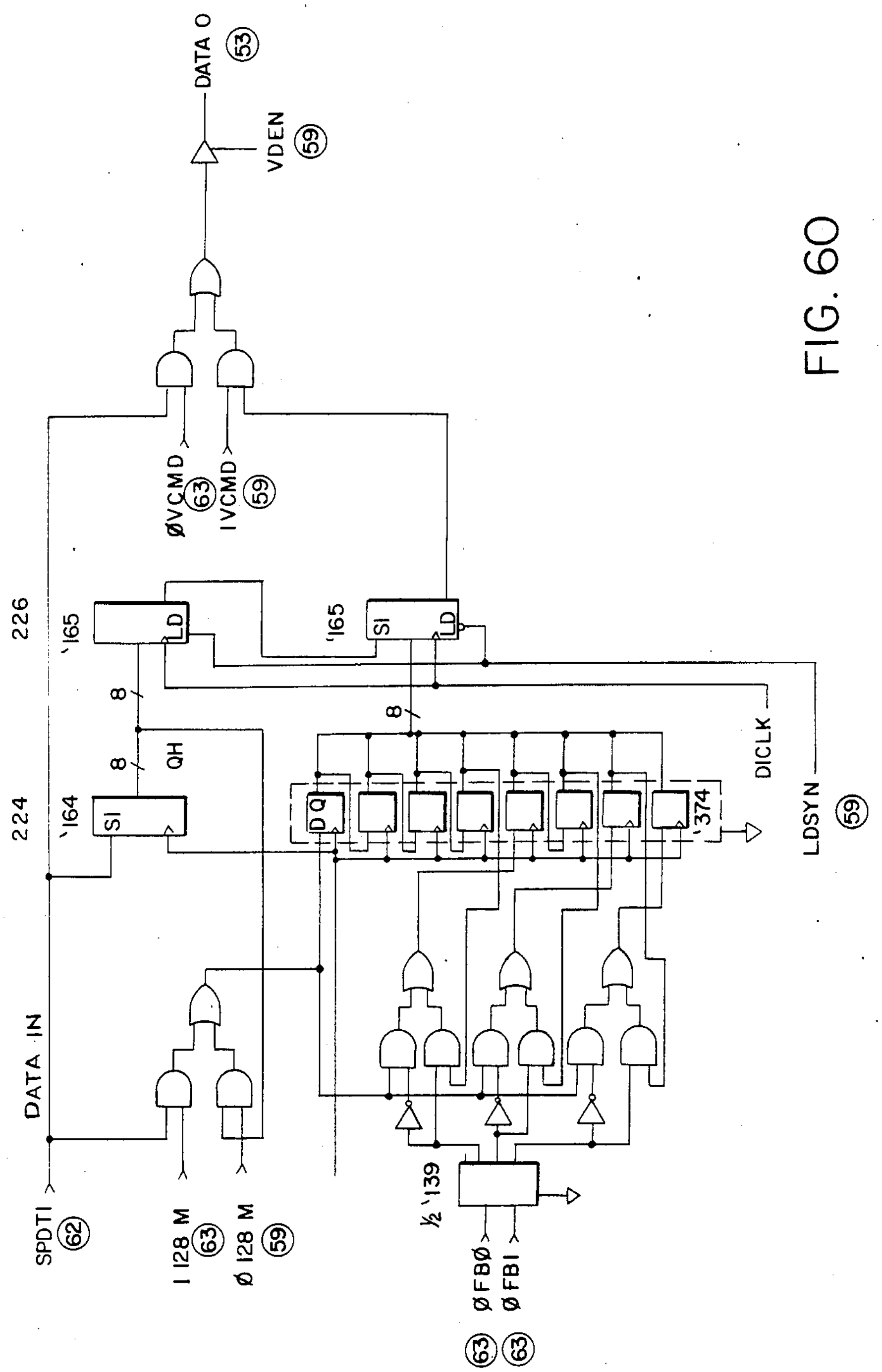
FIG. 60 illustrates another portion of the MTC clear channel rate conversion logic.

FIG. 60 illustrates part of the clear channel serial rate conversion logic directed to outputting information to the system interface, for transmission to the QPLS. The circuit is shown more generally at FIG. 51(*c*). The input to the circuit is labeled SPDTI, which may again be 8 or 16 bits depending upon whether or not the MTC is in the 128 kHz mode or not. The bits FB0 and FB1 are two register bits which configure a multiplexer arrangement to arrange the incoming data such that the least significant bit is in the proper location in the '374 register. In view of the way that the MTC affects variable bandwidth transfer to the system node, i.e. not all of the transferred bits necessarily have valid dates, the MTC must least significant bit justify the data transmitted to the node such that the valid data is contained within the first bits transferred to the system node. The remaining bits will comprise fill data, which is transparent to the receiving station, that operates at the same rate as the transmit station. When the MTC is configured for voice mode operation the signal VCMD enables the SPDTI signal to bypass the register circuitry and be communicated directly to the output (DATO). As presently configured the node will allocate one to four 8 or 16 bit spaces for communications with the MTC. The '374 register will accommodate the 1, 2, 4 or 8 bit modes. The 16 bit mode is accommodated by the '374 register and the 8 bit, 164 register directly above.

Figure 61:
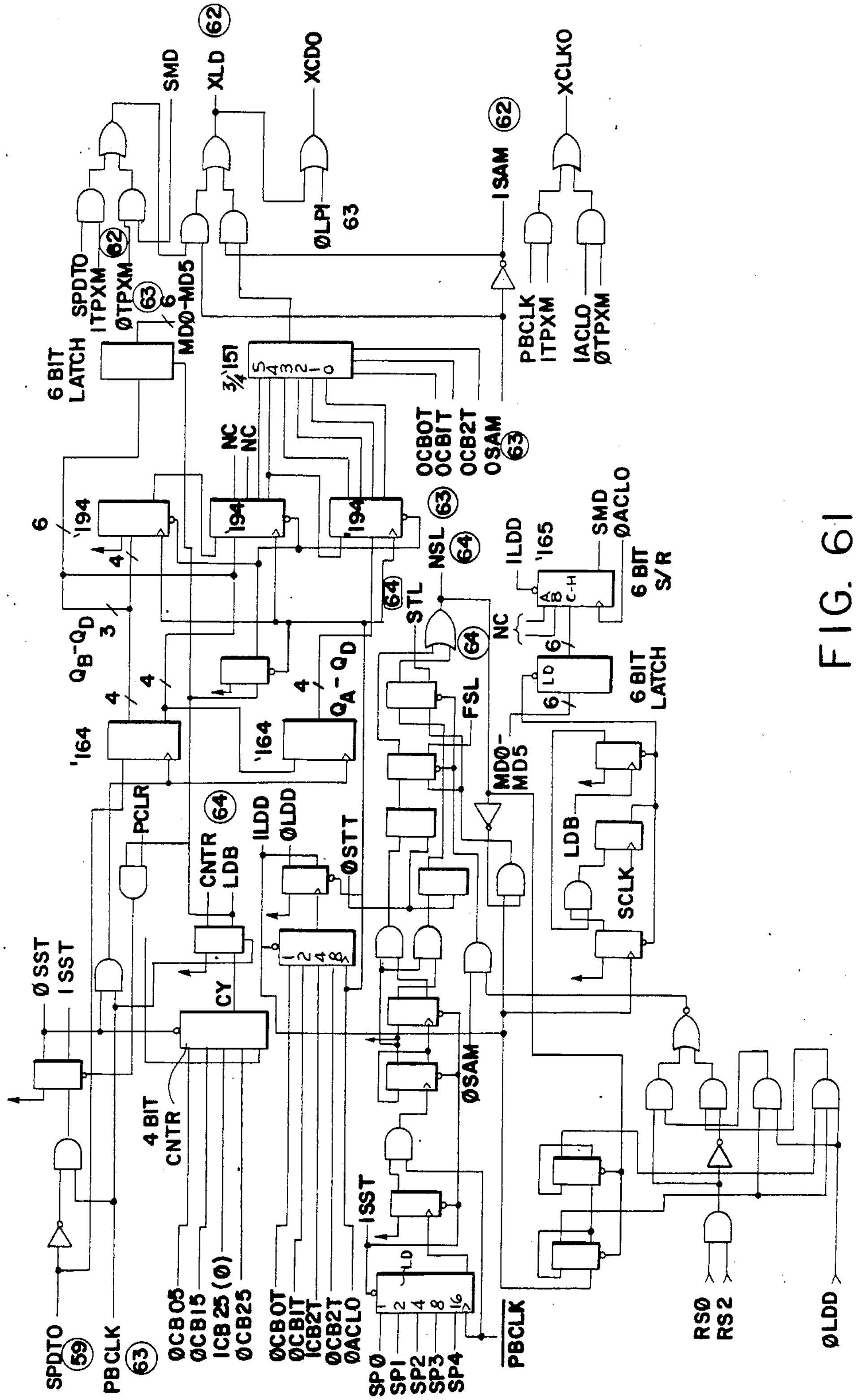
FIG. 61 illustrates another portion of the MTC clear channel rate conversion logic.

FIG. 61 illustrates some of the logic in the clear channel asynchronous, synchronous and terminal rate logic 625, illustrated more generally at FIG. 41*d*. The data into the circuit is communicated on the SPDTO input line to the 164 shift registers located in the center of the figure. The number of bits loaded into the 164 shift registers is a function of the 4 bit counter connected to the station inputs OCB0S, OCB1S, 1CB2S, and OCB2S. The information in the 164 registers is communicated to the 194 registers and clocked out at the clock rate OACLO. Thus, data is brought in at the PBCLK clock rate and is output at the clock rate of the device (OACLO). In asynchronous operation the stop bit is detected by the STT flip flop at the upper left portion of the figure. The character is then clocked into the 164 shift registers previously described. In synchronous operation much of the logic circuitry is omitted and the input SPDTO signal is communicated to the XCTO output via the AND gate network in the upper right portion of the figure. In the PBX mode the output is selected from the SMD input to the AND gate network which is derived from the 6 bit latch output MD0-MD5 as shifted through the 6 bit SMD shift register in the lower center portion of the page. The output timing signal (XCLK0) is derived from the logic circuitry shown in the lower right portion of the figure. When in the PBX mode the timing signal PBCLK is selected as the output timing signal. In the terminal mode the signal ACLO is selected. The ACLO signal is derived at FIG. 64 in the drawings and is the product of the timing checking circuitry used in the terminal mode. The timing checking circuitry includes the 5 bit counter shown at the center left portion of the figure which is used to monitor the contents of the incoming data stream to determine whether a proper number of stop bits are in the input characters. If an incorrect number of stop bits is detected the timing checking circuitry functions to enable the slow clock (SSL) or the fast clock (FSL) as described previously in connection with FIG. 51(*d*). If the incoming data contains the proper number of stop bits the nominal clock rate signal (NSL) enables the ACLO clock.

Figure 62:
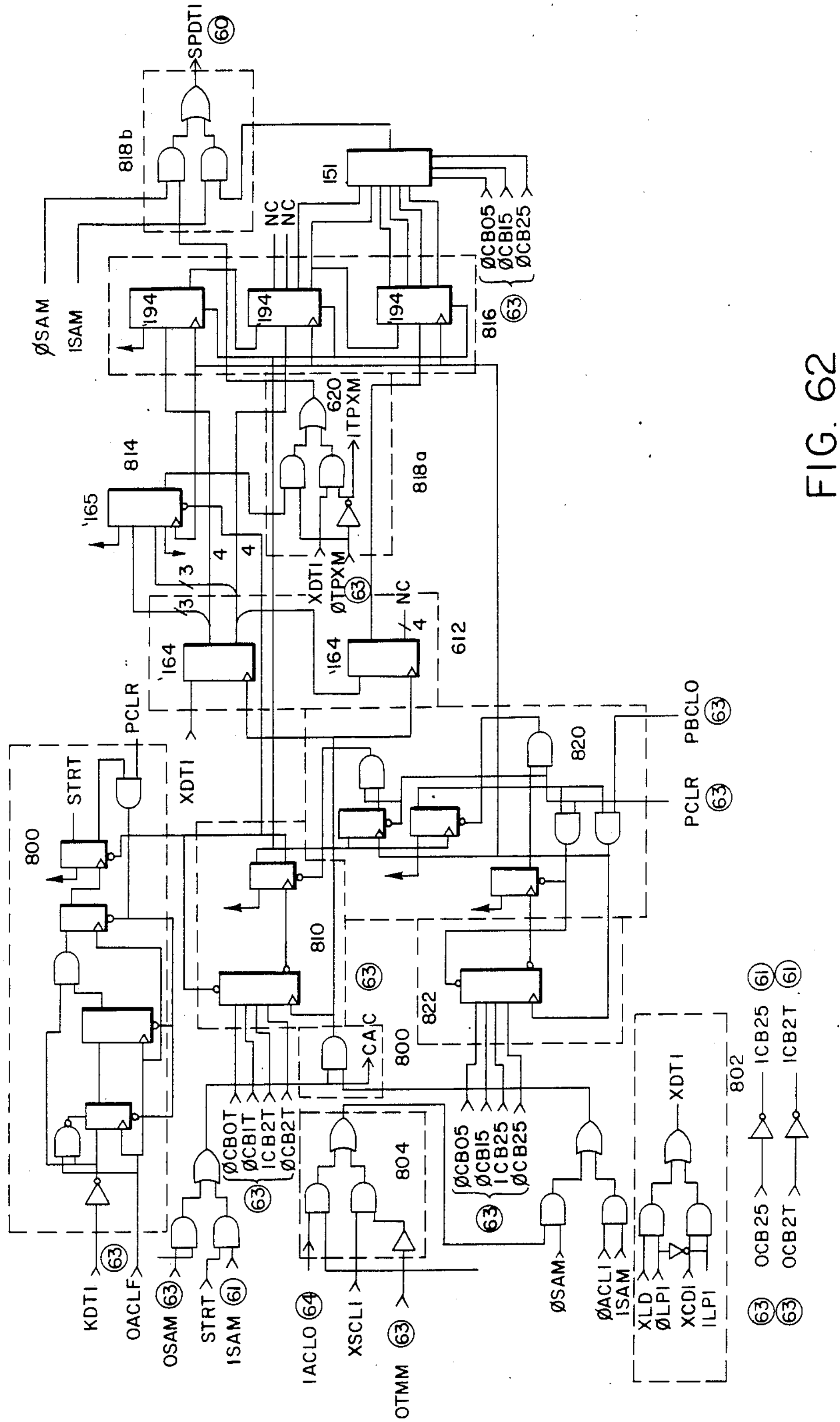
FIG. 62 illustrates another portion of the MTC clear channel asynchronous, synchronous and terminal rate logic.

FIG. 62 illustrates a portion of the clear channel asynchronous, synchronous and terminal rate logic for receiving data from a device and rate converting that data for transmission to the circuitry illustrated at FIG. 60. The circuitry at the upper left portion of the figure is the asynchronous start bit detect circuit 800, the output which is STRT. The input signal XTDI is also communicated to the 164 shift registers 812 at the terminal clock rate. The asynchronous mode at the signal in the register 812 is then communicated to the 194 registers 816 and is output from the multiplexor network 818(*b*) at the PBCLO clock rate. In the synchronous mode the output from the 164 shift registers is communicated to the '165 shift register 814. The output from that shift register is then communicated to the multiplexer 218*a* and 218(*b*) for output on the SPDTI line. The output from the asynchronous shift register 816 is communicated to a '151 multiplexer which enables a correct number of bits to the multiplexer 818(*b*). In the presently preferred embodiment the '151 multiplexer enables passage of between 7 to 12 bits in the asynchronous mode.

Figure 63:
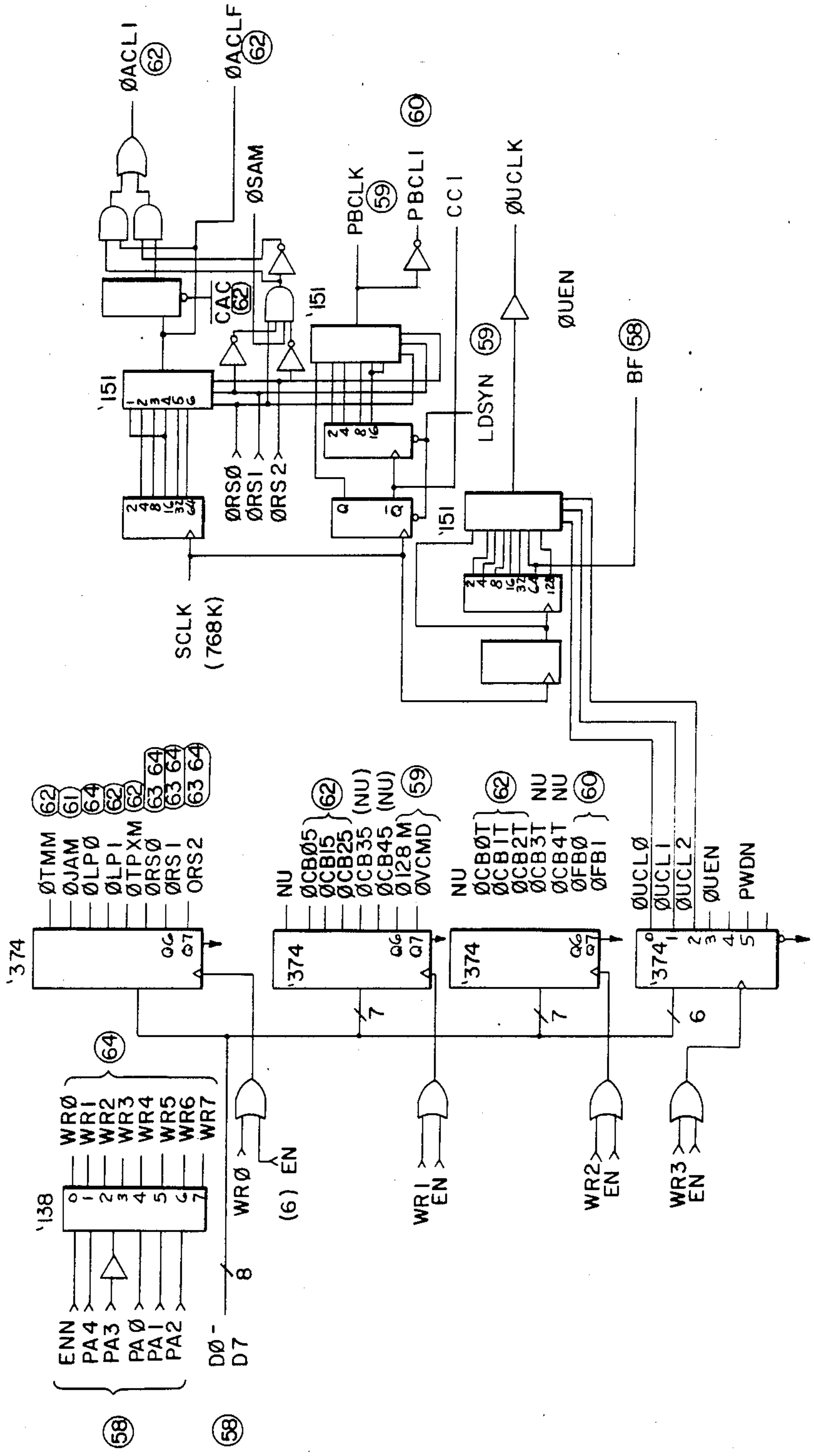
FIG. 63 is a logic diagram of the MTC decoding circuit.

FIG. 63 illustrates further decoding logic in the MTC. The write decoder at the upper left portion of the figure illustrates the decoder addresses for the signals WR1-7. The '374 registers illustrate the various addresses that can be written from the microprocessor to set up particular data operations. The top most '374 register begins with the address number 8 which correlates to the terminal modem mode (TMM) that determines whether the device's clock or the MTC clock is to be used. The SAM signal is the synchronous asynchronous mode flag. The LP0 and LP1 bits re for the loop back channel 0 and loop back channel 1 signals respectively. The TPXM bit is the terminal or PBX clock flag. RS0-2 are the 3 bits used to select the asynchronous clock rate (ACLI) and the PBX clock rate (PBCLK), illustrated at the right hand portion of the figure.

In the second most '374 register the bits OCB0S, OCB1S and OCB2S are used to determine the system side number of characters. Similarly, the signals OCBT, OCB1T and OCB2T determine the character size on the terminal side. The 0128M mode is the 128 kHz flag. The VCMD bit is the voice clear mode data flag. The FB0 and FB1 bits represent the number of bits per frame that are being used. The bits UCL0, UCL1 and UCL2 determine the rate of the clock signal UCLK. The bit UBN is the enable signal for the UCLK signal. The bit PWDN is used to select a data multiplexer and external circuitry.

Figure 64:
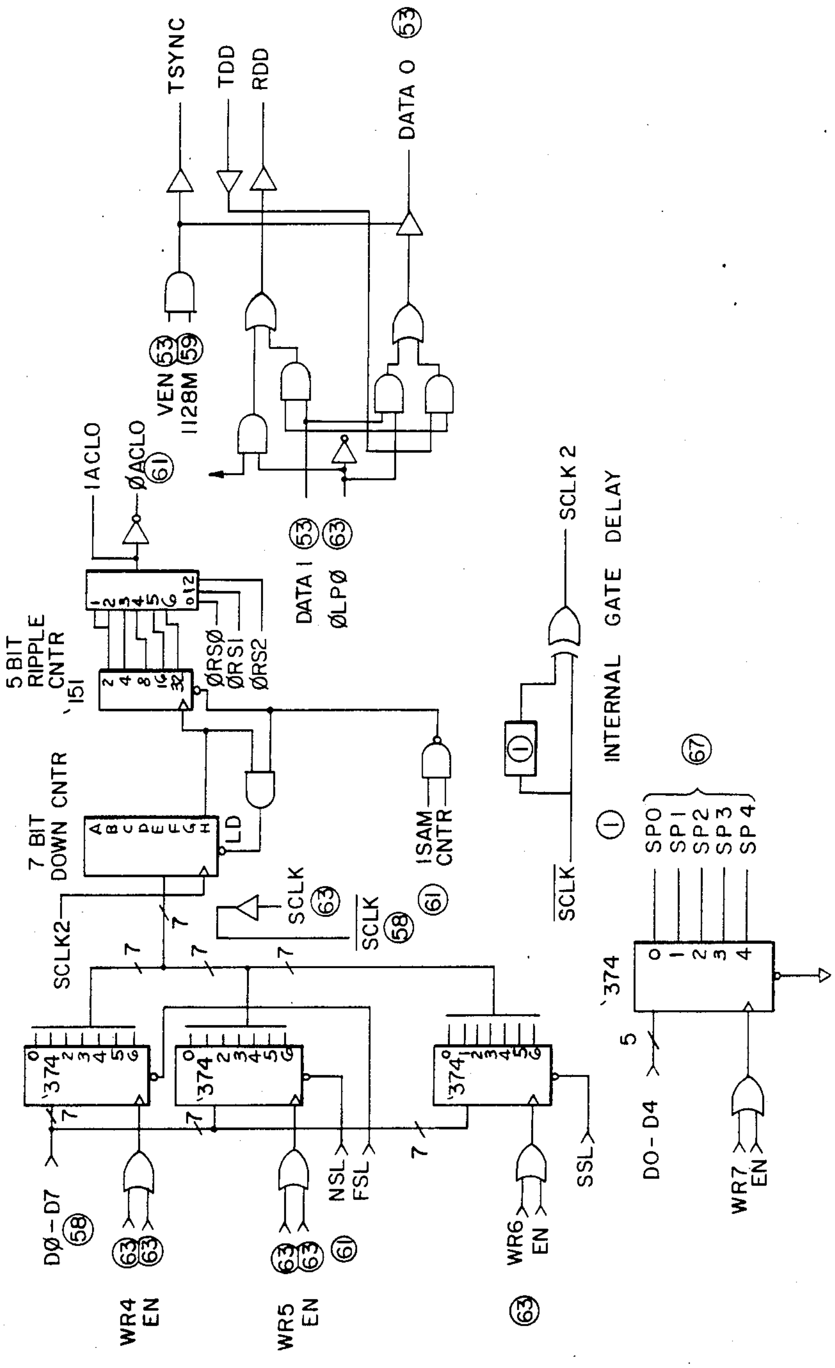
FIG. 64 is a logic diagram of the MTC output clock signals.

FIG. 64 illustrates the logic of the output clock generation signals. The three '374 registers on the left hand portion of the figure are the preload registers to a 7 bit down counter. The three preload registers contain the preload values to enable the fast clock, nominal clock or slow clock to increase or decrease a nominal clock rate, as previously described in connection with FIG. 51(*d*). The preload values in the '374 registers are initialized by the microprocessor. The output of the 7 bit down counter is transmitted to a '151 multiplexer to enable selection of the ACLO clock rate. The S clock logic operates to double the clock doubler which is communicated to the 7 bit down counter to obtain high resolution of the counter. The '374 register at the lower left portion of the figure is loaded according to the rate of operation to indicate the number of stop bits between synchronous terminal characters. The logic in the upper right portion of the figure illustrates the signals communicated between the codec and the MTC. The T sync signal to the codec is the 128 kHz signal enabled by the voice enable signal (VEN). The data I signal is multiplexed at the righthand portion of the Figure according to whether or not the MTC is in the diagnostic mode causing the loop back bit (LP0) to be active. If not looped back the data I signal becomes the codec data in on the RDD input. The signal from the codec is fed into the MTC on the TDD input and becomes the DATA0 input to the microprocessor.

The foregoing description represents the presently preferred embodiment of the MTC. It should be understood that features such as the data rates and the message lengths described above are exemplary and do not represent limitations on the invention. The message lengths, data rates and other design criteria can be changed within the scope of the invention, which is defined only by the claim appended below.

VIDEO INTERFACE MODULE

Figure 65:
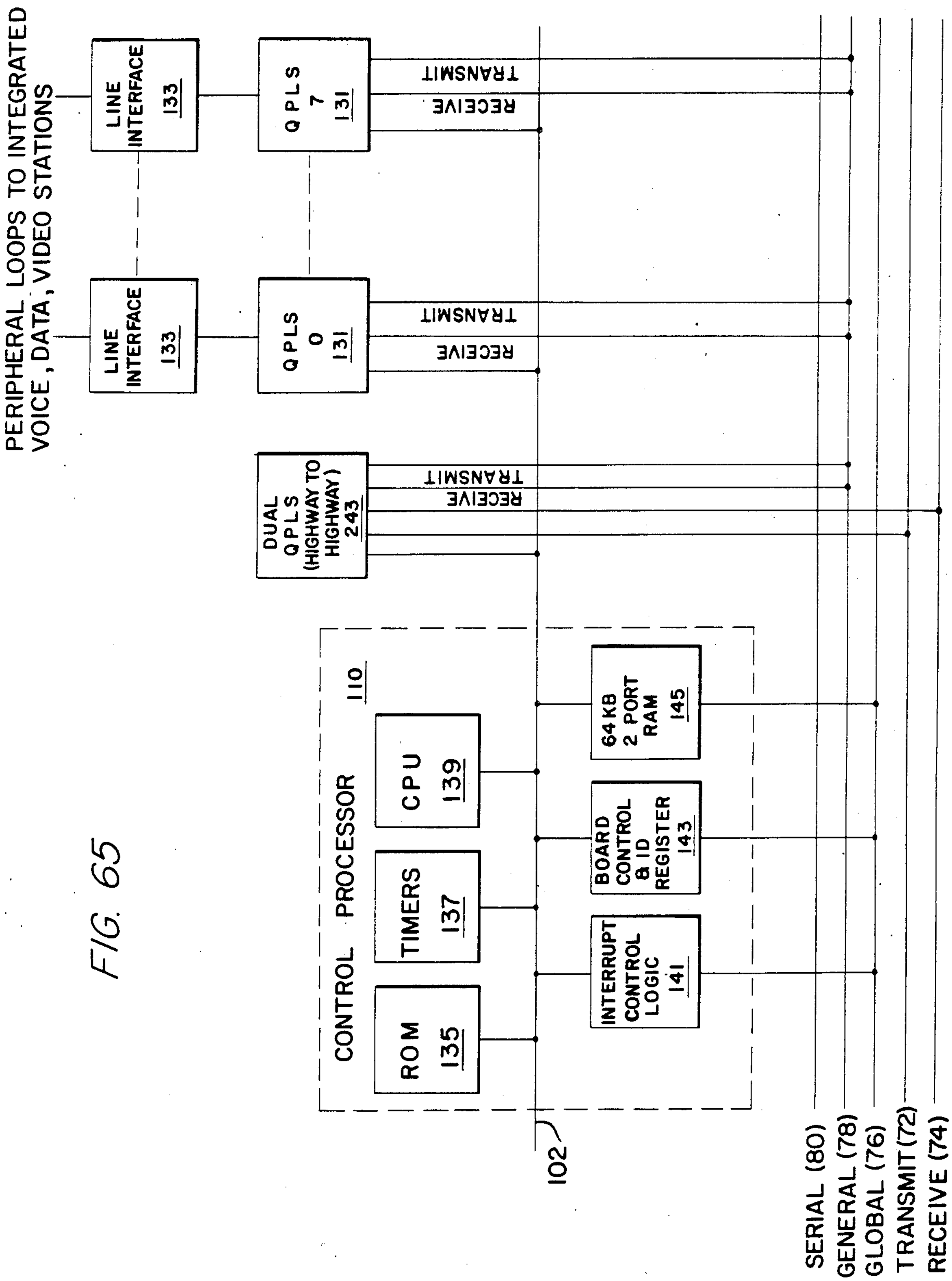
FIG. 65 is a block diagram of a video interface module (VIM).

The Video Interface Module (VIM) illustrated in FIG. 65 is substantially similar in structure and operation to the station interface module. The VIM 63, illustrated at FIG. 6(*a*), provides a structure for incorporating digitized video communication capacity to the system. VIM 63 differs from the construction of the SIM, shown at FIG. 10, in that the QPLS's do not attach to the transmit and receive highways, but rather to the alternate transmit and receive highways in the general purpose bus. A second difference between the construction of VIM 63 and the SIM is that the VIM includes dual QPLS chips 243 operating in a highway-to-highway switching mode, carrying eight channels from the receive transmit highways to the alternate transmit and receive highways and the general purpose bus. The control processor section 110 is similar to that found in the SIM or the NIM and functions in a similar manner.

The VIM is used in fully redundant (i.e., dual ring) systems where dual counter directional network loops are employed and each node has two NIM's. Typically, the forward ring could carry circuit switched voice and data, and the backward ring could carry high-speed video channels operating at 488 kbps. In this manner the backward ring could carry seventy-two channels of 448 kbps digitized video that is accessible through the NIM on the alternate transmit and receive highways. The QPLSs, operating in high-speed mode, can switch 764 kbps channels for an aggregate of 448 kbps to the peripheral loop. A voice channel may be switched to and from the transmit and receive highways to the alternate highway and receive highways by the dual QPLS. In this manner each VIM supports eight integrated work stations with 448 kbps of digitized video, 64 kbps of digitized voice, and a 32 kbps packet channel.

What is claimed is:

1. A digital communications system for transfer of a variable bandwidth of information from within a network signal stream comprised of said information to a digital communication device, said communications system comprising:

at least one network path for carrying the network signal stream, the network path having a first bandwidth;

a plurality of digital communication devices at least one of which has a lower bandwidth than the first bandwidth, a first of said communication devices being operative to generate a message signal for communication to a second of said communication devices;

at least one first controller operative to interpret the message signal and to generate bandwidth allocation control signals defining portions of the first bandwidth which are to be allocated to a communications path between the first and second digital communication devices; and plural nodes connected to the network path and each connected to at least one of the digital communication devices, the nodes being responsive to the allocation control signals for selectively transferring a variable bandwidth of information between the network path and at least one digital communication device, at least one of said plural nodes comprising:

means for transferring information between said network path and a plurality of network highways;

means for selectively transferring information between said network highways and a plurality of node highways, said node highways having a lower bandwidth than said first bandwidth of said network path; and means for selectively transferring information between said node highways and a digital communication device connected to said node.

2. A digital communications system for transfer of a variable bandwidth of information from within a network signal stream comprised of said information to a digital communication device, said communications system comprising:

at least one network path for carrying the network signal stream, the network path having a first bandwidth;

a plurality of digital communication devices at least one of which has a lower bandwidth than the first bandwidth, a first of said communication devices being operative to generate a message signal for communication to a second of said communication devices;

at least one first controller operative to interpret the message signal and to generate bandwidth allocation control signals defining portions of the first bandwidth which are to be allocated to a communications path between the first and second digital communication devices; and plural nodes connected to the network path and each connected to at least one of the digital communication devices, the nodes being responsive to the allocation control signals for selectively transferring a variable bandwidth of information between the network path and at least one digital communication device, at least one of the nodes comprising:

at least one network receive highway connected to the network path and operative to communicate at least a portion of the first bandwidth of information from the network path;

at least one network transmit highway connected to the network path and operative to communicate at least a portion of the first bandwidth of information to the network path;

data steering logic connected to at least one transmit highway and at least one receive highway;

at least one node transmit information highway connected to the data steering logic;

at least one node receive information highway connected to the data steering logic; and the data steering logic being operative to transfer a variable bandwidth of information between a selected network highway and a selected node information highway in response to the bandwidth allocation control signals,

3. The system as recited in claim 2 wherein at least one of the nodes further includes a data steering map connected to and adapted for operative control of data steering logic, the data steering map being operative to store information representing a proper configuration of the data steering logic to correlate information transfer between at least one of the network highways and at least one of the node information highways.

4. The system as recited in claim 3 further including a demultiplexer operative to communicate a network signal stream to said at least one network receive highway.

5. The system as recited in claim 4 further including a multiplexer operative to formulate a network signal stream from signals on said at least one network transmit highway.

6. The system as recited in claim 5 wherein the network path is configured as a ring network.

7. The system as recited in claim 5 wherein the network path is adapted to communicate a time multiplexed network signal stream having a control data portion and a circuit switched data portion, the control data portion including information regulating highway selection and the bandwidth of the information transferred between a network highway and a node receive highway.

8. The system as recited in claim 7 wherein demultiplexer (53) is operative to separate the control data portion of the network signal stream from the circuit switched data portion.

9. The system as recited in claim 8 further including an ethernet transceiver and a local area network controller, said transceiver and local area network controller being operative to communicate control information to and from the first controller to regulate highway selection and bandwidth of the information transferred.

10. The system as recited in claim 9 further comprising:

steering map control logic electrically connected to the first controller so as to receive signals therefrom; and wherein the first controller is adapted to receive control data from the demultiplexer and to formulate control data configuration signals for communication to the data steering map control logic.

11. The system as recited in claim 10 wherein the first controller is electrically connected to the local area network controller and adapted to receive control data from the local area network controller and to formulate control data configuration signals for communication to the data steering map control logic.

12. The system as recited in claim 2 further comprising:

a plurality of station ports, at least one of said station ports connected to one of said digital communication devices; and a switching device for transferring information between a plurality of said node information highways, and between at least one of said node information highways and at least one of said station ports, the switching device comprising a plurality of switches, each switch having a station-to-highway section and a highway-to-station section, each section being in electrical communication with a station port and with a plurality of node information highways, and said sections being adapted to communicate information between said station ports and said node information highways, each section further including information channel circuits that are independently configurable in response to dynamic control signals to communicate a selected bandwidth of information between the station ports and a selected node information highway.

13. The system as recited in claim 12 wherein the information highways may operate at one of a plurality of speeds.

14. The system as recited in claim 13 wherein the station-to-highway section includes programmable logic circuitry adapted to serially interconnect the same sections of at least two station-to-highway sections in response to the information rate on the information highways and the station ports.

15. The device as recited in claim 12 wherein the highway-to-station sections and the station-to-highway sections comprise independently configurable control registers which enable a plurality of simultaneous communications paths between the information highway and selected ones of said sections.

16. The device as recited in claim 12 wherein at least one of the highway-to-station sections comprises at least one information channel output register, which contains information representative of the information highway from which the information is transferred, the time relative to the beginning of a message frame at which the information is transferred and the bandwidth of information transferred from the information highways to the switching device.

17. The system as recited in claim 16 wherein the information channel output register may be dynamically reconfigured in response to control signals from the controller.

18. The system as recited in claim 12 wherein one of the station-to-highway sections comprises at least one information channel input register which contains information representative of the bandwidth of information transferred to the information highways from the switching device.

19. The system as recited in claim 18 wherein the information channel input register may be dynamically configured in response to control signals from the controller.

20. The system as recited in claim 8 further comprising:

a plurality of station ports for transmitting a serial signals stream; and a microtelephone controller adapted for connection to a digital communications device and in electrical communication with the station ports, the microtelephone controller being adapted to interface digital information between the station ports and the device, the microtelephone controller comprising:

a system interface being operative to demultiplex the serial signal stream from one of the station ports into control and data information for communication to the digital communications device, and to multiplex control and data information from the digital communications device into a serial signal stream for communication to the station port;

clear channel serial rate conversion logic for translating an information rate of data from the system interface to a rate compatible with an operating rate of the digital communications device, and for translating a rate of data from a local device to a rate compatible with an operating rate of the system interface;

asynchronous, synchronous, and terminal rate logic operative to format the data from the digital communications device as a message segment for transmission through the system interface to the station port, and for deriving data from message segments received from said system interface; and packet channel logic for communicating control information between the system interface and a microprocessor interface, and for generating monitoring signals responsive to contents of the control information.

21. The system as recited in claim 20 further including:

a voice interface for communicating voice information between an audio device (613) and the system interface.

22. The system as recited in claim 20 wherein the system interface comprises:

a system interface multiplexer operative to combine control signals from an external processor, voice signals from an external audio device and data signals from an external data device and to transmit a combined signal in a serial signal stream to the station port; and a decoder adapted to receive a serial signal stream from the station port and to separate a control signal portion of the received signal stream.

23. The system as recited in claim 20 wherein the data portion of the message segment transmitted to the station port includes a variable number of valid message bits, the number of message bits being determined in response to the operating rate of the digital communications device (614).

24. The system as recited in claim 20 wherein the data portion of the message segment from the station port includes a variable number of valid data bits, the number of valid bits being determined in response to the operating rate of the digital communications device.

25. A digital communications system for transfer of a variable bandwidth of information from within a network signal stream comprised of said information configured in a first bandwidth to a first digital device which is operative to provide message signals for communication to other digital devices, the first digital device having a device bandwidth which is different from the first bandwidth, wherein the digital communications system comprises:

means for carrying the network signal stream configured in said first bandwidth;

means responsive to the message signal for providing bandwidth allocation control signals defining portions of the first bandwidth to be allocated to provide a communications path between the first digital device and said means for carrying said network signal stream; and means connected to the means for carrying the network signal stream and to at least one of the digital devices, and responsive to the allocation control signals for selectively transferring a variable bandwidth of information between said means for carrying said network signal stream and said first digital device, said means for selectively transferring comprising:

means for transferring information from said means for carrying said network signal stream to a plurality of network highways, each of said network highways having a bandwidth less than the first bandwidth of said network signal stream; and means for selectively transferring information from said network highways to said digital device at said device bandwidth.

* * * * *

UNITED STATES PATENT AND TRADEMARK OFFICE
CERTIFICATE OF CORRECTION

PATENT NO. : 4,679,191

DATED : July 7, 1987

INVENTOR(S) : Gary A. Nelson, et al.

It is certified that error appears in the above-identified patent and that said Letters Patent is hereby corrected as shown below:

Column 5, line 33, change "The deive" to --The device--.

Column 15, line 49, delete second occurrence of "the".

Column 23, line 43, change "typical" to --typically--.

Column 25, line 31, change "redistribution. The" to --redistribution, the--.

Column 25, line 52, change "any node" to --any node that--.

Column 26, line 36, change "intranode" to --intra-node--.

Column 27, line 64, change "sterring" to --steering--.

Column 29, line 4, change "8(c)" to --8(b)--.

Column 29, line 62, after Intel delete "as".

Column 35, line 65, delete second occurrence of "as".

Column 38, line 7, change "hihway" to --highway--.

Column 39, line 14, change "rate" to --data rate--.

Column 51, line 25, change "OPLS" to --QPLS--.

Column 52, line 17, change "OPLS" to --QPLS--.

Column 52, line 36, change "OPLS" to --QPLS--.

Column 53, line 59, change "QE and PB" to --OE, and PB--.

UNITED STATES PATENT AND TRADEMARK OFFICE
CERTIFICATE OF CORRECTION

PATENT NO. : 4,679,191
DATED : July 7, 1987
INVENTOR(S) : Gary A. Nelson, et al.

It is certified that error appears in the above-identified patent and that said Letters Patent is hereby corrected as shown below:

Column 63, line 56, change "JF flip-flop" to --JK flip-flop--.

Column 87, line 54, change "the to" to --to the--.

Column 90, line 37, change "LP1 bits re" to --LP1 bits are--.

Column 95, line 27, after device delete "(613)".

Column 96, line 3, after device delete "(614)".

Signed and Sealed this

Twenty-first Day of March, 1989

*Attest:*

DONALD J. QUIGG

*Attesting Officer* — *Commissioner of Patents and Trademarks*